(12) United States Patent
Williams

(10) Patent No.: US 7,812,579 B2
(45) Date of Patent: *Oct. 12, 2010

(54) HIGH-EFFICIENCY DC/DC VOLTAGE CONVERTER INCLUDING CAPACITIVE SWITCHING PRE-CONVERTER AND UP INDUCTIVE SWITCHING POST-REGULATOR

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 11/890,941

(22) Filed: Aug. 8, 2007

(65) Prior Publication Data

US 2008/0157732 A1 Jul. 3, 2008

Related U.S. Application Data

(60) Provisional application No. 60/877,952, filed on Dec. 30, 2006, provisional application No. 60/877,720, filed on Dec. 30, 2006.

(51) Int. Cl.
*G05F 1/563* (2006.01)
(52) U.S. Cl. .................... 323/266; 323/222; 323/282; 363/60
(58) Field of Classification Search .............. 323/222, 323/266, 282; 363/59, 60
See application file for complete search history.

(56) References Cited

U.S. PATENT DOCUMENTS

| | | | | |
|---|---|---|---|---|
| 3,943,428 A | 3/1976 | Whidden | ................ | 363/60 |
| 4,533,986 A * | 8/1985 | Jones | ................ | 363/17 |
| 4,553,986 A | 11/1985 | Ciliberti et al. | ................ | 95/116 |
| 4,743,835 A | 5/1988 | Bosse et al. | ................ | 323/266 |
| 4,761,722 A | 8/1988 | Pruitt | ................ | 363/17 |
| 4,974,141 A | 11/1990 | Severinsky et al. | ................ | 363/81 |
| 5,066,900 A | 11/1991 | Bassett | ................ | 323/224 |
| 5,235,504 A | 8/1993 | Sood | ................ | 363/53 |
| 5,446,367 A | 8/1995 | Pinney | ................ | 323/266 |
| 5,557,193 A | 9/1996 | Kajimoto | ................ | 323/282 |
| 5,773,966 A | 6/1998 | Steigerwald | ................ | 323/284 |
| 5,886,512 A | 3/1999 | Becerra | ................ | 323/282 |
| 6,023,418 A | 2/2000 | Engira | ................ | 363/63 |
| 6,272,025 B1 | 8/2001 | Riggio et al. | ................ | 363/24 |
| 6,400,579 B2 | 6/2002 | Cuk | ................ | 363/16 |
| 6,428,918 B1 | 8/2002 | Fuglevand et al. | ................ | 429/13 |
| 6,504,423 B2 | 1/2003 | Riggio et al. | ................ | 327/560 |
| 6,580,258 B2 | 6/2003 | Wilcox et al. | ................ | 323/282 |
| 6,617,832 B1 | 9/2003 | Kobayashi | ................ | 323/266 |
| 6,650,552 B2 | 11/2003 | Takagi et al. | ................ | 363/17 |

(Continued)

FOREIGN PATENT DOCUMENTS

KR 10-2006-0084075 7/2006

*Primary Examiner*—Jeffrey L Sterrett
(74) *Attorney, Agent, or Firm*—Patentability Associates

(57) ABSTRACT

A DC/DC converter includes a pre-converter stage, which may include a charge pump, and a post-regulator stage, which may include a boost converter. The duty factor of the post-regulator stage is controlled by a feedback path that extends from the output terminal of the DC/DC converter to an input terminal in the post-regulator stage. The pre-converter steps the input DC voltage up or down by a positive or negative integral or fractional value, and the post-regulator steps the voltage up by a variable amount depending on the duty factor at which the post-regulator is driven. The converter overcomes the problems of noise glitches, poor regulation, and instability, even near unity input-to-output voltage conversion ratios.

27 Claims, 76 Drawing Sheets

U.S. PATENT DOCUMENTS

| | | | |
|---|---|---|---|
| 6,798,177 B1 * | 9/2004 | Liu et al. | 323/222 |
| 6,903,536 B2 * | 6/2005 | Yang | 323/266 |
| 6,937,487 B1 * | 8/2005 | Bron | 363/60 |
| 7,071,660 B2 * | 7/2006 | Xu et al. | 323/266 |
| 7,078,882 B2 * | 7/2006 | Weng et al. | 323/224 |
| 7,161,335 B2 | 1/2007 | Wei et al. | 323/266 |
| 7,317,302 B1 | 1/2008 | Collins | 323/222 |
| 7,336,059 B2 | 2/2008 | Steigerwald et al. | 323/288 |
| 7,359,219 B2 | 4/2008 | Erdl et al. | 363/16 |
| 7,408,330 B2 | 8/2008 | Zhao | 323/266 |
| 7,466,111 B2 * | 12/2008 | Komaki | 323/224 |
| 7,560,915 B2 | 7/2009 | Ito et al. | 323/282 |
| 2005/0099164 A1 | 5/2005 | Yang | 323/266 |
| 2008/0157733 A1 | 7/2008 | Williams | 323/266 |
| 2008/0158915 A1 | 7/2008 | Williams | 323/266 |
| 2009/0059630 A1 | 3/2009 | Williams | 323/282 |

* cited by examiner

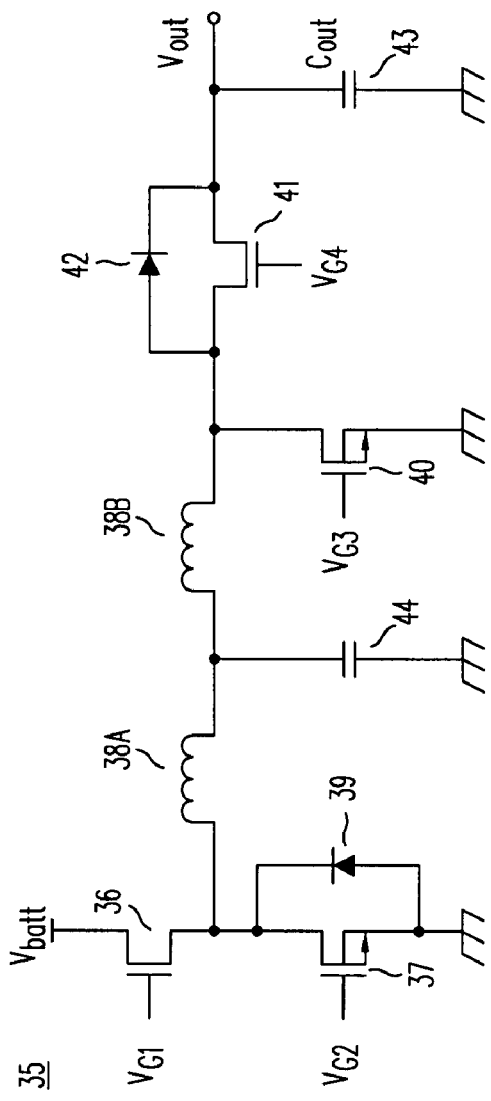
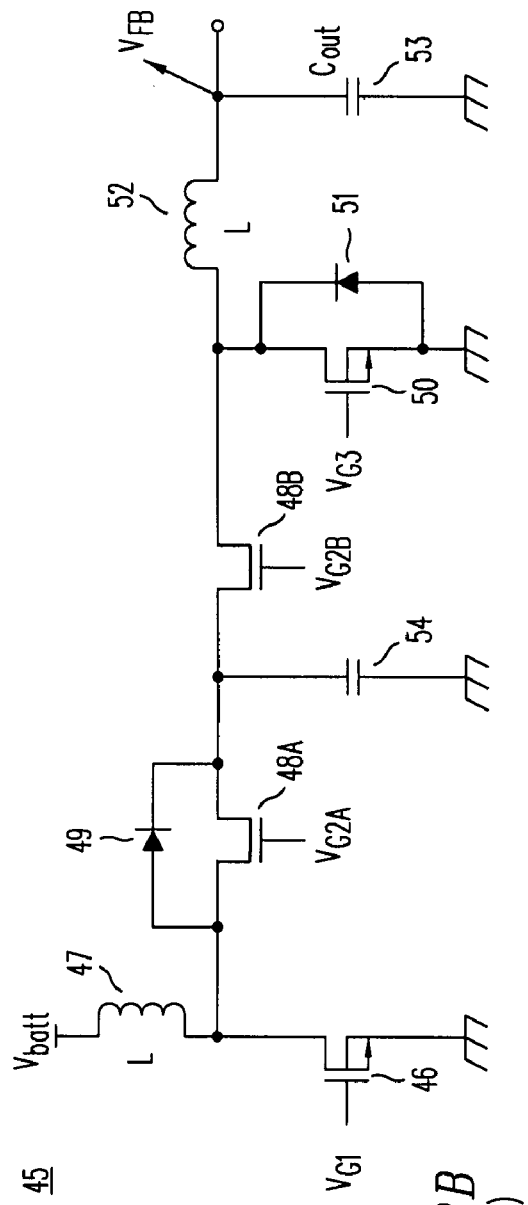
FIG. 3A
(Prior Art)
FIG. 3B
(Prior Art)

$V_{out} = 2V_{batt}$

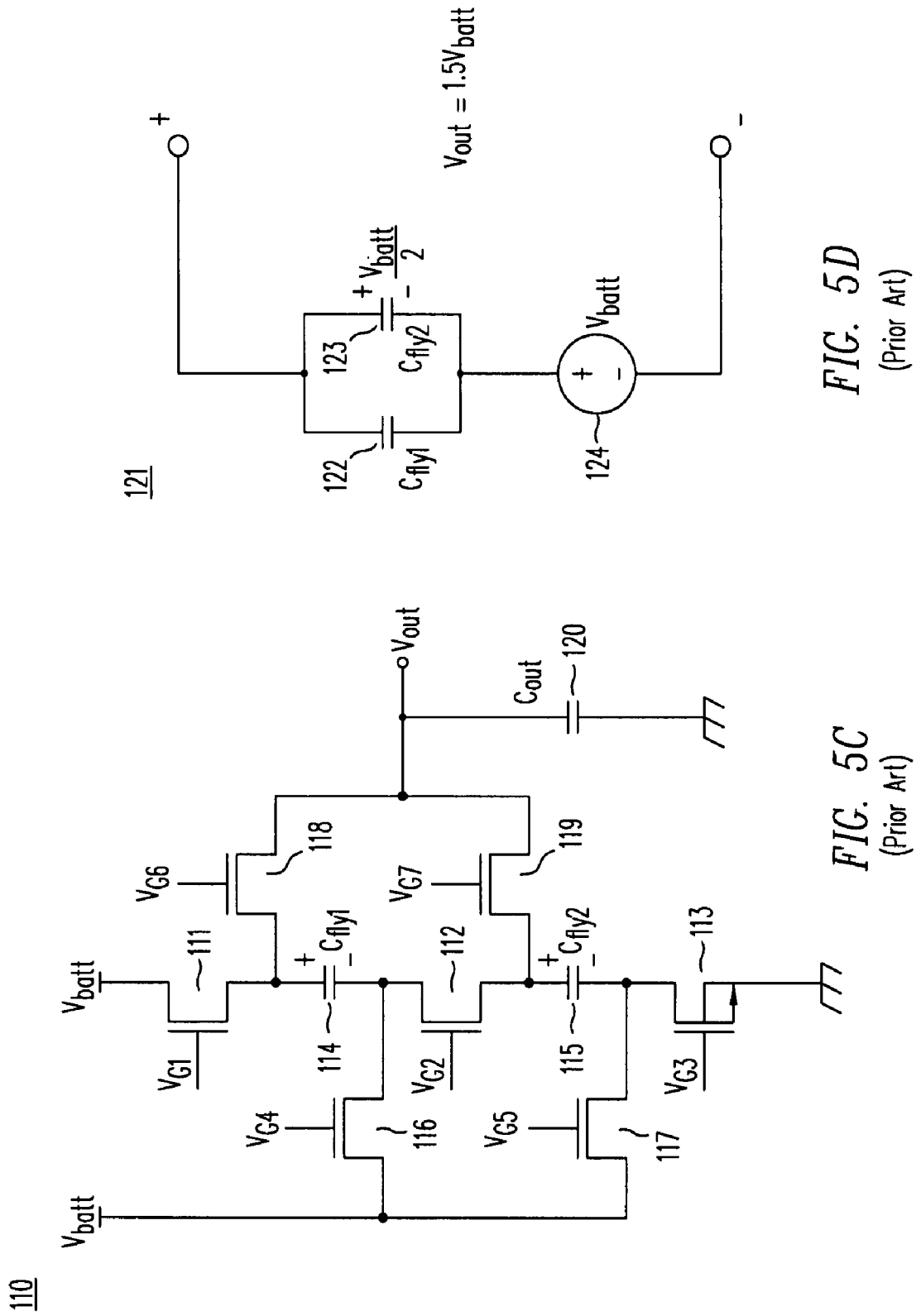

440

450

$V_{out}/V_y$

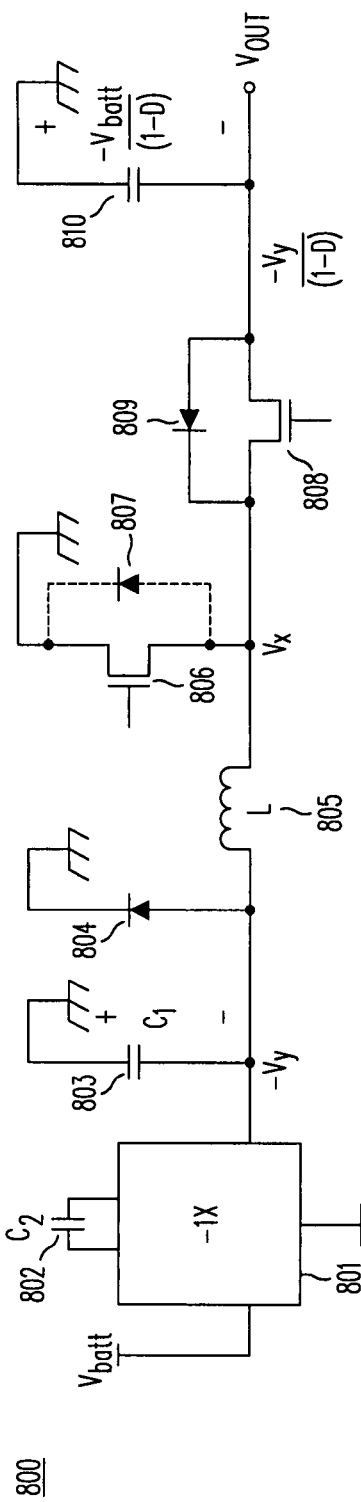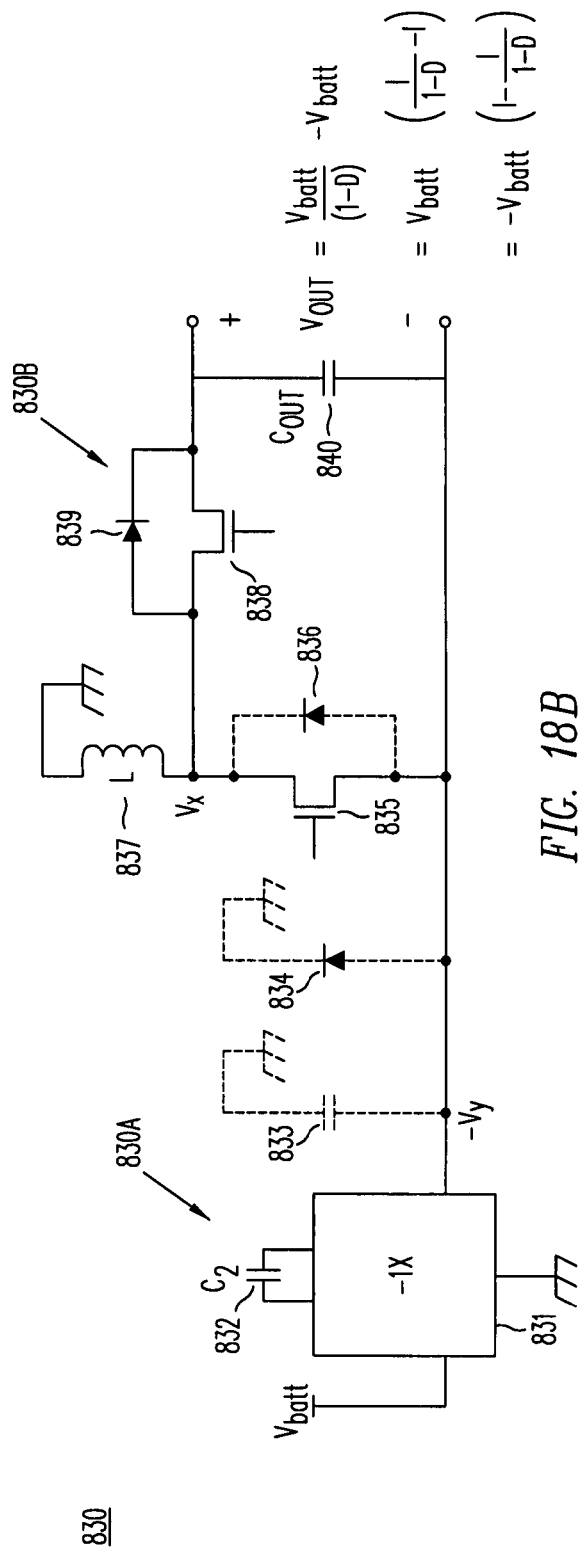

_US 7,812,579 B2_

HIGH-EFFICIENCY DC/DC VOLTAGE CONVERTER INCLUDING CAPACITIVE SWITCHING PRE-CONVERTER AND UP INDUCTIVE SWITCHING POST-REGULATOR

CROSS-REFERENCE TO RELATED APPLICATIONS

This application claims the priority of Provisional Applications Nos. 60/877,952 and 60/877,720, both titled "High-Efficiency Down-Up And Related DC/DC Converters" and filed on Dec. 30, 2006, each of which is incorporated herein by reference in its entirety.

FIELD OF THE INVENTION

This invention pertains to the design, operation and performance of switching power supplies for use in DC/DC conversion and voltage regulation, and to the semiconductor components used in such converters.

BACKGROUND OF THE INVENTION

Voltage regulation is commonly required to prevent variation in the supply voltage powering various microelectronic components such as digital ICs, semiconductor memories, display modules, hard disk drives, RF circuitry, microprocessors, digital signal processors and analog ICs, especially in battery-powered applications such as cell phones, notebook computers and consumer products.

Since the battery or DC input voltage of a product often must be stepped-up to a higher DC voltage, or stepped-down to a lower DC voltage, such converters are referred to as DC-to-DC converters. Step-down converters, commonly referred to as "Buck converters," are used whenever a battery's voltage is greater than the desired load voltage. Step-down converters may comprise inductive switching converters, capacitive charge pumps, and linear converters. Conversely, step-up converters, commonly referred to as "boost converters," are needed whenever a battery's voltage is lower than the voltage needed to power its load. Step-up converters may comprise inductive switching converters or capacitive charge pumps.

Another type of converter may operate as either a step-up or a step-down converter depending on whether the power input to the converter has a voltage above or below its output voltage. Commonly referred to as Buck-boost converters, such circuitry is needed whenever a converter's input and output are similar in voltage, where variations in the input voltage preclude the use of a simple boost or Buck converter.

One example of such an application requiring both step-up and step-down conversion is supplying a regulated 3.3V output from a lithium ion (LiIon) battery. A LiIon battery exhibits a terminal voltage which decays from 4.2V when fully charged to below 3V when discharged. Since the initial battery voltage is above 3.3V and the final battery voltage is below 3.3V, the converter must be able to step-down initially and step-up later.

Inductive Switching Converters

Of the aforementioned voltage converters, the inductive switching converter can achieve superior performance over the widest range of currents, input voltages and output voltages. The operating principles of the inductive switching converter are described in application Ser. No. 11/890,818, titled "High-Efficiency DC/DC Voltage Converter Including Down Inductive Switching Pre-Regulator And Capacitive Switching Post-Converter," filed contemporaneously herewith and incorporated herein by reference. Two examples of non-isolated inductive switching converters, a synchronous Buck step-down converter and synchronous boost step-up converter, are shown in FIGS. 1A and 1B.

An illustrative synchronous Buck converter 1, shown in FIG. 1A, comprises a power MOSFET switch 3, an inductor 5, a synchronous rectifier power MOSFET 4 with rectifier diode 8, and a capacitor 6. Operation of MOSFET 3 is controlled by a pulse-width modulation (PWM) control circuit 2, driving the gate of MOSFET 3. The gate drive may vary in polarity and voltage depending on whether MOSFET 3 is N-channel or P-channel. Synchronous rectifier MOSFET 4, generally an N-channel MOSFET, is driven out of phase with MOSFET 3, but MOSFET 4 is not necessarily on the entire time when MOSFET 3 is off. In general, MOSFET 4 conducts only during times when diode 8 is conducting.

While the control circuit controlling the converter's operation is referred to as a "PWM control," implying fixed-frequency variable-pulse-width operation, it may alternatively operate in a variable frequency mode where the clock period is allowed to vary, or alternatively it may alternate between varying and fixed frequency modes depending on load and input conditions.

The energy delivered from the power source, battery or power input into the DC/DC converter 1 is switched or gated through MOSFET 3. With its positive terminal connected to the battery or input, MOSFET 3 acts like a "high-side" switch controlling the current in inductor 5. Diode 7 is a P-N junction parasitic to MOSFET 3, in parallel to the transistor's drain and source, which remains reverse biased under normal Buck converter operation. Since diode 7 does not carry current under normal operation, it is illustrated by dotted lines.

By controlling the current in the inductor 5 through the switching and on-time control of MOSFET 3, the energy stored in the inductor coil's magnetizing field can be adjusted dynamically to control the voltage on output filter capacitor 6. The output voltage $V_{out}$ is fed back to the input of PWM control circuit 2, which controls the current $I_L$ in inductor 5 through the repeated switching of MOSFET 3. The electrical load connected to the converter's output is not shown.

Driven out of phase with MOSFET 3, synchronous rectifier MOSFET 4 conducts some portion of the time when MOSFET 3 is off. With its positive terminal connected to the inductor 5, i.e. to node $V_x$, and its negative terminal connected the circuit ground, MOSFET 4 acts like a "low-side" switch, shunting the current flowing through diode 8. Diode 8 is a P-N junction parasitic to synchronous rectifier MOSFET 4, in parallel to the transistor's drain and source. Diode 8 conducts substantial inductor current only during intervals when both MOSFETs 3 and 4 are turned off.

One common condition when both MOSFETs 3 and 4 are off occurs during every switching transition to prevent shorting of the input power source to circuit ground. This so-called break-before-make interval prevents shoot through conduction by guaranteeing that both transistors do not conduct simultaneously and short or "crow-bar" the converter's input and power source to ground.

During this brief break-before-make (BBM) interval, diode 8 in parallel to synchronous rectifier MOSFET 4 must, along with any parasitic capacitance associated with diode 8, carry the inductor's current $I_L$. Unwanted noise can occur during the transitions associated BBM operation.

If we define the converter's duty factor D as the time during which energy flows from the battery or power source into the DC/DC converter, i.e. the time that MOSFET switch 3 is on, then the output to input voltage ratio of the Buck converter 1 is proportionate to its duty factor, i.e.

$$\frac{V_{out}}{V_{in}} = D \equiv \frac{t_{sw}}{T}$$

where $t_{sw}$ is the time during which MOSFET 3 is turned on and T is the duration of the total clock cycle.

This relationship for a Buck or synchronous Buck converter is illustrated by curve 17 in graph 15 of FIG. 2A. Notice the Buck converter cannot smoothly reach a zero or unity transfer characteristic without exhibiting some discontinuities 19 and 21 at the extremes of the duty factor D. This phenomenon is due to switching delays in the power MOSFET switch and its control and gate drive circuitry.

As long as the Buck converter's power MOSFET is still switching, $t_{sw}$ is limited to some portion of the clock period T, e.g. 5%<D<95%, essentially due to turn-on and turn-off delay within the MOSFETs 3 and 4 and their control loop. For example at 95% duty factor and a 3 MHz clock, the off time for the high-side MOSFET 3 is only five percent of the 333 nsec period, or just 16 nsec. This means the high side MOSFET 3 must turn off and back in only 16 nsec—too rapidly to regulate over a 95% output-to-input conversion ratio. The minimum off time problem impacts either synchronous or non-synchronous Buck converters. The problem is, however, further exacerbated in synchronous DC/DC converter 1, since no time remains for the synchronous rectifier MOSFET 4 to turn on and then off again and still exhibit BBM operation.

Referring again to curve 17 in FIG. 2A, above some maximum duty factor $D_{max}$, there is not adequate time to maintain switching operation and the converter must jump from $D_{max}$ to a 100% duty factor, as shown by discontinuity 21. Above $D_{max}$, the converter turns MOSFET 3 on and leaves it on for the entire clock period T. The abrupt transition 21 causes a glitch in the output voltage of Buck converter 1. Moreover, at a 100% duty factor, $V_{out}=V_{in}$ as shown by line 16, and all regulation is lost as long as the switching is halted.

Synchronous boost converter 10 shown in FIG. 1B includes a low-side power MOSFET 12, a battery connected inductor 13, an output capacitor 15, and a "floating" synchronous rectifier MOSFET 14 with parallel rectifier diode 16. The gates of the MOSFETs 12 and 14 are driven by break-before-make circuitry (not shown) and controlled by PWM controller 11 in response to voltage feedback $V_{FB}$ from the output of converter 10, present across output capacitor 15. BBM operation is needed to prevent shorting the terminals of output capacitor 15.

The synchronous rectifier MOSFET 14, which may be an N-channel or P-channel MOSFET, is considered floating in the sense that its source and drain terminals are not permanently connected to any supply rail, i.e. to ground or $V_{batt}$. Diode 16 is a P-N diode intrinsic to synchronous rectifier MOSFET 14, regardless whether synchronous rectifier MOSFET 14 is a P-channel or an N-channel device. A Schottky diode may be included in parallel with MOSFET 16 but with series inductance may not operate fast enough to divert current from forward biasing intrinsic diode 16. Diode 17, which is a P-N junction diode intrinsic to N-channel low-side MOSFET 12, remains reverse biased under normal boost converter operation. Since diode 17 does not conduct under normal boost operation, it is shown with dotted lines.

If we again define the duty factor D of boost converter 10 as the time during which energy flows from the battery or power source into the converter, i.e. during the time that low-side MOSFET 12 is on and inductor 13 is being magnetized, then the output to input voltage ratio of a boost converter is proportionate to the inverse of 1 minus its duty factor, i.e.

$$\frac{V_{out}}{V_{in}} = \frac{1}{1-D} \equiv \frac{1}{1 = t_{sw}/T}$$

where $t_{sw}$ is the time during which MOSFET 12 is turned on and T is the duration of the total clock cycle.

This relationship for a boost or synchronous boost converter is illustrated by curve 18 in FIG. 2A. Notice that the boost converter cannot smoothly reach a unity transfer characteristic without exhibiting some discontinuity at the extremes of D. This phenomenon occurs due to switching delays in the power MOSFET 12 and its control and gate drive circuitry.

As long as power MOSFET 12 is still switching, $t_{sw}$ is limited to some portion of the clock period T, e.g. 5%<D<95%, essentially due to turn-on and turn-off delay within the MOSFET 12 and its control loop. For example at 5% duty factor and a 3 MHz clock, the off time for the low-side MOSFET 12 is only five percent of the 333 nsec period, or just 16 nsec. This means the low side MOSFET 12 must turn on and back off in only 16 nsec—too rapidly to regulate below a 5% output-to-input conversion ratio. This minimum on time problem impacts either synchronous or non-synchronous boost converters.

Referring again to curve 18 in FIG. 2A, below some minimum duty factor $D_{min}$, there is not adequate time to maintain switching operation and the converter 10 must jump from $D_{min}$ to a 0% duty factor, as shown by discontinuity 20. Below $D_{min}$, the converter turns on the synchronous rectifier MOSFET 14 and leaves it on for the entire clock period T. The abrupt transition 20 causes a glitch in the output voltage of boost converter 10. Moreover, at a 100% duty factor, $V_{out}=V_{in}$ as shown by line 16, all regulation is lost as long as the switching is halted.

So for both synchronous Buck converter 1 and synchronous boost converter 10, operation near a unity transfer characteristic where $V_{out} \approx V_{in}$, shown by line 16 in FIG. 2A, is problematic.

The efficiency η of a DC/DC converter can be given by:

$$\eta = \frac{P_{out}}{P_{in}} = \frac{I_{out} \cdot V_{out}}{I_{in} \cdot V_{in}}$$

An analysis of inductive switching converter efficiencies is described in the above-referenced application Ser. No. 11/890,818.

Graph 25 of FIG. 2B illustrates examples of typical conversion efficiencies for synchronous Buck and synchronous boost converters as a function of the converter's voltage conversion ratio $V_{out}/V_{in}$. As shown, line 26 illustrates the unity conversion condition where $V_{out}=V_{in}$. Conversion ratios less than unity, on the left side of line 26 in graph 25, represent step-down conversion. Efficiency curve 27 represents an example of a Buck converter performing step-down voltage conversion. Conversion ratios greater than unity, on the right side of line 26 in graph 25 represent step-up conversion. Efficiency curve 28 represents an example of a boost converter performing step-up voltage conversion.

In general boost converters exhibit lower efficiencies than Buck converters for comparable load currents, as illustrated by curves 27 and 28. This disparity is primarily due to the fact that boost converters exhibit higher peak currents than Buck converters. This problem is further accentuated for high $V_{out}/V_{in}$ voltage conversion ratios, especially for output voltages approaching ten times their input, as illustrated by the efficiency decline of curve 28 with increasing conversion ratios.

Furthermore, in graph 25, Buck efficiency 27 is not shown for conversion ratios below 0.1 and above 0.9 and likewise boost efficiency 29 is not shown for conversion ratios below 1.1 and above 10, because these ranges require switching converter operation below a 10% or above a 90% duty factor, an operating condition difficult to achieve, especially at high switching frequencies.

Buck-Boost Switching Converter

The problem of non-isolated DC/DC switching converter operation near unity transfer is especially difficult in applications when the input voltage may vary either above or below the desired output voltage. Examples of this application include the output of noisy AC adapters or in circuitry which must operate by battery back-up during emergency conditions when a main source of power has failed.

Another scenario where a unity conversion ratio is required occurs when a battery's operating voltage range extends above and below the desired regulated voltage.

For example, the discharge characteristic of a LiIon battery starts at 4.2V at full charge, initially decays rapidly to around 3.6V, then decays slowly from 3.6V to 3.4V, and finally drops quickly to its cutoff at or below 3V. In the event that a DC/DC converter is needed to produce a well-regulated 3.3V output during the entire duration, a sub-unity conversion ratio of 3.3V/4.2V, or 0.79, is needed at the outset, indicating that a Buck converter is required. At the battery's end-of-life, the conversion ratio exceeds unity becoming 3.3V/3V, or 1.1, requiring a boost converter to achieve regulation. Such an application demanding both step-up and step-down conversion requires a Buck-boost, or up-down converter.

In the case where the user wants to avoid the complexities of up-down conversion, one possible approach is to use only a Buck converter and give up some battery life by cutting of the battery early, e.g. at 3.3V, but in practice when considering battery manufacturing variations and converter drop-out and duty factor limitations, too much battery life is sacrificed to rely on a Buck-only converter solution.

If up-down conversion cannot be avoided, one possible solution involves Buck-boost conversion and regulation. The Buck-boost converter can easily be derived from combining synchronous Buck and boost converters into a merged circuit. In the Buck-boost converter 35 of FIG. 3A, for example, a synchronous Buck converter comprising a P-channel or N-channel MOSFET 36, an inductor 38A, an N-channel synchronous rectifier MOSFET 37, an intrinsic rectifier diode 39, and a capacitor 44 is used to power a synchronous boost converter comprising a low-side N-channel MOSFET 40, an inductor 38B, a synchronous rectifier MOSFET 41, an intrinsic rectifier diode 42, and a filter capacitor 43. Buck-boost converter 35 first steps down the input voltage to an intermediate voltage lower than the desired output, then steps this voltage up to produce $V_{out}$.

Conversely, in the synchronous boost-Buck converter 45 of FIG. 3B, a boost converter comprising a low-side N-channel MOSFET 46, an inductor 47, an N-channel or P-channel synchronous rectifier MOSFET 48A, an intrinsic diode 49, and a capacitor 54 is used to power a synchronous Buck converter comprising a MOSFET 48B, an inductor 52, an N-channel synchronous rectifier MOSFET 50, an intrinsic rectifier diode 51, and a filter capacitor 53. The cascade boost-Buck converter 45 drives a load (not shown). In this approach the input voltage is first stepped-up to an intermediate voltage higher than the desired output, then back down to produce $V_{out}$.

The overall efficiency of either Buck-boost converter 35 or boost-Buck converter 45 is given by the product of the boost converter's efficiency $\eta_{boost}$ multiplied by the Buck converter's efficiency $\eta_{Buck}$, mathematically as $\eta_{cascade} = \eta_{Buck} \cdot \eta_{boost}$. Even if both converters are 85% efficient, the combined cascade converter only reaches an overall efficiency of roughly 70%, significantly lower than the efficiency of an individual Buck converter or boost converter. The overall loss of either a Buck-boost or boost-Buck cascade is worse than a synchronous Buck or synchronous boost alone, because there are more transistors in series between input and output, and because all the transistors are switching all the time.

As shown, boost-Buck converter 45 of FIG. 3B includes series-connected MOSFETs 48A and 48B with intermediate capacitor 54. Since in steady-state, the current in series-connected MOSFETs must be equal, MOSFET 48B is redundant and can be eliminated without impacting circuit operation. Even so, boost-Buck converter 45 requires two inductors 47 and 52, a characteristic highly undesirable from a user's point-of-view.

Similarly, Buck-boost converter 35 of FIG. 3A includes inductors 38A and 38B with intermediate capacitor 44. Since in steady state the current in inductors 38A and 38B is the same, inductor 38B is redundant and may be eliminated without changing the function of the circuit. In fact, capacitor 44 may also be eliminated without significantly altering the converter's operation.

The resulting simplified prior-art Buck-boost converter 55 is illustrated in FIG. 3C, comprising a single-inductor 59; four MOSFETs 57, 56, 60, and 61; diodes 58 and 62 and filter capacitor 63. The PWM control circuitry and break-before-make and gate buffer circuits are not shown. Depending on its terminal conditions, such a converter can operate in three distinct modes, Buck, boost, and Buck-boost.

In FIG. 3D, schematic diagram 65 represents the operation of Buck-boost converter 55 as a Buck converter, where MOSFETs 57 and 56 are switched out-of-phase by a PWM control unit (not shown), while MOSFET 61 remains turned-on, represented as resistance 67, and MOSFET 60 is turned off, shown as open circuit 66. The overall power loss in converter 55 is greater than the power loss in a synchronous Buck converter because it now includes the conduction loss in MOSFET 61, i.e. power lost continuously in resistance 67. As a result of this increased power loss, Buck-boost converter 55 operating in its Buck mode has a lower efficiency than conventional Buck converter 1 shown in FIG. 1A.

In FIG. 3E, schematic diagram 70 represents the operation of Buck-boost converter 55 as a boost converter, where MOSFETs 60 and 61 are switched out-of-phase under a PWM control unit (not shown), while MOSFET 57 remains turned-on, represented as resistance 71, and MOSFET 56 is turned off, shown as open circuit 72. The overall power loss in converter 55 is greater than the power loss in a synchronous boost converter because it now includes the conduction loss in MOSFET 57, i.e. power lost continuously in resistance 71. As a result of this increased power loss, Buck-boost converter 55 operating in its boost mode has a lower efficiency than conventional boost converter 10 shown in FIG. 1B.

The loss of efficiency using Buck-boost converter 55 is illustrated in FIG. 4 in the plot of efficiency $\eta$ for various output-to-input voltage conversion ratios $V_{out}/V_{in}$. For convenience, conventional Buck and boost efficiency curves 27 and 28 from FIG. 2B are illustrated by curves 81 and 82 respectively.

Curve 83 illustrates the efficiency of Buck-boost converter 55 operating in Buck-only mode shown in equivalent circuit 65. Because of series resistance 67 associated with on-state MOSFET 61, the efficiency of Buck-boost converter 65 in the Buck only mode is lower than that of a simple Buck converter, represented by curve 81. This loss of efficiency can range from a few percent to over ten percent, depending on operating conditions. Curve 85 illustrates Buck-boost converter 55 operating in full Buck-boost mode where all four switches are switching constantly, and as a result exhibits even greater losses and poorer efficiency than Buck mode curve 83.

Curve 84 illustrates the efficiency of Buck-boost converter 55 operating in boost-only mode shown in equivalent circuit 70. Because of series resistance 71 associated with on-state MOSFET 57, the efficiency of a Buck-boost converter 65 in the boost-only mode is lower than that of a simple boost converter, represented by curve 82. This loss of efficiency can range from a few percent to over ten percent depending on operating conditions. Curve 86 illustrates Buck-boost converter 55 operating in full Buck-boost mode where all four switches are switching constantly, and as a result exhibits even greater losses and poorer efficiency than boost mode curve 84.

Operating near unity conversion ratios, where the output voltage is slightly above or below its input, i.e. where $V_{out} \approx V_{in}$, Buck-boost converter 55 must operate in the Buck-boost mode, where all four transistors are switching constantly. The resulting efficiency, represented by curve 87, can be ten to twenty percent lower than the efficiency of conventional Buck and boost converters, represented by curves 81 and 82.

Thus, the efficiency penalty for a prior art Buck-boost converter operating over a wide range of voltage conversion ratios is substantial. Moreover, the converter must change its operating mode whenever operating near unity voltage conversion ratios.

Charge Pump Converters

An alternative to the switched-inductor converter is a charge pump, a voltage conversion circuit using only switches and capacitors to perform voltage translation through repeated charge redistribution, i.e. the continuous charging and discharging of a capacitor network driven by a clock or oscillator.

The advantage of a charge pump is that specific voltage conversion ratios, it can exhibit extremely high conversion efficiencies approaching 100%. The disadvantage is that it can only efficiently generate voltages that are selected multiples of the input voltage, determined by the number of "flying capacitors" used in its circuit. At output voltages other than selected multiples of the input voltage, the charge pump exhibits low efficiencies.

An example of a common charge pump 90 is illustrated in FIG. 5A, where a single "flying capacitor" 93 is employed as a "doubler", i.e. to double the battery's input voltage. Charge pump 90 comprises four MOSFETs, 92, 91, 94 and 95 configured in an H-bridge arrangement, except that one terminal, the source of MOSFET 95 is connected to the charge pump output $V_{CP}$ and reservoir capacitor 96 rather than to ground.

Operation of charge pump 90 involves repeatedly charging and discharging flying capacitor 93. During the charging phase, diagonal MOSFETs 94 and 91 are turned on, charging capacitor 93 to the voltage $V_{batt}$ while MOSFETs 92 and 95 remain turned off. Alternatively, in the charge transfer phase, MOSFETs 94 and 91 are turned off, MOSFETs 92 and 95 are turned on, and energy is transferred from the flying capacitor 93 to the output reservoir capacitor 96, pumping the $V_{CP}$ voltage to a value twice the battery voltage or $2 \cdot V_{batt}$.

The purpose of the switch network is essentially to place the flying capacitor in parallel with the battery during charging and in series, i.e. stacked on top of the battery's positive terminal, during discharging, as illustrated by equivalent circuit 100 in FIG. 5B, where voltage source 101 represents the battery input and capacitor 102 charged to $V_{batt}$ represents the flying capacitor. By stacking one voltage atop the other, the output voltage of the charge pump is the sum of the voltages, hence doubling the voltage input. The cycle then repeats with another charging phase.

FIG. 5C illustrates a charge pump 110 utilizing two flying capacitors 114 and 115 and a network of seven MOSFETs 111, 112, 113, 116, 117, 118 and 119. This network charges the flying capacitors 114 and 115 in series, charging each flying capacitor to one-half the battery voltage, i.e. $V_{batt}/2$. During the charging stage, MOSFETs 111, 112 and 113 are turned on and MOSFETs 116, 117, 118 and 119 are turned off. After the charging is completed, the two charged capacitors are connected in parallel to the positive terminal of the battery. This connection is accomplished by turning on MOSFETs 116, 117, 118 and 119. The resulting output, shown in equivalent circuit 121 of FIG. 5D, is then $V_{batt}+V_{batt}/2$, for an output voltage of $1.5 V_{batt}$ as illustrated by battery voltage source 124 with capacitors 122 and 123 stacked atop one another. Because the output is 1.5 times its input this charge pump is sometimes referred to as a "fractional" charge pump.

Actually many charge pump topologies are possible, but most concentrate on using only one or two flying capacitors. A single flying capacitor charge pump is capable only of efficiently delivering an output voltage equal to twice its input voltage, or alternatively, if the capacitor is connected to the negative terminal of the battery, to produce a mirror-image negative voltage of the battery, i.e. $-V_{batt}$. In this topology, the device is known as an inverter. The inverting case is illustrated in equivalent circuit 130 of FIG. 5E, where battery 131 is used to charge capacitor 132 to a voltage below ground, i.e. a voltage referenced to the negative terminal of battery 131. Two-transistor fractional charge pumps may also be used to produce an output voltage equal to positive or negative one-half the input voltage, as shown in equivalent circuit 135 of FIG. 5F, where capacitors 137 and 138, after being charged to one-half of the battery voltage 136 are then referenced to ground to produce either a positive potential $+0.5 V_{batt}$ or a negative potential $-0.5 V_{batt}$.

The problem with charge pump converters is they operate efficiently only at specific multiples of the number of flying capacitors. In other words, they are not true voltage converters. Specifically, as a desired load voltage $V_{out}$ drops below the voltage $V_{Cp}$ the capacitor network produces, the converter cannot adapt. The voltage-differential between the charge pump's output voltage $V_{CP}$ and the regulated output voltage of the converter $V_{out}$ requires a resistor or current source to support the voltage mismatch, and the voltage across that lossy element results in lost power and reduced efficiency. An analysis of charge pump efficiencies is described in detail in the above-referenced application Ser. No. 11/890,818.

This efficiency equation for single-mode charge pumps is illustrated graphically in FIG. 6A for various multipliers, including a doubler (curve 151), an inverter (curve 152), and fractional charge pumps (curves 153, 154 and 155). Curve 156 represents a direct battery connection, identical to a linear converter's maximum theoretical efficiency, i.e. assuming no quiescent operating current. In each case, as the input to output ratio approaches an integral multiple of $\pm\frac{1}{2}V_{batt}$, the efficiency increases. Above that voltage, the charge pump is not capable of delivering a higher voltage and a different capacitor multiplier, i.e. a different operating mode must be employed.

Each curve shown in graph 150 of FIG. 6A represents a specific charge pump circuit, e.g. including those shown in FIGS. 5A-5F. Unless a load operates at an exact half-volt integral multiple of the input voltage, however, the efficiency of the charge pump converter using one or two capacitors will suffer. This behavior is especially problematic for battery powered products where the battery voltage changes markedly as the cell discharges. In the case of LiIon batteries, the voltage can decay more than 1V during discharge, representing a 25% change. Even if the peak efficiency may be high at one specific operating condition and battery voltage, the overall efficiency of the converter averaged over the battery discharge curve is poor. Weighted average efficiencies can be lower than 60% using a single-mode charge pump.

One way to improve the average efficiency of the converter is to switch modes between 1×, 1.5× and 2× automatically within one circuit. This feature is particularly useful to supply a fixed voltage over a wide input range. An example of the efficiency of a mode changing charge pump is illustrated in graph 160 of FIG. 6B, which shows the efficiency of a tri-mode converter circuit as it switches from 1×-battery-direct mode having an efficiency shown by line 163, to 1.5×-fractional-mode with efficiency curve 162, and again to 2×-doubler-mode with an efficiency curve 161 as the battery decays. By switching modes in this zigzag pattern, the efficiency of the charge pump converter is improved because the output is not pumped to an excessively high value compared to the load.

Unfortunately, conditions still exist where the efficiency suffers substantially. The mode transitions exhibit dramatic shifts in efficiency shown by curve 163 at a conversion ratio of one, and again by curve 162 at a 1.5× conversation ratio. The mode transitions may also result in sudden current and voltage discontinuities, or produce instability or noise. To determine what conversion ratio is required, graph 160 also includes curves 166, 165, and 164 relating the required input voltage range and conversion ratios to produce an output voltage of 3V, 3.5V and 4V respectively.

Specifically, the charge pump converter in 1.5× mode does not perform well for conditions slightly above a unity conversion ratio, manifesting even lower efficiencies than the aforementioned inductive Buck-boost converter.

Dropout in Prior Art Converters

Whenever the input and the output of a voltage converter approach a range of several hundred millivolts of one another, i.e. $V_{out} \approx V_{in} \pm 200$ mV, the quality of the converter's regulating ability suffers. Loss of regulation quality may be manifested in several ways, either by a one-time or repeated glitch or discontinuity in output voltage, by increased ripple, or by complete loss of regulation within some narrow voltage band. The phenomenon of degraded regulation whenever $V_{out}$ approaches $V_{in}$ is referred to as "dropout", meaning the converter drops out of regulation.

As shown in FIG. 2A, the Buck converter 1 of FIG. 1A momentarily loses regulation as its switching duty factor jumps from $D_{max}$ to 100% or $D_{min}$ to 0% and the boost converter 10 of FIG. 1B momentarily loses regulation as its switching duty fact jumps from $D_{min}$ to 0%. Both converters completely lose regulation while D=0% since the input is essentially resistively connected to the output during the dropout condition.

While a Buck-boost converter doesn't really exhibit permanent dropout, it can easily suffer a voltage glitch whenever the converter switches from its Buck mode into its Buck-boost mode, or from its Buck-boost mode to its boost mode. Mode transitions occur whenever the converter changes from a circuit having two power devices switching into one where four devices are switching, or vice versa.

To avoid the mode switching transition problem, a Buck-boost converter can be run continuously in Buck-boost mode with all four power devices switching continuously but, as shown in FIG. 4, when this happens the efficiency is degraded under all input-output conditions and conversion ratios.

As stated above, the charge pump is incapable of regulating voltage without the use of a series connected linear converter to provide the regulation function. Unfortunately, it is well known phenomenon that all linear converters exhibit loss of regulation, i.e. dropout, whenever the $\Delta V$ across the linear converter's input and output terminals becomes too small. In essence, dropout occurs in a linear converter because the loop gain of the amplifier performing regulation drops precipitously as its transistor pass element changes from behaving as a current source into acting like a variable resistor. If the pass element is a bipolar transistor, the loss of gain occurs at small values of $V_{CE}$ as the device transitions from its active operating region into saturation. In many bipolar linear converters, this dropout condition occurs at more than 400 mV.

In so-called "low dropout" linear converters or "LDOs", a MOSFET capable of operating as a current source at a lower $\Delta V$ is substituted for the bipolar pass element, but the linear converter still drops out at 200 to 300 mV as the power MOSFET pass element transitions from its saturation, i.e. constant current, region into its linear, i.e. resistive, region of operation.

In conclusion, all prior-art non-isolated high-efficiency converters exhibit dropout at voltage conversion ratios approaching unity. Mode switching, loss of regulation and dropout can be avoided, but only by sacrificing efficiency. Isolated converters such as the flyback and forward converter are able to operate at high efficiencies near unity conversion without the need switching modes, but their use of physically-large tapped inductors, coupled inductors, and transformers precludes their application in most portable products.

Summary of Prior-Art Down-Up Converters

In conclusion, no existing charge pump converter, Buck-boost switching converter or other inductive switching converter is able to both step-up and step-down DC voltages efficiently, especially for conversion ratios near unity, where $V_{in} \approx V_{out}$. What is needed is an up-down converter that is efficient over a wide range of input and output voltages, and that does not need to change its operating mode as it approaches or operates near unity voltage conversion ratios. Furthermore, the converter should be free from dropout problems, maintaining high quality regulation even while biased with an output voltage within 200 mV of its input, i.e. within the range $V_{out} \approx \pm 200$ mV.

SUMMARY OF THE INVENTION

A DC/DC voltage converter according to this invention includes a pre-converter and a post-regulator. The pre-converter includes a switched capacitive circuit: and a post-regulator includes a switched inductive circuit. An output terminal of the pre-converter is coupled to an input terminal of the post-regulator. An input terminal of the pre-converter comprises an input terminal of the DC/DC voltage converter, and an output terminal of the post-regulator comprises an output terminal of the DC/DC voltage converter. In many embodiments the pre-converter includes a charge pump and the post-regulator includes a boost converter.

Within this broad structure, many variations are possible within the scope of the invention. In one group of embodiments, the pre-converter includes a voltage-reducing fractional charge pump and the post-regulator includes a non-inverting boost converter. In another group of embodiments, the pre-converter includes a voltage-increasing charge pump and the post-regulator includes a non-inverting boost converter. In another group of embodiments, the pre-converter includes a voltage-inverting charge pump and the post-regulator includes a non-inverting boost converter. In yet anther group of embodiments, the pre-converter includes a voltage-inverting charge pump and the post-regulator includes an inverting boost converter.

DC/DC converters according to this invention are capable of operating over a wide range of voltage conversion ratios ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched inductor operation, it avoids the minimum pulse width problem plaguing conventional switching converters at very high and very low duty factors, including converter dropout, narrow pulses and associated high-current spikes, variable frequency operation, inadequate time to perform break-before-make transitions. In contrast, prior-art non-isolated DC/DC converters suffer from one or more of the aforementioned problems at extreme duty factors, and their use near unity voltage conversion ratios remains problematic.

The method and apparatus of this invention can be used in applications requiring up-down conversion, and avoid the problems of existing Buck-boost and flyback converters. While preferred embodiments of this invention specifically address the implementation of up-down converters, variants include improved down-only regulating converters and DC/DC inverters capable of producing negative, i.e. below ground, supply voltages.

BRIEF DESCRIPTION OF THE DRAWINGS

FIG. 3A is a circuit diagram of a cascaded Buck-boost converter.

FIG. 3B is a circuit diagram of a cascaded boost-Buck converter.

FIG. 5C is a circuit diagram of a 1.5× fractional charge pump.

FIG. 5D is an equivalent circuit diagram of the 1.5× circuit during discharge.

FIG. 18A is a functional diagram of a −1× pre-converter and non-inverting boost converter.

FIG. 18B is a functional diagram of a −1× pre-converter and inverting boost converter.

DESCRIPTION OF THE INVENTION

Figure 7:
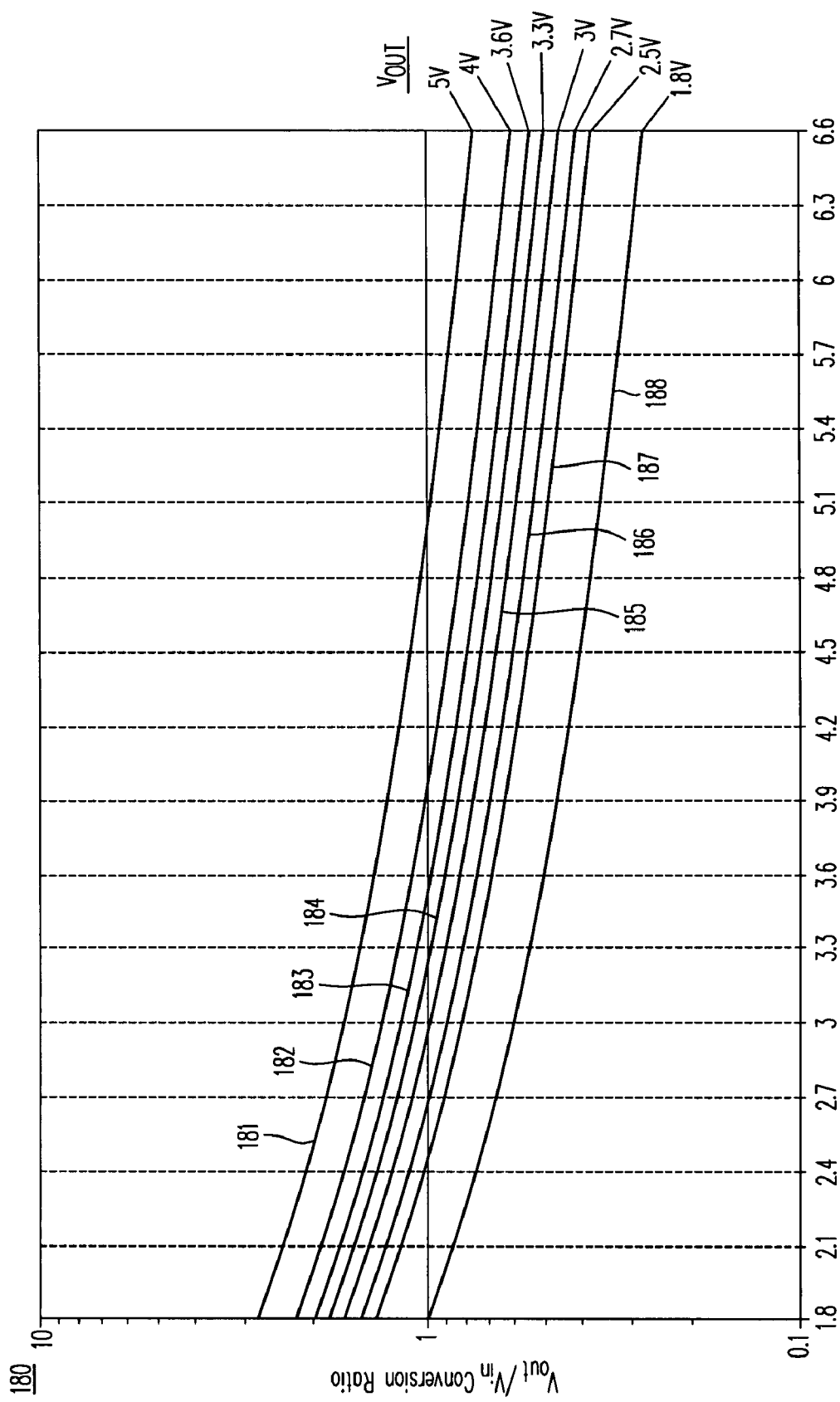
FIG. 7 is a graph of the voltage conversion ratio versus input voltage for various output voltages for DC/DC converters.

FIG. 7 graphically illustrates the requisite voltage conversion ratio $V_{out}/V_{in}$ of a DC/DC converter operating at a variety of voltage output voltages for input voltages ranging from 1.8V to 6.6V. Curve 181, for example, shows that for a 4.5V to 5.5V range of input voltages, regulating a 5V output to ±1% accuracy requires operation above and below a unity conversion ratio, meaning an up-down regulating converter is required to hold a tighter tolerance than the ±5% or ±10% accuracy commonly guaranteed by low cost AC/DC wall adapters.

Another need for up-down conversion occurs when using a lithium ion battery to produce a voltage intermediate to its wide voltage range. As examples, curves 182, 183, 184 in FIG. 7 illustrate output voltages of 4V, 3.6V, and 3.3V respectively. Since these outputs fall within the LiIon battery's normal discharge voltage range of 4.2V to 3V, the converter must regulate in step-down mode with a voltage conversion ratio below unity at the beginning of the cell's discharge cycle, and in step-up mode with a conversion ratio above unity later as the cell's voltage decays.

Curve 185 illustrates a 3V output, which theoretically should require only step down conversion, but because of the aforementioned problem of dropout, a LiIon battery supplying a 3V output must be cut off above 3.2V, thereby wasting useful battery life. New generation LiIon cells under development may allow operation down to 2.7V, requiring the need to utilize up-down conversion for 2.7 V outputs, as shown by curve 186. At a 2.5V battery condition, dropout issues may also require the use of an up-down converter even to supply a regulated 2.5V output, as shown by curve 187. If, however, up-down conversion results in a loss of efficiency exceeding the extra operating time gained by the extended battery range, then the user lifetime benefit of using a battery capable of lower voltage operation is lost entirely.

Similarly, dropout concerns make it difficult to guarantee a 1.8V regulated output shown by curve 188 from 2-cell-connected nickel-metal-hydride or nickel-cadmium, i.e. NiMH or NiCd, batteries, since those their output voltages range from 2.4V down to 1.8V. Stopping battery usage at a 2V condition unacceptably wastes more than half the battery's charge life.

Other examples of battery arrangements needing an efficient low dropout up-down converter are two NiMH dry-cells, two alkaline cells, or a single cell LiIon battery. Since 2-series-cell NiMH battery packs supply a voltage ranging from 1.8V to 2.4V, 2-series-cell alkaline batteries supply a voltage ranging from 1.8V up to 3.4V during charging, and single-cell LiIon batteries supply a voltage ranging from 4.2V down to 3V or even 2.7V, any output between 4.2V and 1.8V needs an up-down converter to maximize efficiency and battery life, as shown by curves 188 through 182 in FIG. 7.

If we also consider that some systems allow the DC output from the AC/DC wall adapter to be connected without a battery present, the input voltage supplied to a system's DC/DC converter input can be considerably higher than if the battery were present, and may reach as high as 6.5V. When the battery is present and the charger disconnected, the input voltage may be as low as 1.8V. In such cases, every output curve ranging from curve 181 to 188, i.e. from 5V down to a 1.8V output, requires an up-down converter.

Today most electrical loads are supplied by an up-only or down-only converter, and the battery is cut off prematurely to avoid requiring up-down conversion at the expense of wasting usable stored charge in a battery. Up-down conversion is avoided at any cost except in extreme situations. With the poor efficiency, mode switching, noise glitches, regulation dropout, and poor regulation offered by existing up-down converters, be they DC/DC converters, charge pumps, or linear converters; a requirement for up-down conversion and regulation is extremely problematic. In short, present up-down converters cannot meet the need of today's efficiency-focused consumer marketplace.

A New DC/DC Converter Topology

The new non-isolated DC/DC converter and voltage regulation topology described herein is capable of operating over a wide range of voltage conversion ratios ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched inductor operation, it avoids the minimum pulse width problem plaguing conventional switching converters at very high and very low duty factors, including converter dropout, narrow pulses and associated high-current spikes, variable frequency operation, inadequate time to perform break-before-make transitions. In contrast, prior-art non-isolated DC/DC converters suffer from one or more of the aforementioned problems at extreme duty factors, and their use near unity voltage conversion ratios remains problematic.

The method and apparatus of this invention can be used in applications requiring up-down conversion, and avoid the problems of existing Buck-boost and flyback converters.

While preferred embodiments of this invention specifically address the implementation of up-down converters, variants include improved down-only regulating converters and DC/DC inverters capable of producing negative, i.e. below ground, supply voltages.

Collectively, the new DC/DC converters disclosed herein comprise four new converter topologies and variants thereof, referred to herein by acronym as CLDU—switched capacitor-inductor down-up converter
CLUU—switched capacitor-inductor up-up converter
CLIU—switched capacitor-inductor inverting-up converter (inverter)
CLII—switched capacitor-inductor inverting-inverting converter Specifically this invention focuses on switched capacitor-inductor regulating converters comprising a switched-capacitor step-up, step-down, or inverting pre-converter feeding an inductively implemented step-down post-regulator. As a matter of nomenclature, the first C in the acronym represents the capacitive energy storage element in the pre-converter and the L represents the energy storage element, i.e. the coil or inductor, in the converter's second, or post-regulator, stage.

The third character in the converter's name, either: D, U or I, indicates whether the pre-converter is stepping the input or battery voltage, down, up, or inverting respectively, before supplying it to the post-regulator. The last character U describes the post-regulator as a step-up converter, meaning the magnitude of the voltage is increased without changing its relative polarity. For example, "up" for a positive voltage means making a larger positive voltage, while "up" for a negative voltage, the output of an inverting pre-converter, means a greater negative voltage. Thus, "up" means an increase in the absolute value of the voltage, whether the voltage is positive or negative.

These topologies, described by the acronyms CLDU, CLUU, and CLIU vary in the utility for differing applications, and as such this new switched capacitor-inductor family of DC/DC converter topologies can be collectively described as CLXU regulating converters, the X referring to a variable U for up, D for down, and I for inverting, respectively.

Another converter related to the CLIU inverter, the CLII converter uses an inverting post-regulator to produce a positive voltage which may vary above and below unity conversion ratios.

Related U.S. application Ser. No. 11/890,994, titled "High-Efficiency DC/DC Voltage Converter Including Capacitive Switching Pre-Converter And Down Inductive Switching Post-Regulator," filed contemporaneously herewith and incorporated herein by reference, describes other switched capacitor-inductor converters comprising a switched capacitor step-down, step-up, or inverting pre-converter followed by a switched inductive step-down type post-regulator. Collectively these CLXD type regulating converters include the following:

CLUD—switched capacitor-inductor up-down converter
CLDD—switched capacitor-inductor down-down converter
CLID—switched capacitor-inductor inverting-down converter (inverter)
CLII—switched capacitor-inductor inverting-inverting converter Related U.S. application Ser. No. 11/890,818 and application Ser. No. 11/890,956, titled "High-Efficiency DC/DC Voltage Converter Including Up Inductive Switching Pre-Regulator And Capacitive Switching Post-Converter," each of which is filed contemporaneously herewith and each of which is incorporated herein by reference, describe other switched inductor-capacitor regulating converters, where pre-regulation is achieved by a switched inductor stage and post-conversion is accomplished by a switched capacitor stage.

Switched Capacitor-inductor (CLXU) Converters

Figure 8:
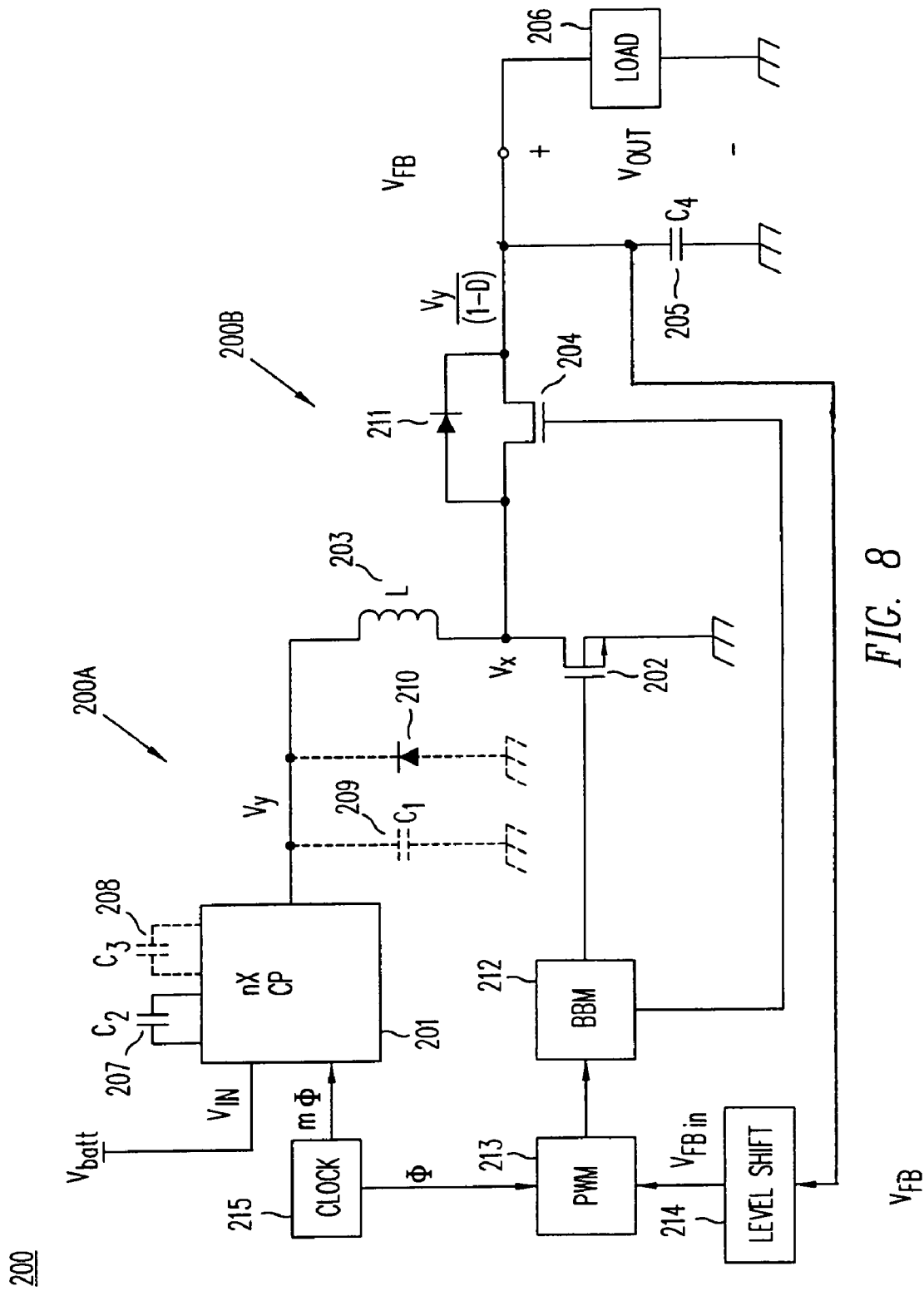
FIG. 8 is a general schematic circuit diagram of a switched CLXU converter according to the invention.

FIG. 8 illustrates a switched CLXU converter 200 comprising a switched-capacitor pre-converter 200A with a conversion ratio n supplying an intermediate voltage $V_y$ to a switched-inductor post-regulator 200B comprising a step-up switched inductor converter, where the output voltage is further used as feedback to control the operating condition and output of the post-regulator. The output voltage $V_y$ of pre-converter 200A thereby follows the input at an n× multiple for optimum efficiency while post-regulator 200B dynamically adjusts the output voltage to produce a well-regulated output at a desired voltage $V_{out}$.

In converter 200, a charge pump 201 scales the input voltage $V_{batt}$ by a factor "n" to produce an intermediate voltage $V_y$. Charge-pump 201 including a capacitor 207 and optionally a capacitor 208 or more, comprises a switched-capacitor network producing any variety of multiplier, including a doubler, an inverter, or a fractional or fractional-inverting circuit. The node at which the intermediate voltage $V_y$ appears may also include a filter capacitor 209 and a diode 210, depending on various design considerations.

Within converter 200, the switched-inductor post-regulator 200B comprises a PWM controller 213, a break-before-make gate buffer 212, a low-side N-channel power MOSFET 202, a floating synchronous rectifier power MOSFET 204 with intrinsic PN diode 211, and an inductor 203. A filter capacitor 205 is connected across the output of converter 200 to insure stability, reduce ripple, and improve transient response. In this embodiment of the invention, the step-up switched-inductor post-regulator 200B is topologically configured as a synchronous boost converter although any step-up switched inductor DC/DC converter may be used. For example MOSFET 204 may be eliminated and diode 211 replaced by a Schottky rectifier to implement a conventional boost converter in lieu of the synchronous boost converter shown.

A PWM controller 213 controls the on-time of low-side N-channel MOSFET 202 by varying the duty factor D in response to its feedback input, operating at a fixed frequency Φ as determined by ramp generator clock 215. Alternatively PWM controller 213 may operate at a variable frequency with either a fixed or variable on-time for N-channel MOSFET 202.

Whenever N-channel MOSFET 202 is on, current flows from the output terminal of the charge pump 201 through inductor 203. Inductor 203 is thereby magnetized, storing energy in an amount equal to ½LI² and resisting any rapid changes in current. At the switching frequency Φ, current in inductor 203 cannot react to the rapid switching of MOSFET 202 so that the inductor behaves as a nearly lossless current source, whose average current changes slowly, over many clock cycles in response to pulse width modulation controlled by PWM controller 213.

Whenever low-side MOSFET 202 is not conducting, inductor 203 drives the voltage $V_x$ to a level above the output voltage $V_{out}$, forward biasing diode 211 and allowing current in the inductor 203 to flow uninterrupted, i.e. to recirculate. With both of MOSFETs 202 and 204 off, the power dissipated in diode 211 is $I_L \cdot V_f$ where $V_f$ is the forward voltage of P-N junction in diode 211. Floating synchronous rectifier MOSFET 204 conducts all or some portion of the time whenever N-channel MOSFET 202 is off, shunting diode 211 and redirecting the recirculation current through the channel of MOSFET 204. Since MOSFET 204 only conducts when rectifier diode 211 is conducting, it operates as a "synchronous" rectifier, even though conduction in the channel of MOSFET 204 occurs only during a portion of the time conduction takes place in diode 211. During conduction, the voltage drop across the synchronous rectifier MOSFET 204 is given by $I_L \cdot R_{DS}(on)$ and its instantaneous power dissipation is $IL^2 \cdot R_{DS}(on)$.

A break-before-make (BBM) buffer 212 insures that low-side power MOSFET 202 and floating power MOSFET 204 never conduct simultaneously to prevent shoot-through conduction, shorting out the load 206. Shoot through conduction, the crow barring of the input from overlapping conduction, is an undesirable condition leading to wasted power and a loss of efficiency and potentially resulting in damage to the MOSFETs. While BBM intervals must be sufficiently long to prevent shoot-through conduction, excessively long BBM intervals are also undesirable since they force diode 211 to carry current for longer times and to dissipate more power.

Except for the BBM period, synchronous rectifier MOSFET 204 ideally should be turned on and conducting whenever low-side MOSFET 202 is off. In some circumstances, however, it may be advantageous to turn off MOSFET 204 prematurely or not to turn it on at all. For example at very low output currents, unwanted oscillations and reverse current flow may occur if MOSFET 204 is left on for an extended duration. Shutting MOSFET 204 off disables channel conduction, and diode 204 under a reverse bias condition prevents reverse current conduction, improving the light load efficiency of converter 200.

Alternatively, as described in application Ser. No. 11/890,947, titled "Low-Noise DC/DC Converter With Controlled Diode Conduction," filed contemporaneously herewith and incorporated herein by reference, the synchronous rectifier MOSFET 204 may remain on, but controlled in a manner to limit the magnitude of its drain current when it is not being operated as a fully-on device. Alternating between a resistive switch state and a low-current constant-current mode in MOSFET 204 reduces electrical noise in converter 200.

Charge pump 201 converts the input voltage $V_{batt}$ to an intermediate voltage $nV_y$ using a switched capacitor network with flying capacitors 207 and (optionally) 208. The conversion ratio n× of charge pump 201 may be step-up, step down, or inverting.

In the event that charge pump 201 uses step-down conversion, e.g. a dual-capacitor fractional version where n=0.5, converter 200 operates as a CLDU down-up converter, which may step-up or step-down the input voltage or it may provide a unity voltage conversion ratio, i.e. where $V_{out} \approx V_{in}$.

Step-up conversion in the pre-converter of a switched CLUU converter may be performed with a single-capacitor doubler, where n=2, or a dual-capacitor fractional implementation, where n=1.5. Dual capacitors may also be configured as a tripler, a method well known to one skilled in the art. CLUU converters can thereby achieve high step-up conversion ratios while maintaining a duty factor much closer to 50% than is possible with a simple inductive boost converter.

Using an inverter in the pre-converter may be accomplished with a single capacitor circuit, where n=−1, or with a two capacitor circuit, where n=−0.5. Connecting the output of an inverting pre-converter to the input of a post-regulator comprising a non-inverting inductive boost converter results in an output voltage that is even more negative than the intermediate voltage Vy. Such an inverter is referred to as a CLIU converter, the "U" referring to "up" meaning greater in numerical magnitude. Assuming that the input voltage is above ground, a CLIU converter can only deliver a below ground, i.e. negative, output voltage.

In another alternative, an inverting pre-converter is used to produce a negative supply rail at a voltage $V_y$ of $-0.5V_y$, for example, and then to boost the voltage in a positive polarity, i.e. inverted in polarity a second time, to a positive voltage having an absolute value greater than the absolute value of $V_y$. Accordingly, this CLII converter is capable of producing voltages both above and below zero, and even to actively regulate precisely at zero volts.

The output of converter 200, filtered by reservoir capacitor 205, supplies load 206 with a regulated voltage $V_{out}$. In a preferred embodiment this output is used to provide feedback to the PWM controller 213 with a feedback signal $V_{FB}$ which is converted by level shifter 214 to a voltage used to produce $V_{FBin}$, the control signal input to PWM controller 213. As shown below, the value of $V_y$ output by the pre-converter is self biasing and allows charge pump 201 to operate at its maximum efficiency point. The negative feedback loop facilitates tight voltage regulation in the post-regulator without significantly affecting the overall efficiency of the CLXU converter.

In a preferred embodiment, the output voltage of level shifter 214 is $V_{out}$, i.e. the feedback should force the value of $V_{out}$ to a same voltage $V_{out}$. In the case of CLUU and CLDU converters this level shifter may comprise a network of two resistors acting as a voltage divider to match the feedback to the converter's internal voltage reference but need not account for the factor n from the pre-converter. In inverting converters, the feedback must be referenced to the converter's ground pin.

Another feature of CLXU converter 200 is the use of oscillator 215 to control the switching of both MOSFETs 202 and 204 and charge pump 201. By synchronizing the switched inductor post-regulator and switched capacitor pre-converter circuits, the size of intermediate filter capacitor 209 can be greatly reduced or in some cases capacitor 209 may be eliminated altogether.

Behavioral Model of CLXU Converters

Figure 9:
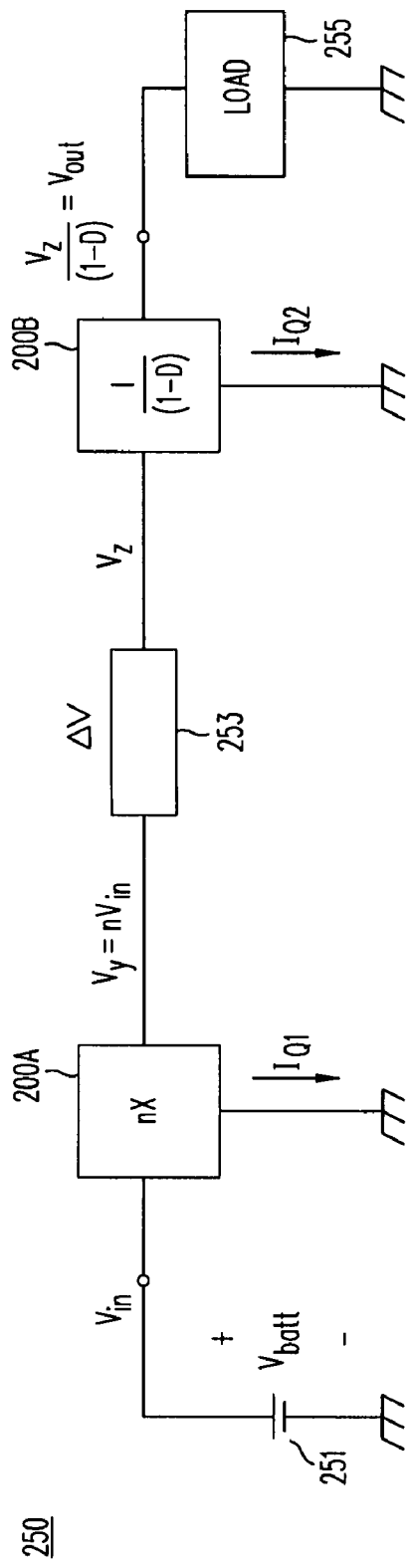
FIG. 9 is a diagram of a behavioral model of the switched CLXU converter of FIG. 8.

To better understand the general operation of CLXU converter 200, behavioral model 250 of FIG. 9 can be used for control analysis and for estimating efficiency. As shown, step-down pre-converter 200A is powered from input voltage $V_{in}$ producing an intermediate voltage $V_y$ which in turn powers a switched inductor post-regulator 200B.

The conversion ratio of the pre-converter 200A is given by $$V_y = n \cdot V_{in}$$

or expressed as a voltage conversion ratio $V_y/V_{in}$ for pre-converter 200A, the ratio equals $$\frac{V_y}{V_{in}} = n$$

Theoretically, since charge pumps are not voltage converters the output voltage $V_y$ of pre-converter 200A, can be "loaded" by whatever it is driving. Loading means its output is forced to another voltage $V_z$ dissimilar from $V_y$ by an amount $\Delta V$, represented by lossy element 253. Because voltage $V_y$ is not normally supplying current to any load except post-regulator 200B, post-regulator 200B cannot force its input $V_z$ to be substantially different than $V_y$ so that $\Delta V \approx 0$ and $V_y \approx V_z$.

Figure 1A:
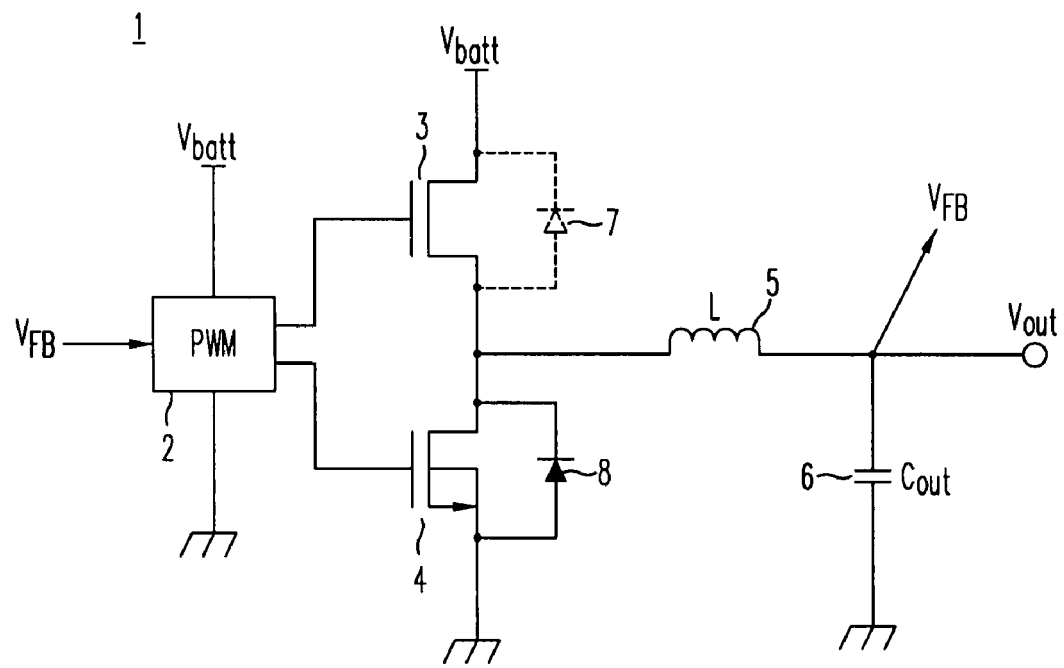
FIG. 1A is a circuit diagram of a prior-art synchronous Buck converter.
Figure 1B:
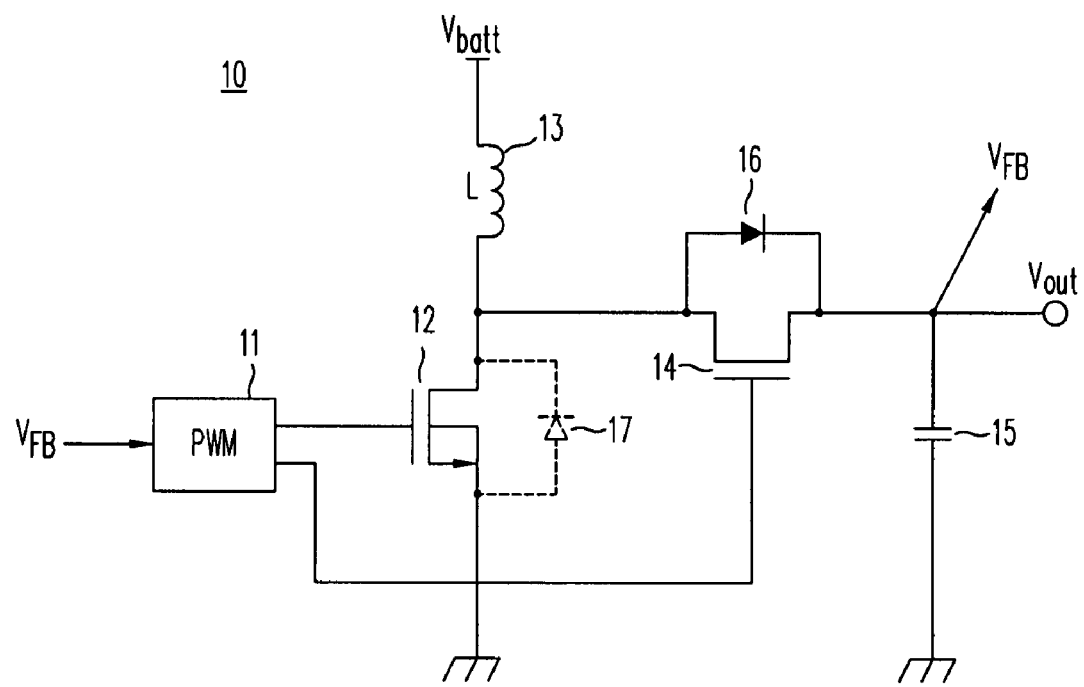
FIG. 1B is a circuit diagram of a prior art synchronous boost converter.
Figure 2A:
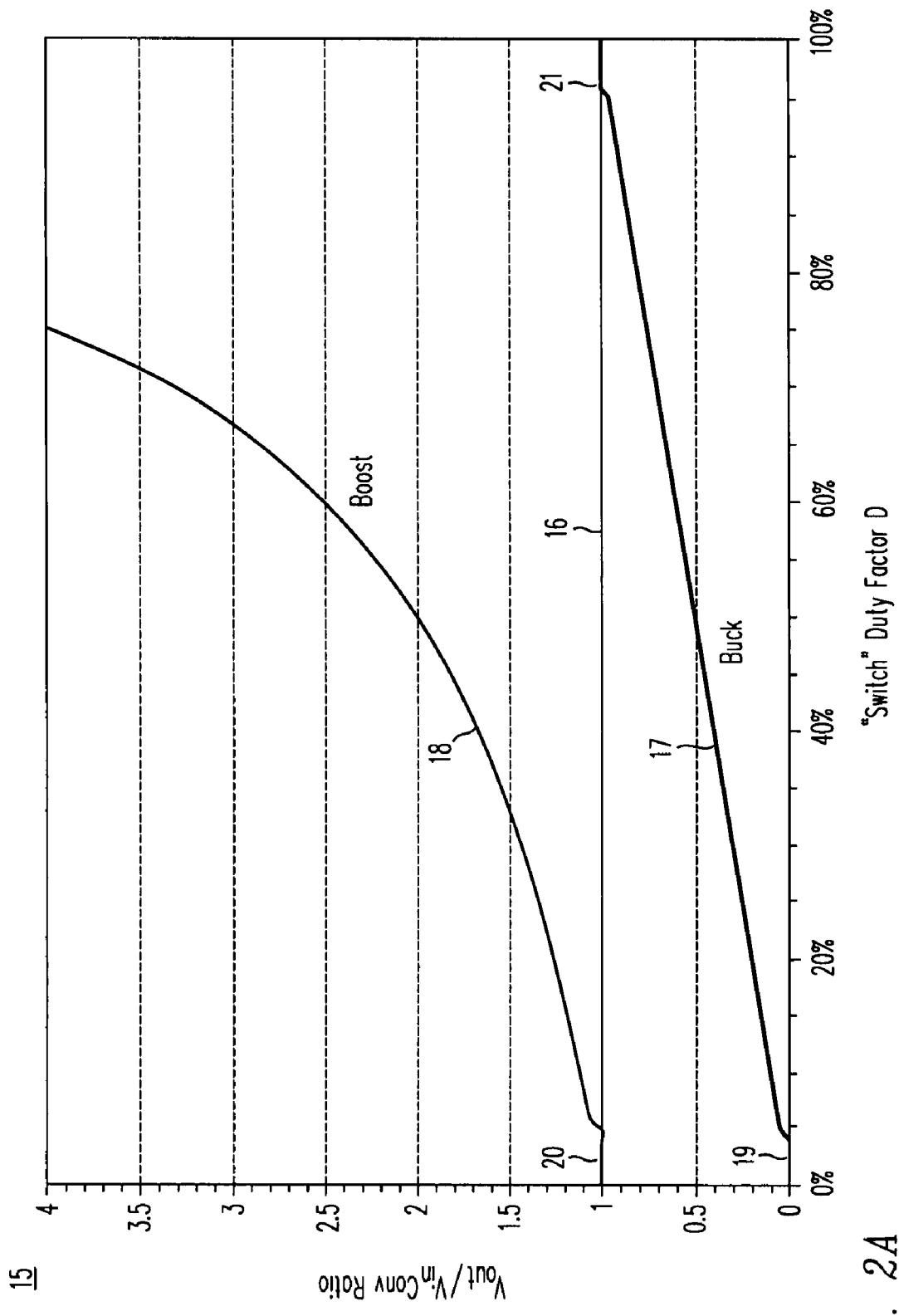
FIG. 2A is a graph of the voltage conversion ratio versus duty factor of conventional Buck and boost converters.

In the CLXU topology, post-regulator 200B operates as a step-up or boost converter, given by the relation $$V_{out} = \frac{V_z}{1-D} \approx \frac{V_y}{1-D}$$

where D is the duty cycle of the low side MOSFET 202, ranging between 0% and 100% and with an output similar to curve 18 of FIG. 2A.

Combining the two equations gives us the important relationship $$V_{out} \approx \frac{V_y}{1-D} = \frac{n \cdot V_{batt}}{1-D}$$

The voltage conversion ratio of the CLXU is therefore given by $$\frac{V_{out}}{V_{in}} = \frac{n}{1-D}$$

From this relation, we can make the important observation for the CLXU converter that the converter's output to input ratio is the multiplicative product of its pre-converter's ratio "n" and the post-regulator's duty-factor dependent voltage boost factor $1/(1-D)$. In essence, to properly regulate an output, the duty factor D, the conversion ratio n, or both must be varied dynamically to compensate for changes in input voltage.

While the post-regulator of the CLXU converter can only step-up its input to a higher voltage, operating in tandem with the charge pump pre-converter, the combined converter can operate at step-up, step-down, or even unity voltage conversion ratios.

Specifically, if n<1, the pre-converter 200A steps down, the post-regulator 200B steps up and the combination forms an up-down CLDU converter. With a two capacitor fractional charge pump this relation is given by $$\frac{V_{out}}{V_{in}} = \frac{0.5}{1-D}$$

Figure 10:
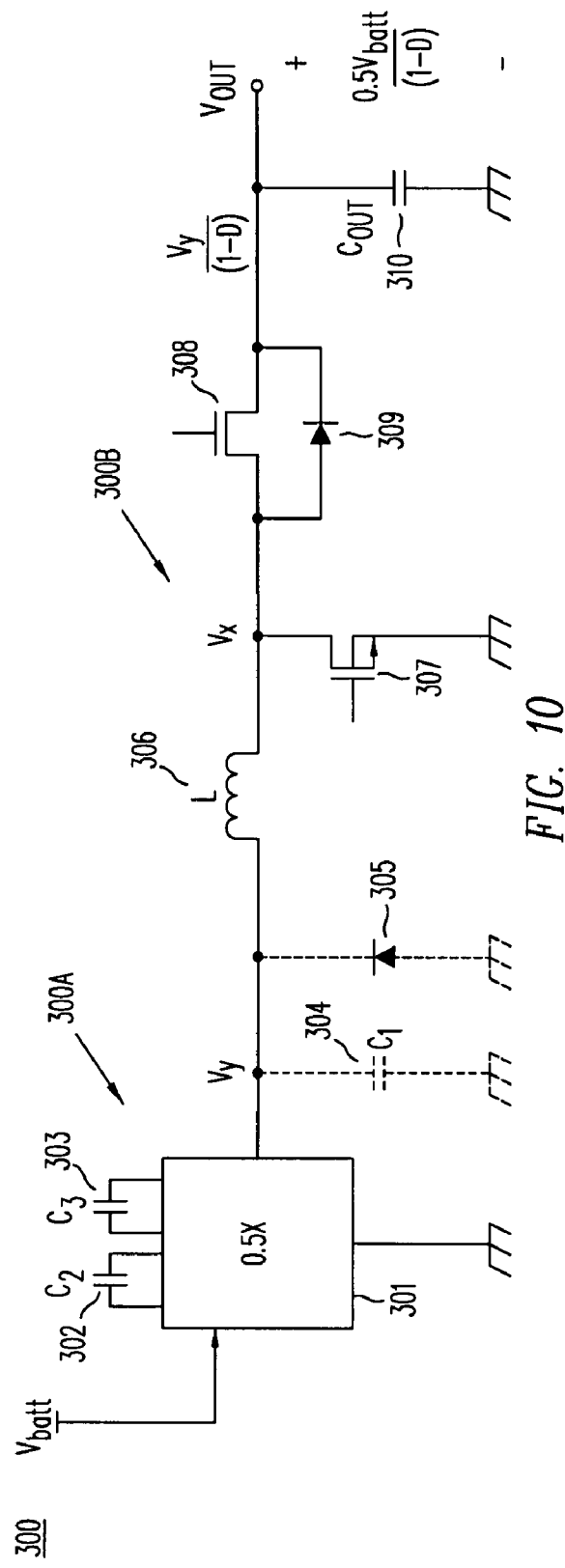
FIG. 10 is a circuit diagram of a switched 0.5× CLDU converter.

FIG. 10 represents a functional diagram of a CLDU down-up converter 300 comprising a 0.5× step-down charge-pump pre-converter 300A followed by an switched inductor boost converter as a post-regulator 300B.

Figure 14A:
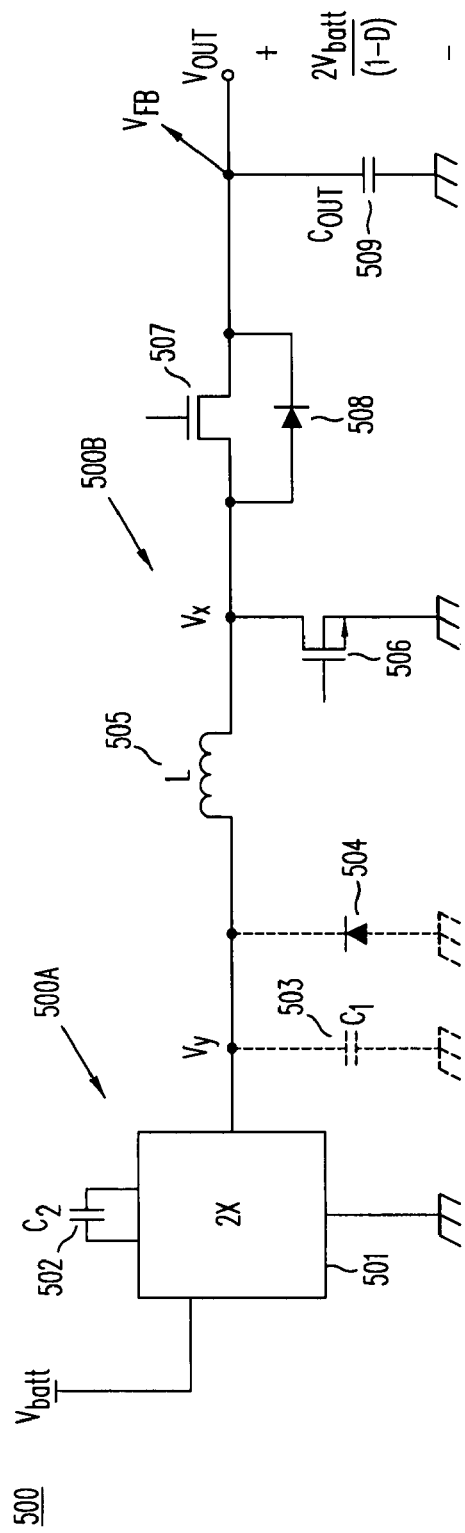
FIG. 14A is a functional diagram of a CLUU converter containing a 2× pre-converter.
Figure 14B:
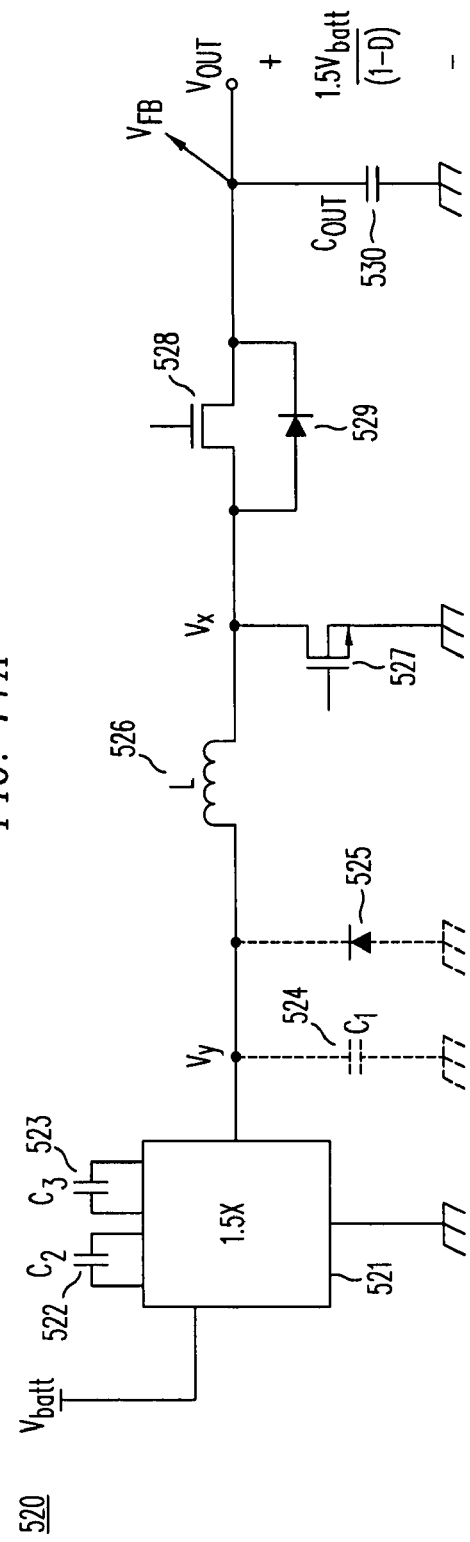
FIG. 14B is a functional diagram of a CLUU converter containing a 1.5× pre-converter.

If n>1, the converter 300 operates only as step-up CLUU converter and can achieve high step-up conversion ratios at moderate duty factors. Functional descriptions of single and dual flying capacitors CLUU converters are illustrated in FIGS. 14A and 14B. In single capacitor implementations of the pre-converter 501, as shown in FIG. 14A, the CLUU converter can be described by the relation $$\frac{V_{out}}{V_{in}} = \frac{2}{1-D}$$

In dual capacitor fractional implementations of the pre-converter 521, as shown in FIG. 14B, the CLUU converter can be described by the relation $$\frac{V_{out}}{V_{in}} = \frac{1.5}{1-D}$$

If n is negative and the post-regulator is non-inverting, the resulting CLIU converter is inverting and supplies a wide range of negative voltages. These inverting CLIU converters are illustrated in FIGS. 18A and 18B. For single-capacitor charge-pump implementations such CLIU inverters are described by $$\frac{V_{out}}{V_{in}} = \frac{-1}{1-D}$$

Using dual-capacitor fractional inverting charge-pumps, such CLIU inverters are described by $$\frac{V_{out}}{V_{in}} = \frac{-0.5}{1-D}$$

In such cases, the boost converter increases the magnitude of the voltage without changing its polarity, i.e. the term "up" refers to increasing the absolute value of a negative voltage without changing its polarity.

In an alternative embodiment, an inverting boost converter can be used to drive the pre-converter's output more positive and even above zero volts. Strictly speaking, such an implementation uses a positive boost converter referenced to a negative supply voltage—the output of the inverting charge pump. But since the polarity is opposite that of the output of the pre-converter, by convention, this last stage "inverts" the signal a second time.

A CLXX converter with two inversions is therefore capable of producing and regulating a positive, i.e. above ground, output voltage and is herein referred to as a CLII converter. Such a CLII converter, such as those shown in FIGS. 18C and 18D can regulate voltages above and below ground as given by $$\frac{V_{out}}{V_{in}} = \left[\frac{1}{1-D} - 1\right] = \frac{D}{1-D}$$

for a single capacitor charge pump implementation and by $$\frac{V_{out}}{V_{in}} = 0.5\left[\frac{1}{1-D} - 1\right] = \frac{0.5 \cdot D}{1-D}$$

for a two-capacitor fractional inverting charge pump.

CLDU Down-Up Converter Operation

A functional diagram of a CLDU down-up converter 300 is shown in FIG. 10 where converter 300 comprises a 0.5× step-down charge-pump pre-converter 300A, an inductor 306, an N-channel low-side switch 307, a synchronous rectifier 308 with intrinsic P-N diode 308 and an output filter capacitor 310. Capacitor 304 may range in size depending of the "n" multiple and circuit implementation of charge pump 301 and in some cases can be eliminated. Diode 305 also depends on charge pump 301 design and operation.

Figure 11A:
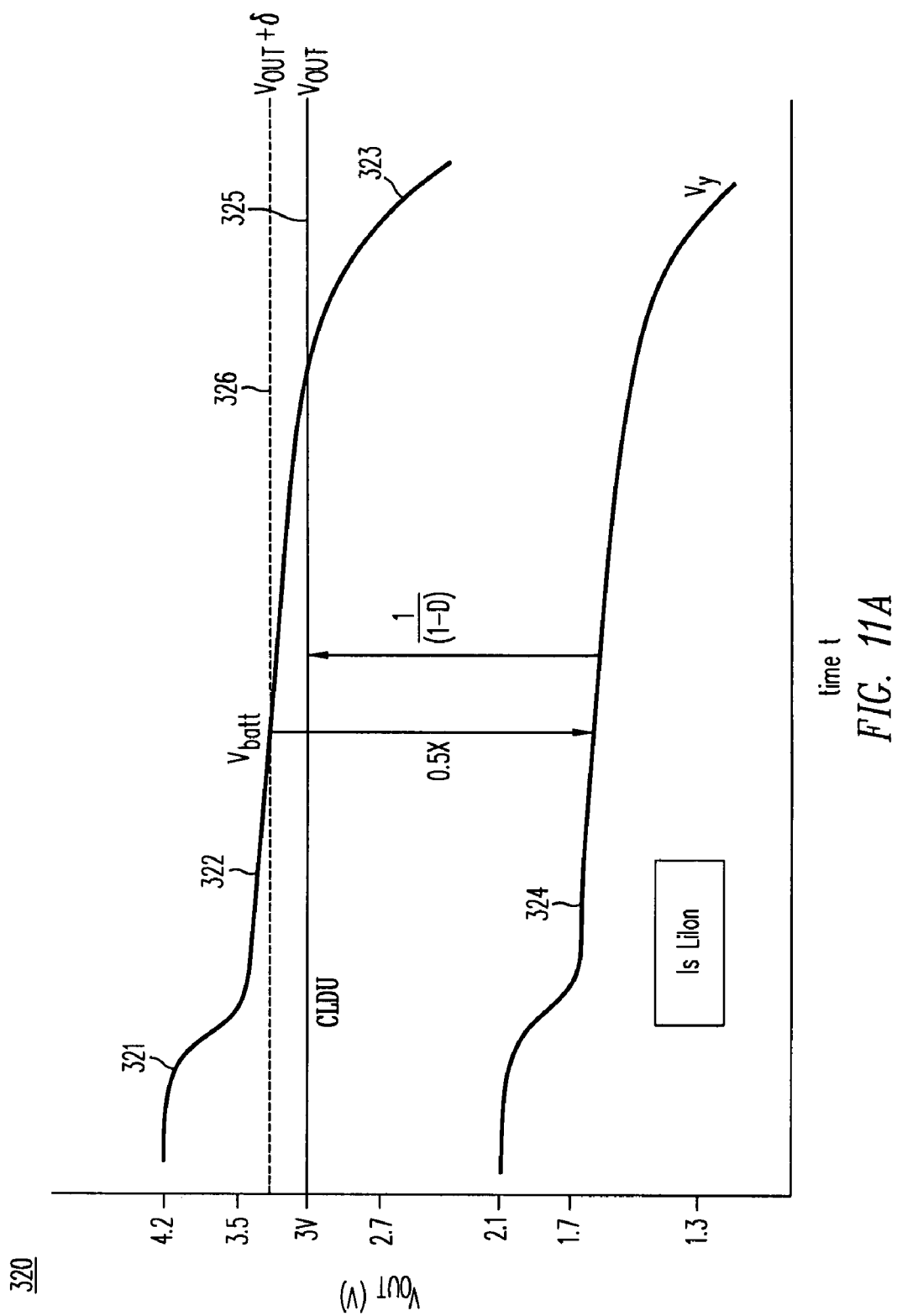
FIG. 11A is a graph illustrating the operation of converter according to this invention with a 1-cell Lilon battery.
Figure 11B:
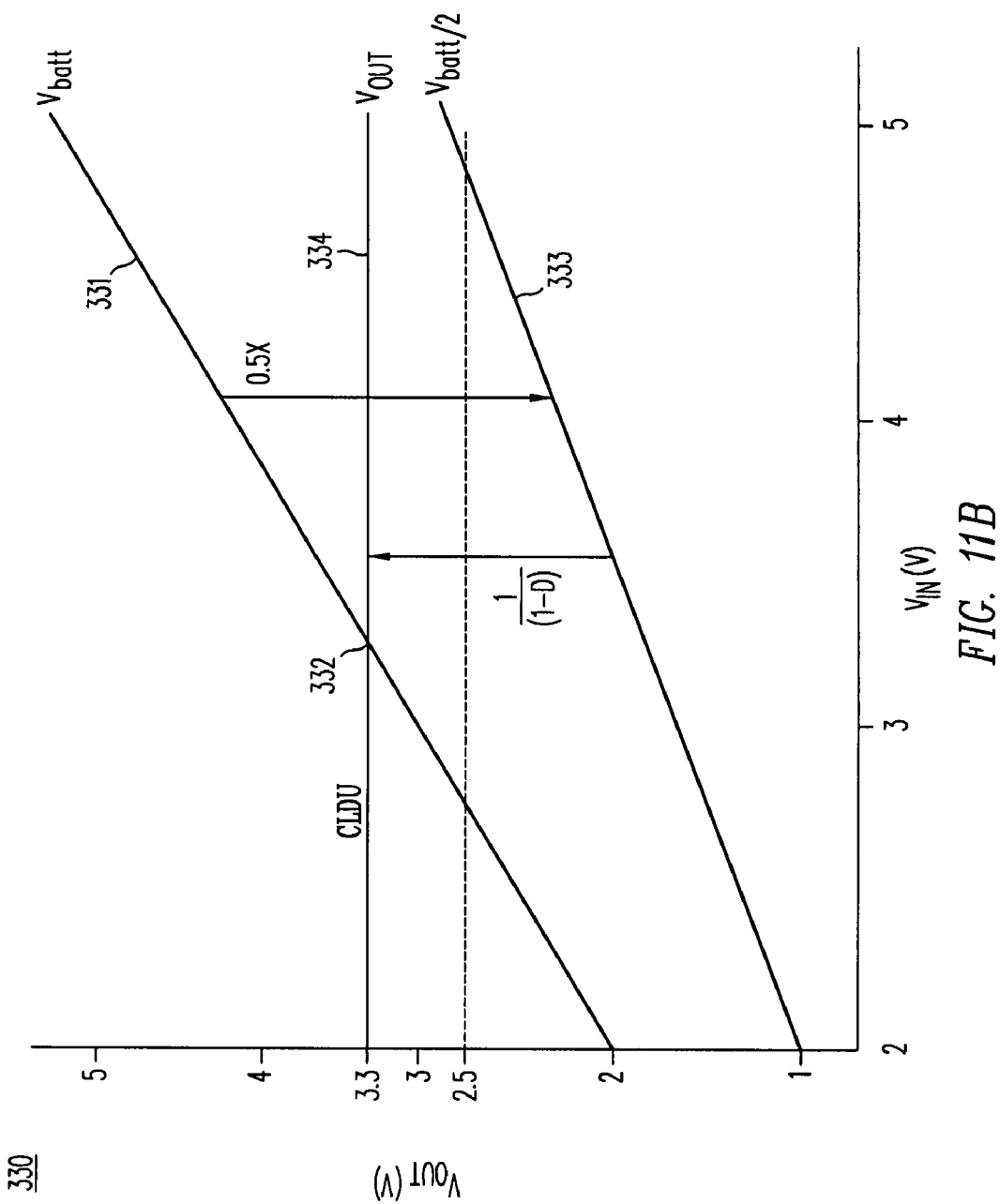
FIG. 11B is a graph illustrating 2V to 5V input transfer characteristics.
Figure 11C:
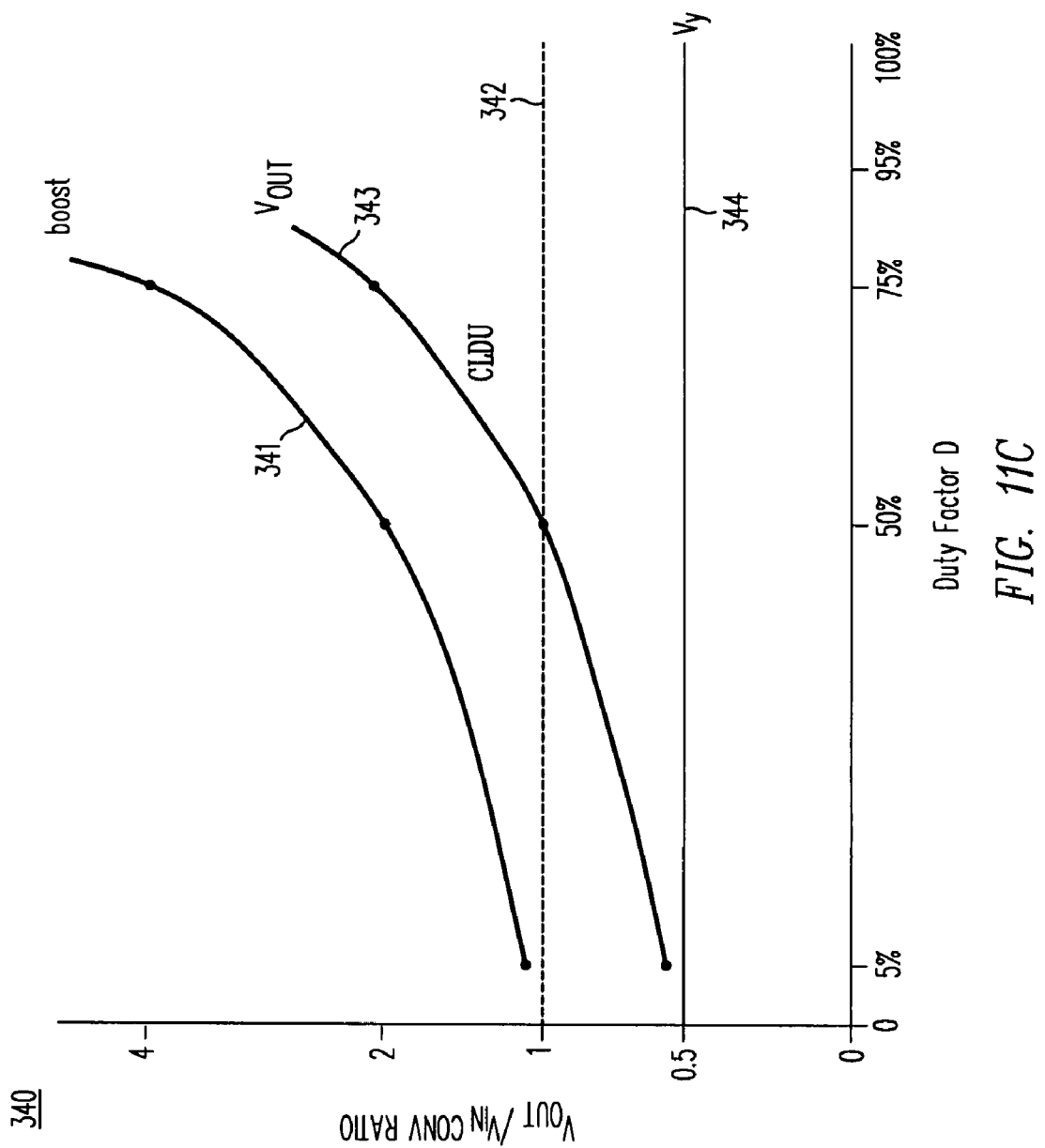
FIG. 11C is a graph illustrating the $V_{out}/V_{in}$ ratio as a function of the duty factor.

FIGS. 11A-11C illustrate various electrical characteristics of CLDU converter 300. Specifically, graph 320 in FIG. 11A illustrates the application of a CLDU converter in regulating the discharge of a single-cell lithium ion battery. The notation "1s LiIon" refers to a single series-connected cell comprising lithium ion electrochemistry.

As described in graph 320, a fully charged 1s LiIon battery exhibits a voltage $V_{batt}$ around 4.2V at the onset of discharging illustrated by line segment 321 which settles to a voltage of approximately 3.5V before remaining relatively constant for some extended duration, as revealed by line segment 322. Later, curve 322 illustrates that the battery voltage decays below 3.5V into a range {Vout<Vbatt<(Vout+δ)} between lines 325 and 326, a condition where a normal converter would suffer dropout or mode switching problems.

As the cell approaches full discharge in segment 323, its voltage drops rapidly to 2.7V, below which it must be cut off to avoid over-discharge induced cell damage. Only specialized LiIon batteries can operate down to 2.7V without growing crystallites and thereby shorting out the cell.

The output voltage $V_y$ of the 0.5× switched capacitor pre-converter 300A is illustrated by curve 324. This intermediate voltage varies in proportion to the battery input voltage discharge characteristic, with a voltage equal to one-half $V_{batt}$. The inductive boost post-regulator 300B steps this time-varying intermediate voltage up by a factor 1/(1−D) to produce a constant CLDU output voltage $V_{out}$, as illustrated by line 325. The output voltage of CLDU converter 300 can be any voltage greater than the highest value of curve 324, namely 2.1V. Such an output voltage may be greater than, less than, or within the voltage range of the battery input. For example, as shown $V_{out}$ is 3V, inside the LiIon battery's voltage range of 4.2V to 2.7V.

Regardless of the LiIon cell voltage, CLDU converter 300 steps the battery voltage down by half with its 0.5× charge-pump pre-converter, a varying voltage $V_y$ represented by line 324. This voltage is then boosted by a 1/(1−D) duty-factor-dependent boost converter to produce a constant regulated output voltage shown by line 325. The condition of converter 300 can be described as shown in Table 1:

TABLE 1

| Phase | Up/Down | $V_{batt}$ | nX | $V_y$ | D | $V_{out}$ | $V_{out}/V_{in}$ |
|---|---|---|---|---|---|---|---|
| 321. Full charge | Down | 4.2 V | 0.5X | 2.1 V | 30% | 3 V | 0.71 |
| Decay | Down | 3.6 V | 0.5X | 1.8 V | 40% | 3 V | 0.83 |
| 322. Plateau | Down | 3.5 V | 0.5X | 1.75 V | 42% | 3 V | 0.86 |
| Discharge $V_{batt} \approx V_{out}$ | Unity | 3.0 V | 0.5X | 1.5 V | 50% | 3 V | 1.00 |
| 323. Extend Range | Up | 2.7 V | 0.5X | 1.35 V | 55% | 3 V | 1.11 |

Using feedback, the duty factor self-adjusts to maintain the proper output voltage and regulation, whereby $$D = 1 - \frac{V_y}{V_{out}} = 1 - \left[\frac{0.5 \cdot V_{batt}}{V_{out}}\right]$$

Unlike in conventional Buck-boost converters, as the battery voltage curve 323 passes through the output voltage 325, i.e. when $V_{in}=V_{out}\approx 3V$, no mode change occurs. CLDU converter 300 therefore remains stable with no dropout and degradation in the quality of regulation.

Eliminating time as a variable, the transfer characteristic of converter 300 is illustrated in graph 330 of FIG. 11B, comparing $V_{out}$ to $V_{in}$ for a 3.3V CLDU converter. As shown, unregulated battery input voltage 331 ranging from 2V to 5V is reduced by the 0.5× capacitor pre-converter 300a to a lower voltage $V_y$ having a narrower range of 1V to 2.5V, illustrated by line 333. The slope of line 333 is half that of the input voltage 331, reducing the sensitivity of converter 300 to noise and other input fluctuations. The intermediate voltage node $V_y$ of line 333 is then stepped up by the inductive boost post-regulator 300B by a factor 1/(1−D) using a varying duty factor to produce a constant output voltage $V_{out}$, illustrated by line 334. Feedback of the output is employed to adjust the duty factor D to maintain $V_{out}$ at 3.3V.

At point 332, the input and output voltages are equal and converter 300 is regulating at a unity conversion ratio. When line 331 is above line 334, i.e. to the right of point 332, converter 300 is providing a step down regulation. When line 331 is less than 334, the output voltage is greater than its input and converter 300 is acting as a step-up converter. The mode of operation of converter 300 remains the same throughout all conditions shown, even at point 332.

One common application using a single cell LiIon battery and requiring a 3.3V regulated supply is in a cell phone. Unlike a 3V output, where the converter is mostly operating in step-down mode, a 3.3V output requires operation closer to unity conversion and exhibits an extended duration in its step-up mode as shown in Table 2.

TABLE 2

| Phase | Up/Down | $V_{batt}$ | nX | $V_y$ | D | $V_{out}$ | $V_{out}/V_{in}$ |
|---|---|---|---|---|---|---|---|
| Full charge | Down | 4.2 V | 0.5X | 2.1 V | 36% | 3.3 V | 0.79 |
| Decay | Down | 3.6 V | 0.5X | 1.8 V | 45% | 3.3 V | 0.92 |
| Plateau | Down | 3.5 V | 0.5X | 1.75 V | 47% | 3.3 V | 0.94 |
| $V_{batt} \approx V_{out}$ | Unity | 3.3 V | 0.5X | 1.65 V | 50% | 3.3 V | 1.00 |
| Discharged | Unity | 3.0 V | 0.5X | 1.5 V | 55% | 3.3 V | 1.10 |
| Extend Range | Up | 2.7 V | 0.5X | 1.35 V | 59% | 3.3 V | 1.22 |

Despite operating within approximately ±20% of its unity conversion ratio, CLDU converter 300 typically exhibits duty factors in the narrow range of 36% to 59%, utilizing PWM control circuitry more easily implemented than circuits controlling extreme duty factors, especially at high switching frequencies.

Unlike the converter of this invention, no present day converter is able to operate with high efficiencies over the battery's entire voltage range. Handset designers today must employ step-down-only Buck converters that cut off around 3.5V, thereby throwing away the battery life in discharge phases (curve 323) and a portion of voltage-plateau-phase (curve 322), because the added use-life of these later phases of discharge is completely overcome by the efficiency loss of a conventional Buck-boost converter.

As previously derived, the conversion ratio of 0.5× CLDU converter 300 is given by $$\frac{V_{out}}{V_{in}} = \frac{0.5}{1-D}$$

$V_{out}$ is illustrated by line 343 in FIG. 11C as a function of duty factor and compared to the boost converter's characteristic, shown by line 341. While the boost converter exceeds the unity voltage conversion ratio, illustrated by dashed line 342, at all values of the duty factor D, CLDU converter 300 is able to operate both above and below the unity conversion condition. The output voltage $V_y$ of pre-converter 300A, illustrated by line 344, however, illustrates that the operation of the pre-converter 300A does not depend on the duty factor of the boost converter in post-regulator 300B.

As shown, a unity conversion ratio occurs in 0.5× CLDU converter 300 when the duty factor D=50%. Under the same condition, a boost converter exhibits a conversion ratio of 2. At low duty factors, where conversion ratio of the boost converter approaches unity, 0.5× CLDU converter 300 is able to supply a regulated output voltage $V_{out}$ roughly equal to one-half the input voltage $V_{in}$.

At higher duty factors, e.g. when D=75%, a boost converter manifests a strong dependence on duty factor at a conversion ratio of 4, while CLDU converter 300 exhibits a conversion ratio of only 2. Compared to a boost converter alone, the lower slope of $V_{out}$ in CLDU converter 300 reduces its noise sensitivity to fluctuations in duty factor.

CLDU Converter Implementation

Figure 12A:
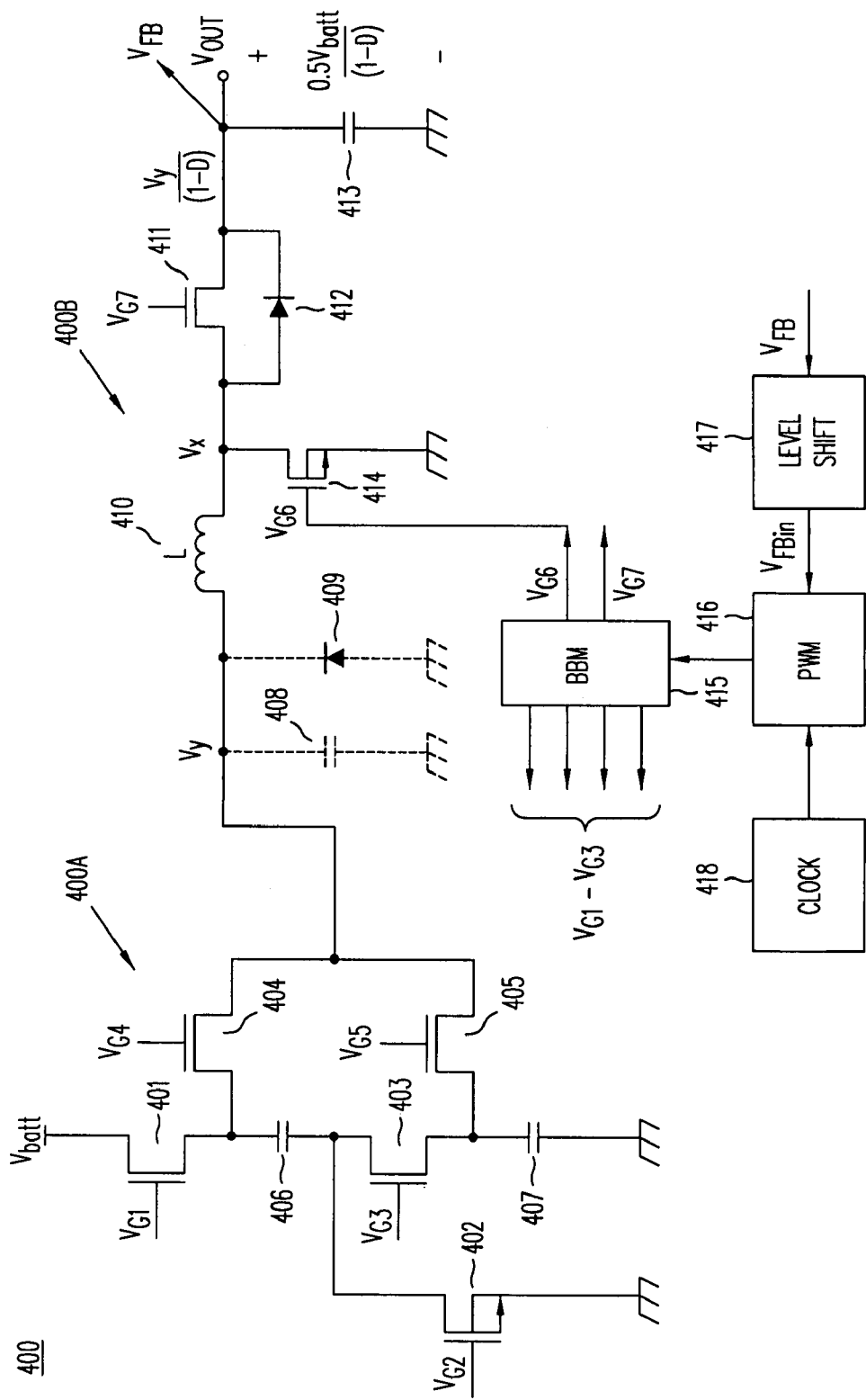
FIG. 12A is a more detailed circuit diagram of a 0.5× CLDU converter.

FIG. 12A illustrates an implementation of a 0.5× CLDU converter 400. As shown, switched capacitor pre-converter 400A comprises MOSFETs 401, 402, 403, 404, and 405 with flying capacitors 406 and 407. The gates of MOSFETs 401, 402, 403, 404, and 405 are controlled by a break-before-make (BBM) unit 415 to alternatively charge and discharge flying capacitors 406 and 407. The intermediate voltage $V_y$ charges capacitor 408 and powers the input to an inductive post-regulator 400B, the current flowing into inductor 410.

The current flowing through inductor 410 is dynamically adjusted by the duty factor of a low-side N-channel MOSFET 414 with a PWM controller 416 responding to changes in the output voltage of converter 400. A feedback signal $V_{FB}$ is adjusted in voltage and polarity by a level shift circuit 417 to control PWM controller 416.

When low-side MOSFET 414 is conducting, the voltage $V_x$ is biased near ground, at a voltage drop of $I_L \cdot R_{DSN}$, during which time the inductor 410 is magnetized, i.e. stores energy. When MOSFET 414 is turned off, the voltage $V_x$ flies up above the output voltage $V_{out}$ across capacitor 413, forward-ing biasing diode 412 and transferring energy to the output capacitor 413.

During some portion of the time while diode 412 is forward biased, a synchronous rectifier MOSFET 411 is turned-on, diverting the current from diode 412. A break-before-make unit 415 drives the gate of MOSFETs 414 and 411 out-of-phase insuring that the output capacitor 413 is not shorted by the simultaneous conduction of MOSFETs 411 and 414. In a preferred embodiment, a clock generator 418 synchronizes the switching of MOSFETs 411 and 414 in post-regulator 400B with the switching of MOSFETs 401, 402, 403, 404, and 405 in pre-converter 400A.

In an alternative embodiment, synchronous rectifier MOSFET 411 is eliminated and the current transfer to output capacitor 413 performed entirely by diode 412, which is incorporated in converter 400 as a separate device (not an intrinsic diode within MOSFET 411) and preferably comprises a Schottky metal-semiconductor diode instead of a P-N junction. Schottky diodes are preferred because they exhibit lower forward voltage drops than do junction diodes. In yet another embodiment, a Schottky diode can be placed in parallel with MOSFET 411 and intrinsic P-N diode 412.

Figure 12B:
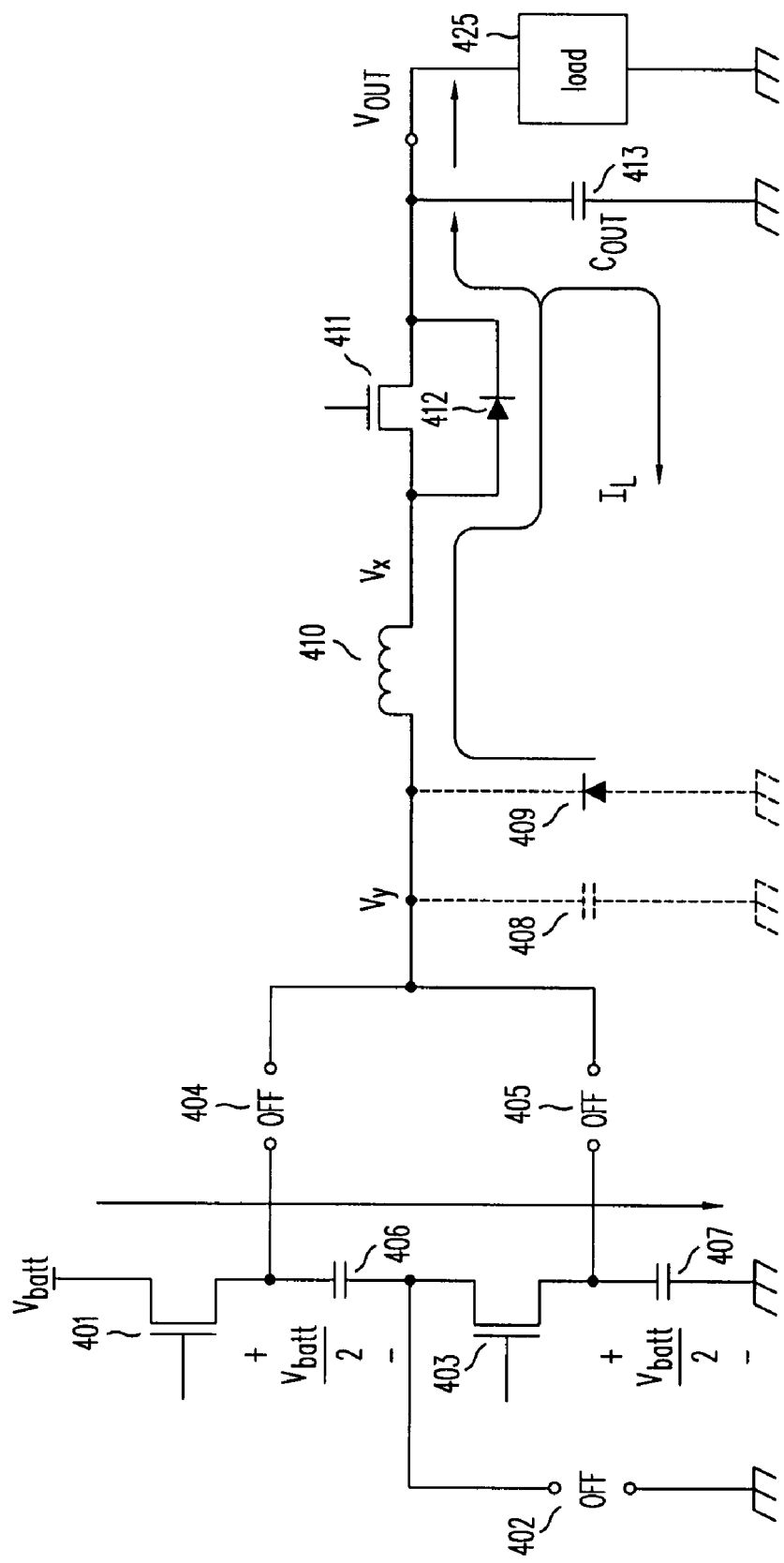
FIG. 12B is a circuit diagram illustrating the charging and recirculation stages of the converter.
Figure 12C:
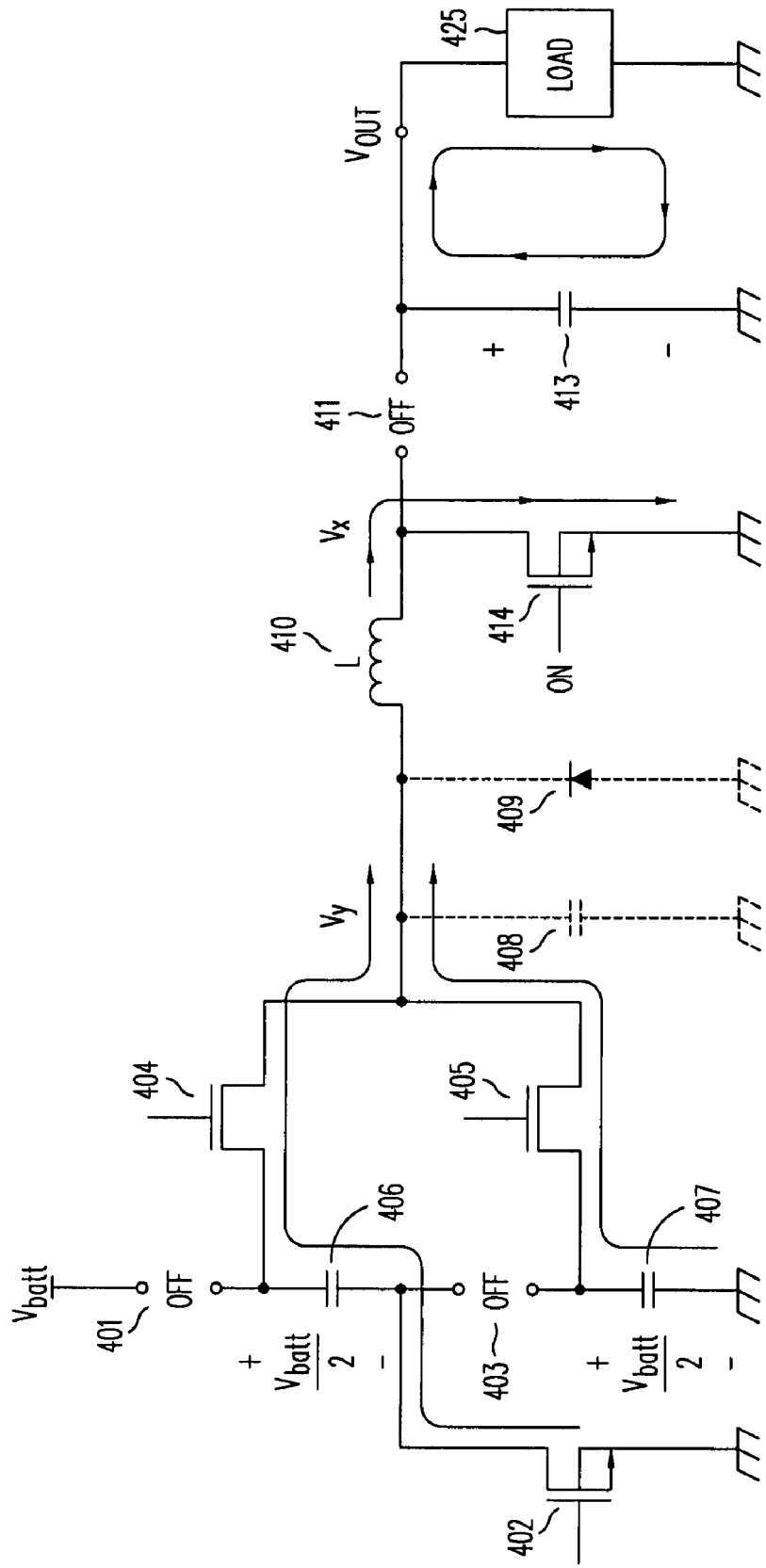
FIG. 12C is a circuit diagram illustrating the transfer and magnetizing stages of the converter.

The operation of CLDU converter 400 is illustrated in FIGS. 12B and 12C. In FIG. 12B, flying capacitors 406 and 407 are charged through the conducting MOSFETs 401 and 403 while MOSFETs 402, 404 and 405 remain off. Since capacitors 406 and 407 are connected in series, if they have equal capacitance each one charges to a voltage one-half the battery input voltage, i.e. $V_{batt}/2$.

During this cycle, synchronous rectifier MOSFET 411 is conducting a recirculation current through inductor 410, thereby moving energy from inductor 410 to output capacitor 413 and load 425. The phase can be referred to as the "charging and recirculation phase", i.e. the charging of the flying capacitors 406 and 407 and the moving of the energy from the inductor 410 to the output capacitor through inductor recirculation.

Specifically, during the charging and recirculation phase, the energy in inductor 410 is used to charge output capacitor 413 because inductor 410 forces the voltage $V_x$ to a more positive potential than the output voltage $V_{out}$, hence the output voltage $V_{out}$ is boosted. Controlled by the inductor 410, the intermediate voltage $V_x$ changes instantaneously in order to prevent any instantaneous interruption in inductor current $I_L$. Because charge pump output MOSFETs 404 and 405 are off during this phase, the current transfer path includes filter capacitor 408. If the capacitance of filter capacitor 408 is substantial, the voltage $V_y$ will remain substantially at $0.5 \cdot V_{batt}$, i.e. the output of the fractional step down charge pump.

If capacitor 408 is not sufficiently large, the voltage at $V_y$ will decay during the transfer phase and have to be replenished during the subsequent transfer phase. In some instances, e.g. if capacitor 408 is even smaller, the polarity of $V_y$ may actually drop below ground. In such cases, diode 409 can be added to complete the recirculation path of inductor 410 and limit the range of negative voltage on node $V_y$. In another embodiment, diode 409 may be replaced with a grounded N-channel MOSFET having an intrinsic parallel P-N junction diode and being turned on whenever $V_y$ goes negative.

FIG. 12C represents the transfer condition where energy is transferred from flying capacitors 406 and 407 in pre-converter 400A to inductor 410 in post-regulator 400B. This transfer is achieved by turning off MOSFETs 401 and 403 and turning on MOSFETs 402, 404 and 405, thereby forming a parallel combination of flying capacitors 406 and 407 that is connected in series with inductor 410 and charges capacitor 408 to an voltage $V_y$ equal to the voltage on the flying capacitors 406 and 407, i.e. $+V_{batt}/2$. The voltage $V_y$ is positive and above ground because the negative terminals of the capacitors are tied to ground—specifically capacitor 407 has its negative terminal hard wired to ground and capacitor 406 has its negative terminal connected to ground through MOSFET 402.

Simultaneous with the charging of capacitor 408, N-channel MOSFET 414 is turned on and conducts a current $I_L$ through inductor 410, completing the circuit and magnetizing, i.e. storing energy equal to $I_L^2 L$ in inductor 410. Since the voltage at the node $V_x$ is near ground, it is more negative than the output voltage $V_{out}$ and diode 412 is non-conducting, i.e. reversed biased and off. During this cycle MOSFET 411 is turned off and output capacitor 413 must supply the necessary load current $I_{out}$ to electrical load 425. The voltage across capacitor 413 begins to sag during this cycle and is replenished during the subsequent recirculation cycle shown in FIG. 12B.

The two cycles alternate to keep inductor 410 magnetized and flying capacitors 406 and 407 and output capacitors 408 and 413 charged. The entire system is efficient because once the voltage builds up on the capacitors 408 and 413 during start-up, steady-state operation must only replenish enough charge to compensate for the small shifts in voltage resulting from voltage sagging across the capacitors 408 and 413 during their discharge periods.

As shown in a preferred embodiment, converter 400 is operated using the same switching frequency for all the MOSFETs, with MOSFETs 402, 403 and 404 switched in phase with MOSFET 414 and out of phase with MOSFETs 401 and 403. Synchronous rectifier MOSFET 411 may conduct for all or some portion of the time whenever MOSFET 414 is off. Break-before-make unit 415 must guarantee that conduction in transfer MOSFETs 402, 404, and 405 never overlaps with conduction in charging MOSFETs 401 and 403. Similarly, BBM unit 415 must also insure that MOSFETs 414 and 411 never conduct simultaneously.

The advantage of this embodiment is that energy is transferred from pre-charged flying capacitors 406 and 407 directly into inductor 410 in real time. Converting energy stored in an electric field into energy stored as a magnetic field in real time minimizes the size required for filter capacitor 408, allowing it to be physically realized as an on-chip capacitor or in some cases even as parasitic junction capacitance.

Figure 12D:
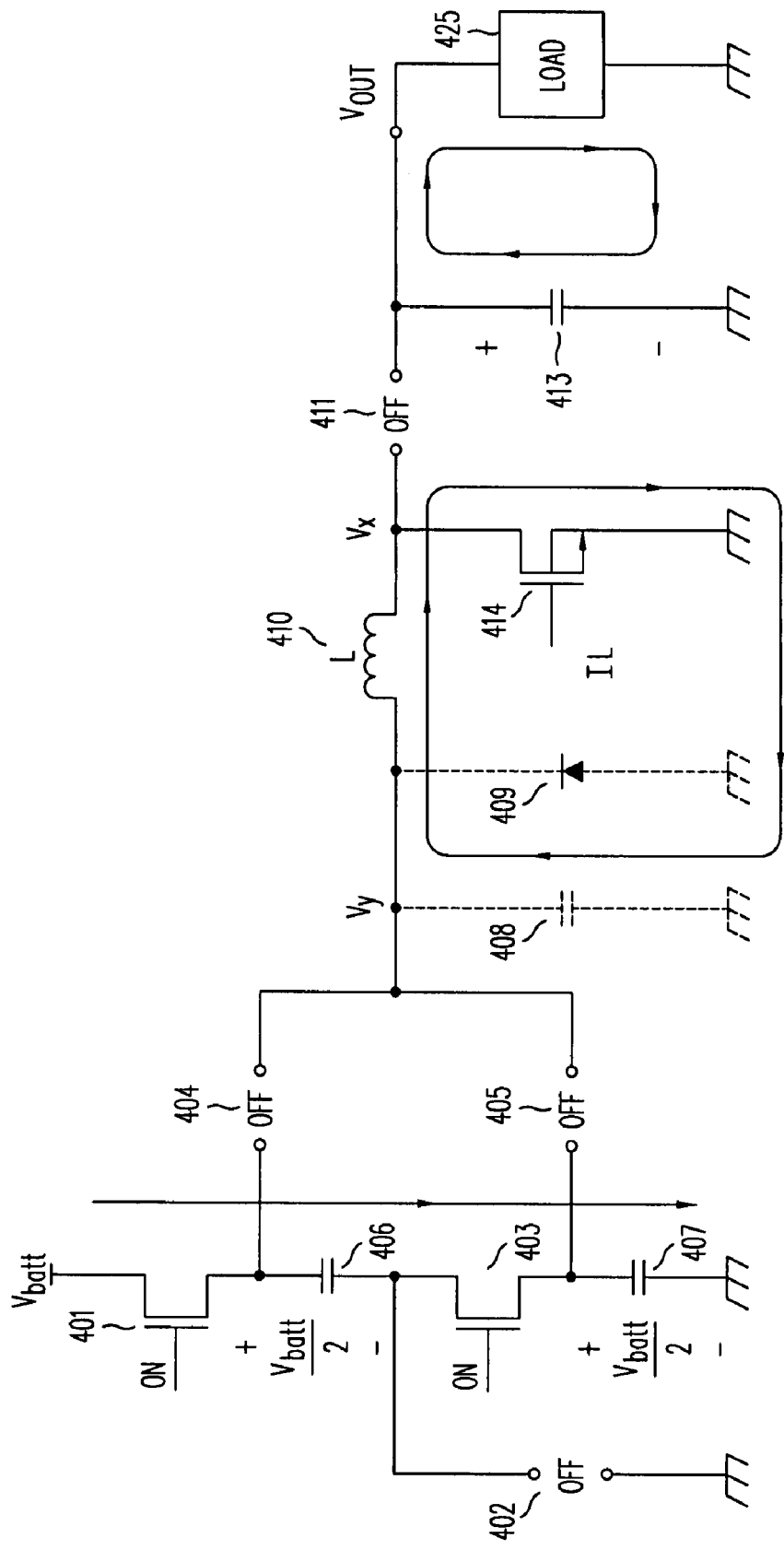
FIG. 12D is an alternative circuit diagram illustrating the transfer and magnetizing stages of the converter.
Figure 12E:
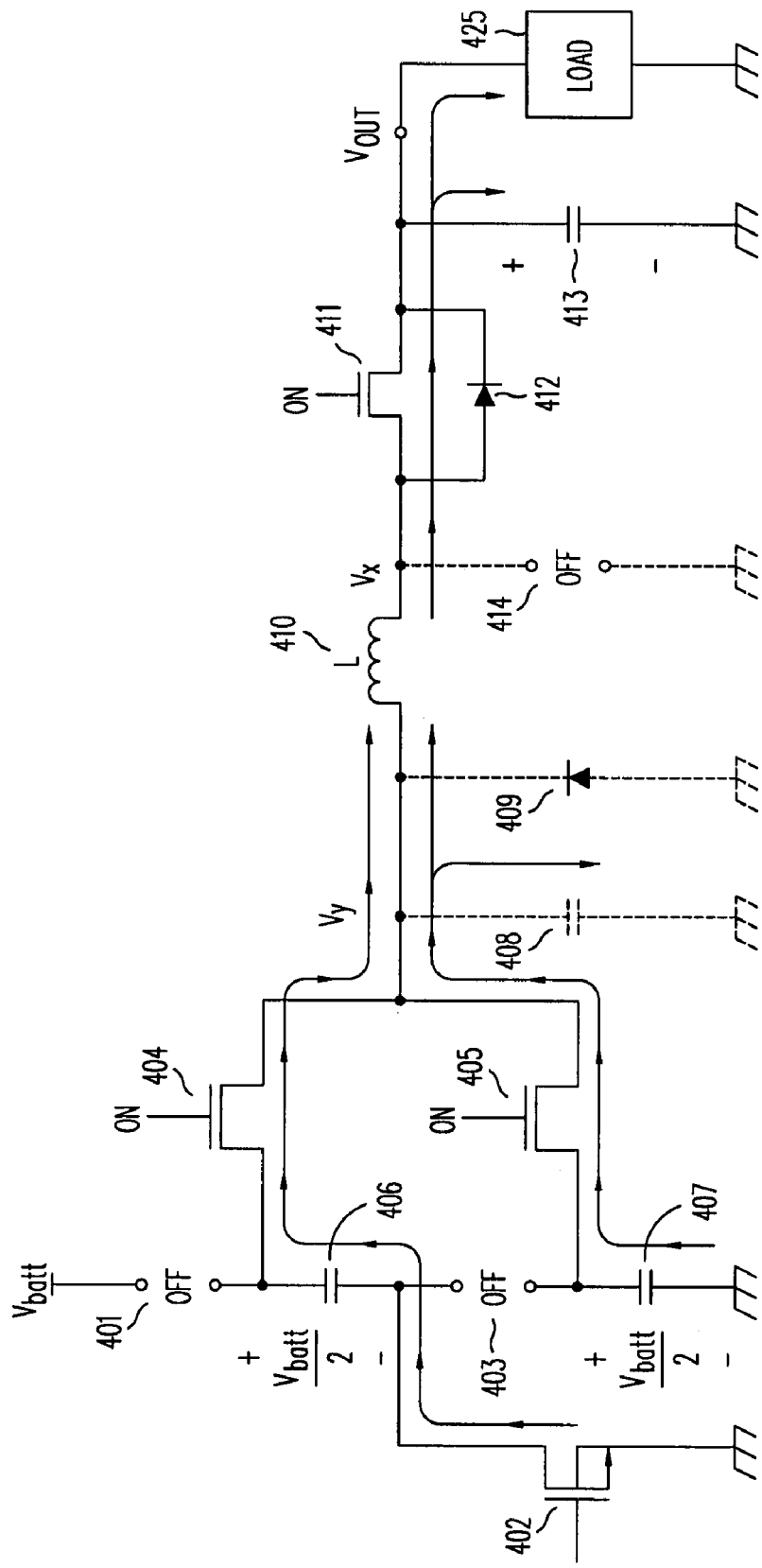
FIG. 12E is an alternative circuit diagram illustrating the transfer and output stages of the converter.

In an alternative embodiment of the CLDU converter, the phasing of the MOSFETs comprising the step-up post-regulator may be opposite that of the MOSFETs in the charge pump pre-converter, as illustrated in FIGS. 12D and 12E. Specifically, in FIG. 12D flying capacitors 406 and 407 are charged while the current in inductor 410 re-circulates through conducting MOSFET 414. During this same time interval, output capacitor 413 must supply load 425 with current. All other MOSFETs including MOSFETs 402, 404, 405 and 411, are turned off.

This recirculation phase of converter 400 shown in FIG. 12D is similar to that shown in FIG. 12B in that the flying capacitors 406 and 407 are charging, but the load 425 is disconnected from inductor 410 rather than taking energy from it. Since Vx is held near ground by on MOSFET 414, diode 412 remains reversed biased. The size of capacitor 408 must be sufficient to supply power to inductor 410 or the circuit will oscillate and power will be lost.

In the second phase of this embodiment, shown in FIG. 12E, flying capacitors 406 and 407 maintain the current in inductor 410 to charge capacitor 408 while inductor 410 is supplying energy to load 425 and output capacitor 413 through conducting synchronous rectifier MOSFET 411. MOSFETs 401, 403 and 414 are turned off. With MOSFET 414 off, $V_x$ flies up to a voltage higher than the output voltage $V_{out}$ so that no voltage differential exists to magnetize inductor 410 in this phase, only to maintain current continuity.

Since in this embodiment inductor 410 is magnetized only when low-side MOSFET 414 is conducting, during which time the only source of stored energy is that present in capacitor 408, the size of capacitor 408 is typically larger than the size of capacitor 408 in the embodiment shown FIGS. 12B and 12C. Whenever a large intermediate capacitor is needed, pre-converter 400A and post-regulator 400B are operating more independently and less synergistically than in designs where the energy flow between to the two stages of conversion is more balanced, with less need for storing energy in intermediate capacitor 408. That balance is best when charge pump pre-converter 400A and the switched inductor post-regulator 400B are synchronized to a common clock and phased so that the inductor 410 is magnetized whenever the charge pump within pre-converter 400A discharges flying capacitors 406 and 407, as illustrated in FIGS. 12B and 12C.

While charge-pump pre-converter 400A and switched-inductor post-regulator 400B are preferably operated at the same frequency and synchronized to a common clock, in an alternative embodiment they may be operated at different frequencies. Referring again to converter 200 shown in FIG. 8, PWM controller 213 in pre-converter 200A switches at a clock frequency Φ generated by clock circuit or ramp generator 215 while charge pump 201 switches at a frequency m·Φ, i.e. at a different frequency "m" times the clock frequency. Since m may be greater than or less than unity, charge pump 201 may be operated at a frequency higher or lower than PWM controller 213. At m=1 pre-converter 200A and post-regulator 200B are switching at the same frequency.

Whenever charge pump pre-converter 200A is not operating at the same frequency as switched inductor post-regulator 200B, intermediate filter capacitor 209 becomes increasingly important in storing energy to power post-regulator 200B and to magnetize inductor 203 as needed. While the two clocks may "free run" and thereby vary in frequency, unsynchronized operation can lead to excessive switching noise in the system.

In a preferred embodiment of a multi-frequency implementation of the CLXU converter, the pre-converter and post-regulator circuits switch at different frequencies but are synchronized either by a phase-locked-loop, also known as a PLL, or by using a common clock multiplied-up or divided-down to generate the two dissimilar clock signals. Ideally the clock waveform for the inductive post-regulator comprises a ramp generator rather than oscillating to produce a square wave. The gate drive for the charge pump MOSFETs may, however, comprise square wave signals generated by feeding the output of the ramp generator into a comparator. Alternatively, one or more of the MOSFETs in the charge pump pre-converter may be used to limit the charge pump's inrush current during the charging or discharging of its flying capacitors.

CLXU Converter Efficiency

One unexpected aspect of a CLXU converter, and in fact any CLXX converter, is the relative independence of its overall efficiency η on input and load conditions. This can better be understood by referring to FIG. 9, where charge-pump pre-converter 200A produces an intermediate voltage $V_y$ that provides the input to switched inductor post-regulator 200B.

The lossy element 253 is included in the behavioral model to illustrate that because the charge-pump within pre-converter 200A cannot actually regulate voltage, any voltage mismatch ΔV between its output voltage $V_y$ and the desired input voltage $V_z$ needed to power post-regulator 200B will result in a further loss of efficiency. In "LC class" converters like those described in related U.S. application Ser. No. 11/890,818, closed loop feedback from the output terminal of the entire DC/DC converter is beneficial to counter any "loading" effects on the charge pump. But in "CL class" converters like converter 250 shown in FIG. 9 the output voltage $V_y$ of the charge pump within pre-converter 200A is internal to converter 250 and unless the input to post-regulator 200B is used to supply an external load, $V_z$ will naturally operate at the voltage $V_y$, the optimum efficiency condition.

Specifically, in CLXX type converters, the switched capacitor pre-converter may operate in an open-loop manner to produce an output voltage $V_y$ that is some fixed multiple "n" of its input. For example, using one or two flying capacitors, the multiplier will be an integral multiple of 0.5V. As long as $V_z$ can be maintained near the voltage n·$V_{in}$, i.e. where $V_y \approx V_z$, the efficiency of charge pump pre-converter 20A will remain high. Any deviation ΔV from this optimum condition will result in a loss of charge pump efficiency, where the mismatch is given by $\Delta V = V_z - V_y$, resulting in a loss that has the same mathematical form $\Delta V/V_{in}$ as the losses in a linear converter, even though lossy element 253 is not really regulating voltage per se. Specifically, the loss may be defined as $$P_{loss2} = I_y \cdot \Delta V = I_y |(V_y - V_z)|$$

The efficiency $\eta_2$ of element 253, is then given by $$\eta_2 = \frac{P_z}{P_y} = \frac{P_y - P_{loss2}}{P_y} = \frac{I_y \cdot V_y - I_y(V_y - V_z)}{I_y \cdot V_y} = \frac{V_z}{V_y}$$

and where $V_z \leq V_y$, i.e. the maximum theoretical efficiency of the second element is 100%. From the converter transfer function $V_y = n \cdot V_{in}$ then $$\eta_2 = \frac{V_z}{V_y} = \frac{V_z}{nV_{in}}$$

Figure 13A:
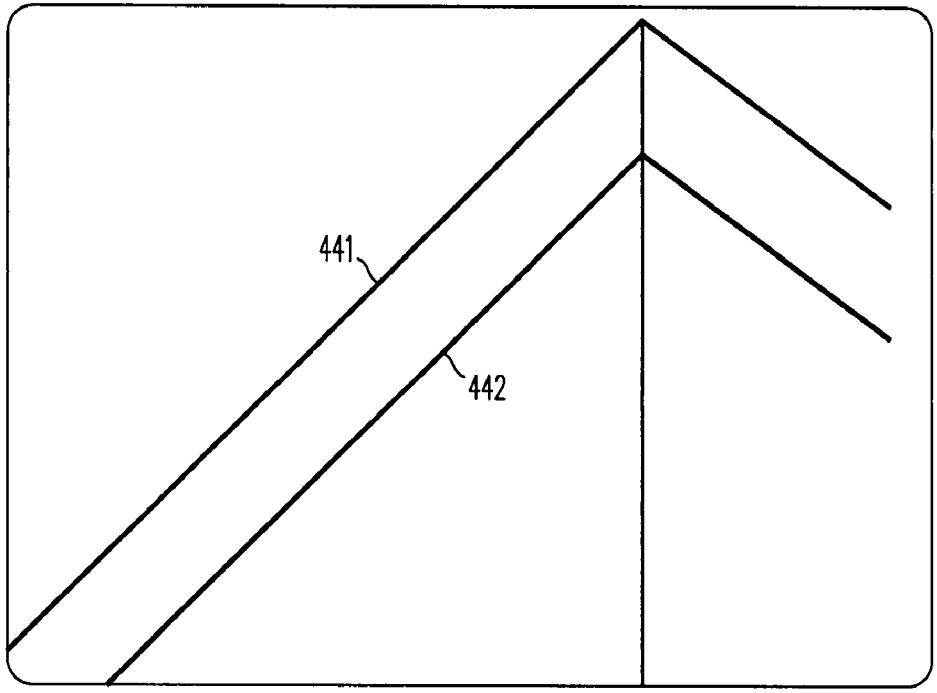
FIG. 13A is a graph showing the efficiency of the pre-converter stage and a function of the voltage conversion ratio $V_y/V_{in}$.

Line 441 in the efficiency graph 440 of FIG. 13A illustrates $\eta_2$ as a function of the input-to-output charge pump voltage conversion ratio. In reality however, the maximum efficiency of charge pump pre-converter 200A is not 100%. Charge pump pre-converter 200A typically has a maximum efficiency in the range of 96% when delivering power to a load operating at a voltage $V_z$. Assuming for the sake of simplicity that this efficiency remains relatively constant, the conversion efficiency of the first two stages is given by $$\eta_{CP} = \eta_1 \cdot \eta_2 = \eta_2 \frac{V_z}{V_y} = \frac{\eta_2 \cdot V_z}{n \cdot V_{in}}$$

This equation is illustrated by line 442 in FIG. 13A. Note that the maximum voltage conversion ratio is limited to the ratio "n". The dashed line above that cannot physically be realized but illustrates the impact of the lossy element 253 is mathematically symmetric, i.e. purely a lossy element. When n=1, the charge pump is not actually stepping up voltage and the efficiency equation defaults to that of linear converter.

Referring again to behavioral model 250, the overall efficiency of the CLXU converter shown can be estimated the product of the aforementioned charge pump efficiency $\eta_1 \cdot \eta_2$ and the efficiency of the switched inductor post-regulator $\eta_3$.

The power input to post-regulator 200B is given by $P_z = I_z \cdot V_z$, while $P_{out} = I_{out} \cdot V_{out}$. The efficiency $\eta_3$ of the post-regulator 200B can thus be expressed as $$\eta_3 = \frac{P_{out}}{P_z} = \frac{I_{out} \cdot V_{out}}{I_z \cdot V_z}$$

Figure 13B:
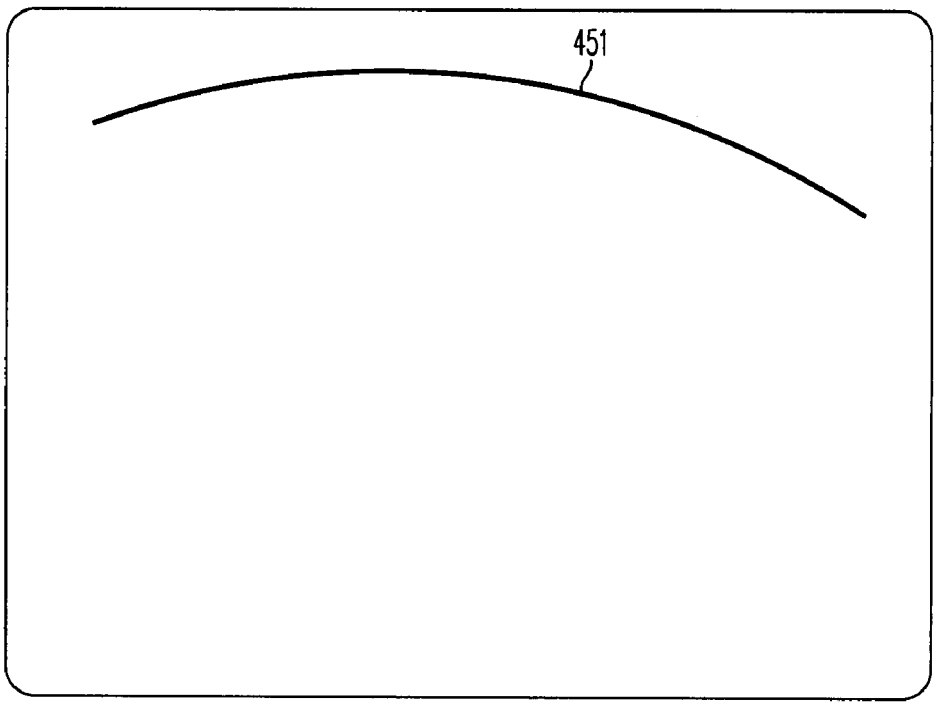
FIG. 13B is a graph showing the efficiency of the post-regulator stage as a function of the conversion ratio $V_{out}/V_y$.

The voltage dependence of the post-regulator efficiency given by the above equation is illustrated for a given load current by example curve 451, shown in graph 450 of FIG. 13B. Typical values range from 94% to 89% depending on operating conditions, power MOSFET resistance and operating currents. Since post-regulator efficiency $\eta_3$ depends on the voltage conversion ratio, and since the conversion ratio depends on duty factor D, then it follows logically that the switching converter's efficiency depends on duty factor, i.e. $\eta_3 = f(D)$.

Overall CLXX converter efficiency is thus given by the efficiency product of the charge-pump pre-converter and the switching post-regulator converter.

$$\eta = \eta_{CP} \cdot \eta_3 = \eta_1 \cdot \eta_3 \frac{V_z}{V_y} = \eta_1 \cdot \eta_3 \frac{V_z}{n \cdot V_{in}}$$

Figure 13C:
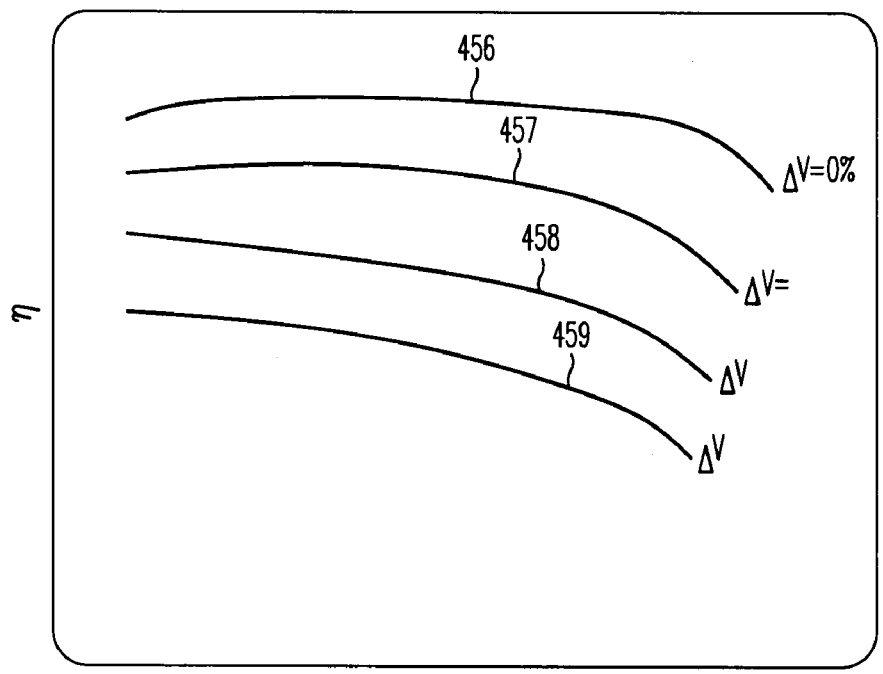
FIG. 13C is a graph showing the efficiency of the converter as a function of the conversion ratio $V_{out}/V_{in}$ for different duty factors.
Figure 13D:
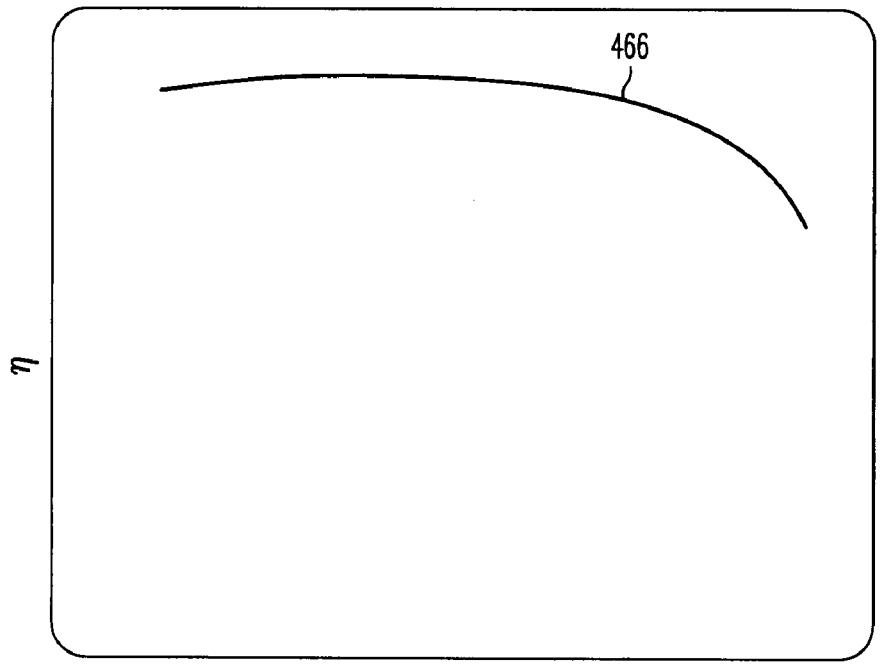
FIG. 13D is a graph showing the efficiency of the converter as a function of the duty factor.

Graph 455 in FIG. 13C illustrates the overall efficiency of a CLXX converter for various values of $V_z$, expressed as a percentage of $V_y$. Since feedback within post-regulator 200B maintains the targeted output voltage $V_{out}$ by adjusting its duty factor for a wide range of intermediate voltages $V_z$ then, unloaded, $V_z=V_y=n\cdot V_{in}$ and the above equation simplifies to $$\eta = \eta_{CP} \cdot \eta_3 = \eta_1 \cdot \eta_3$$

where $\eta_3$ is a function of the duty factor D. Using a step-up, boost converter topology for the post-regulator stage, the CLXU converter transfer function is given by $V_{out}=V_y/1-D = [n/(1-D)]V_{in}$. As such, the efficiency can be re-plotted in terms of duty factor D rather than by conversion ratio $V_{out}/V_{in}$ as illustrated by line 466 in efficiency graph 465 of FIG. 13D.

Switched CLXX and CLXU converters of this invention can produce a well regulated output with efficiencies relatively insensitive to the $V_{out}/V_{in}$ voltage conversion ratio. In the event that the charge-pump pre-converter is a step-down fractional charge pump, e.g. where n=½, the resulting CLDU converter is able to operate in either step-up or step-down modes without exhibiting any mode changes, narrow pulse, or dropout effects near unity voltage conversion ratios, i.e. when $V_{out} \approx V_{in}$. The CLDU converter is able to operate over a range of output to input voltage ratios far beyond that of a Buck converter, boost converter or charge pump. Assuming a practical limitation on duty factor ranges between 10% and 90%, Table 3 compares the usable range of voltage conversion ratios of the CLDU converter to those of a charge pump doubler, Buck converter, and boost converter.

TABLE 3

| Converter Topology | Range of $V_{out}/V_{in}$ | Range of Efficiency | Unity Ratio Efficiency |
|---|---|---|---|
| 2X Charge Pump | 0.1 to 2.0 | Above 1.8 | Poor, $\eta < 50\%$ |
| Boost Converter | 1.1 to 15 | Good up to ~8-10 | Dropout below 1.1 |
| Buck Converter | 0.1 to 0.9 | Good over range | Dropout above 0.9 |
| 0.5X CLDU | 0.1 to ~10 | Good up to ~4-5 | Good, $\eta > 88\%$ |

Despite its high efficiency characteristic, a Buck converter operating between a 10% to 90% duty factor is only capable of step-down conversion ratios, i.e. where $V_{out}=\{0.1V_{in}$ to $0.9V_{in}\}$ as shown by curve 471. Similarly a boost converter operating between a 10% to 90% duty factor is only capable of step-up conversion ratios, i.e. where $V_{out}=\{1.1V_{in}$ to $8V_{in}\}$ as shown by curve 472. Furthermore 2× charge pump efficiency, shown by curve 473, is high only for conversion ratios exceeding 1.8.

In contrast, the efficiency of a CLDU converter (curve 474) is high over a wide range of voltage conversion ratios, i.e. where $V_{out}=\{0.1V_{in}$ to $4V_{in}\}$. This result is unexpected considering that the CLDU converter combines elements of a charge pump and a boost converter, yet regulates over a much wider range of operating conditions than either of them.

Switched Capacitor-Inductor Up-Up (CLUU) Regulating Converters

A CLXU converter topology is useful for step-up voltage regulation. By utilizing a step-up charge-pump as a pre-converter, step-up voltage conversion is performed in two stages, or as a CLUU converter. Examining the implementation of CLUU converters in greater detail, FIGS. 14A and 14B illustrate the functional block representation of two different switched LCUU regulating converters, a 2× type shown in FIG. 14A and a fractional 1.5× type shown in FIG. 14B.

Figure 2B:
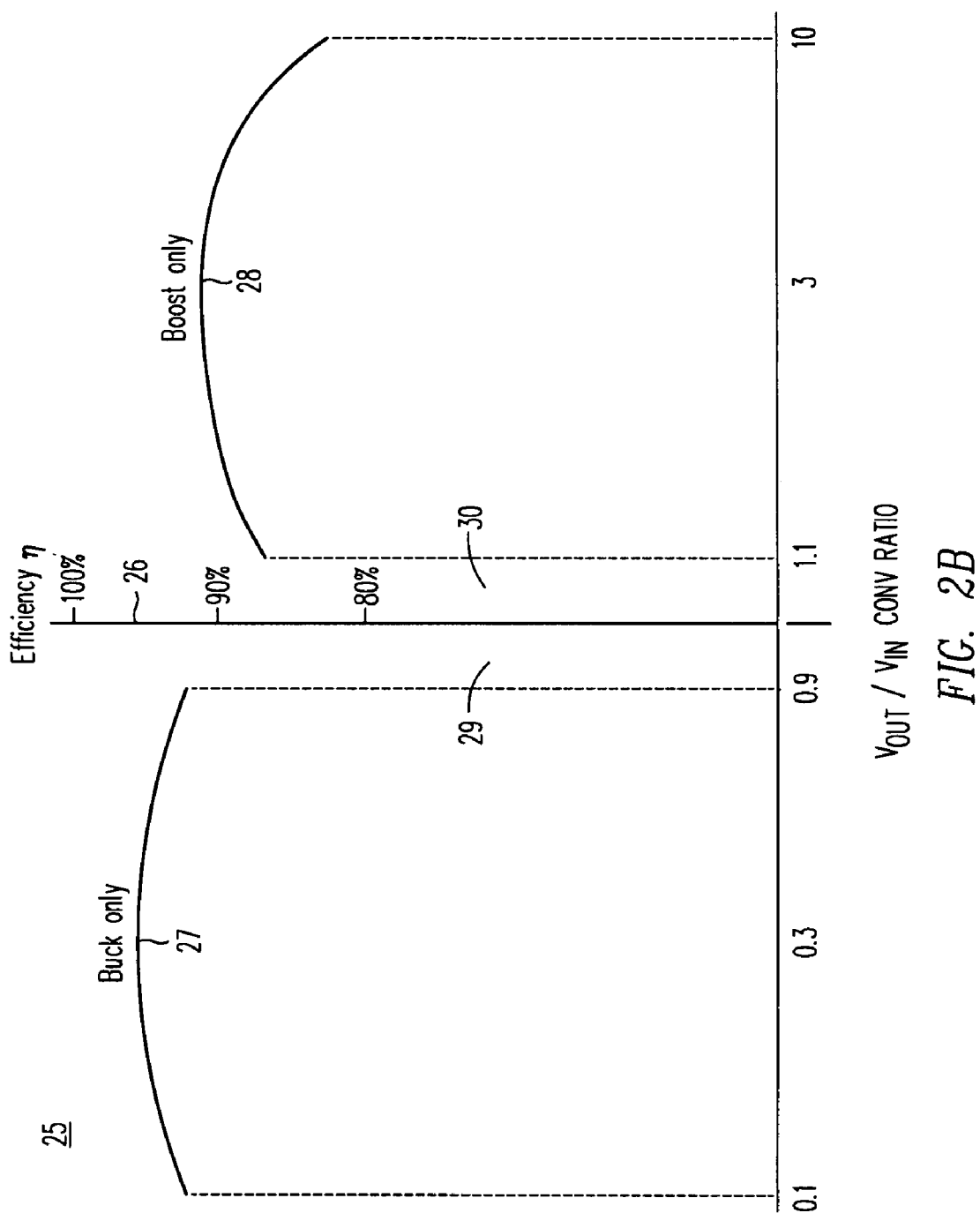
FIG. 2B is a graph of efficiency versus voltage conversion ratio of conventional Buck and boost converters.
Figure 3C:
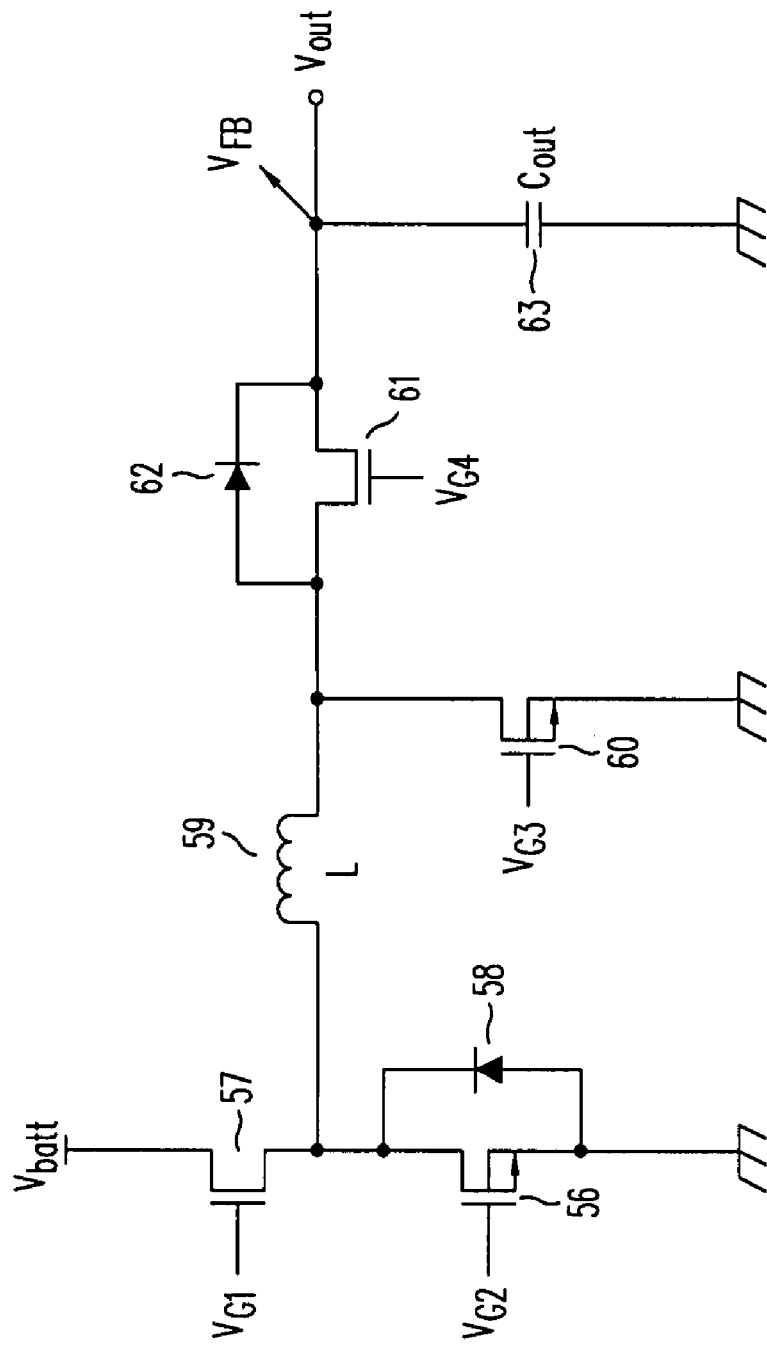
FIG. 3C is a circuit diagram of a simplified Buck-boost converter.
Figure 3D:
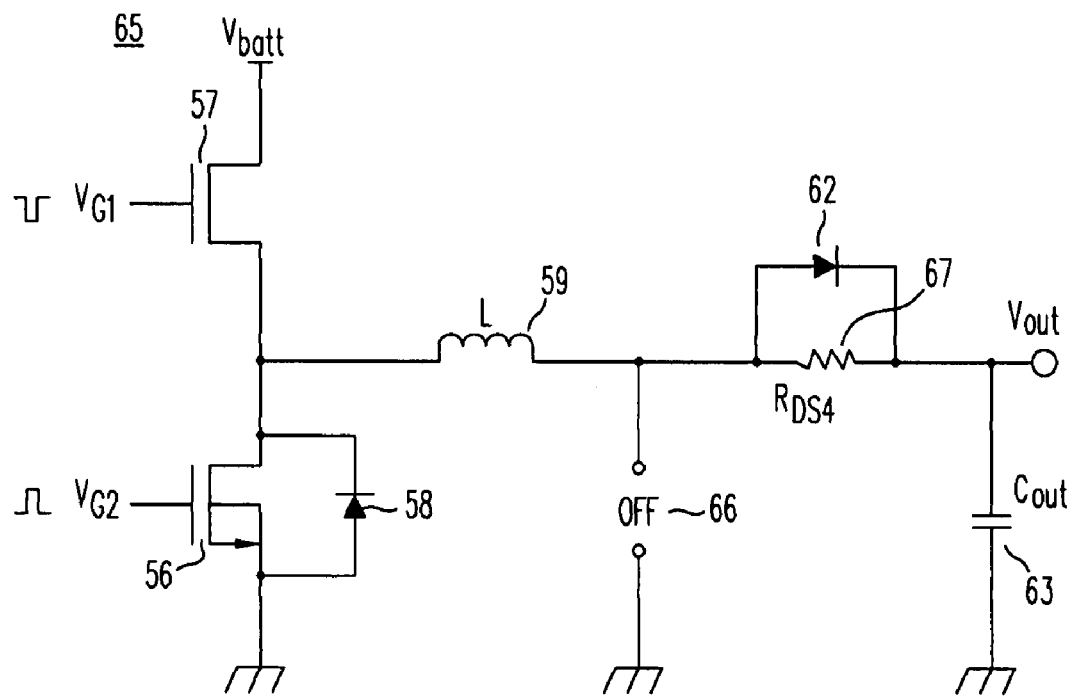
FIG. 3D is an equivalent circuit diagram of a Buck-boost converter in Buck-only mode.
Figure 3E:
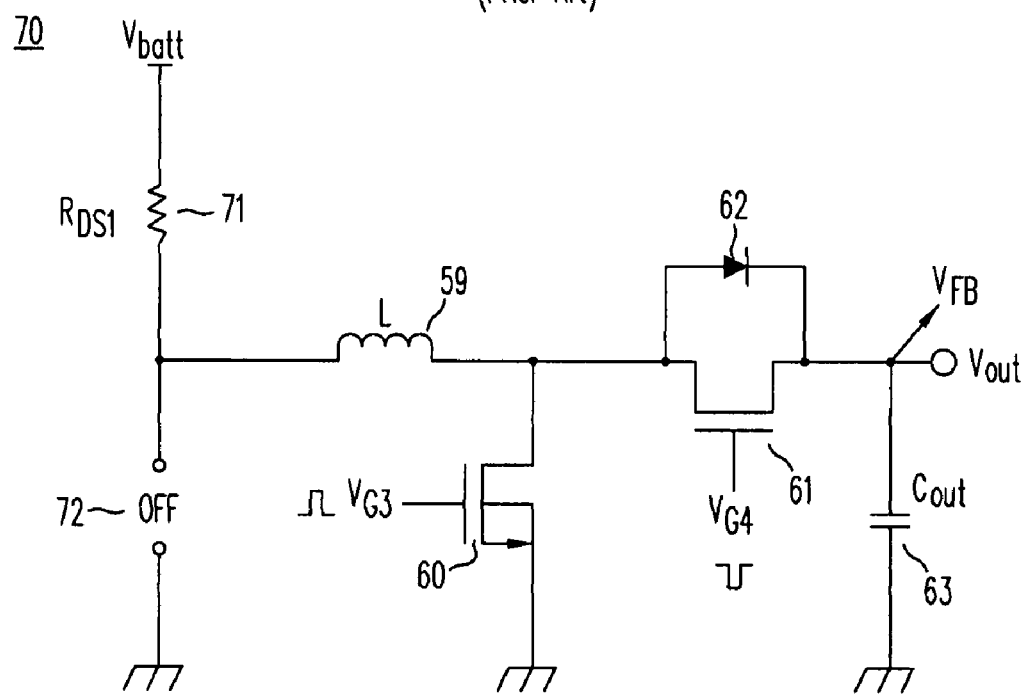
FIG. 3E is an equivalent circuit diagram of a Buck-boost converter in boost-only mode.
Figure 4:
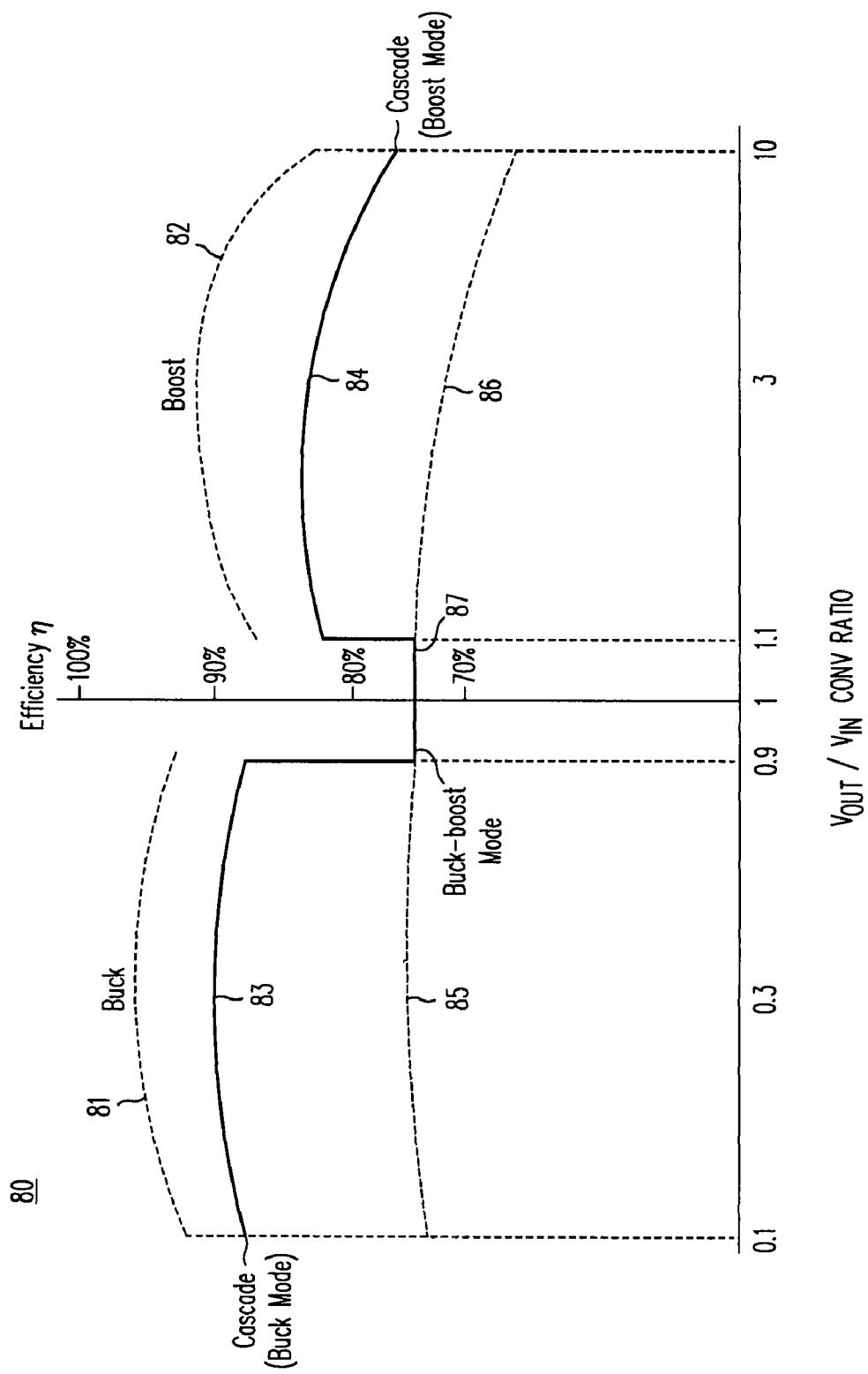
FIG. 4 is a graph of efficiency versus voltage conversion ratio for Buck, boost, and Buck-boost converters.
Figure 5A:
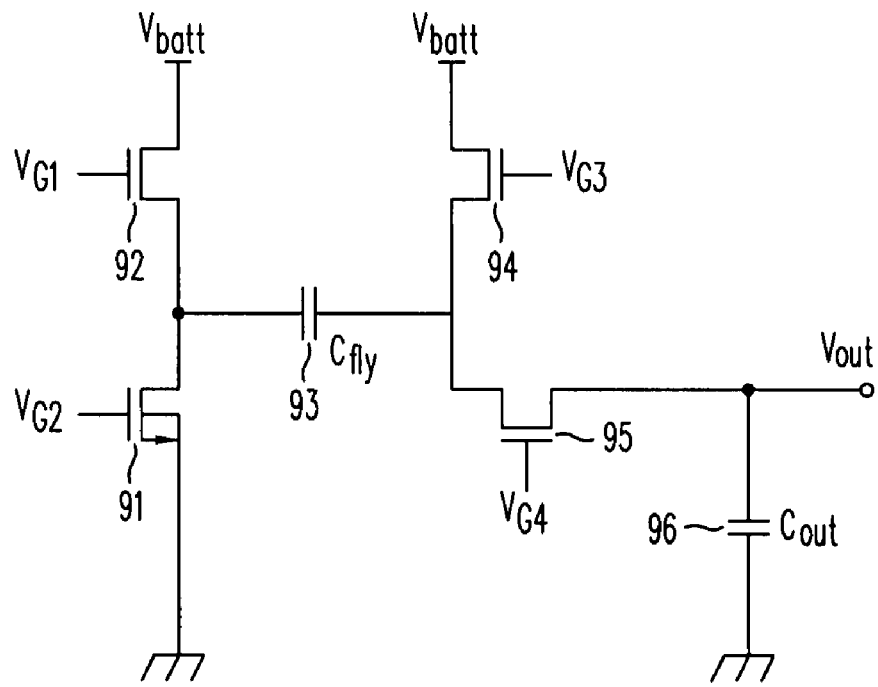
FIG. 5A is a circuit diagram of a 2× doubler charge pump.
Figure 5B:
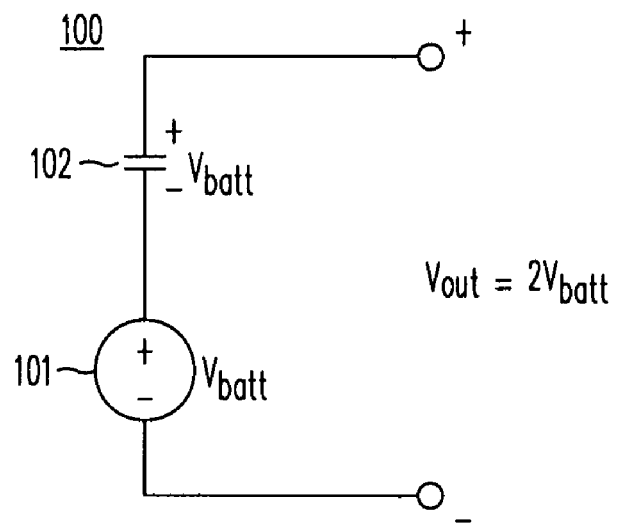
FIG. 5B is an equivalent circuit diagram of the doubler during discharge.
Figure 5E:
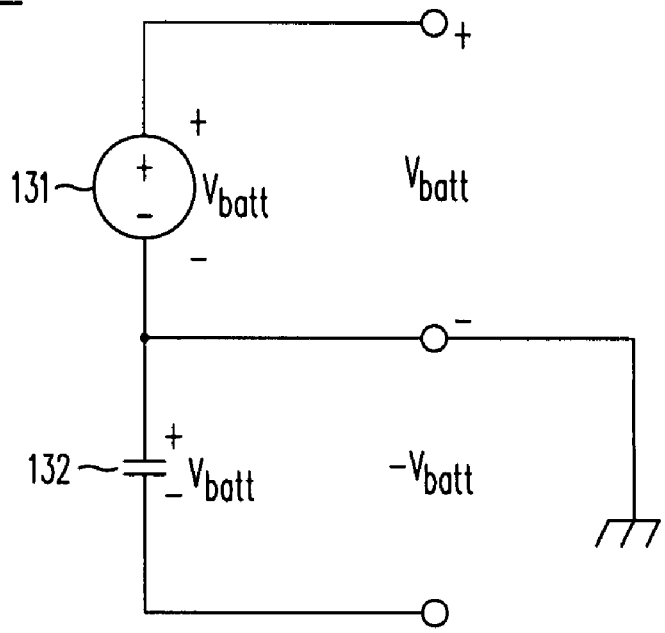
FIG. 5E is an equivalent circuit diagram of a −× inverter circuit during discharge.
Figure 5F:
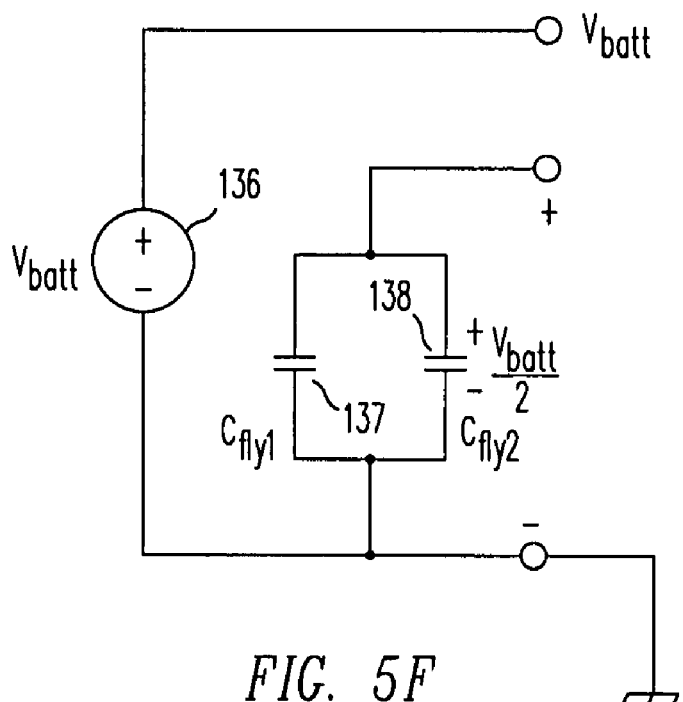
FIG. 5F is an equivalent circuit diagram of a 0.5× circuit during discharge.
Figure 6A:
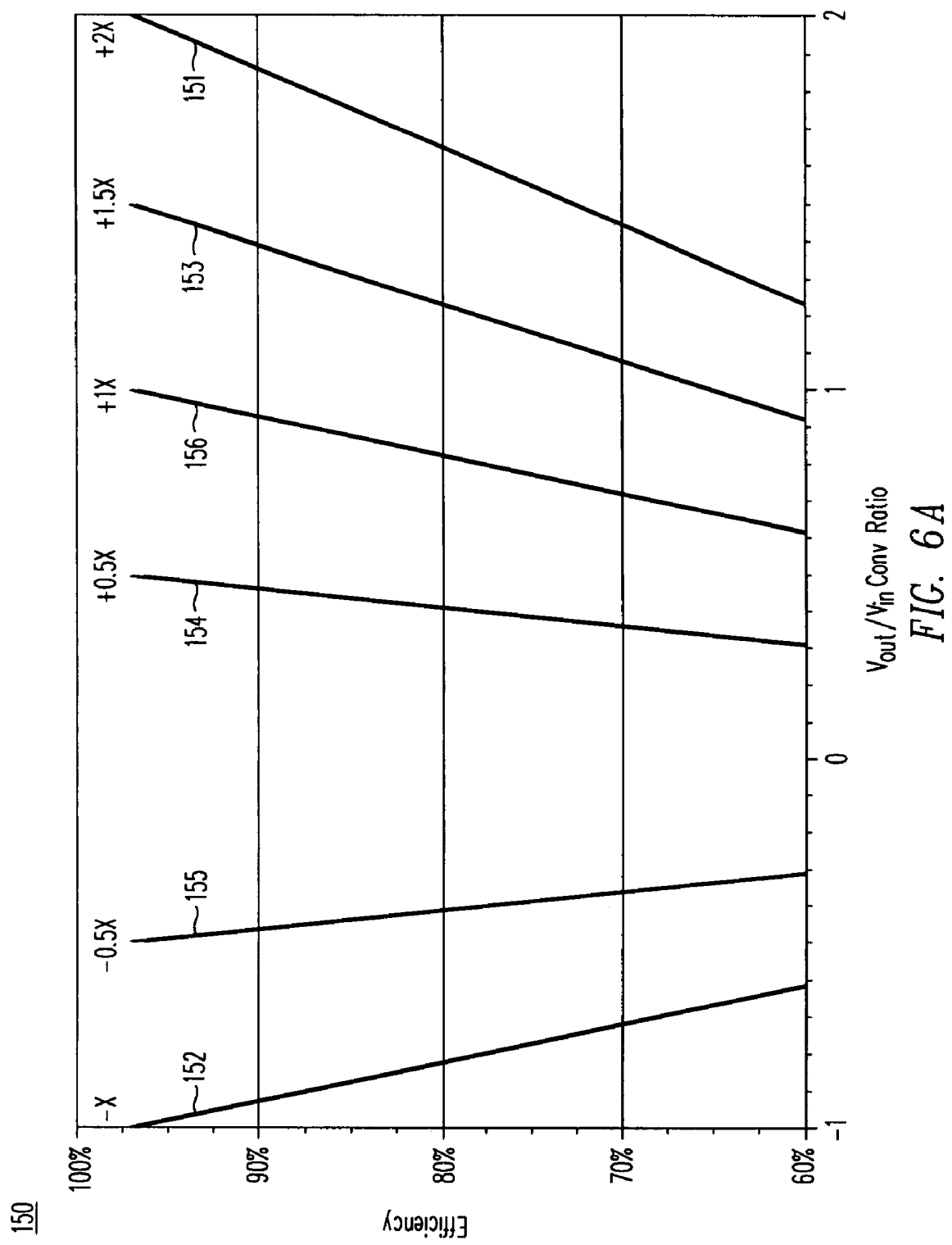
FIG. 6A is a graph of efficiency versus conversion ratio for a single-mode charge pump.
Figure 6B:
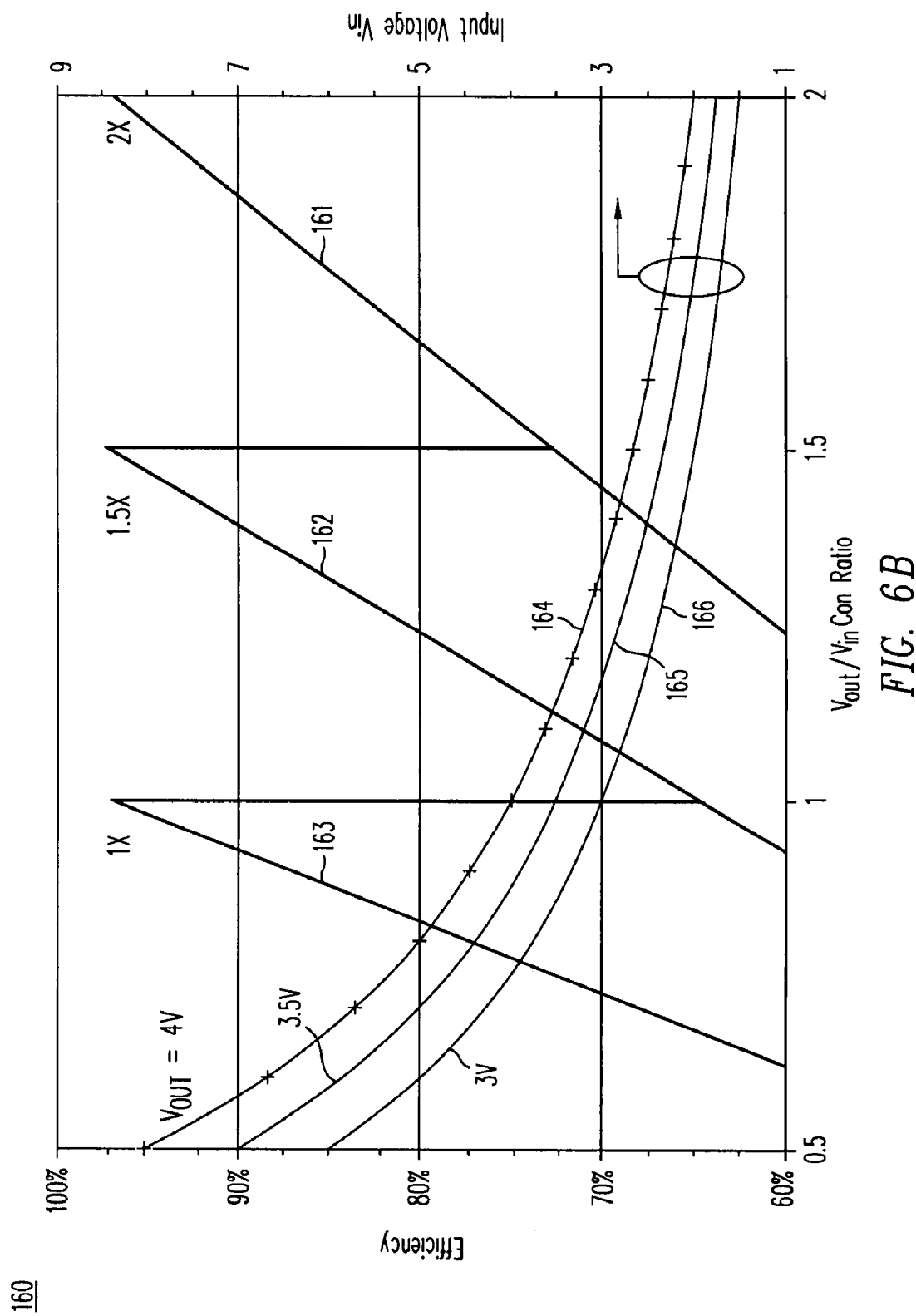
FIG. 6B is a graph of efficiency versus conversion ratio for a tri-mode charge pump.

In FIG. 14A, 2×-type LCUU converter 500 comprises a pre-converter 500A and a post-regulator 500B. Pre-converter 500A comprises a doubler charge pump 501 with a flying capacitor 502 and a filter capacitor 503. The output of charge pump 501 supplies an intermediate voltage $V_y$ which in turn powers the step-up switched-inductor post-regulator 500B, comprising an inductor 505, an N-channel MOSFET 506, a synchronous rectifier MOSFET 507 with an intrinsic diode 508, and an output capacitor 509. In some cases and depending on the magnitude of capacitance $C_1$, a diode 504 is included to clamp the voltage range of $V_y$. Since $V_y=2\cdot V_{batt}$ and $V_{out}=V_y/1-D)$, then the voltage conversion ratio of the 2×-type CLUU converter is given by $$\frac{V_{out}}{V_{batt}} = \frac{2}{1-D}$$

Figure 15A:
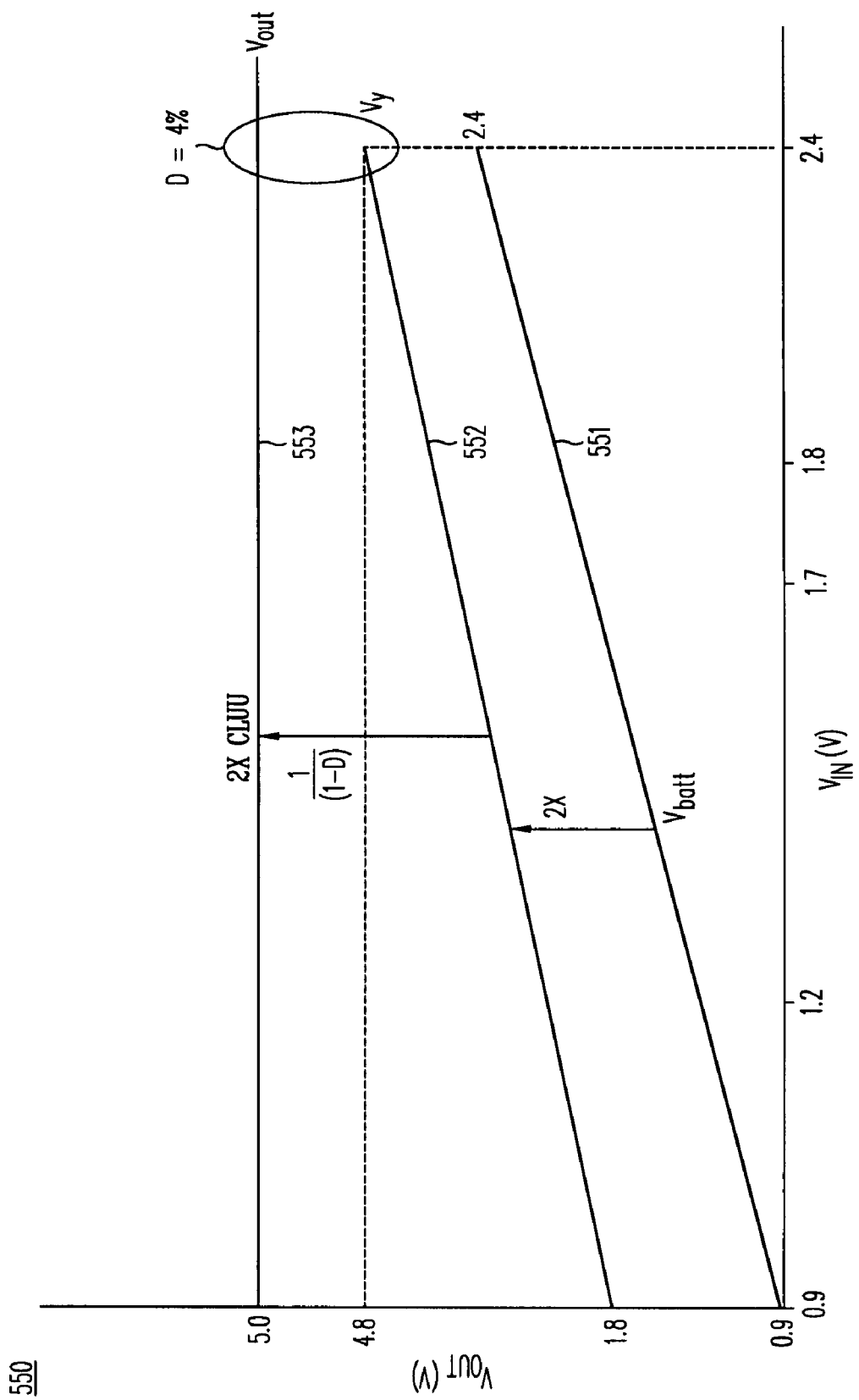
FIG. 15A is a graph showing the low-voltage transfer characteristics of a 2× CLUU converter.

An example of the CLUU converter's ability to regulate a wide range of input voltages is illustrated in graph 550 of FIG. 15A, where a battery or input voltage 551 varying from 0.9 to 2.4V is used to produce a regulated 5V output 553. The input range from 0.9V to 1.2V represents the voltage typically supplied by single cell NiMH batteries, the range from 0.9V to 1.7V represents alkaline batteries, while the range from 1.8V to 2.4V represents 2s configured NiMH batteries.

As shown, the battery input 551 is doubled in voltage by pre-converter 500A to an intermediate voltage $V_y$ shown by line 552, and then further stepped up by switched inductor post-regulator 500B by a varying amount $1/(1-D)$ to produce regulated output voltage 553. At battery input voltages as low as 0.9V a 5V input can be produced with a duty factor of only 64% despite delivering a voltage conversion ratio of 5.6. The 2.4V input condition is more difficult since by using a 2× pre-converter, $V_y=4.8V$, requiring a duty factor in the post-regulator as low as 4%.

Figure 15B:
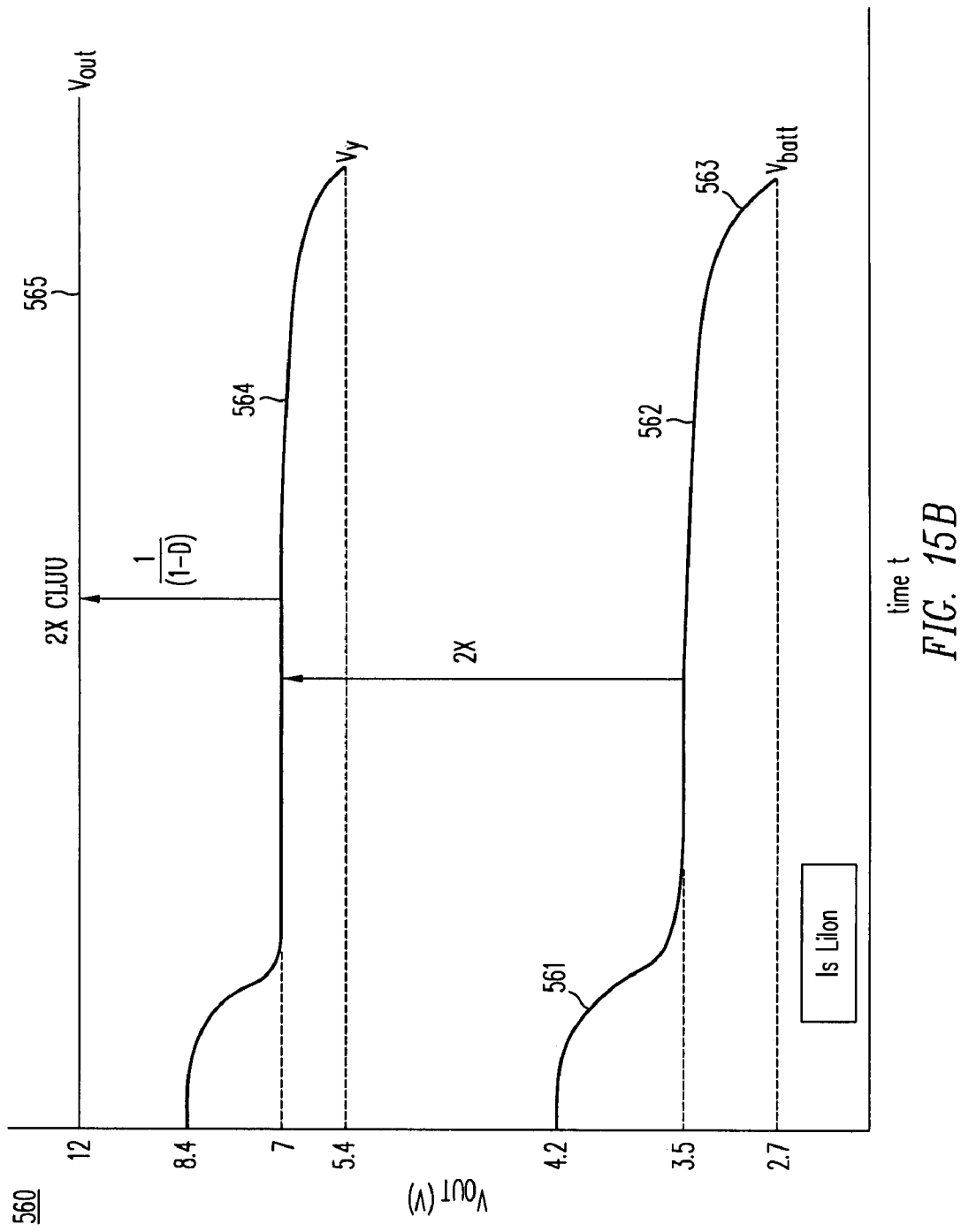
FIG. 15B is a graph showing the discharge of a 1s Lilon battery in a 2× CLUU converter.

Another example of CLUU regulation is illustrated in graph 560 of FIG. 15B where the output voltage $V_{batt}$ of a 1s LiIon battery is stepped up and regulated to 12V. The LiIon battery fully charged starts with a 4.2V condition that decays over time (curve 561) to a plateau voltage of approximately 3.5V (curve 562) and then eventually reaches its discharged condition of 2.7V (curve 563). The doubling pre-converter 500A produces time varying voltage $V_y$, shown by curve 564, ranging from 8.4V to 5.4V, which is then further stepped up to 12V by an a varying amount $1/(1-D)$ by step-up post-regulator 500B to produce a constant 12V output (curve 565).

Figure 15C:
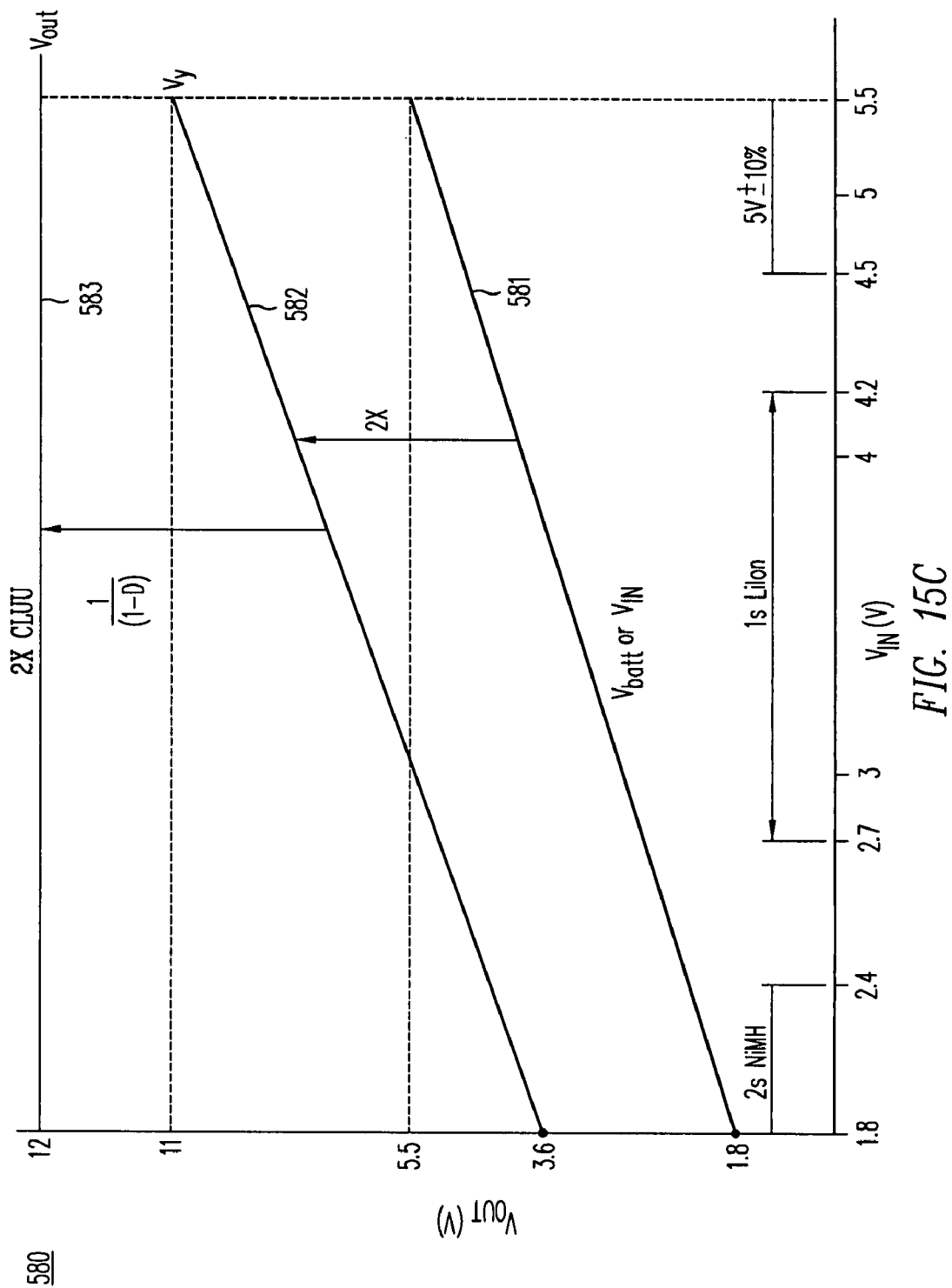
FIG. 15C is a graph showing the higher-voltage transfer characteristics of a 2× CLUU converter.

The wide range of input voltages useful to create and regulate a 12V output is illustrated in graph 580 of FIG. 15C, where the input voltage ranges from 1.8V, the low condition of a 2s NiMH battery, across the 1s LiIon range of 2.7 to 4.2V, and up to 5.5V, the +10% tolerance condition of a 5V regulated supply.

As shown in graph 580, the battery or input voltage (curve 581) is doubled to produce $V_y$ (curve 582) and is then boosted by a varying factor of $1/(1-D)$ to produce a regulated output shown as 12V (curve 583). Using a 2× type CLUU converter, the duty factor of post-regulator 500B for 1.8V to 12V conversion is only 70% while the 5V+10% condition requires a duty factor of around 8.3%.

In some cases, 2× pre-converter 500A produces an undesirably high intermediate voltage $V_y$ at high input voltage conditions, and which forces boost post-regulator 500B to operate at low duty factors. One way to avoid this problem is to employ a 1.5×-type charge pump pre-converter instead of a doubler.

For example, as shown in FIG. 14B, a 1.5×-type LCUU converter 520 comprises a pre-converter 520A and a post-regulator 520B. Pre-converter 520A comprises a fractional charge pump 521 with flying capacitors 522 and 523 and a filter capacitor 524. The output of charge pump 521 supplies an intermediate voltage $V_y$, which in turn powers step-up switched-inductor post-regulator 520B, comprising an inductor 526, an N-channel MOSFET 527, a synchronous rectifier MOSFET 528 with an intrinsic P-N rectifier diode 529, and an output capacitor 530. In some cases and depending on the magnitude of the capacitance $C_1$ of filter capacitor 524, diode 525 is included to clamp the voltage range of $V_y$. Since $V_y=1.5 \cdot V_{batt}$ and $V_{out}=V_y/(1-D)$, then the voltage conversion ratio of the 1.5×-type CLUU converter is given by $$\frac{V_{out}}{V_{batt}} = \frac{1.5}{1-D}$$

Figure 15D:
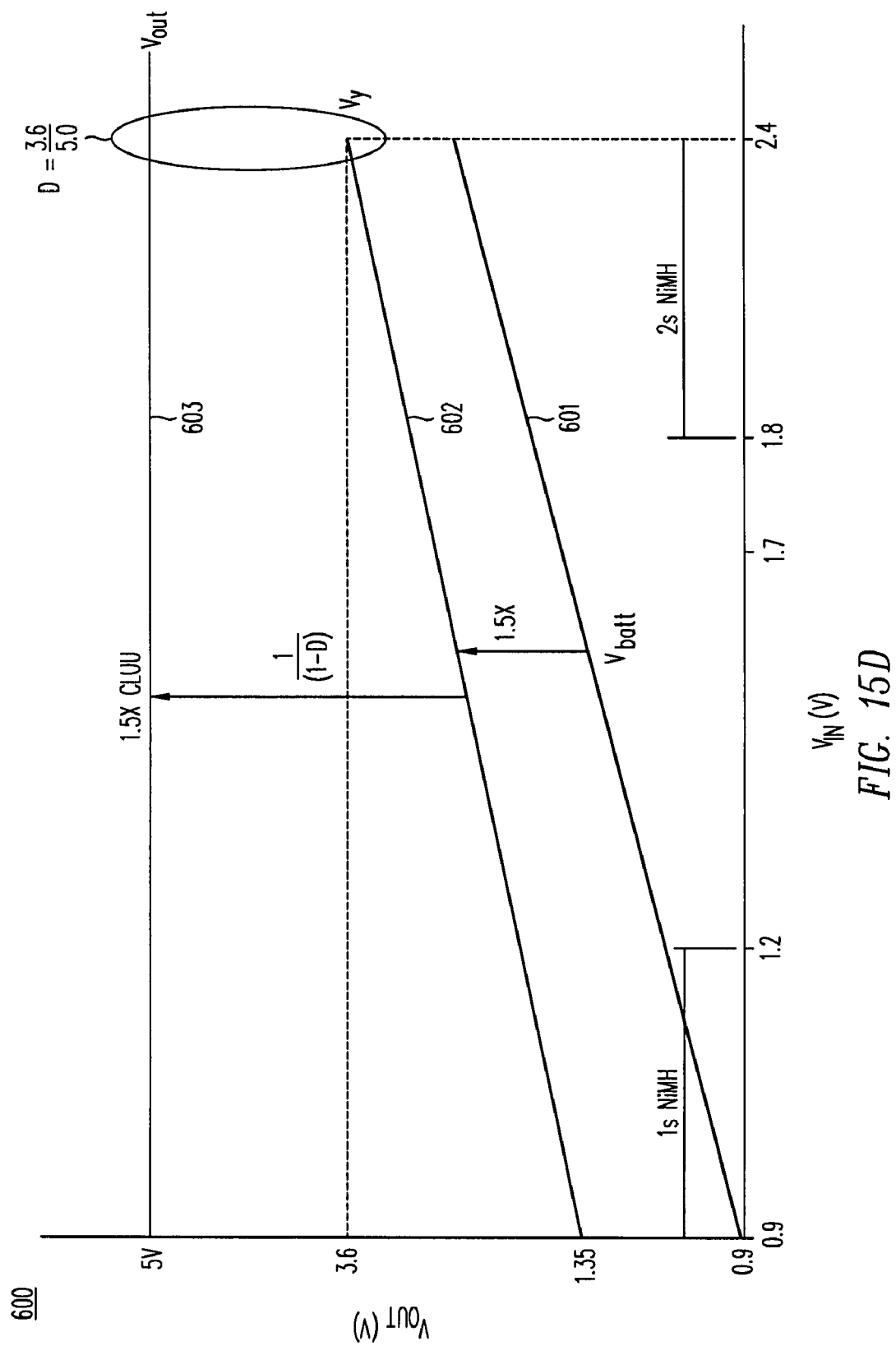
FIG. 15D is a graph showing the low-voltage transfer characteristics of a 1.5× CLUU converter.

Analogous to the doubler LCUU regulation shown in FIG. 15A, an example of the ability of 1.5× CLUU converter 520 to regulate a wide range of input voltages is illustrated in graph 600 of FIG. 15D, where a battery or input voltage varying from 0.9 to 2.4V (curve 601) is used to produce a regulated 5V output (curve 603).

As shown, the battery voltage (curve 601) is increased by 1.5× by fractional pre-converter 520A to intermediate voltage $V_y$ shown by line 602, and then further stepped up by switched inductor post-regulator 520B by a varying amount 1/(1−D) to produce regulated output voltage (curve 603). At battery input voltages as low as 0.9V a 5V input can be produced with a duty factor of only 73% despite delivering a voltage conversion ratio of 5.6. Compared to 2× CLUU converter 500, the 2.4V input condition is not difficult to handle with 1.5× type pre-converter 520A since an intermediate voltage $V_y=3.6V$ requires a duty factor no lower than 28% in the post-regulator to provide a 5V output.

Figure 15E:
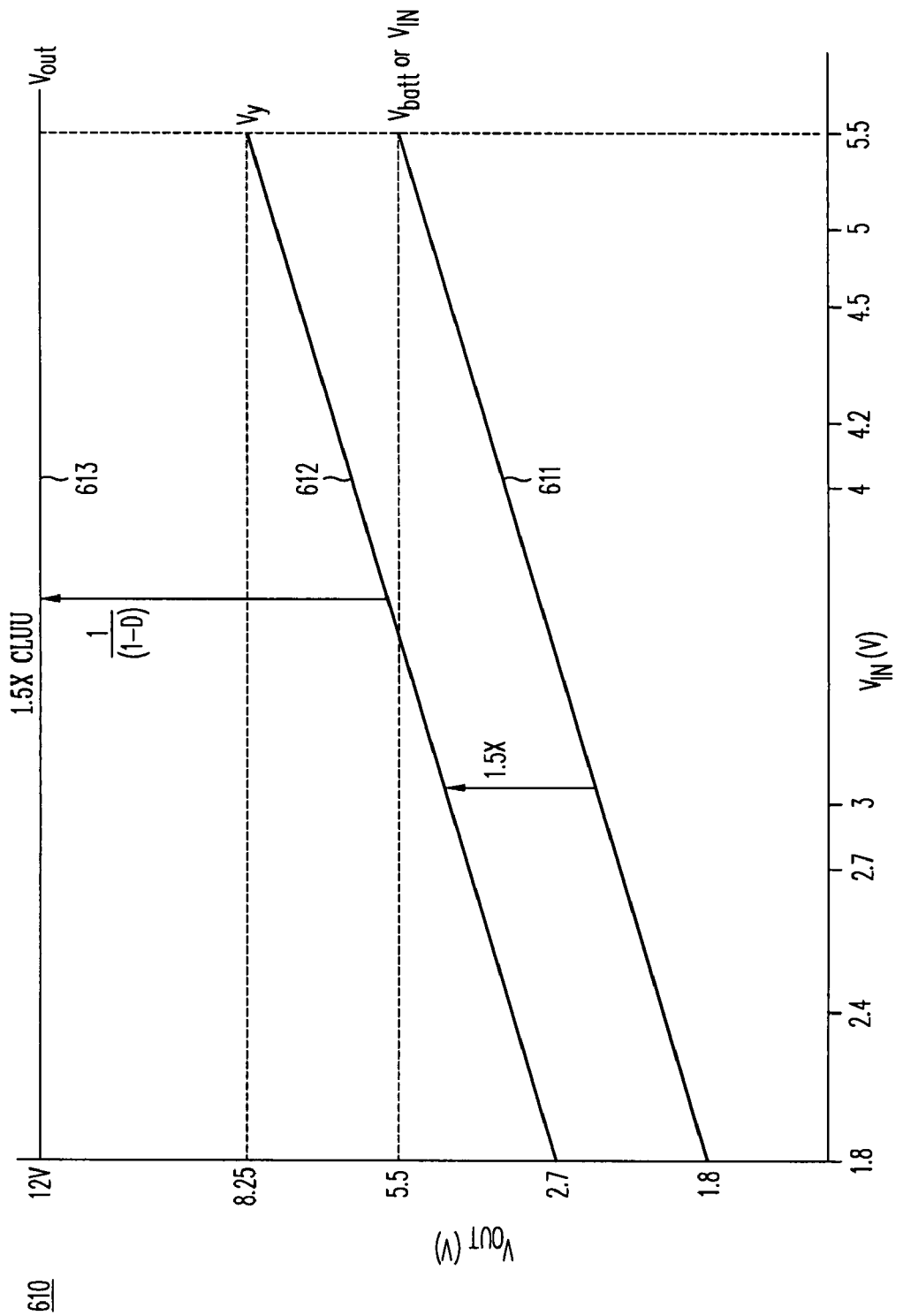
FIG. 15E is a graph showing the higher-voltage transfer characteristics of a 1.5× CLUU converter.

The wide range of input voltages that can be used to provide a 12V output using 1.5× CLUU converter 520 is illustrated in graph 610 of FIG. 15E, where the input voltage shown ranges from 1.8V, the low condition of a 2s NiMH battery, across the 1s LiIon range of 2.7 to 4.2V, and up to 5.5V, the +10% tolerance condition of a 5V regulated supply. The battery or input voltage (curve 611) is multiplied by 1.5× to produce $V_y$ (curve 612) then boosted by a varying factor of 1/(1−D) to produce a regulated output (curve 613) shown as 12V. Using 1.5× type CLUU converter 520, the duty factor of 1.8V to 12V conversion is only 78%, while the 5V+10% condition requires a duty factor of around 31%, a condition considerably easier to realize than the 8.3% duty factor mandated by the doubler type CLUU converter 500.

Figure 15F:
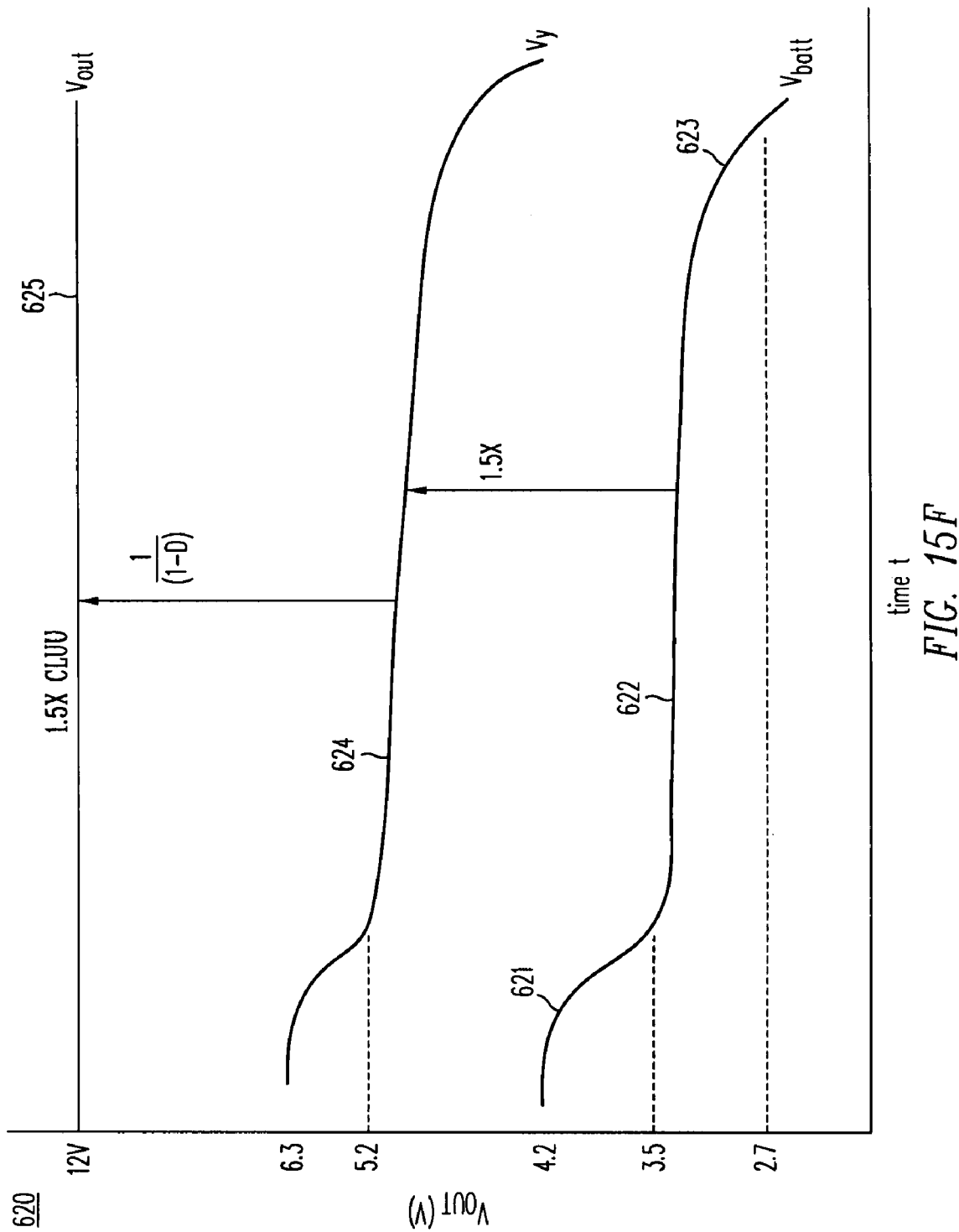
FIG. 15F is a graph showing the discharge of a 1s Lilon battery in a 1.5× CLUU converter.

An example of CLUU regulation using 1.5× type pre-converter 520A is illustrated in graph 620 of FIG. 15F where the discharge of a 1s LiIon battery is stepped up and regulated to 12V. The LiIon battery fully charged starts with a 4.2V condition that decays over time (curve 621) to a plateau voltage of approximately 3.5V (curve 622) and then eventually reaches its discharged condition of 2.7V (curve 623). The 1.5×-type fractional pre-converter 520A produces a time-varying voltage $V_y$ shown by curve 624 ranging from 6.3V to 4.0V which is then further stepped up to 12V by an a varying amount 1/(1−D) by istep-up post-regulator 520B to produce a constant 12V output (curve 625).

Figure 15G:
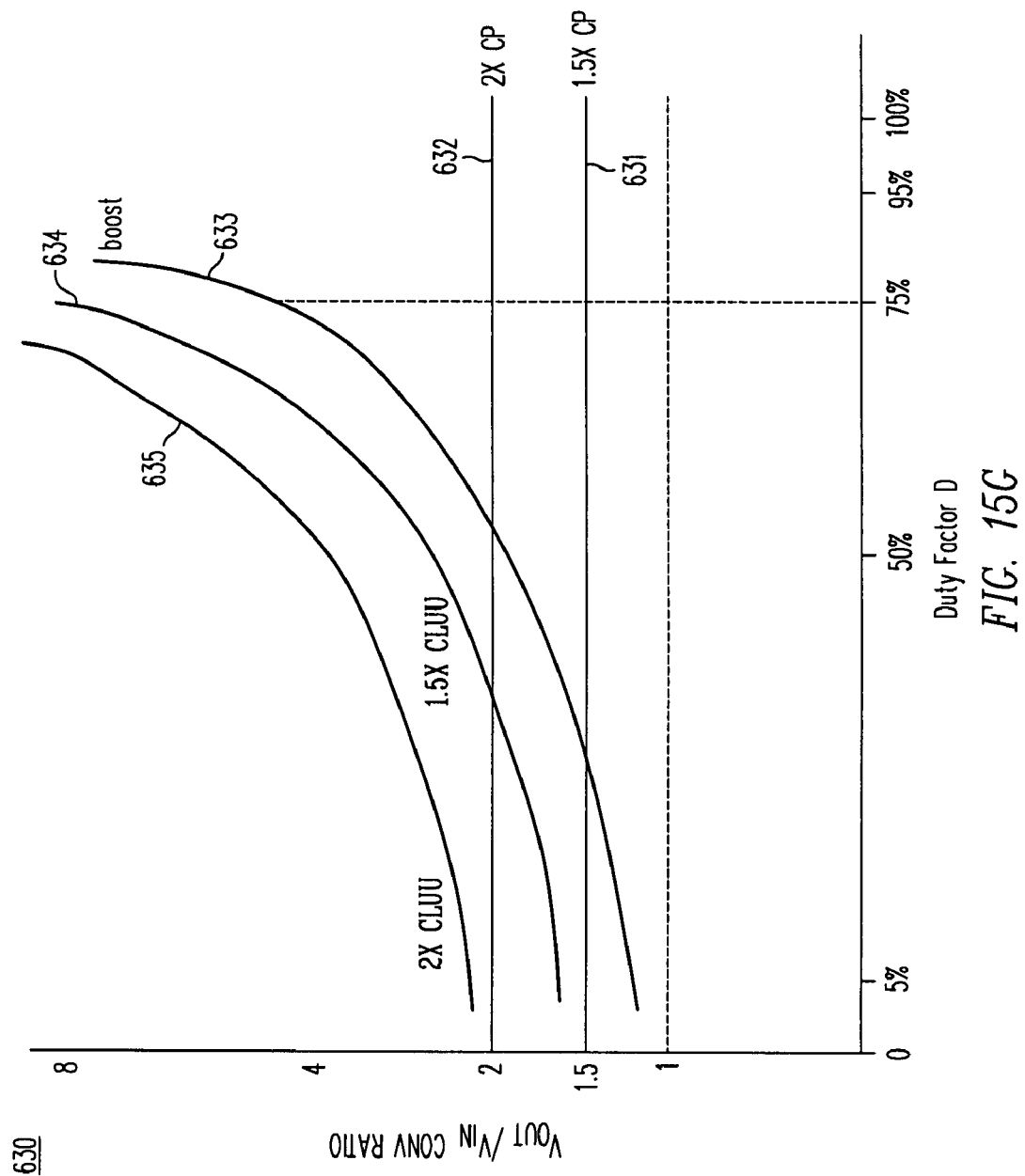
FIG. 15G is a graph showing the voltage conversion ratio $V_{out}/V_{in}$ as a function of duty factor for a 2× CXUU converter, a 1.5× CXUU converter and a boost converter.

The duty factor D of a CLUU converter is lower than that of a boost or CLDU converter, making it ideally suited for providing high voltage conversion ratios. This feature is illustrated in graph 630 in FIG. 15G showing the voltage conversion ratio at various duty factors. The graph compares the characteristic of 2×-type CLUU converter 500 (curve 635) to the characteristic of 1.5× type CLUU converter 520 (curve 634). Both of these characteristics are contrasted with the characteristics of a conventional boost converter (curve 633), a 1.5× charge pump (curve 631), and a 2× charge pump (curve 632).

None of the converters shown operates below a unity conversion ratio, meaning they are all limited to step-up operation. At low duty factors, the conversion ratio of a boost converter (curve 633) asymptotically approaches unity, the conversion ratio of 1.5× CLUU converter 520 (curve 634) approaches 1.5, and the conversion ratio of 2× CLUU converter 500 (curve 635) approaches 2. At a 50% duty factor, a boost converter provides a conversion ratio of 2, 1.5×-type CLUU converter 520 provides a conversion ratio of 3 and 2×-type CLUU converter 500 provides a conversion ratio of 4. From the relationship $$D = 1 - \frac{V_y}{V_{out}} = 1 - \left[n\frac{V_{in}}{V_{out}}\right]$$

describing D as function of the reciprocal of the voltage conversion ratio and the pre-converter factor n×, it is clear that larger values of "n" increase the minimum required duty factor for any given conversion ratio. For example, at a 75% duty factor, 2× CLUU converter 500 can step up its input by a factor of 8, double that of a boost converter, but it is limited to providing output voltages greater than twice its input voltage. A 0.5× CLDU converter is usable only for providing output voltages up to twice its input voltage but can provide an output voltage down to half its input voltage, meaning that it is capable of regulating at unity conversion ratio.

Table 4 summarizes some of these conditions.

TABLE 4

| Condition | 2X CLUU | 1.5X CLUU | Boost | 0.5X CLDU |
| --- | --- | --- | --- | --- |
| D = 75% | $V_{out}/V_{in} = 8$ | $V_{out}/V_{in} = 6$ | $V_{out}/V_{in} = 4$ | $V_{out}/V_{in} = 2$ |
| D = 50% | $V_{out}/V_{in} = 4$ | $V_{out}/V_{in} = 3$ | $V_{out}/V_{in} = 2$ | $V_{out}/V_{in} = 1$ |
| lim D → 0% | $V_{out}/V_{in} = 2$ | $V_{out}/V_{in} = 1.5$ | $V_{out}/V_{in} = 1$ | $V_{out}/V_{in} = 0.5$ |
| 1sNiMH → 12 V | 80% < D < 85% | 85% < D < 88% | 90% < D < 93%* | 95%* < D < 96%* |
| 2sNiMH → 12 V | 60% < D < 70% | 70% < D < 78% | 80% < D < 85% | 90% < D < 93%* |
| 1sNiMH → 5 V | 52% < D < 64% | 64% < D < 73% | 76% < D < 82% | 88% < D < 91%* |
| LiIon → 12 V | 30% < D < 55% | 48% < D < 66% | 65% < D < 78% | 83% < D < 89% |
| 5 ± 10% → 12 V | 8%* < D < 25% | 31% < D < 44% | 54% < D < 63% | 77% < D < 81% |
| 2sNiMH → 5 V | 4%* < D < 28% | 28% < D < 46% | 52% < D < 64% | 76% < D < 82% |

For input voltages that are a large percentage of the desired output, such as a 5V to 12V, or a LiIon battery to 12V converter, 2×-type CLUU converter 500 may be forced to operate at extremely low duty factors, which may limit the its maximum frequency of operation. In contrast, a CLDU up-down converter has no problem operating at such conditions but is more limited at very high conversion ratios, e.g. generating 12V from a 1s or 2s NiMH dry cell battery pack.

Those conditions marked with an asterisk (*) may require limiting the converter's operating frequency in order to meet the full range in required duty factors.

Figure 16A:
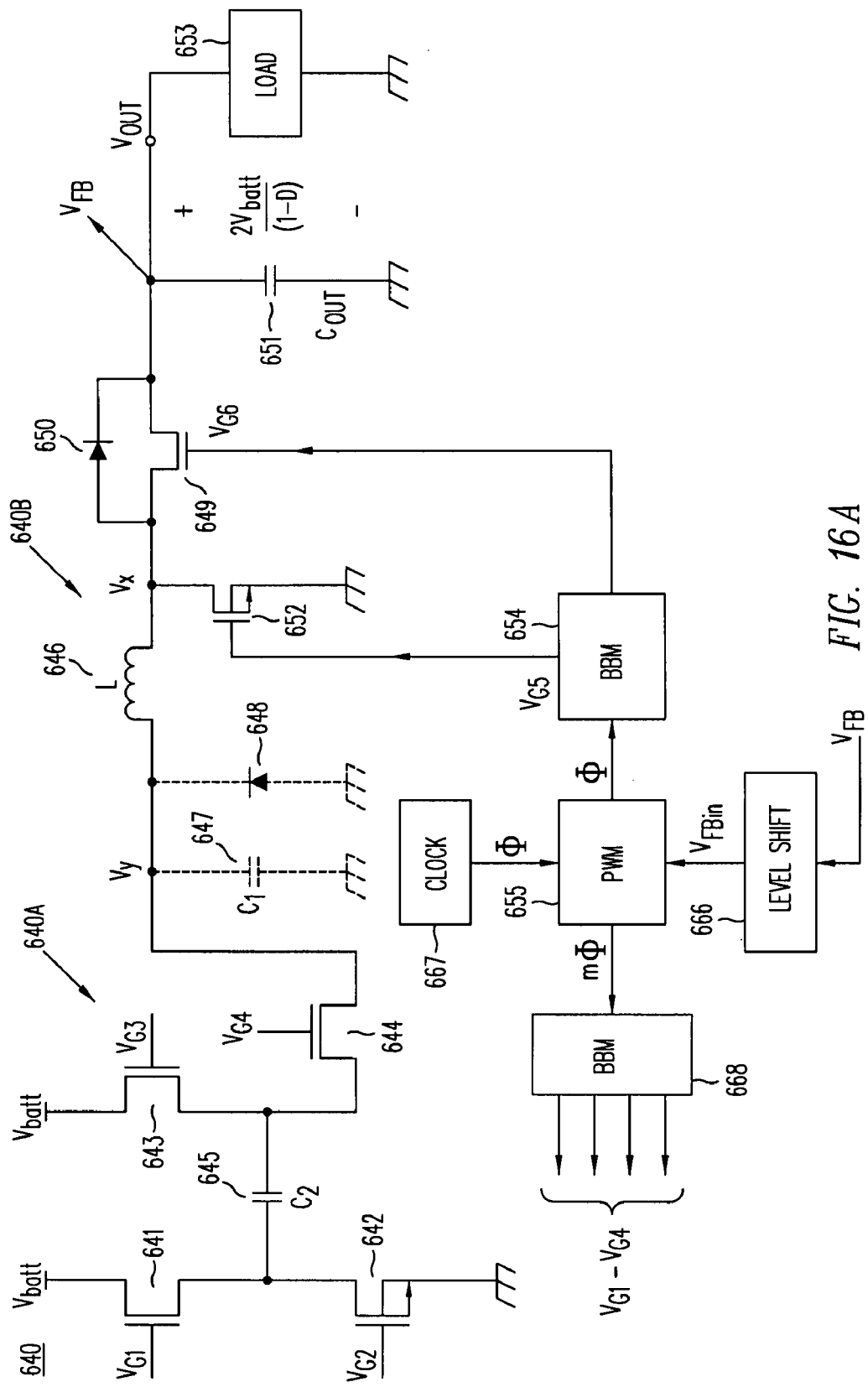
FIG. 16A is a more detailed circuit diagram of a 2× CLUU converter.

Doubler CLUU Converter: A CLUU converter 640 using a 2×-type pre-converter 640A is shown in FIG. 16A. As shown, charge pump doubler pre-converter 640A comprises MOSFETs 641, 642, 643 and 644 and a flying capacitor 645 to provide intermediate output voltage $V_y$, and an optional filter capacitor 647. A diode 648 may be included to limit the $V_y$ negative voltage swing and may be omitted depending on the value $C_1$ of capacitor 647. Intermediate voltage $V_y$ is connected to inductor 646 of a boost-type post-regulator 640B, with a low-side N-channel MOSFET 652, a floating synchronous rectifier MOSFET 649 with an intrinsic P-N diode 650 and an output capacitor 651 driving a load 653.

The output of converter 640 is given by the equation $$V_{out} = \frac{2 \cdot V_{batt}}{(1-D)}$$

Post-regulator 640B is controlled by a PWM controller 655 driving MOSFET 652 in response to the feedback signal $V_{FB}$ from the output terminal of converter 640, shifted to the appropriate value $V_{FBin}$ by a level shift circuit 666. The level shift circuit 666 is needed to convert the output voltage $V_{out}$, which is higher than the battery voltage $V_{batt}$, to a voltage within the range of the PWM controller 655. One convenient method to implement level shift circuit 666 involves a resistor divider. The implementation of a feedback circuit is described in the above-referenced application Ser. No. 11/890,818.

As shown, a clock and ramp generator 667 is used to switch PWM controller 655 at a frequency Φ and is used to drive MOSFETs 641, 642, 643 and 644 in pre-converter 640A at a frequency m·Φ, which may be higher or lower than the switching frequency of the MOSFETs 649 and 652 in post-regulator 640B. In a preferred embodiment, m=1 and charge pump pre-converter 640A and switched inductor post-regulator 640B are clocked at the same frequency and synchronized to the same clock. A break-before-make (BBM) circuit 668 provides the gate drive and necessary level shifting $V_{G1}$ to $V_{G4}$ to the charge pump MOSFETs 641, 642, 643 and 644. A BBM circuit 654 drives low-side MOSFET 642 and synchronous rectifier MOSFET 649 in accordance with PWM controller 655, preventing significant shoot-through conduction, i.e. simultaneous conduction in both MOSFET 649 and MOSFET 659, to prevent damage to and improve the efficiency of converter 640.

Figure 16B:
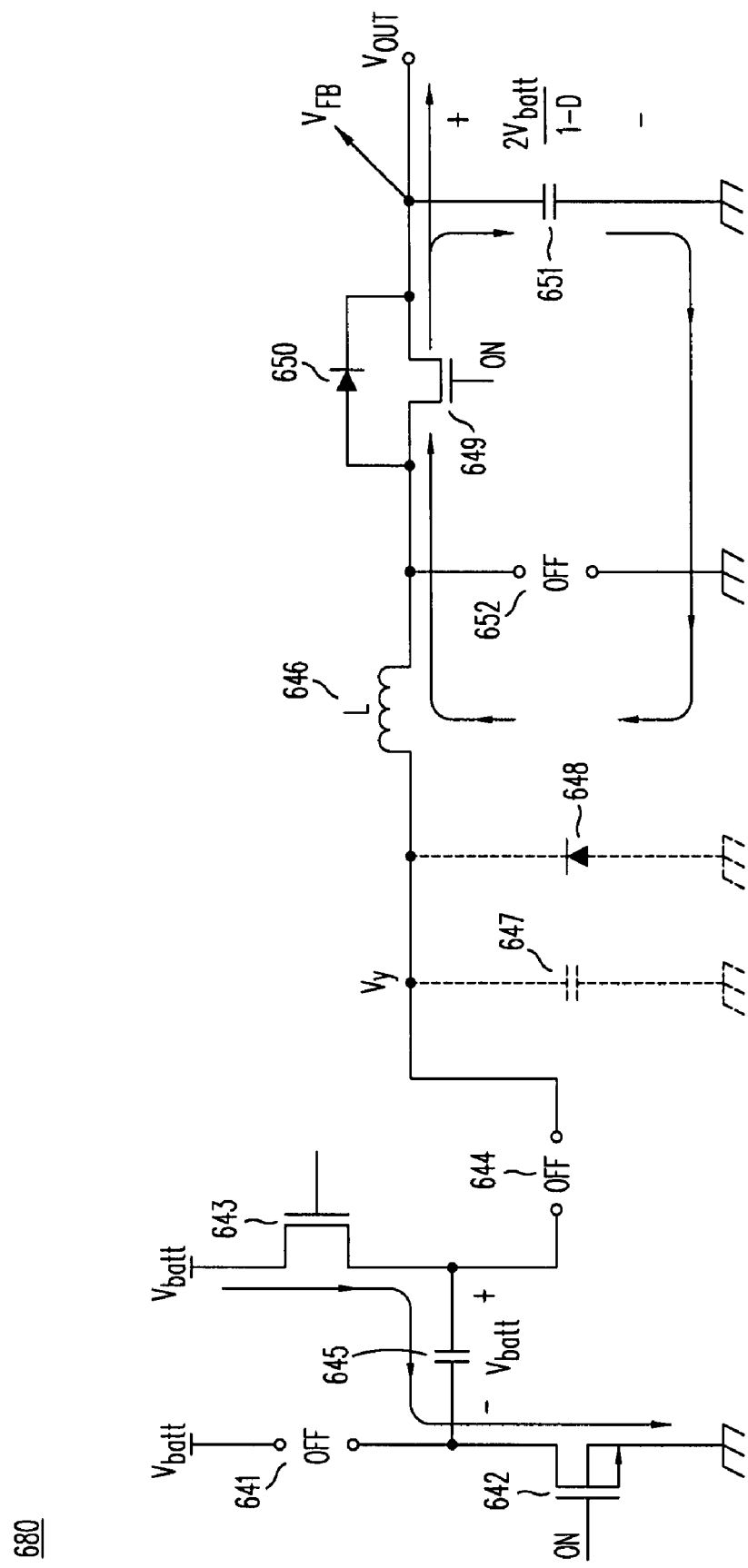
FIG. 16B is a circuit diagram showing the charging and recirculation stages of the 2× CLUU converter.
Figure 16C:
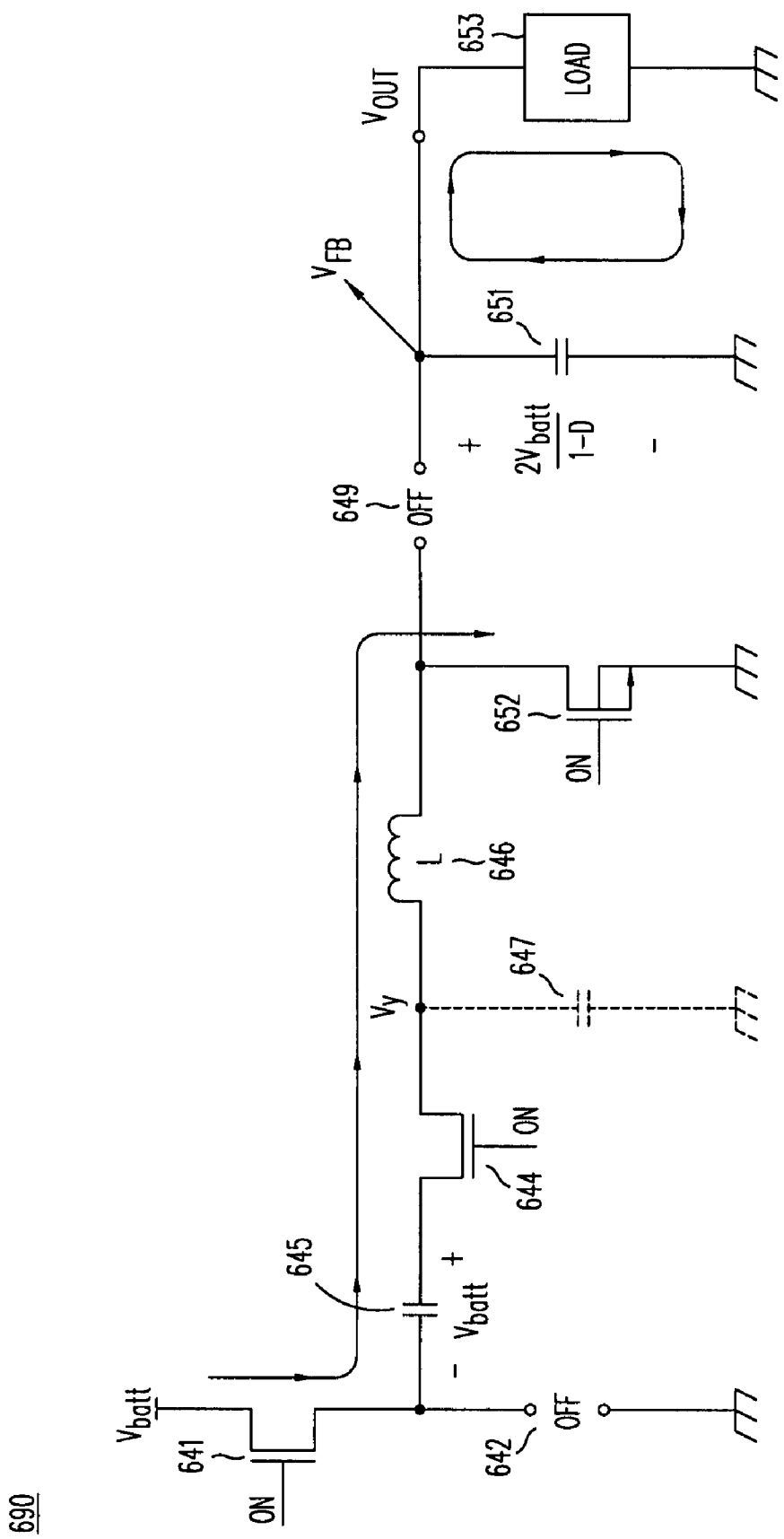
FIG. 16C is a circuit diagram showing the transfer and magnetizing stages of the 2× CLUU converter.

As shown in FIGS. 16B and 16C, operation of converter 640 occurs in two alternating phases. In the charging and recirculating phase, shown in FIG. 16B, flying capacitor 645 is charged to substantially the full battery voltage Vbatt through on MOSFETs 643 and 642 while current $I_L$ in inductor 646 re-circulates through diode 650, on-state synchronous rectifier MOSFET 649 and output capacitor 651 to the load. The recirculation path is completed by capacitor 647, and if the voltage at $V_y$ sags below ground, by diode 648. MOSFETs 641, 644 and 652 remain off in this phase of operation. The on-time of synchronous rectifier MOSFET 649 may be shorter than the entire period when diode 650 is conducting and its beginning and end may be determined by control signals other than simply the gate drive of low-side MOSFET 652.

In the second phase, shown in FIG. 16C, MOSFETs 642, 643 and, if applicable, 649 are turned off and MOSFETs 641, 644 and 652 are turned on to connect flying capacitor 645 to inductor 646, thereby magnetizing inductor 646. During this phase, output capacitor 651 must supply load 653. After a prescribed time, determined by PWM controller 655, converter 640 reverts to the first phase, alternating according to the duty factor set by PWM controller 655.

Figure 16D:
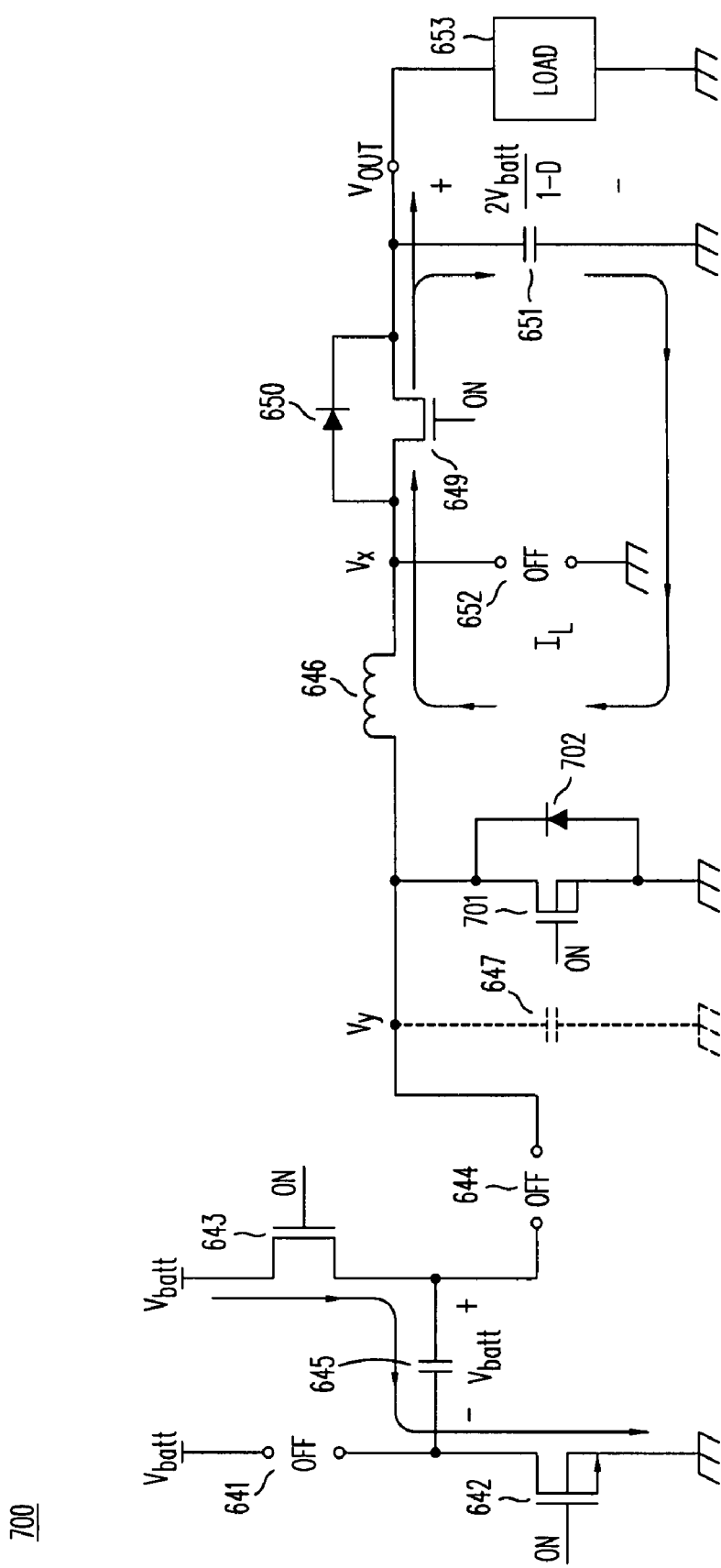
FIG. 16D is a circuit diagram showing the recirculation through the $V_y$ MOSFET in the alternative embodiment of the 2× CLUU converter shown in FIG. 16E.
Figure 16E:
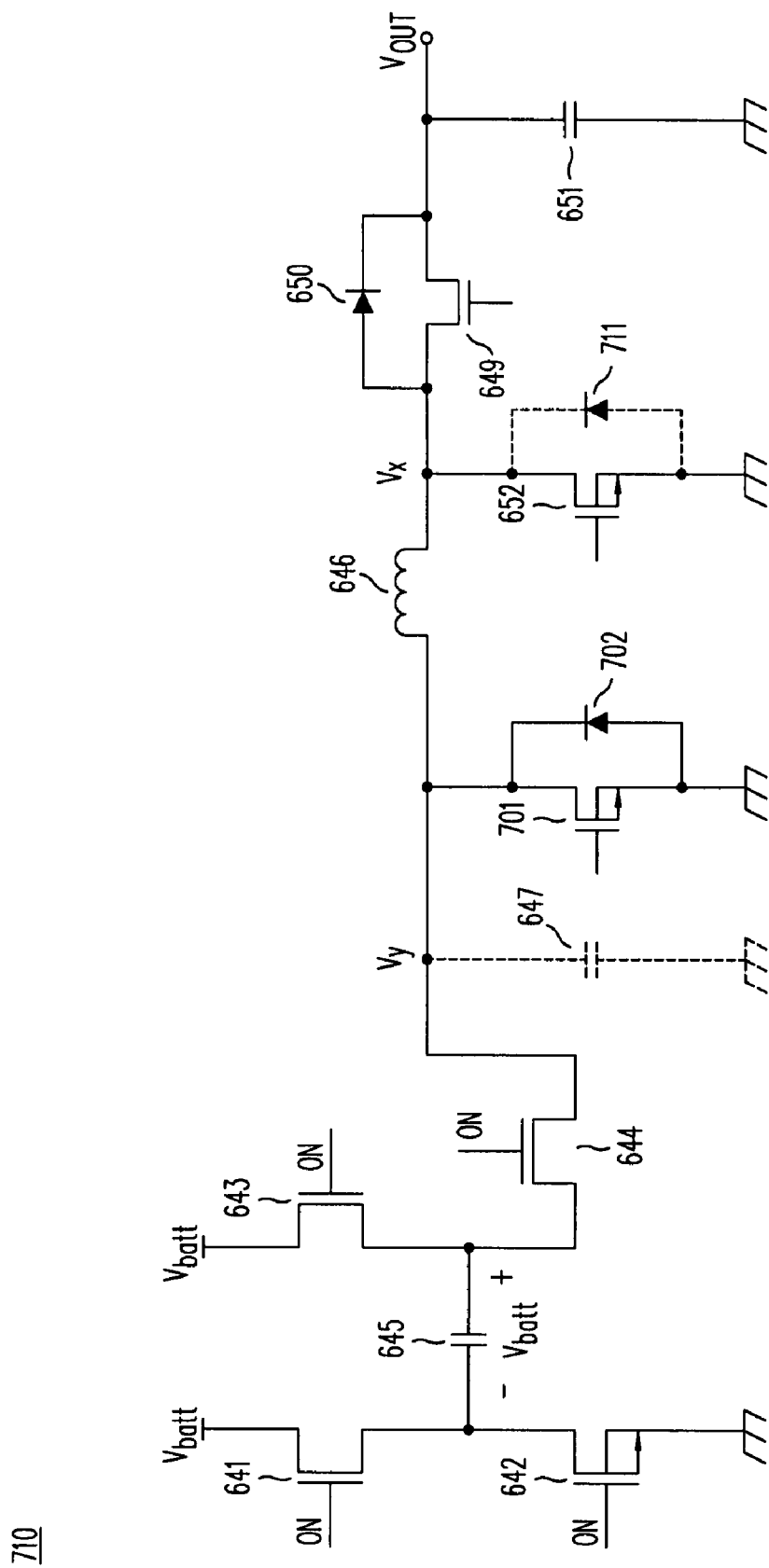
FIG. 16E is a circuit diagram of an alternative embodiment of the 2× CLUU converter.

In an alternative converter 710 shown in FIG. 16E, diode 648 is replaced by a MOSFET 701 and a diode 702, which are timed to conduct whenever the voltage $V_y$ falls below ground. The operation of MOSFET 701 during recirculation phase 700 is illustrated in FIG. 16D.

Alternatively, the synchronous rectifier MOSFET 649 and low-side MOSFET 652 are switched in phase opposite to the charge pump MOSFETs 641, 642, 643 and 644, but this alternative typically requires a larger value $C_1$ of capacitor 647. In another embodiment, the synchronous rectifier MOSFET 649 is never turned off fully but only reduced to low current operation, in the range of a few microamperes to reduce noise, as described in the above-referenced application Ser. No. 11/890,947.

Figure 17A:
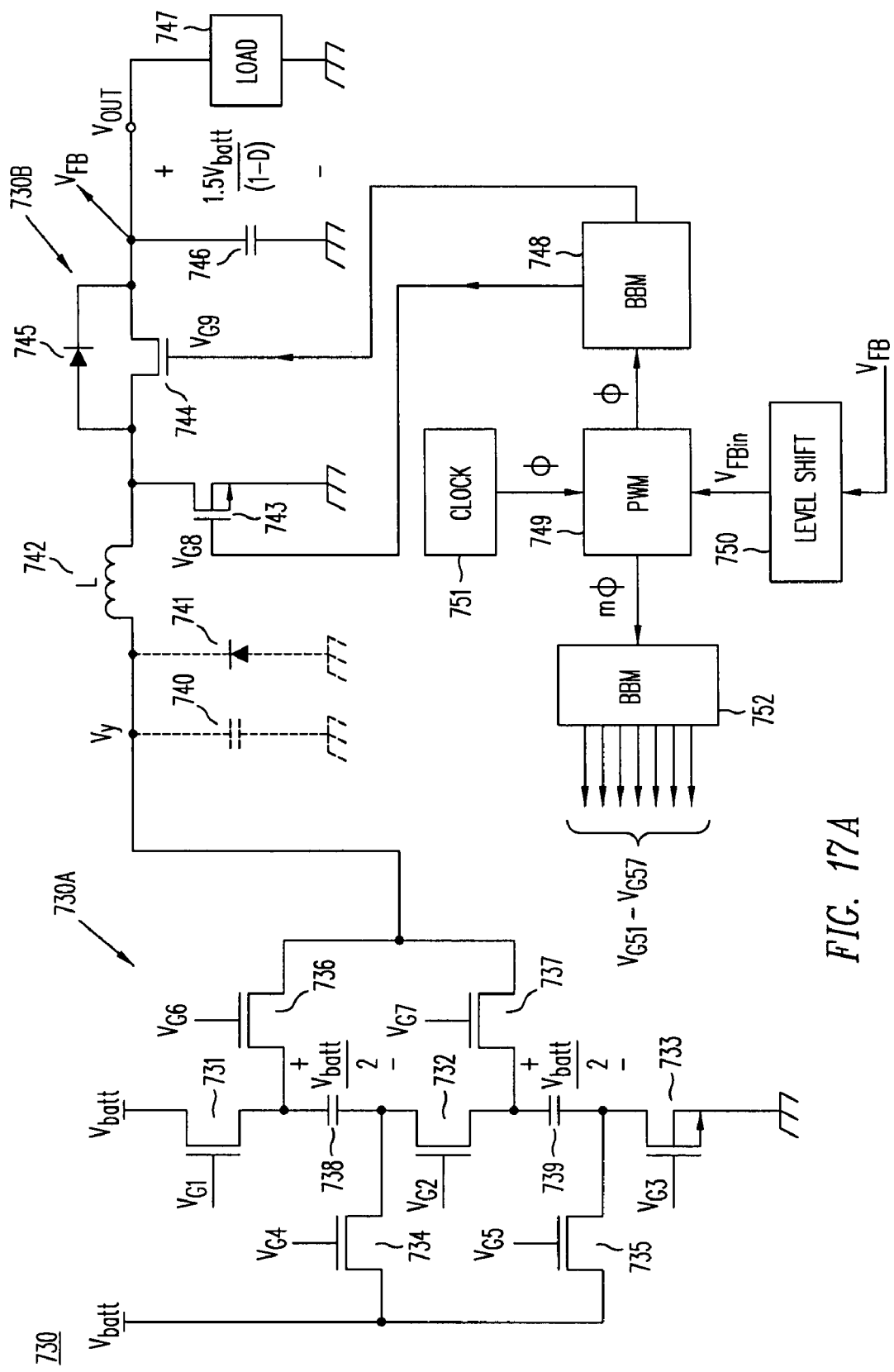
FIG. 17A is a more detailed circuit diagram of a 1.5× CLUU converter.

Fractional CLUU Converter: A CLUU converter 730 containing a 1.5×-type pre-converter 730A is shown in FIG. 17A. As shown, fractional charge pump pre-converter 730A comprises MOSFETs 731 through 737 and flying capacitors 738 and 739 to provide an intermediate output voltage $V_y$, and an optional filter capacitor 740. A diode 741 may be included to limit the $V_y$ negative voltage swing and may be omitted depending on the capacitance value $C_1$ of capacitor 740. Intermediate voltage $V_y$ is connected to inductor 742 of a boost-type post-regulator 730B, with a low-side N-channel MOSFET 743, a floating synchronous rectifier MOSFET 744 with an intrinsic P-N diode 745, and an output capacitor 746 driving a load 747. The output of 1.5×-type LCUU converter 730 is given by the equation:

$$V_{out} = \frac{1.5 \cdot V_{batt}}{(1-D)}$$

Post-regulator 730B is controlled by a PWM controller 749, driving low-side MOSFET 743 in response to a feedback signal $V_{FB}$ from the output terminal of converter 730, level-shifted to the appropriate value $V_{FBin}$ by a level shift circuit 750. Level shift circuit 750 is needed to convert the output voltage $V_{out}$, which is higher than the battery voltage $V_{batt}$, to a voltage within the range of PWM controller 749. One convenient method to implement level shift circuit 750 involves a resistor divider. The implementation of a feedback circuit is described in the above-referenced application Ser. No. 11/890,818.

As shown, a clock and ramp generator 751 is used to switch PWM controller 749 at a frequency Φ and is used to drive the MOSFETs 731 through 737 within charge pump pre-converter 730A at a frequency m·Φ, which may be higher or lower than the switching frequency used to drive post-regulator 730B. In a preferred embodiment m=1 and charge pump pre-converter 730A and switched inductor post-regulator 730A are clocked at the same frequency and synchronized to the same clock. A BBM circuit 752 provides the necessary level shifting for the gate voltages $V_{G1}$ to $V_{G7}$ for the charge pump MOSFETs 731 through 737. BBM circuit 748 drives low-side MOSFET 743 and synchronous rectifier MOSFET 744 in accordance with PWM controller 749, preventing significant shoot-through conduction, i.e. simultaneous conduction in both MOSFET 743 and MOSFET 744, to prevent damage and improve converter efficiency.

Figure 17B:
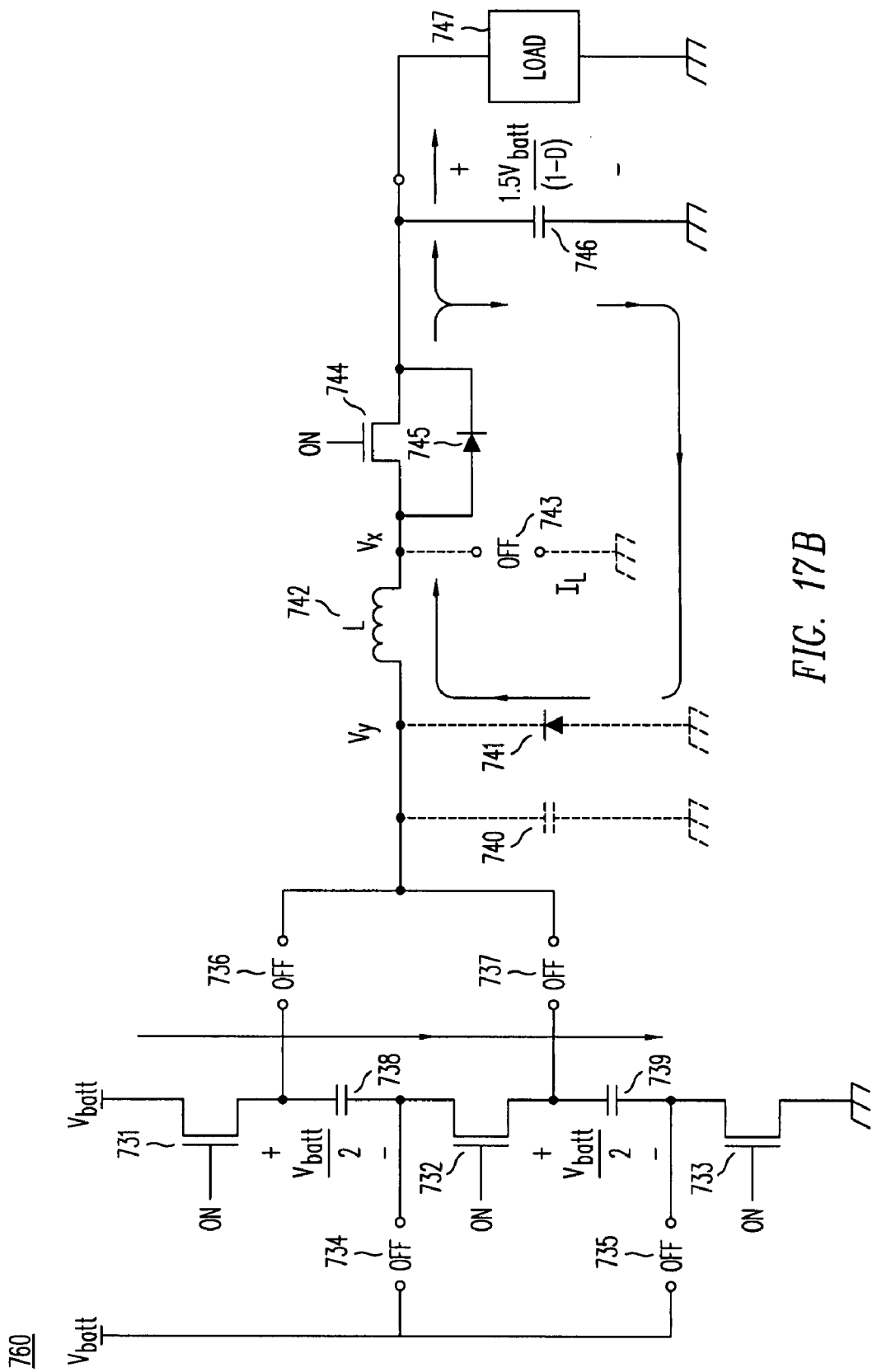
FIG. 17B is a circuit diagram showing the charging and recirculation stages of the 1.5× CLUU converter.
Figure 17C:
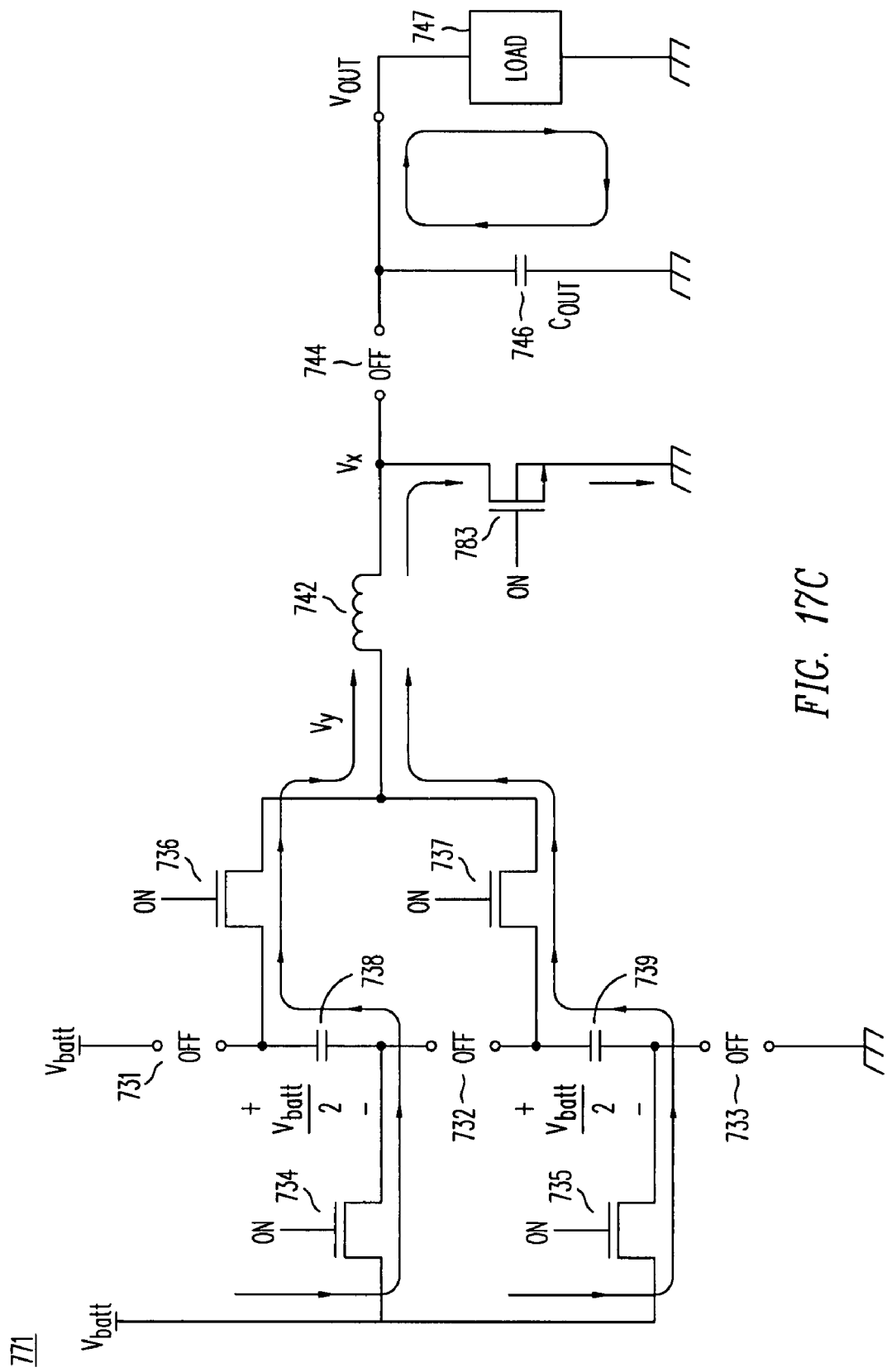
FIG. 17C is a circuit diagram showing the transfer and magnetizing stages of the 1.5× CLUU converter.

As shown in FIGS. 17B and 17C, operation of converter 730 occurs in two alternating phases. In the charging and recirculating phase, shown in FIG. 17B, each of flying capacitors 738 and 739 is charged to substantially half the battery voltage, i.e. $V_{batt}/2$, through MOSFETs 731, 732, and 733, while current $I_L$ in inductor 742 re-circulates through diode 745, synchronous rectifier MOSFET 744 and output capacitor 746, to the load 747. The recirculation path is completed by capacitor 740 and if the voltage at $V_y$ sags below ground, by diode 741. MOSFETs 734, 735, 736, 737 and 743 remain off in this phase of operation. The on-time of synchronous rectifier MOSFET 744 may be shorter than the entire period when diode 745 is conducting and its beginning and end may be determined by control signals other than simply the gate drive of low-side MOSFET 743.

In the second phase, shown in FIG. 17C, MOSFETs 731, 732, and 733 and, if applicable, 744 are turned off and MOSFETs 734, 735, 736, 737 and 783 are turned on to connect flying capacitors 738 and 739 to inductor 742, thereby magnetizing inductor 742. During this phase, output capacitor 746 must supply load 747. After a prescribed time, determined by PWM controller 749, converter 730 reverts to the first phase, alternating according to the duty factor set by PWM controller 749.

Figure 17D:
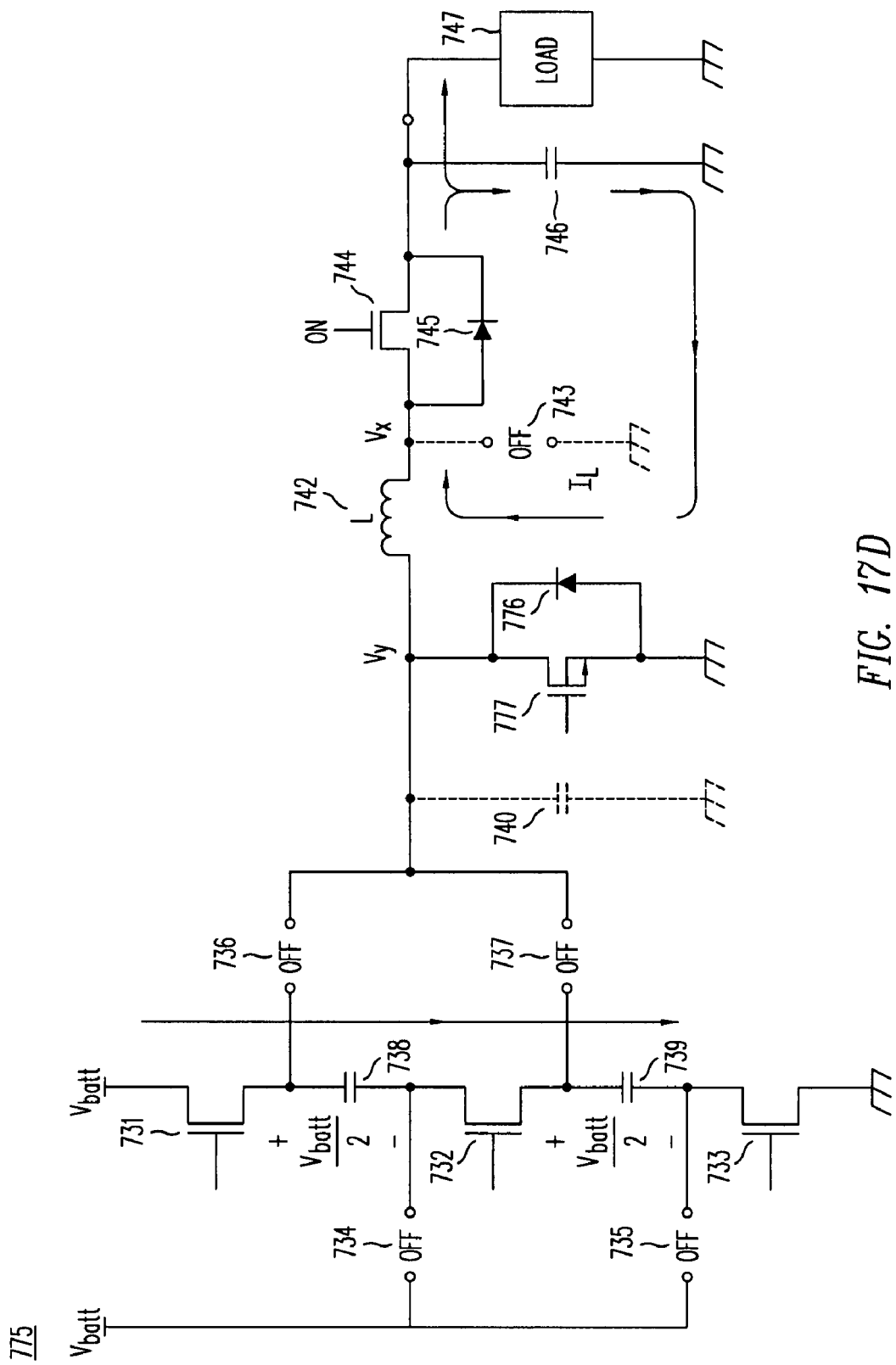
FIG. 17D is a circuit diagram showing the recirculation through the $V_y$ MOSFET in the alternative embodiment shown in FIG. 17E.
Figure 17E:
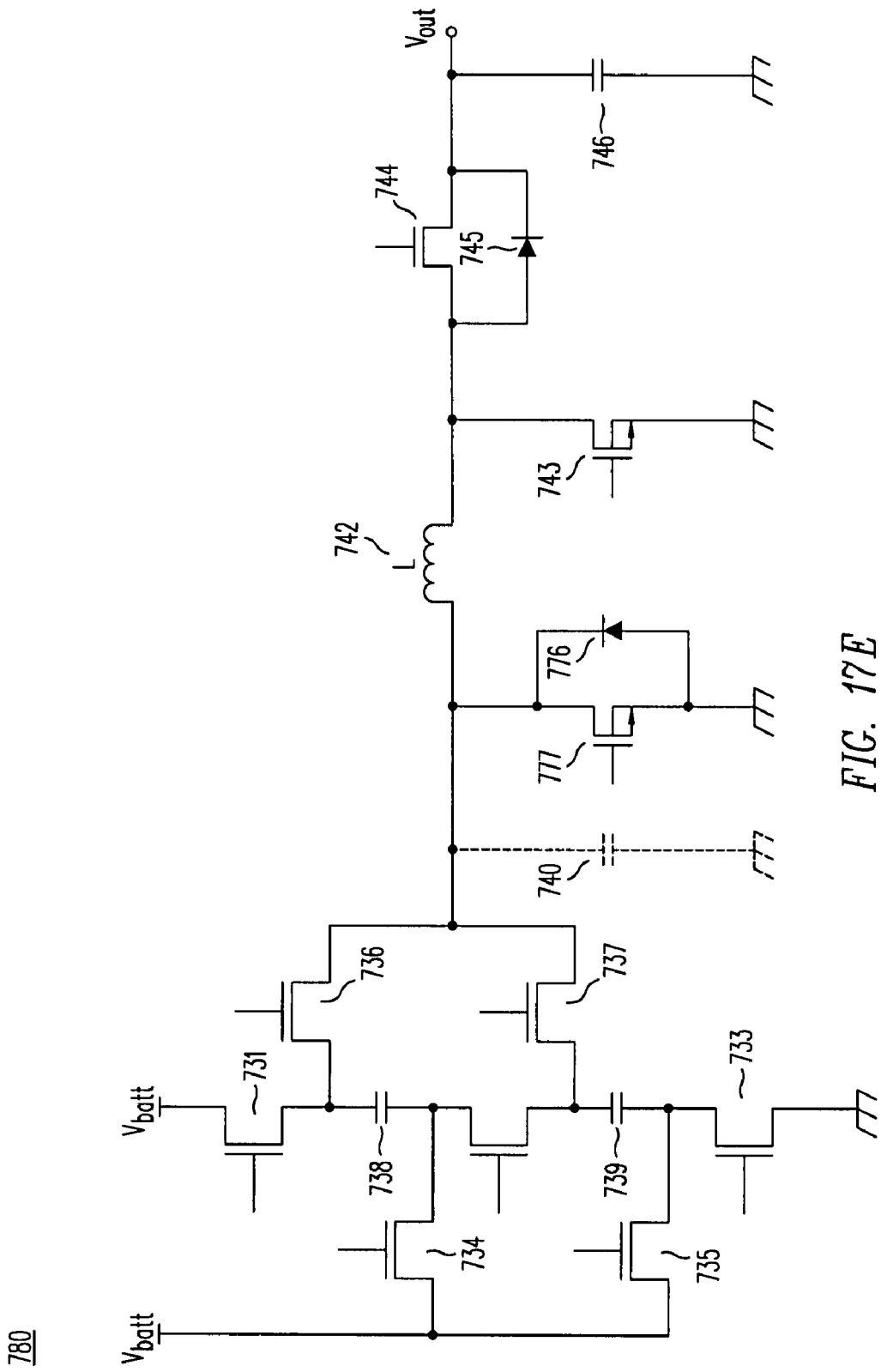
FIG. 17E is a circuit diagram of an alternative embodiment of the 1.5× CLUU converter.

In an alternative embodiment of converter 730 shown in FIG. 17E, diode 741 is replaced by MOSFET 777 and diode 776, which are timed to conduct whenever the voltage $V_y$ falls below ground. The operation of MOSFET 777 during recirculation phase 775 is illustrated in FIG. 17D.

Alternatively, the synchronous rectifier MOSFET 744 and low-side MOSFET 743 are switched in phase opposite to the charge pump MOSFETs 731 through 737 but require a larger value $C_1$ of capacitor 740. In another embodiment, the synchronous rectifier MOSFET 744 is never turned off fully but only reduced to low current operation, in the range of a few microamperes to reduce noise, as described in the above-referenced application Ser. No. 11/890,947.

Switched Capacitor-inductor (CLIX) Regulating Inverters

The generic CLXU converter topology of FIG. 8 is also useful for producing regulated voltages below ground. By utilizing an inverting charge-pump as a pre-converter, inverting voltage conversion is performed in two stages, or as a CLIX converter. While the switched-inductor post-regulator as described comprises an up converter, meaning the magnitude of the voltage is increased, there are two possible polarities later defined as CLIU and CLII, which are referred to herein generically as CLIX inverting converters.

Figure 18C:
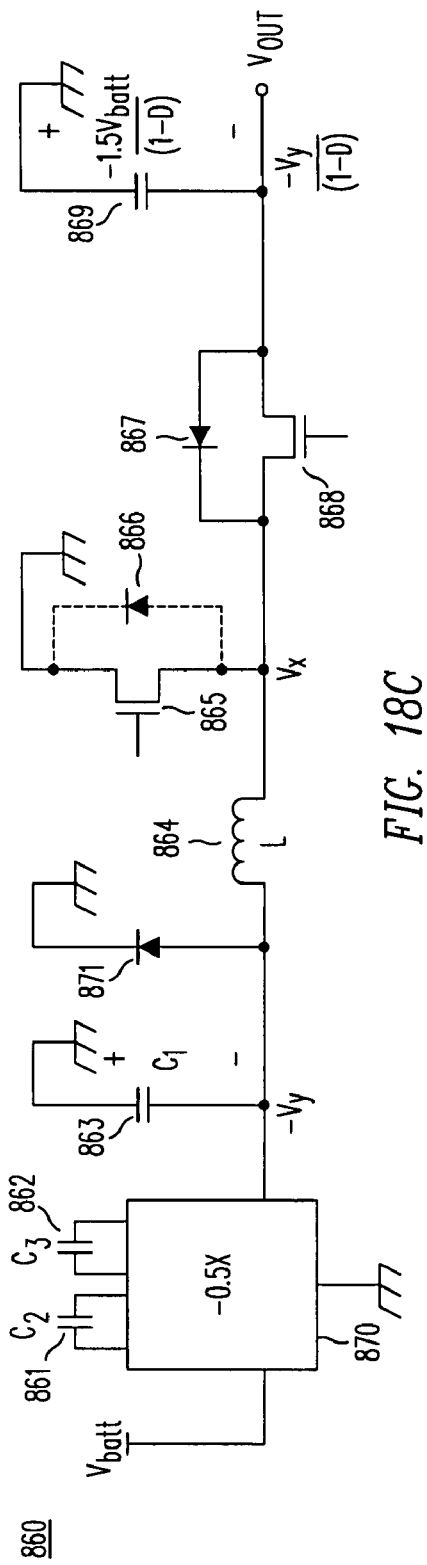
FIG. 18C is a functional diagram of a −0.5× pre-converter and non-inverting boost converter.
Figure 18D:
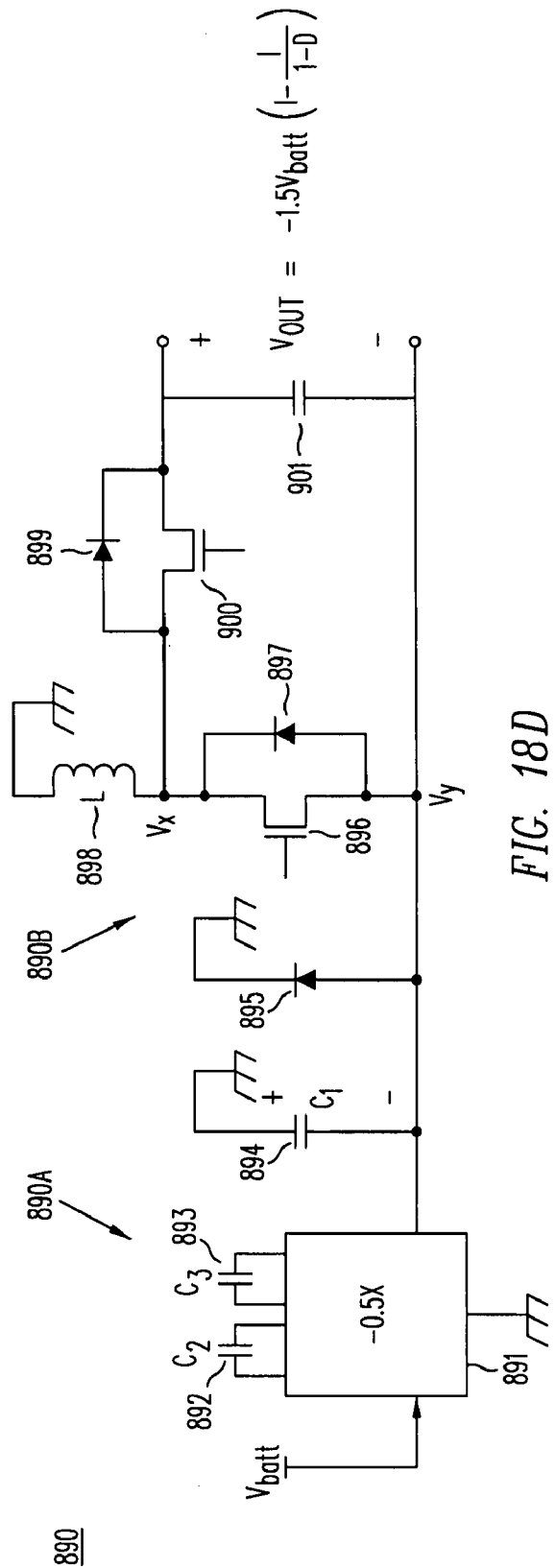
FIG. 18D is a functional diagram of a −0.5× pre-converter and inverting boost converter.

Examining the implementation of the CL type inverters in greater detail, FIGS. 18A-18D illustrate a functional block representation of four different switched CLIX regulating inverters, comprising −1× type pre-converters in FIGS. 18A and 18B, and fractional −0.5× type pre-converters in FIGS. 18C and 18D. In FIGS. 18A and 18C, the post-regulator comprises a non inverting boost converter, a circuit that increases the absolute value of the magnitude of the negative output voltage, i.e. a more negative voltage, without inverting its polarity. Such circuit topologies are referred top herein as CLIU converters.

In FIGS. 18B and 18D, the post-regulator comprises an inverting boost converter, a circuit that increases the magnitude of the output voltage in a polarity more positive than its intermediate voltage $V_y$. The output voltage may be below or above ground, i.e. positive or negative polarity so long as $V_{out}$ is more positive than intermediate voltage $V_y$. Such circuit topologies are referred top herein as CLII converters.

Non-inverting Boost Post-regulators: In FIG. 18A, a −1× type CLIU converter 800 comprises a charge pump 801 with a flying capacitor 802 and a filter capacitor 803. The output of charge pump 801 supplies a negative, i.e. below ground, intermediate voltage $V_y$, which in turn powers a non-inverting step-up switched-inductor post-regulator comprising an inductor 805, an N-channel MOSFET 806, a synchronous rectifier MOSFET 808 with intrinsic rectifier diode 809 and an output capacitor 810. MOSFET 806 includes P-N diode 807, which remains reverse biased since $V_x \leq 0$. In some cases, depending on the magnitude of capacitance $C_1$ of filter capacitor 803, a diode 804 is included to clamp the positive voltage range of $V_y$. Since $V_y = -1 \cdot V_{batt}$ and $V_{out} = V_y/(1-D)$, then the voltage conversion ratio of converter 800 is given by $$\frac{V_{out}}{V_{batt}} = \frac{-1}{1-D} = \frac{1}{D-1}$$

Figure 23A:
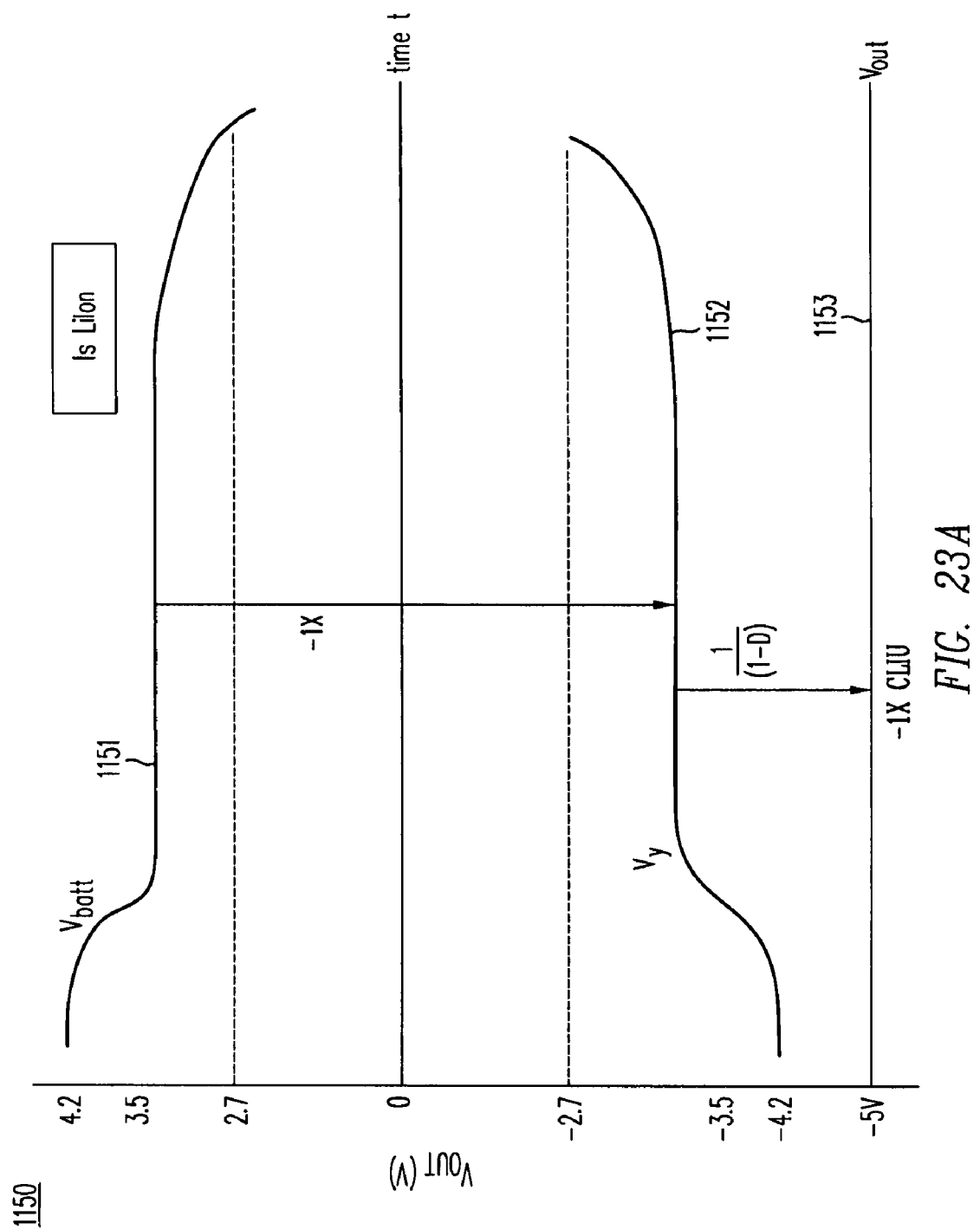
FIG. 23A is a graph showing the transfer characteristic of a −1× type CLIU converter regulating a 1s LiIon battery.

An example of CLIU conversion using a −1× type CLIU converter is illustrated in graph 1150 of FIG. 23A, where the discharge of a 1s LiIon battery is inverted and regulated to −5V. The LiIon battery fully charged starts with a 4.2V condition that decays over time to a plateau voltage (curve 1151) of approximately 3.5V and then eventually reaches its discharged condition of 2.7V. The single-capacitor pre-converter produces a time varying negative voltage $-V_y$, shown by curve 1152, ranging from −4.2V to −2.7V, which is stepped up in (absolute) magnitude to −5V by a varying amount $1/(1-D)$, using a non-inverting step-up post-regulator to produce a constant −5V output (curve 1153).

Figure 23B:
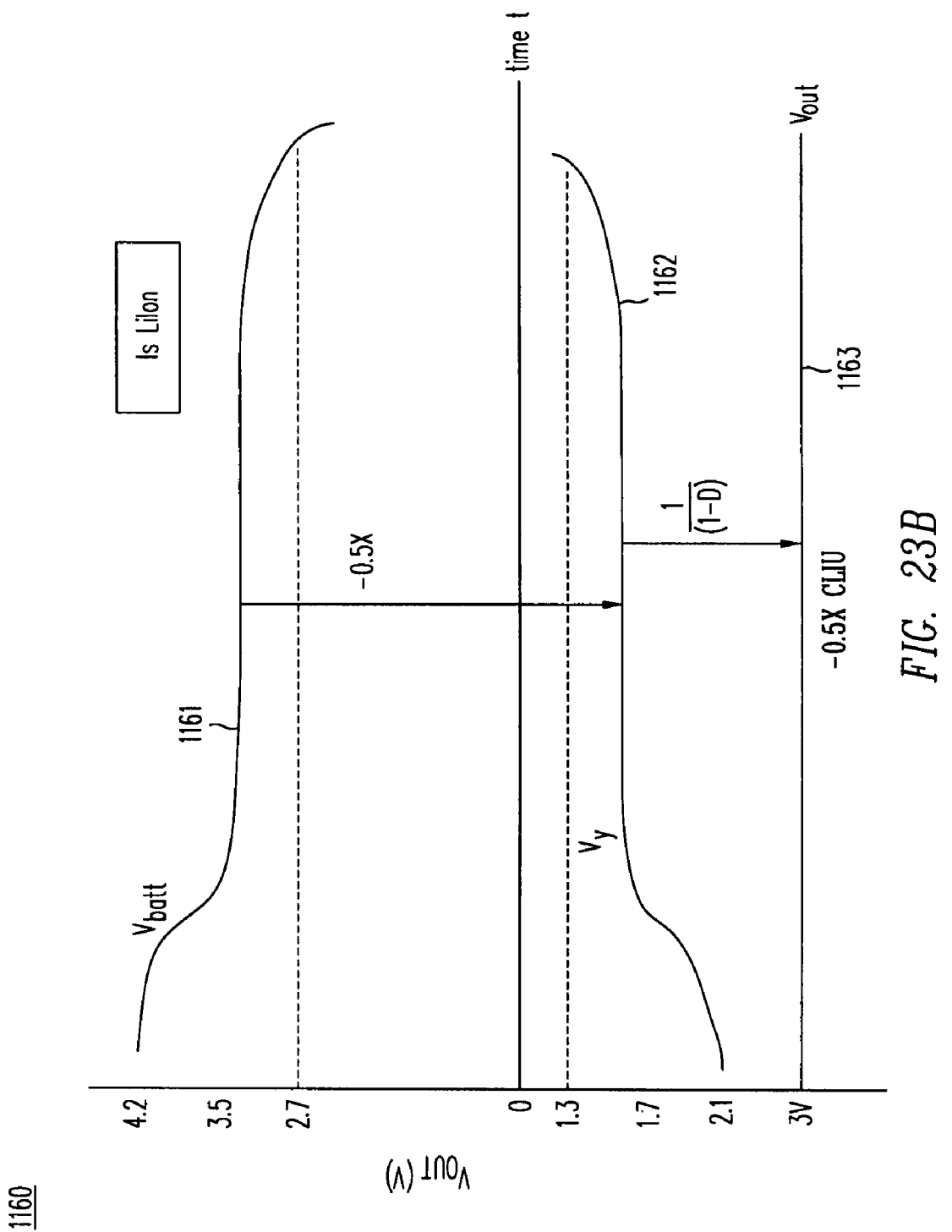
FIG. 23B is a graph showing the transfer characteristic of a −0.5× type CLIU converter regulating a 1s LiIon battery.
Figure 23C:
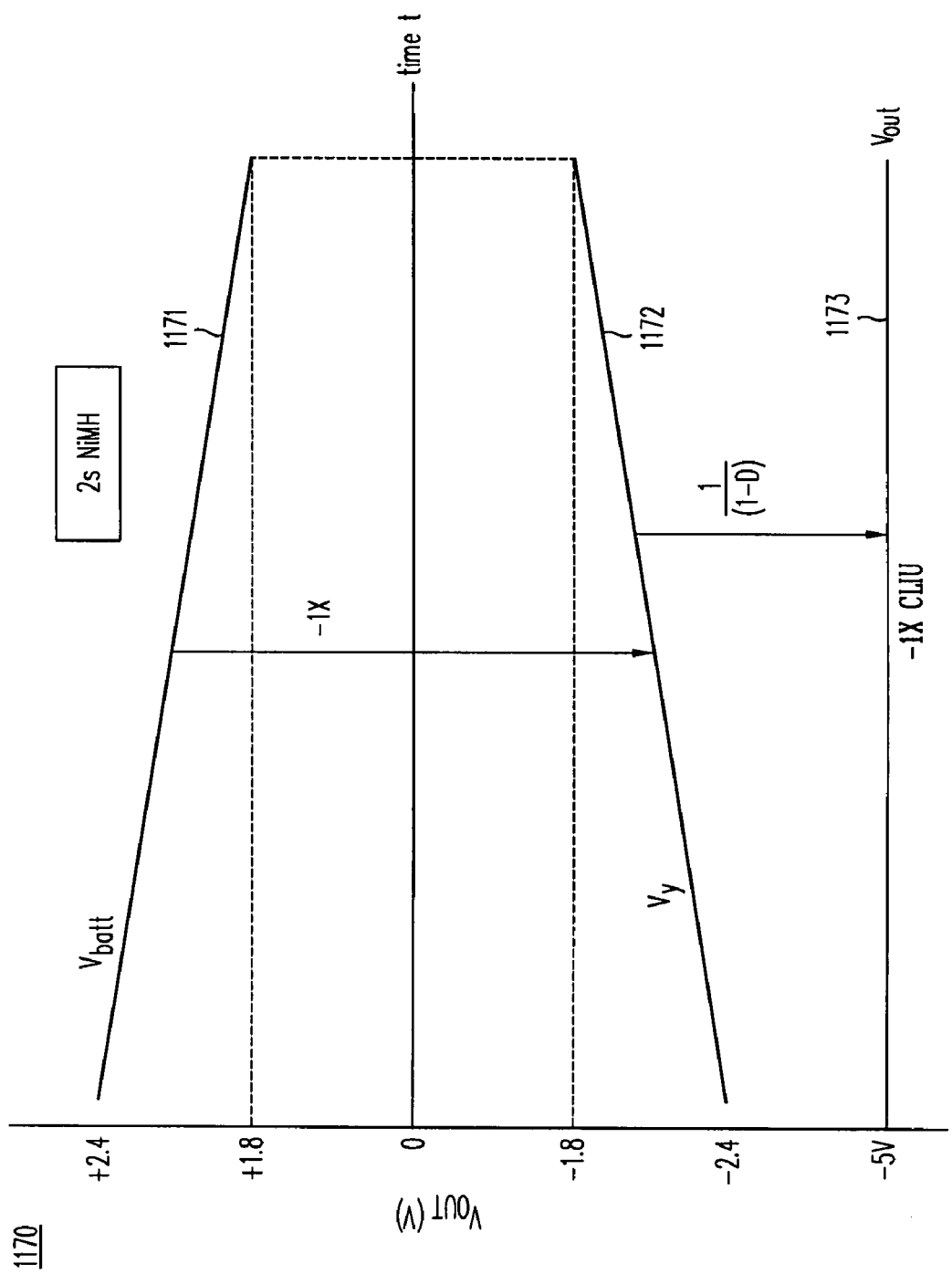
FIG. 23C is a graph showing the transfer characteristic of a −1× type CLIU converter regulating a 2s NiMH battery.
Figure 23D:
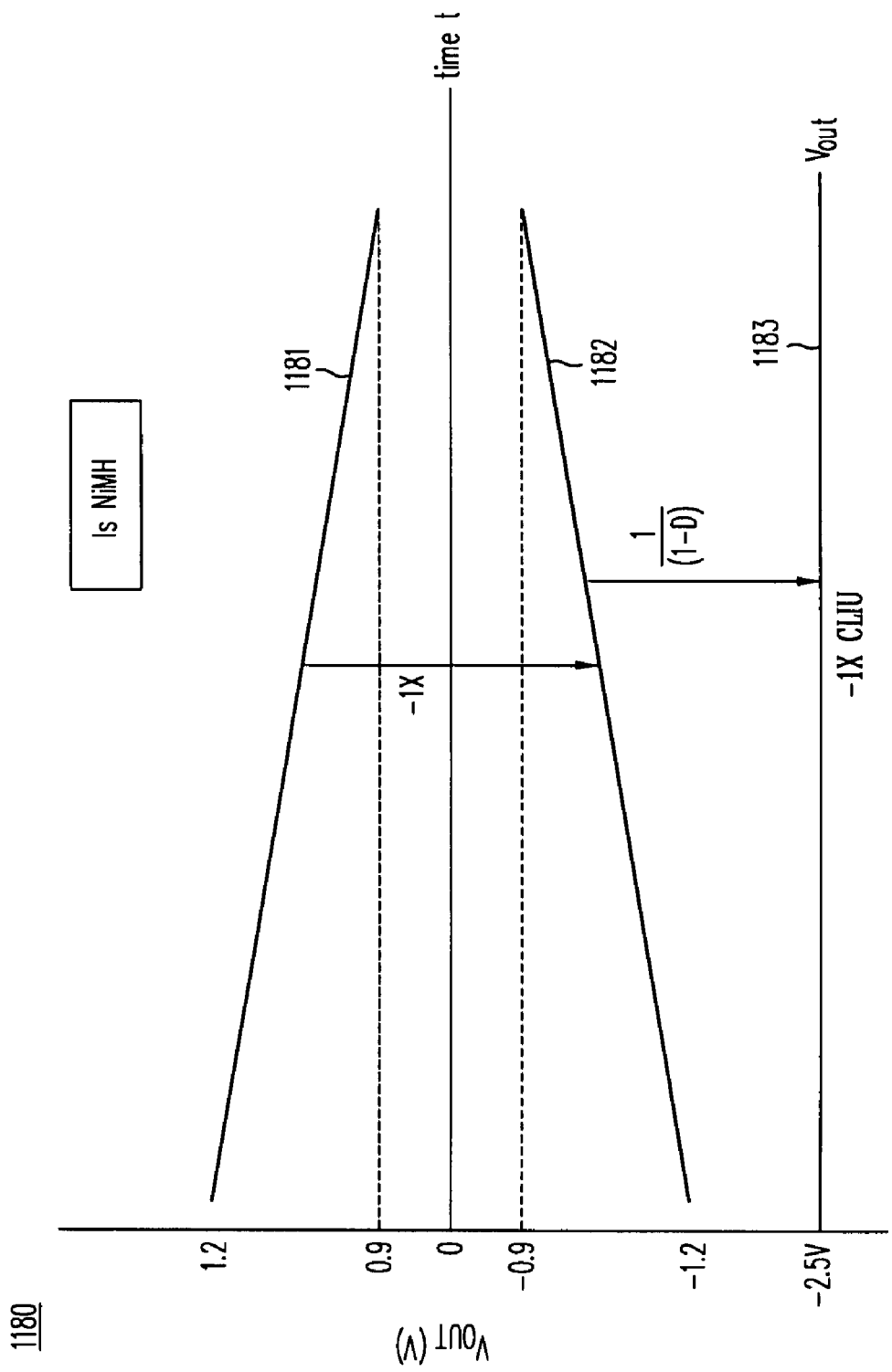
FIG. 23D is a graph showing the transfer characteristic of a −1× type CLIU converter regulating a 1s NiMH battery.

A similar graph 1170 of FIG. 23C illustrates the discharge of a two-series cell connected nickel-metal-hydride battery, or 2s NiMH, regulated by the −1×-type LCIU inverter to −5V. The input voltage (curve 1171) ranging in value from 2.4V to 1.8V during discharge is inverted to produce $-V_y$ (curve 1172) ranging from −2.4V to −1.8V. $V_y$ is then regulated by a factor $1/(1-D)$ by a non-inverting boost converter to produce a regulated output voltage of −5V (curve 1173). Operation to produce −12V would require similar operation but at different duty factors.

Figure 23E:
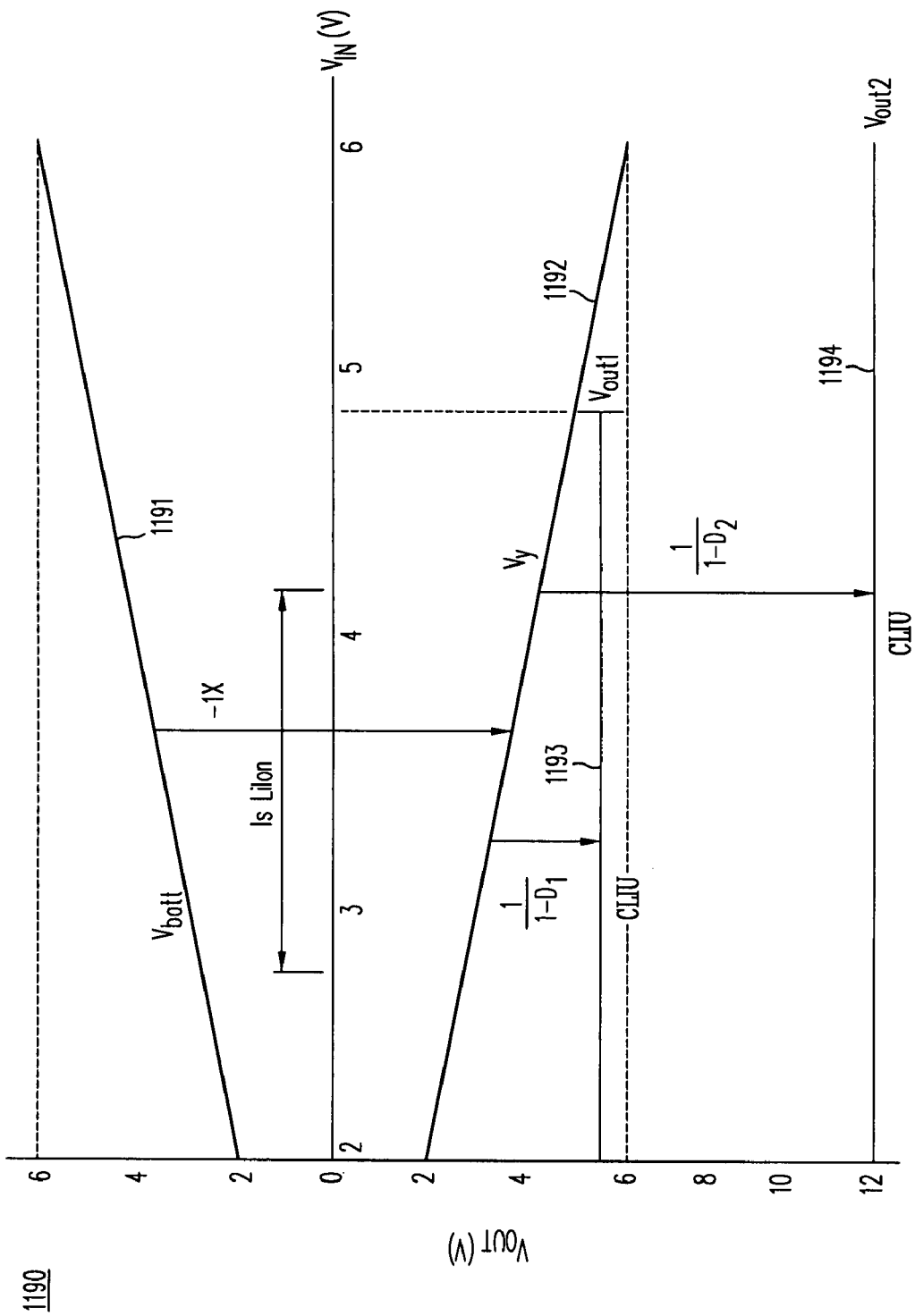
FIG. 23E is a graph showing the higher voltage transfer characteristic of a −1× type CLIU converter.

The ability of the −1× LCIU inverter to create a −5V or −12V output from a wide range of input voltages is illustrated in graph 1190 of FIG. 23E, with inputs as shown ranging from 2V up to 6V, a range including a 1s LiIon discharge condition. As shown, battery or input voltage (curve 1191) is inverted to produce intermediate voltage $V_y$, shown by curve 1192. Using a non-inverting boost type post-regulator operating a duty factor $D_1$, a regulated −5V output (curve 1193) is produced, or at a different duty factor $D_2$, a −12V output (curve 1194) may be produced.

Figure 23F:
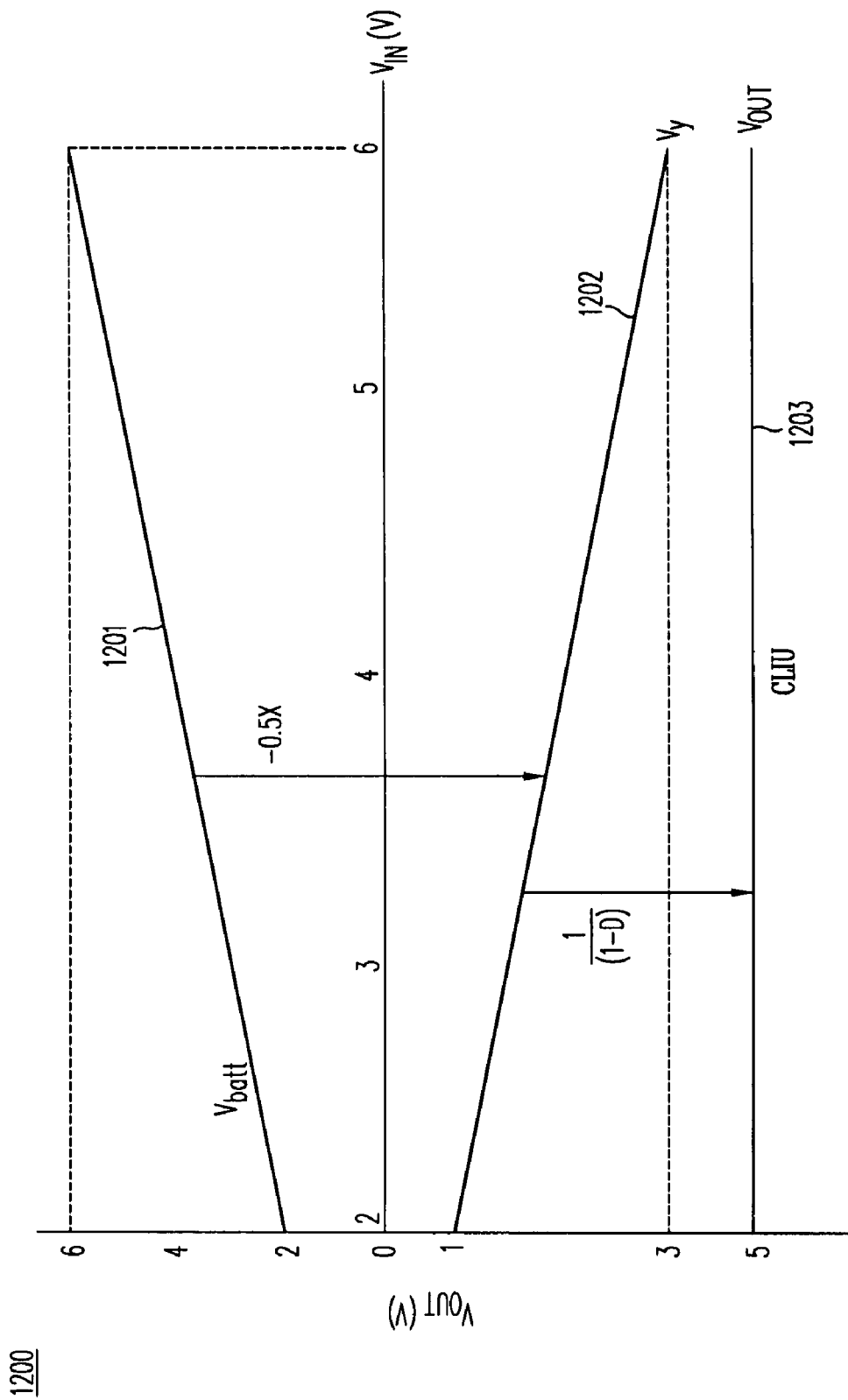
FIG. 23F is a graph showing the higher voltage transfer characteristic of a −0.5× type CLIU converter.
Figure 23G:
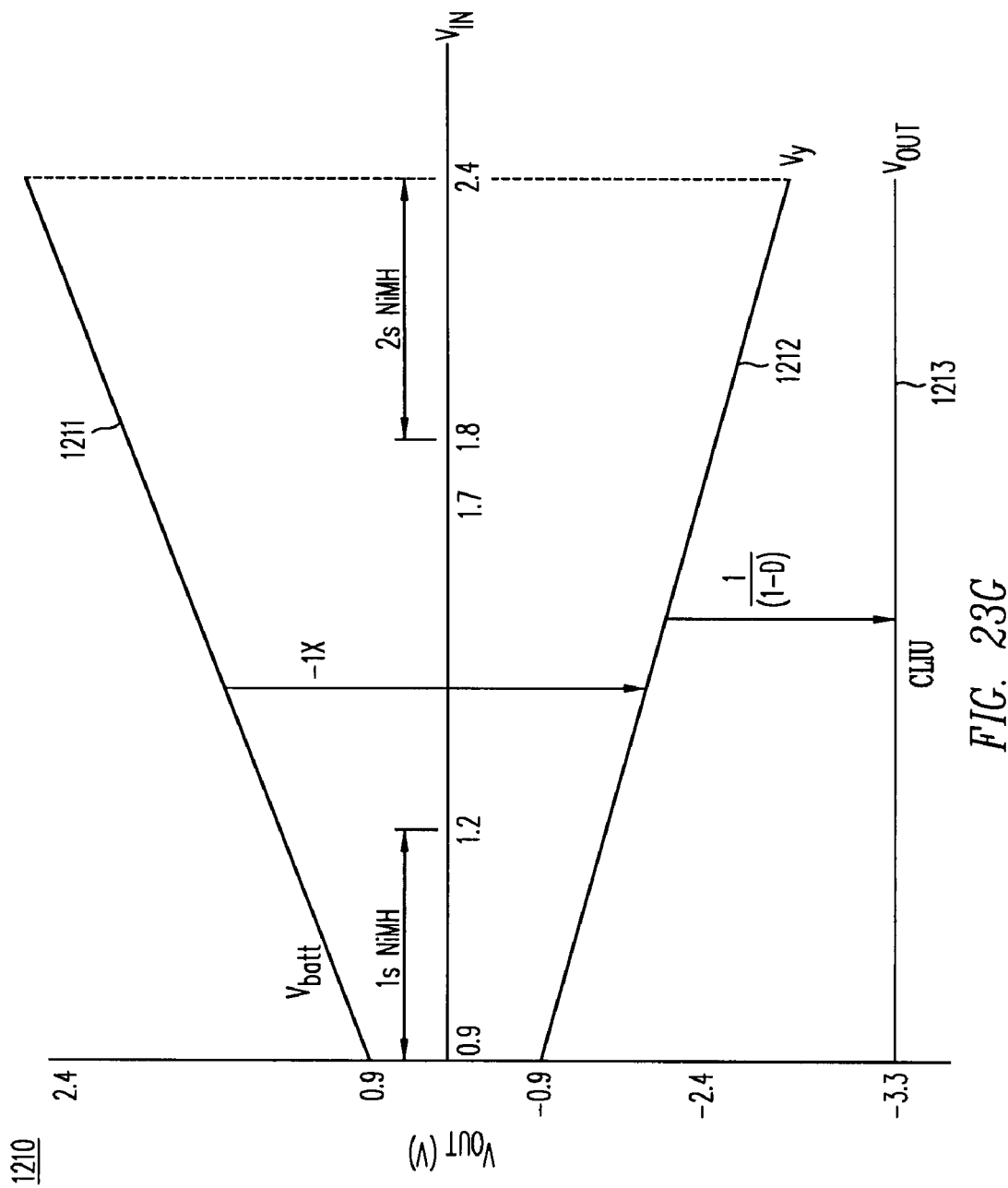
FIG. 23G is a graph showing the low voltage transfer characteristic of a −1× type CLIU converter.

Another example of the CLIU converter's flexibility to invert and regulate a wide range of input voltages is illustrated in graph 1210 of FIG. 23G, where a battery or input voltage (curve 1211) varying from 0.9 to 2.4V is used to produce a regulated −3.3V output (curve 1213). The input range from 0.9V to 1.2V represents single cell NiMH batteries, the range from 0.9V to 1.7V represents alkaline batteries, while the range from 1.8V to 2.4V represents 2s configured NiMH batteries.

As shown in graph 1210, the battery or input voltage (curve 1211) is inverted by the charge pump pre-converter to produce $V_y$ (curve 1212) and is then boosted by a varying factor of $1/(1-D)$ to produce an output voltage (curve 1213), shown here as −3.3V. Alternatively, a different duty factor range could be employed to produce a −12×V output (not shown).

In some cases, a −1× pre-converter produces an undesirably large negative intermediate voltage Vy at high input voltage conditions, and forcing the boost post-regulator to operate at low duty factors. One way to avoid this problem is to employ a −0.5×-type fractional charge pump inverting pre-converter instead of a −1× type pre-converter.

In FIG. 18C, a −0.5× type CLIU converter 860 includes a fractional charge pump 872 with flying capacitors 861 and 862 and a filter capacitor 863. The output of charge pump 870 supplies a negative, i.e. below ground, intermediate voltage $V_y$, which in turn powers a non-inverting step-up post-regulator comprising an inductor 864, an N-channel MOSFET 865, a synchronous rectifier MOSFET 868 with intrinsic rectifier diode 867 and an output capacitor 869. MOSFET 865 includes a P-N diode 866 which remains reverse biased since $V_x \leq 0$. In some cases, depending on the capacitance $C_1$ of capacitor 863, a diode 871 is included to clamp the positive voltage range of $V_y$. Since $V_y = -0.5 \cdot V_{batt}$ and $V_{out} = V_y/(1-D)$, then the voltage conversion ratio of the −0.5×-type CLIU converter is given by $$\frac{V_{out}}{V_{batt}} = \frac{-0.5}{1-D} = \frac{0.5}{D-1}$$

An example of CLIU conversion using a −0.5× type CLIU converter is illustrated in graph 1150 of FIG. 23B where the discharge of a 1s LiIon battery is inverted and regulated to −3V. The LiIon battery fully charged starts with a 4.2V condition that decays over time to a plateau voltage (curve 1161) of approximately 3.5V and then eventually reaches its discharged condition of 2.7V. The double-capacitor pre-converter produces a time varying negative voltage $-V_y$, shown by curve 1152, ranging from −2.1V to −1.35V. $V_y$ is then stepped up in magnitude to −3V by an a varying amount $1/(1-D)$ using a non-inverting step-up post-regulator to produce a constant −3V output (curve 1163).

The ability of the −0.5× CLIU inverter to create and regulate a −5V output from a wide range of input voltages is illustrated in graph 1200 of FIG. 23F, with inputs as shown ranging from 2V up to 6V, a range including a is LiIon discharge condition. As shown, battery or input voltage (curve 1201) is inverted and halved to produce intermediate voltage $V_y$, shown by curve 1202, ranging from 1 to 3V. Using a non-inverting boost type post-regulator operating at a duty factor $D_1$, a regulated −5V output (curve 1203) is produced, or at a different duty factor, a −3.3V output (not shown) may be produced.

Another example of the CLIU converter's flexibility to invert and regulate a wide range of input voltages is illustrated in graph 1210 of FIG. 23G, where a battery or input voltage (curve 1211) varying from 0.9 to 2.4V is used to produce a regulated −3.3V output (curve 1213). The input range from 0.9V to 1.2V represents single cell NiMH batteries, the input range from 0.9V to 1.7V represents alkaline batteries, while the input range from 1.8V to 2.4V represents 2s configured NiMH batteries.

The duty factor for CLIX inverters can be derived by rearranging the formula for the CLXU converter to yield $$D = 1 - \left[n\frac{V_{in}}{V_{out}}\right]$$

Figure 23H:
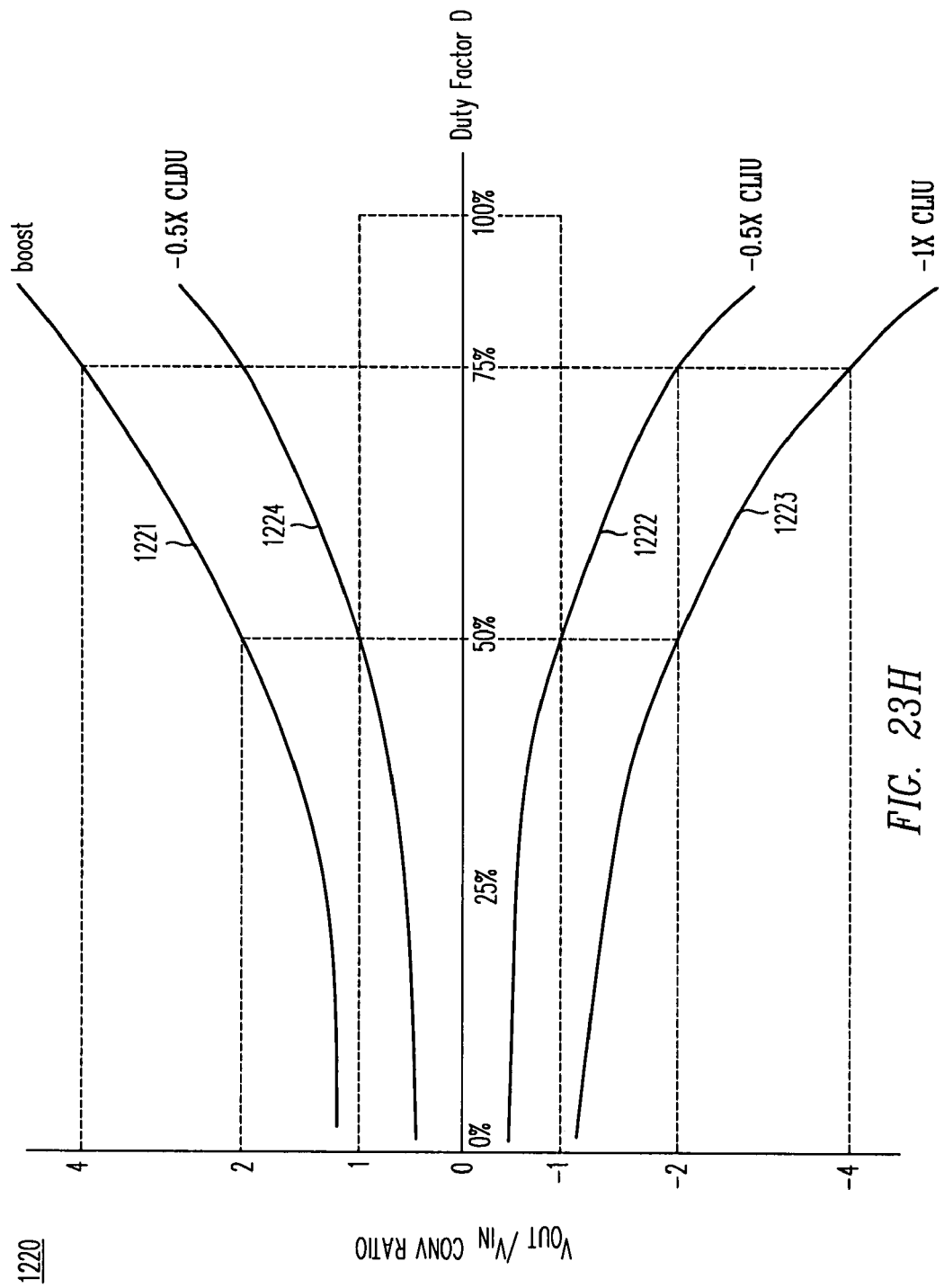
FIG. 23H is a graph showing the voltage conversion ratio $V_{out}/V_{in}$ as a function of duty factor for various CLIU converters.

Since $n<0$ and $V_{in}/V_{out}<0$, both numbers are negative and the duty factor equation mathematically behaves the same as a non-inverting converter. This principle is illustrated in graph 1220 of FIG. 23H where curve 1221 represents a boost converter's conversion ratio as a function of duty factor. The conversion ratio of a −1×-type CLIU inverter (curve 1223) is the negative mirror image of curve 1221 and the conversion ratio of a −0.5×-type CLIU inverter is half that value, or a mirror image of the conversion ratio of a +0.5× CLDU converter, described previously. In some sense, the −0.5× CLIU converter is analogous to an inverted form of a down-up converter since it can produce voltages above and below $-V_{batt}$.

Table 5 contrasts the D=50% preferred conversion ratio for the −1× CLIU and −0.5× CLIU converters and illustrates the duty factor range needed to output several negative output voltages from a LiIon battery.

TABLE 5

| Condition | −0.5X LCDU | −1X LCDU | Boost (Positive) |
| --- | --- | --- | --- |
| D = 50% | $V_{out}/V_{in} = -0.55$ | $V_{out}/V_{in} = -1.0$ | $V_{out}/V_{in} = 1.0$ |
| LiIon → 3.0 V | N/A | 71% < D < 100%* | 71% < D < 100%* |
| LiIon → 2.7 V | N/A | 64% < D < 90% | 64% < D < 90% |
| LiIon → 1.8 V | N/A | 43% < D < 60% | 43% < D < 60% |
| LiIon → 0.9 V | 42% < D < 60% | 21% < D < 30%* | 21% < D < 30%* |

Those conditions marked with an asterisk (*) may require limiting the converter's operating frequency in order to meet the full range in required duty factors. Those marked with N/A require both step-up and step-down inversion.

Figure 19A:
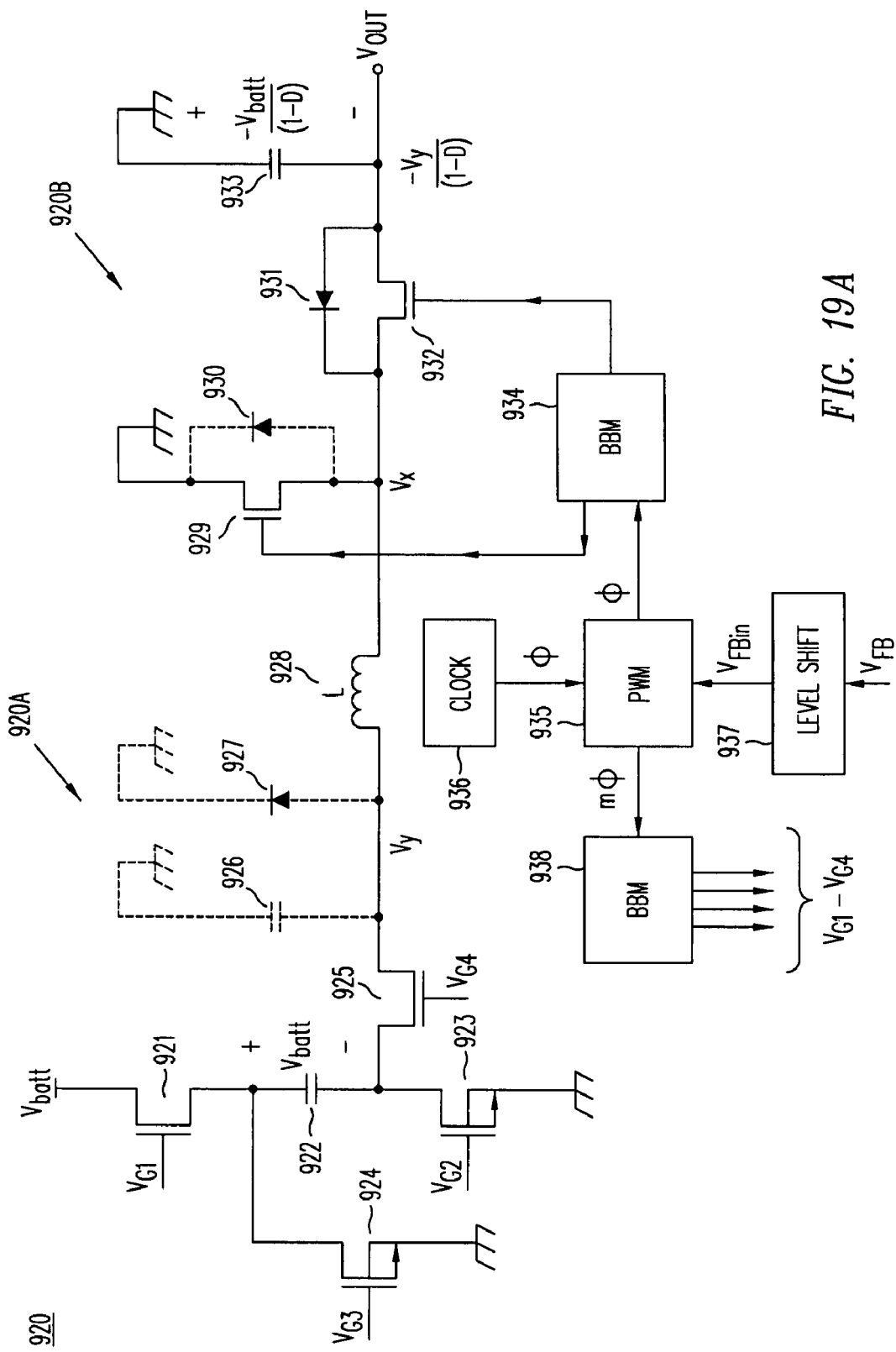
FIG. 19A is a more detailed circuit diagram of a −1× CLIU converter.

CLIU Converter Implementation: A CLIU converter 920 using a −1×-type pre-converter 920A is shown in FIG. 19A. As shown, charge pump inverting pre-converter 920A includes MOSFETs 921, 923, 924, and 925 and a flying capacitor 922 and provides an intermediate negative output voltage $-V_y$. A filter capacitor 926 is optional. Also, a diode 927 may be included to limit the positive voltage swing of $V_y$ and may be omitted depending on the capacitance value $C_1$ of a capacitor 926. Intermediate voltage $V_y$ is connected to an inductor 928 of a non-inverting boost-type post-regulator 920B with a ground-connected MOSFET 929, a floating synchronous rectifier MOSFET 932 with an intrinsic P-N diode 931 and an output capacitor 933 driving the load. Since $V_x \leq 0$, the output of converter 920 is given by the equation $$V_{out} = -\frac{V_{batt}}{(1-D)} = \frac{V_{batt}}{(D-1)}$$

Post-regulator 920B is controlled by a PWM controller 935 driving MOSFET 929 in response to the feedback signal $V_{FB}$ from the output terminal of converter 920, level shifted to the appropriate value $V_{FBin}$ by a level shift circuit 937. The level shift circuit 937 is needed to convert the output voltage $V_{out}$ which is negative, i.e. below circuit ground, to a voltage within the range of PWM controller 935. One convenient method to implement level shift circuit 937 involves a current mirror. The implementation of various feedback circuits is described in the above-referenced application Ser. No. 11/890,818.

As shown in FIG. 19A, a clock and ramp generator 936 is used to switch PWM controller 935 at a frequency Φ and is used to drive the charge pump MOSFETs 921, 923, 924, and 925 at a frequency m·Φ, which may be higher or lower than the switching frequency used to drive post-regulator 920B. In a preferred embodiment m=1 and charge pump pre-converter 920A and switched inductor post-regulator 920B are clocked at the same frequency and synchronized to the same clock. A BBM circuit 938 provides the gate drive and necessary level shifting to generate the gate voltages $V_{G1}$ to $V_{G4}$ of the charge pump MOSFETs 921, 923, 924, and 925, respectively. A BBM circuit 934 drives MOSFET 929 and synchronous rectifier MOSFET 932 in accordance with PWM controller 935, preventing significant shoot-through conduction, i.e. simultaneous conduction in both MOSFET 929 and MOSFET 932, to prevent damage to and improve the efficiency of converter 920.

Figure 19B:
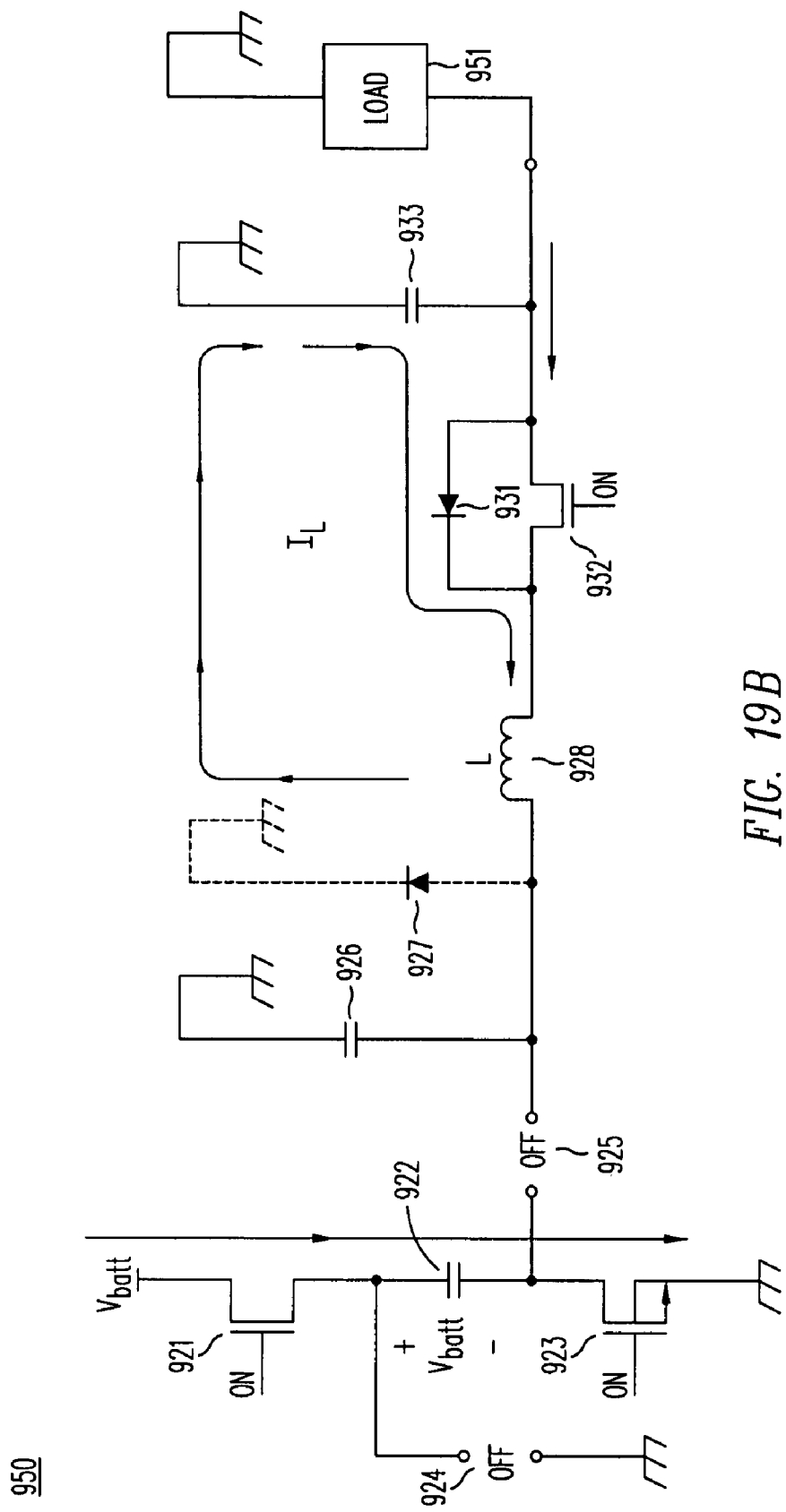
FIG. 19B is an equivalent circuit diagram of the −1× CLIU converter during the charging and recirculating stage.
Figure 19C:
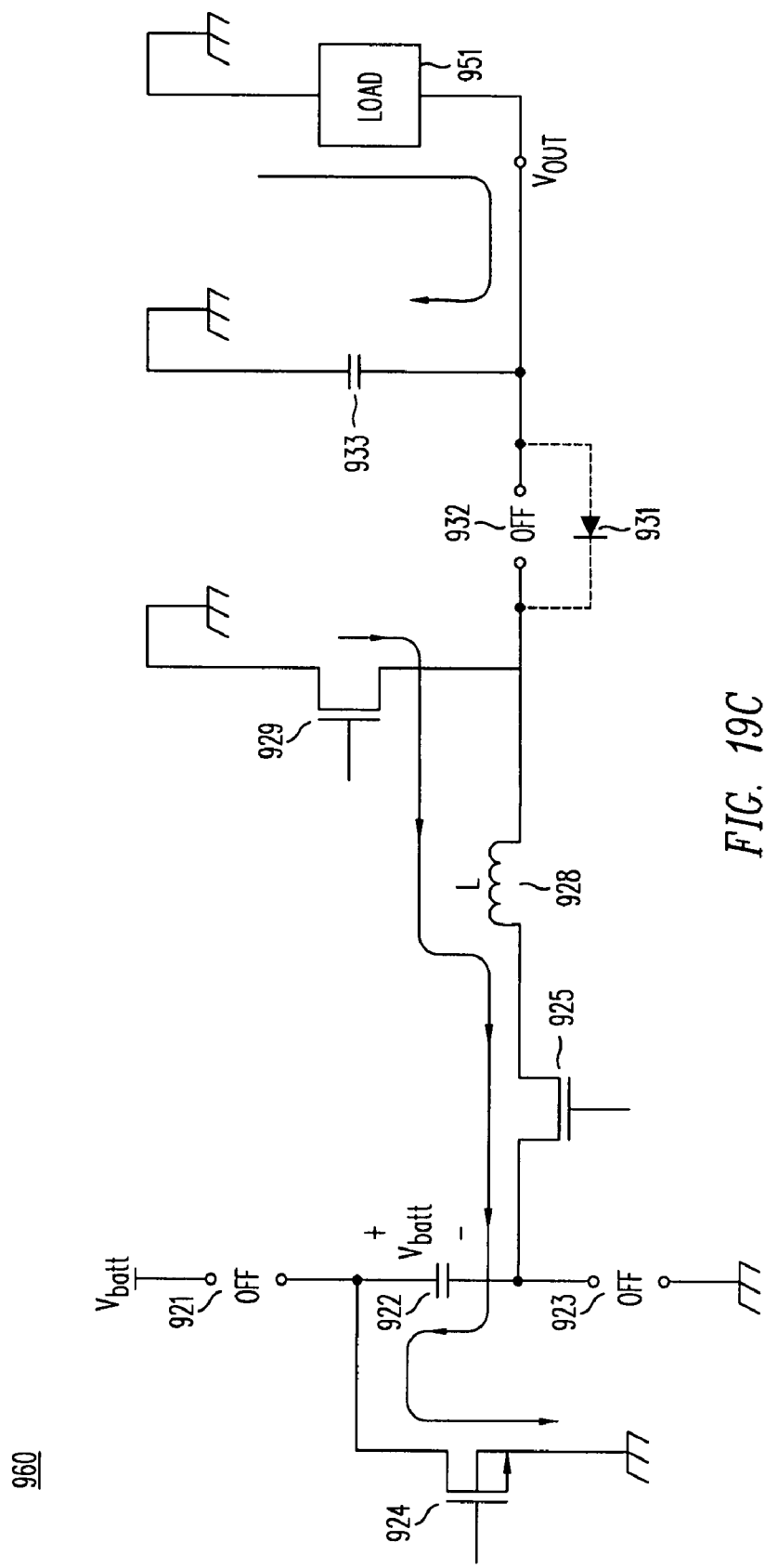
FIG. 19C is an equivalent circuit diagram of the −1× CLIU converter during the magnetizing and discharging stage.

FIGS. 19B and 19C show that the operation of converter 920 occurs in two alternating phases. In the charging and recirculating phase, shown in FIG. 19B, flying capacitor 922 is charged to substantially the full battery voltage Vbatt through on MOSFETs 921 and 923, while the current $I_L$ in inductor 928 re-circulates through diode 931, the on-state synchronous rectifier MOSFET 932, output capacitor 933, and load 951. The recirculation path is completed by capacitor 926, and if the voltage $V_y$ rises above ground, diode 927 will also conduct. MOSFETs 924, 923 and 929 remain off in this phase of operation. The on-time of synchronous rectifier MOSFET 932 may be shorter than the entire period when diode 931 is conducting and control signals other than simply the gate drive of ground connected MOSFET 929 may determine when it begins and ends.

In the second phase, shown in FIG. 19C, MOSFETs 921, 923 and 932 are turned off and MOSFETs 924, 925 and 929 are turned on to connect flying capacitor 922 to inductor 928, thereby magnetizing inductor 928. During this phase, output capacitor 933 must supply load 931. After a prescribed time determined by the PWM controller 935, converter 920 reverts to the first phase.

Figure 19D:
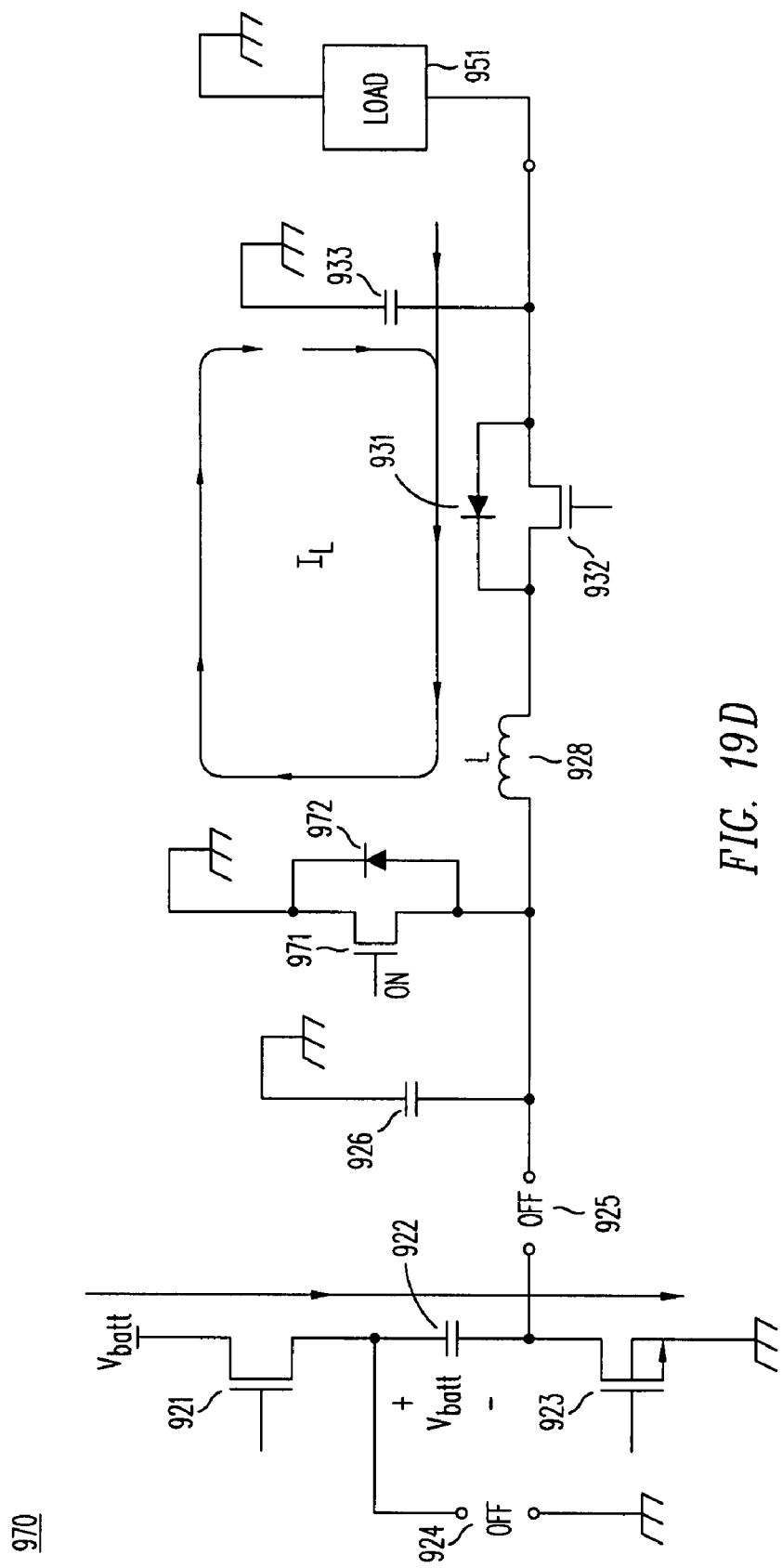
FIG. 19D is a circuit diagram of an alternative embodiment of a =1× CLIU converter with MOSFET circulation.

In an alternative embodiment shown in circuit diagram 970 of FIG. 19D, diode 927 is replaced by a MOSFET 971 and a diode 972 which are timed to conduct whenever the voltage $V_y$ falls below ground.

Alternatively the synchronous rectifier MOSFET 932 and ground-connected MOSFET 929 may be switched in a phase opposite to that of the charge pump MOSFETs 921, 923, 924, and 925, but this alternative may require a larger value of the capacitance $C_1$ of capacitor 926. In another embodiment the synchronous rectifier MOSFET 932 is never turned off fully but only reduced to low current operation, in the range of a few microamperes to reduce noise, as described in the above-referenced application Ser. No. 11/890,947.

Figure 21A:
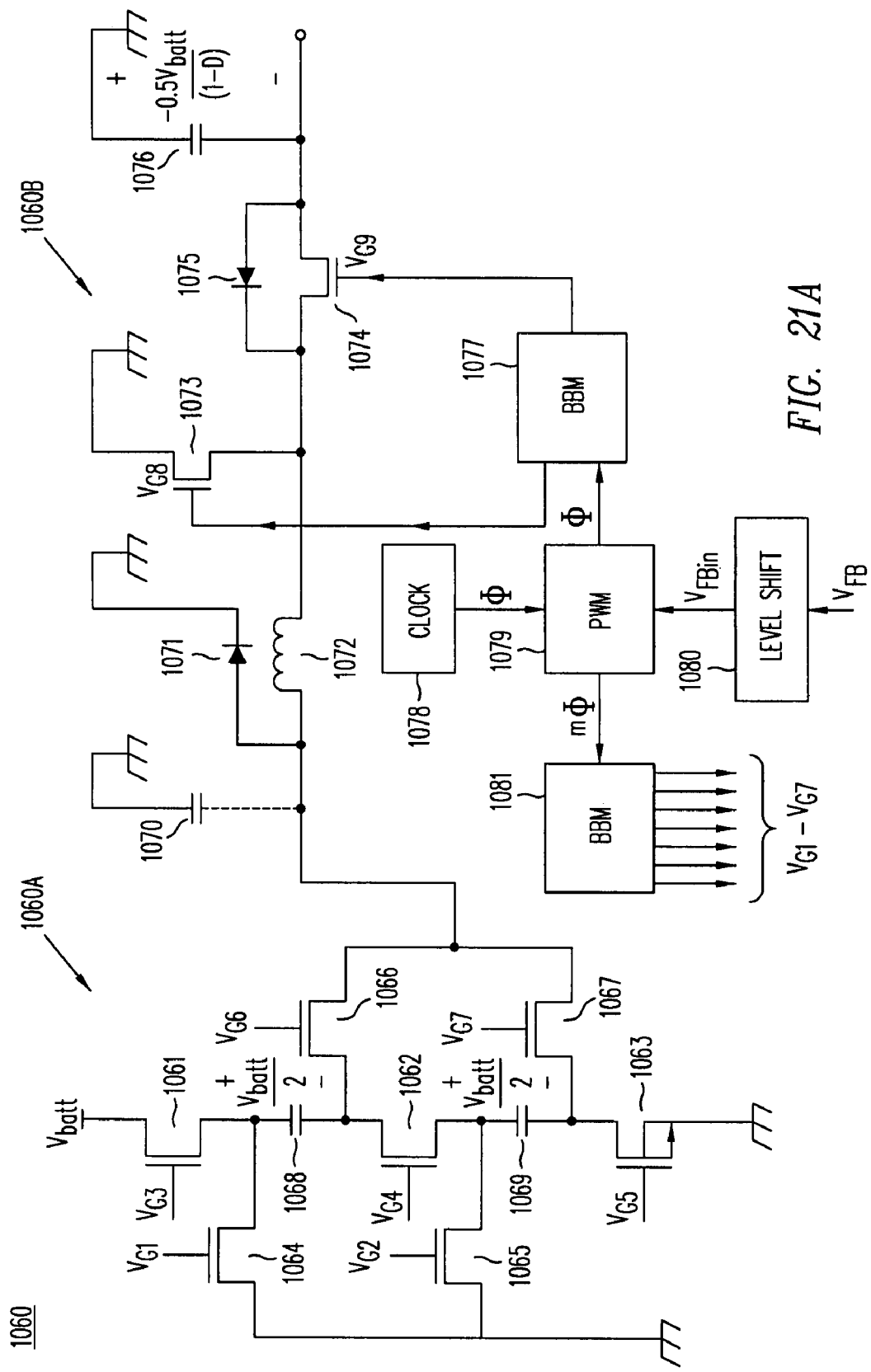
FIG. 21A is a more detailed circuit diagram of a −0.5× CLIU converter.

Fractional CLIU Converter: A CLIU converter 1060 using a −0.5×-type pre-converter 1060A is shown in FIG. 21A. As shown, the fractional charge pump pre-converter 1060A includes MOSFETs 1061 through 1067 and flying capacitors 1068 and 106, with an intermediate output voltage $V_y$. A filter capacitor 1070 is optional. Also, a diode 1071 may be included to limit the positive swing of the voltage $V_y$ and may be omitted depending on the capacitance $C_1$ of capacitor 1070. Intermediate voltage $V_y$ is provided to an inductor 1072 of a non-inverting boost-type post-regulator 1060B, which also includes a ground-connected MOSFET 1073, a floating synchronous rectifier 1074 MOSFET with an intrinsic P-N diode 1075 and an output capacitor 1076 driving a load. The output of converter 1060 is given by the equation $$V_{out} = -\frac{0.5 \cdot V_{batt}}{(1-D)} = \frac{0.5 \cdot V_{batt}}{(D-1)}$$

Post-regulator 1060B is controlled by a PWM controller 1079 driving MOSFET 1073 in response to the feedback signal $V_{FB}$ from the output terminal of converter 1060, level-shifted to the appropriate value $V_{FBin}$ by a level shift circuit 1080. Level shift circuit 1080 is needed to convert the output voltage $V_{out}$ which is negative, i.e. below ground, to a positive signal within the range of PWM controller 1079. One convenient method to implement level shift circuit 1080 involves a current mirror. The implementation of various feedback circuits is described in the above-referenced application Ser. No. 11/890,818.

As shown in FIG. 21A, a clock and ramp generator 1078 is used to switch PWM controller 1079 at a frequency Φ and to drive the charge pump MOSFETs 1061 through 1067 at a frequency m·Φ which may be higher or lower than the switching frequency of post-regulator 1060B. In a preferred embodiment m=1, and charge pump pre-converter 1060A and switched inductor post-regulator 1060B are clocked at the same frequency and synchronized to the same clock. A BBM circuit 1081 provides the gate drive and necessary level shifting to generate the gate voltages $V_{G1}$ to $V_{G7}$ of the charge pump MOSFETs 1061 through 1067. respectively. A BBM circuit 1077 drives low-side MOSFET 1073 and synchronous rectifier MOSFET 1074 in accordance with PWM controller 1079, preventing significant shoot-through conduction, i.e. simultaneous conduction in both MOSFET 1073 and MOSFET 1074, to prevent damage to and improve the efficiency of converter 1060.

Figure 21B:
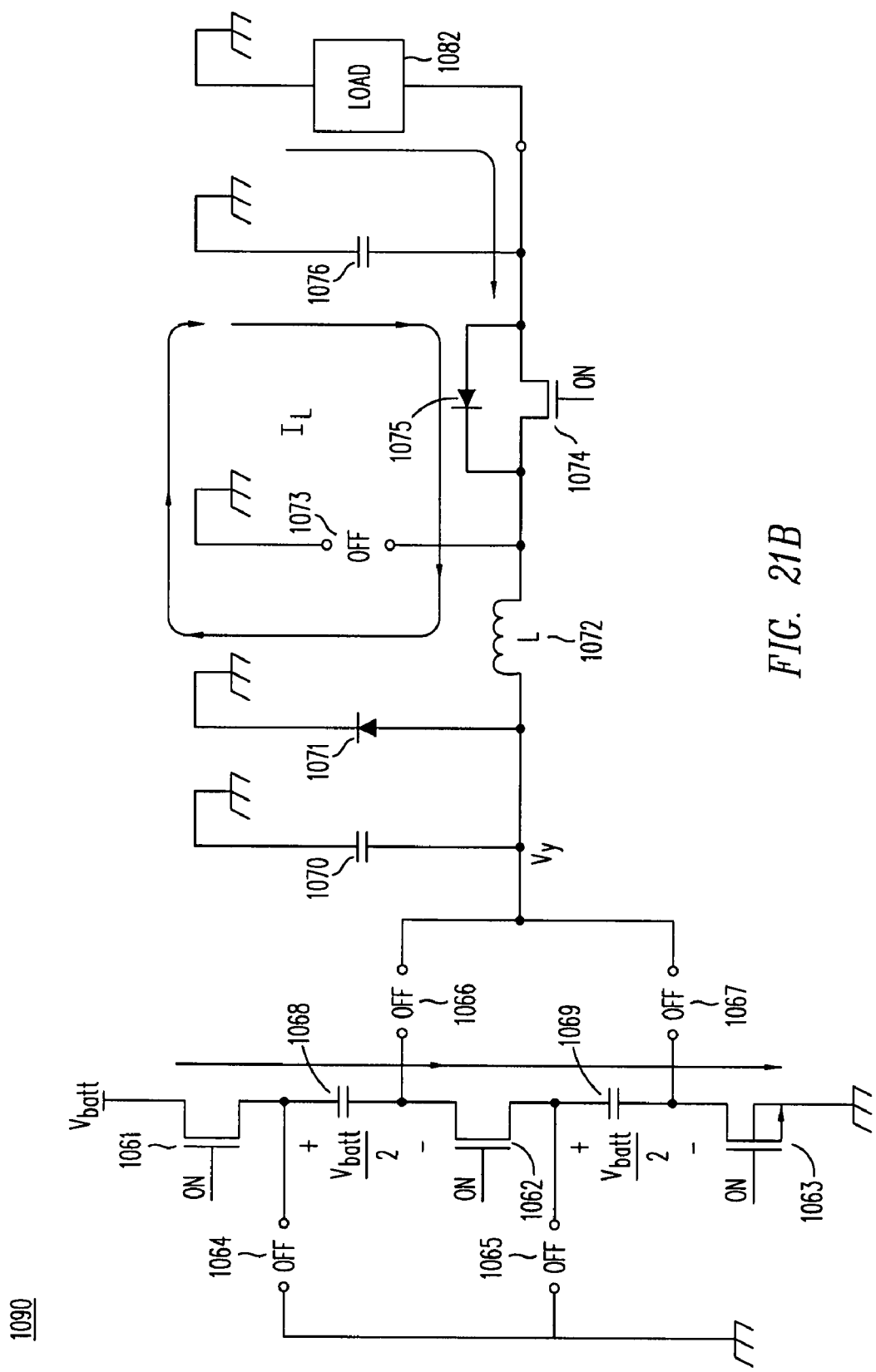
FIG. 21B is an equivalent circuit diagram of the −0.5× CLIU converter during the magnetizing and discharging stages.
Figure 21C:
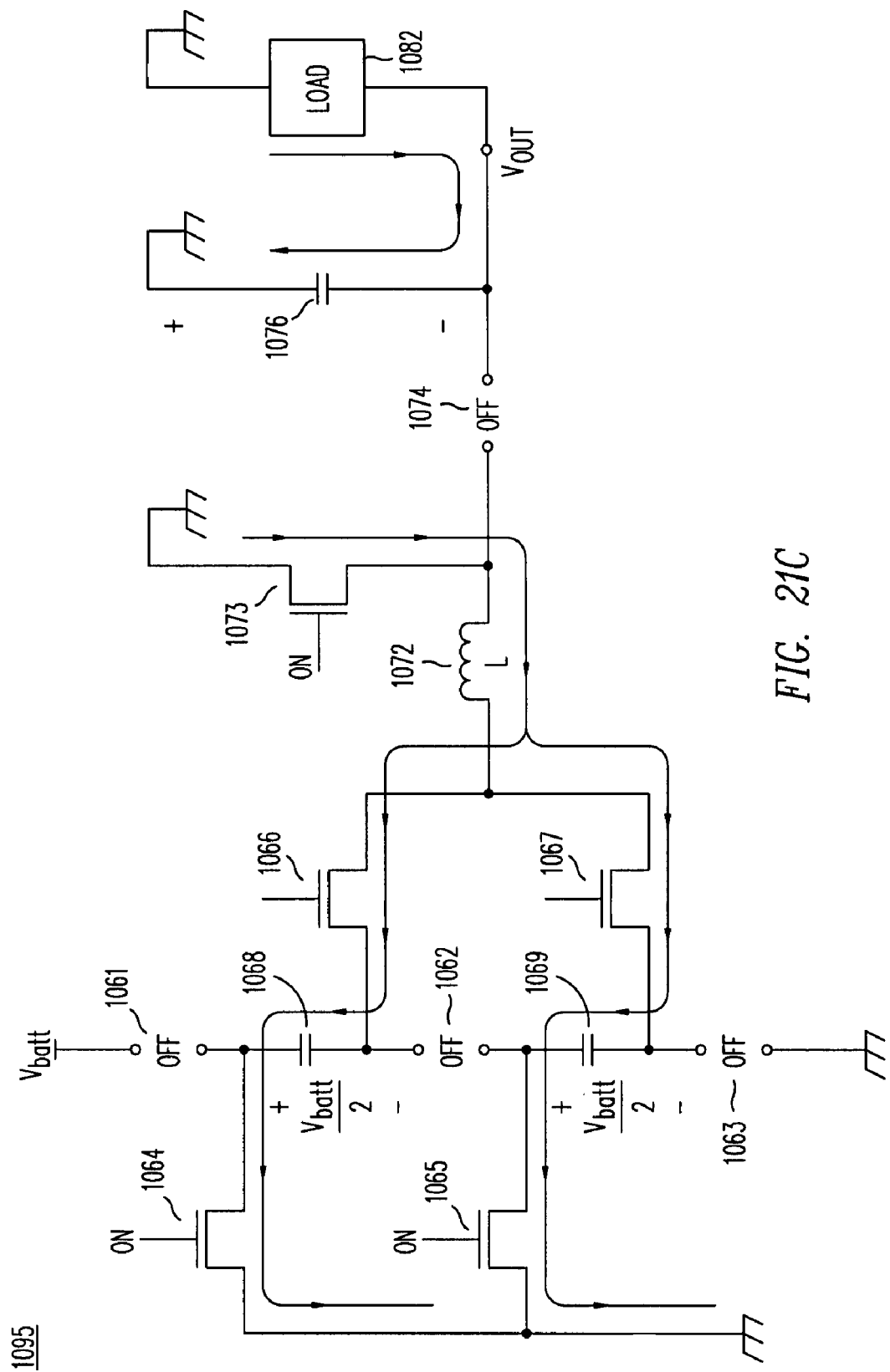
FIG. 21C is an equivalent circuit diagram of the −0.5× CLIU converter during the charging stage.

FIGS. 21B and 21C show that the operation of converter 1060 occurs in two alternating phases. In the charging and recirculating phase, shown in FIG. 21B, each of flying capacitors 1068 and 1069 is charged to substantially half the battery voltage, i.e. $V_{batt}/2$, through MOSFETs 1061, 1062, and 1063, while the current $I_L$ in inductor 1072 re-circulates through diode 1075, synchronous rectifier MOSFET 1074, output capacitor 1076, and the load 1082. The recirculation path is completed by capacitor 1070 and if the voltage at $V_y$ rises above ground, diode 1071 also conducts. MOSFETs 1064, 1065, 1066, 1067 and 1073 remain off in this phase of operation. The on-time of synchronous rectifier MOSFET 1074 may be shorter than the period when diode 1075 is conducting and control signals other than simply the gate drive of ground-connected MOSFET 1073 may be used to determine when it begins and ends.

In the second phase, shown in FIG. 21C, MOSFETs 1061, 1062, 1063 and 1074 are turned off and MOSFETs 1064, 1065, 1066, 1067 and 1063 are turned on to connect flying capacitors 1068 and 1069 to inductor 1072, thereby magnetizing inductor 1072. During this phase, output capacitor 1076 must supply load 1082. After a prescribed time, determined by the PWM controller 1079, converter 1060 reverts to the first phase.

Figure 21D:
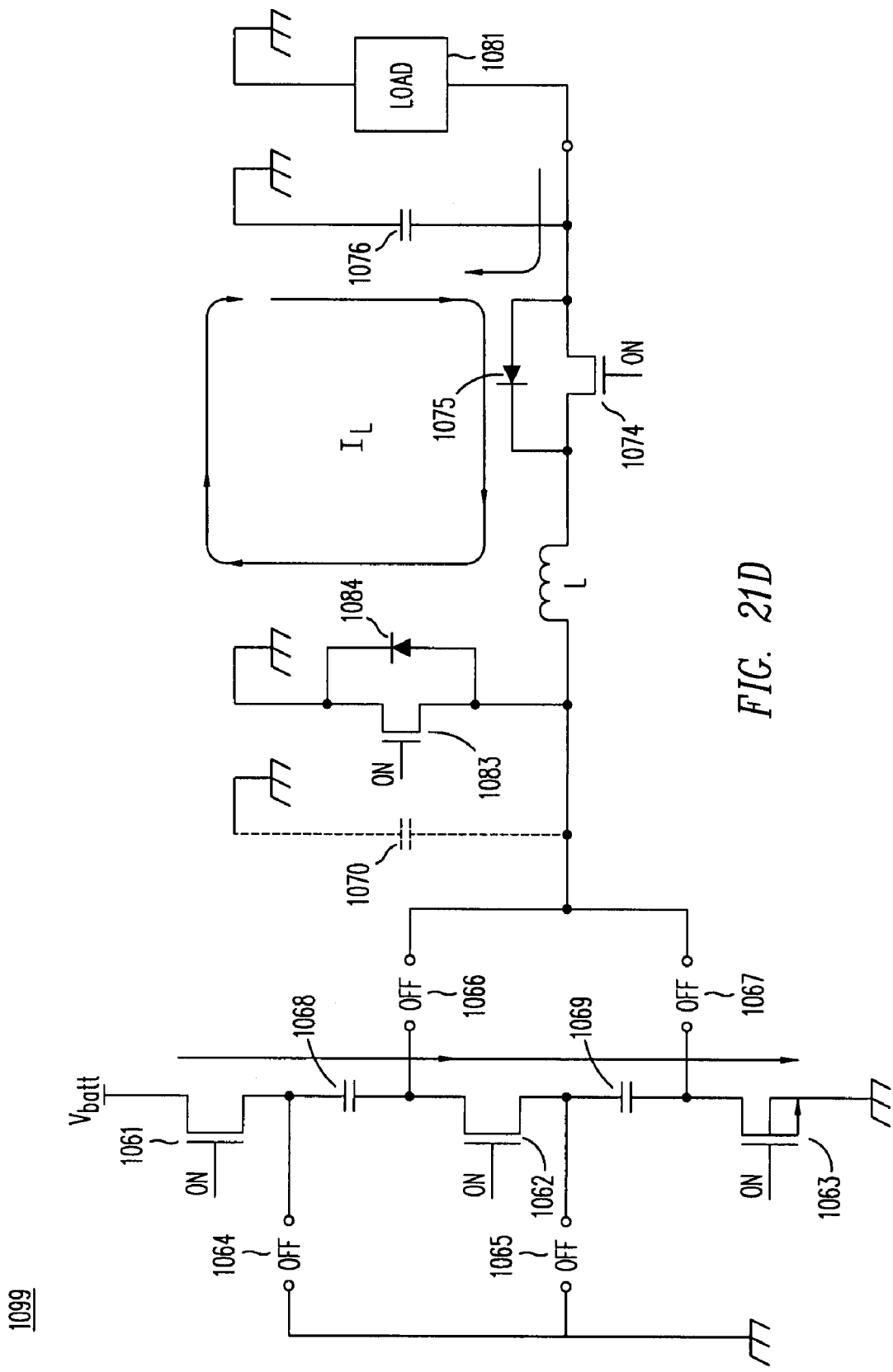
FIG. 21D is a circuit diagram of an alternative embodiment of a −0.5× CLIU converter with MOSFET circulation.

In an alternative embodiment, shown in circuit diagram 1099 of FIG. 21D, diode 1071 is replaced by MOSFET 1083 and diode 1084 which are timed to conduct whenever the voltage $V_y$ rises above ground.

Alternatively, the synchronous rectifier MOSFET 1074 and ground connected MOSFET 1073 may be switched in phase opposite to the charge pump MOSFETs 1061 through 1067, but this alternative may require a larger value of the capacitance C₁ of capacitor 1070. In another embodiment, the synchronous rectifier MOSFET 1074 is never turned off fully but only reduced to low current operation, in the range of a few microamperes to reduce noise, as described in the above-referenced application Ser. No. 11/890,947, filed contemporaneously herewith and incorporated herein by reference.

Inverting Boost Post-regulators: An alternative implementation of a CLXX type converter utilizes a boost post-regulator referenced to a negative supply rail to produce a voltage more positive than that rail. The resulting output voltage may be above or below ground, but it will be more positive than the negative supply rail to which the boost post-regulator is referenced. Since the boost post-regulator boosts voltage in an opposite direction to the charge pump and may even produce a positive output voltage, the post-regulator is also inverting. The resulting converter is referred to herein as a CLII converter.

A functional diagram of a LCII converter 830 is illustrated in FIG. 18B. Converter 830 includes pre-converter 830A which contains a $-1\times$ type charge pump 831 with a flying capacitor 832 and a filter capacitor 833. The output of charge pump 831 supplies a negative, i.e. below ground, intermediate voltage $V_y$ which in turn forms a negative supply rail and powers a step-up switched-inductor post-regulator 830B comprising an inductor 837, a $-V_y$ rail-connected MOSFET 835, a synchronous rectifier MOSFET 838 with an intrinsic rectifier diode 839, and an output capacitor 840. MOSFET 835 includes a P-N diode 836 which remains reverse biased since $V_y<0$ and $V_x>0$. In some cases, depending on the magnitude of capacitance C₁ of capacitor 833, a diode 834 is included to clamp the positive voltage range of $V_y$.

In converter 830, the negative supply rail to which the boost converter within post-regulator 830B is referenced is given by $V_y=-1 \cdot V_{batt}$. If the input powering the boost converter is defined as $V_{inb}$, then $V_{out}=[V_y+|V_{inb}|/(1-D)]$ or as $V_{out}=[-V_{batt}+|V_{inb}|/(1-D)]$. Theoretically any voltage $V_{inb}$ can power the boost converter to, e.g. $V_y$, $V_y/2$ or $V_{batt}+V_y/2$, but the most negative potential in the circuit is not ground—it is $V_y$ which in this application is equal to $-V_{batt}$.

One of the most convenient inputs is to power the boost stage between ground and the negative supply rail $V_y$, as shown in FIG. 18B, so that in the case of the $-1\times$-type LCII converter, $V_{inb}=V_{batt}$. Given that condition, so that $V_{out}=[V_y+|V_y|/(1-D)]$, then the voltage conversion ratio of the $-1\times$-type CLII converter is given by $$V_{out} = y + \frac{|V_y|}{1-D}$$

$$= -V_{batt} + \frac{|V_{batt}|}{1-D}$$

$$= V_{batt}\left(\frac{1}{1-D} - 1\right)$$

$$= V_{batt}\left(\frac{D}{1-D}\right)$$

yielding the transfer function $$\frac{V_{out}}{V_{batt}} = \frac{D}{1-D}$$

which evaluated over a range from 0% to 100% has a positive value of approximately 0 volts, i.e. ground, at duty factors approaching 0% and at duty factors approaching 100% grows exponentially.

Figure 24A:
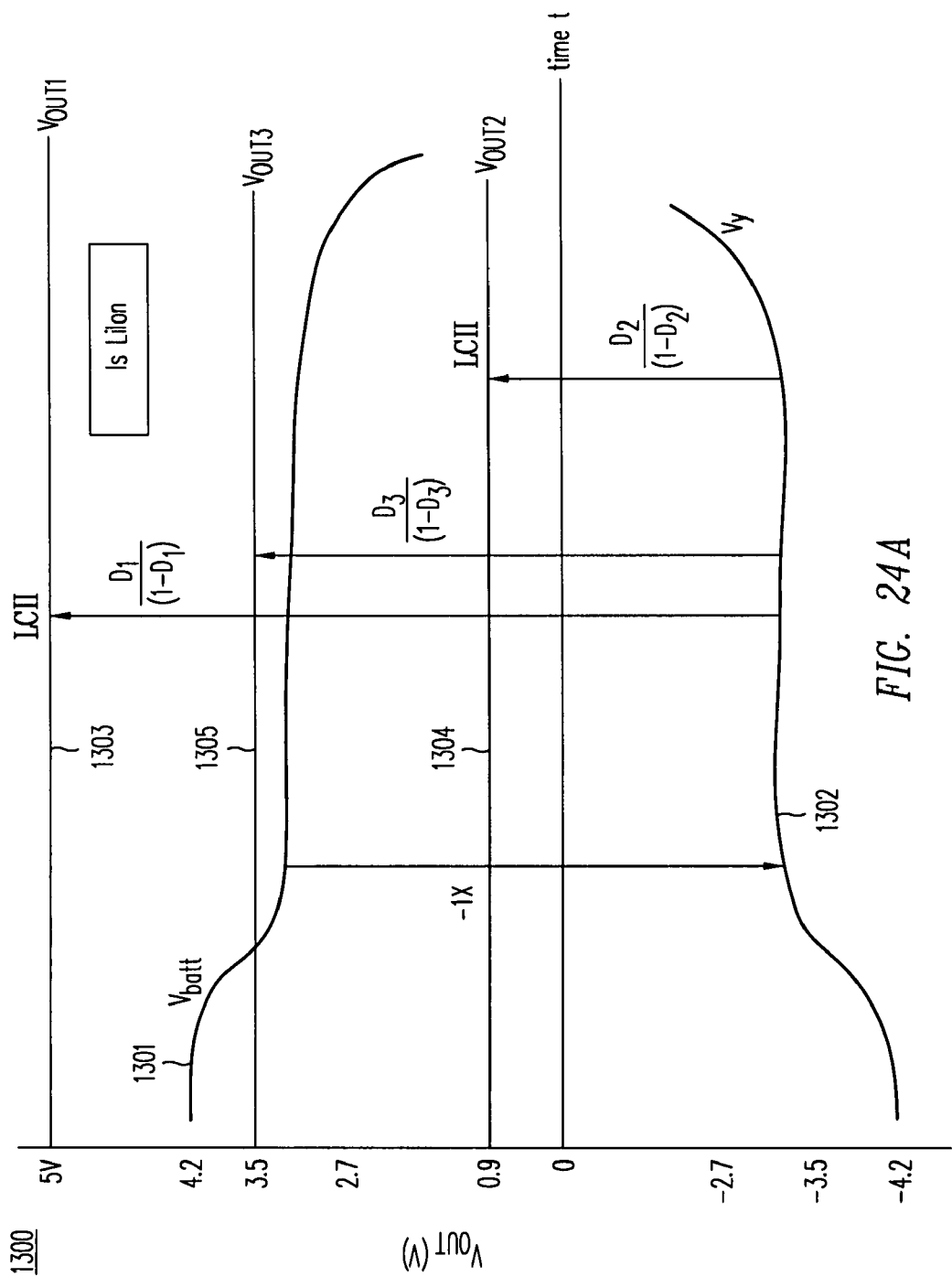
FIG. 24A is a graph showing the transfer characteristic of a −1× type CLII converter regulating a 1s LiIon battery.

FIG. 24A shows, for example, the discharge of the LiIon battery from 4.2V down to 2.7V along curve 1301. In the $-1\times$ type LCII inverter, a negative mirror image voltage $V_y$ of the battery input $V_{batt}$, shown by curve 1302, is then used to produce a positive output voltage. At a duty factor D₁, the output $V_{out1}$ is maintained by feedback at 5V, shown by curve 1303, a voltage greater than the battery's voltage range. By varying the duty factor to D2, feedback maintains the output $V_{out2}$ at +0.9V, shown by curve 1304, below the range of $V_{batt}$ (curve 1301). By varying the duty factor to D₃, a $V_{out3}$ at a voltage within the range of $V_{batt}$ is obtained (curve 1305).

Figure 24B:
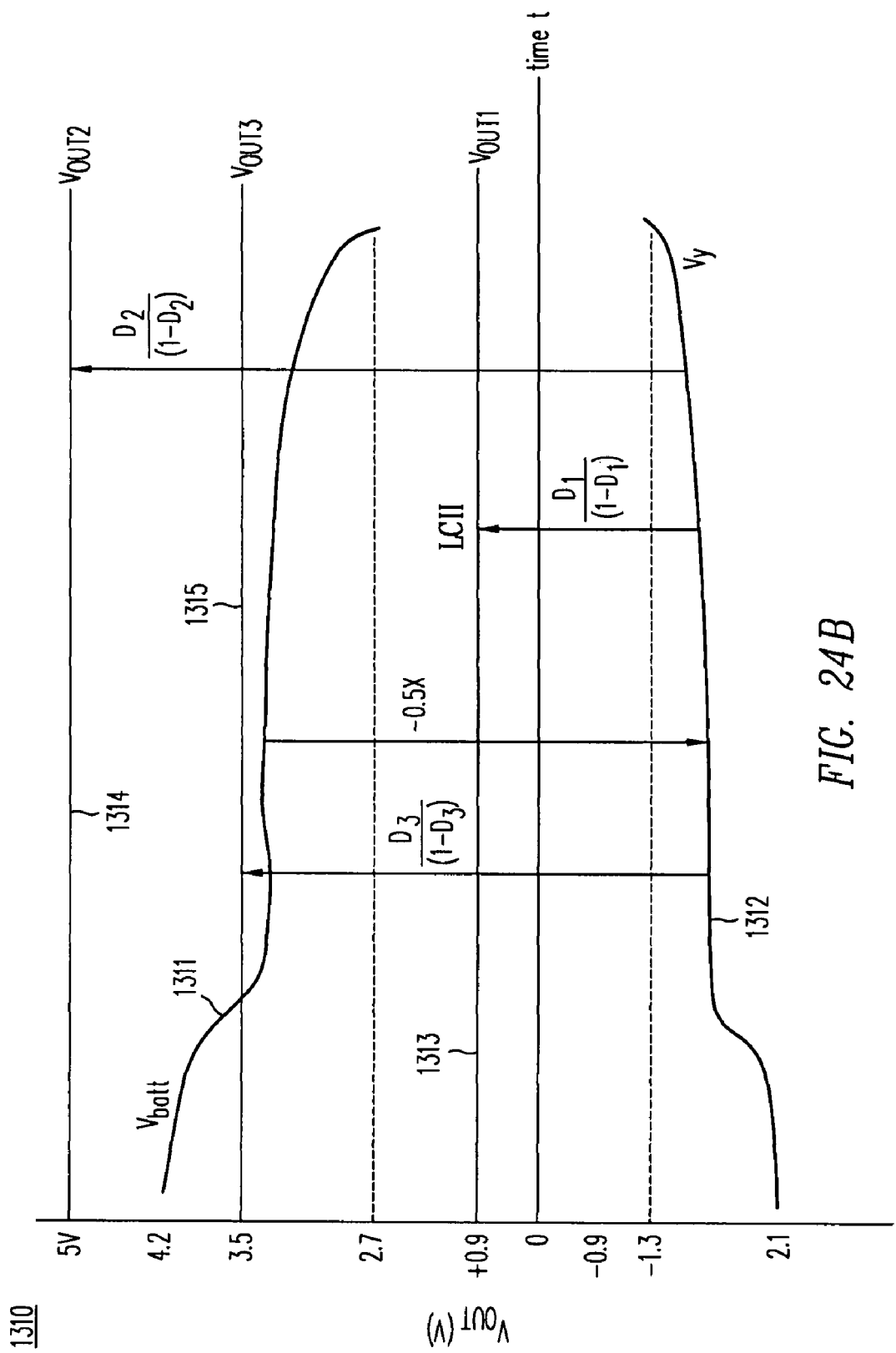
FIG. 24B is a graph showing the transfer characteristic of a −0.5× type CLII converter regulating a 1s LiIon battery.
Figure 24C:
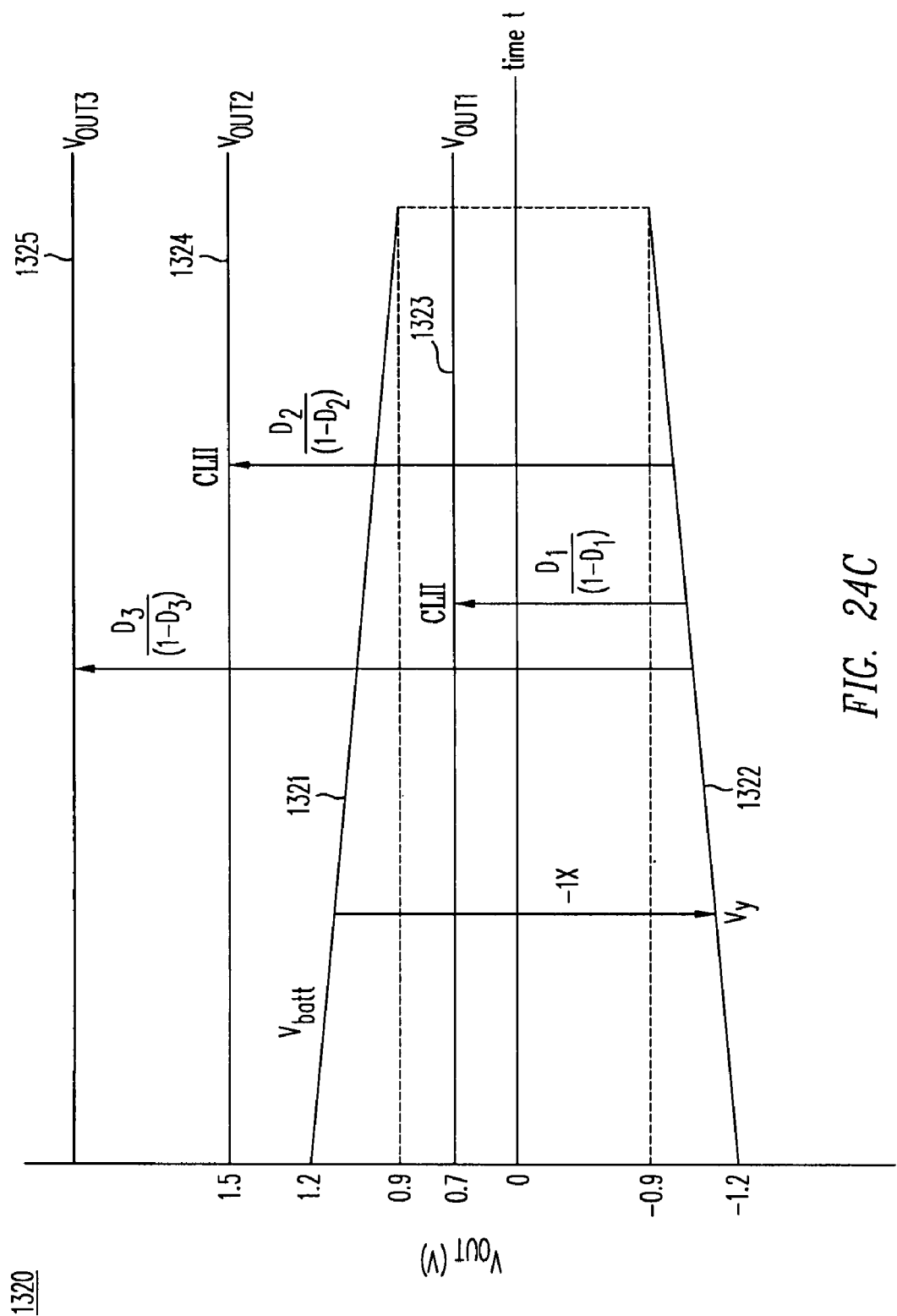
FIG. 24C is a graph showing the transfer characteristic of a −1× type CLII converter regulating a is NiMH battery.

FIG. 24C illustrates the use of a $-1\times$ CLII converter with a 1s NiMH dry cell. As shown the battery discharge (curve 1321) powers the $-1\times$ charge pump inverter to create a varying negative $V_y$ rail (curve 1322), a negative mirror image of the battery voltage. This rail is then used to power one of several possible up converters. At a duty factor D₁, feedback is used to maintain a $V_{out1}$ 1323 of 0.7V (curve 1323). At duty factor D₂, feedback is used to maintain a $V_{out2}$ of 1.5V (curve 1324). At duty factor D₃, feedback is used to maintain a $V_{out3}$ of 5V (curve 1325). One CLII converter is thus capable of operating over a wide range of conditions.

Figure 24D:
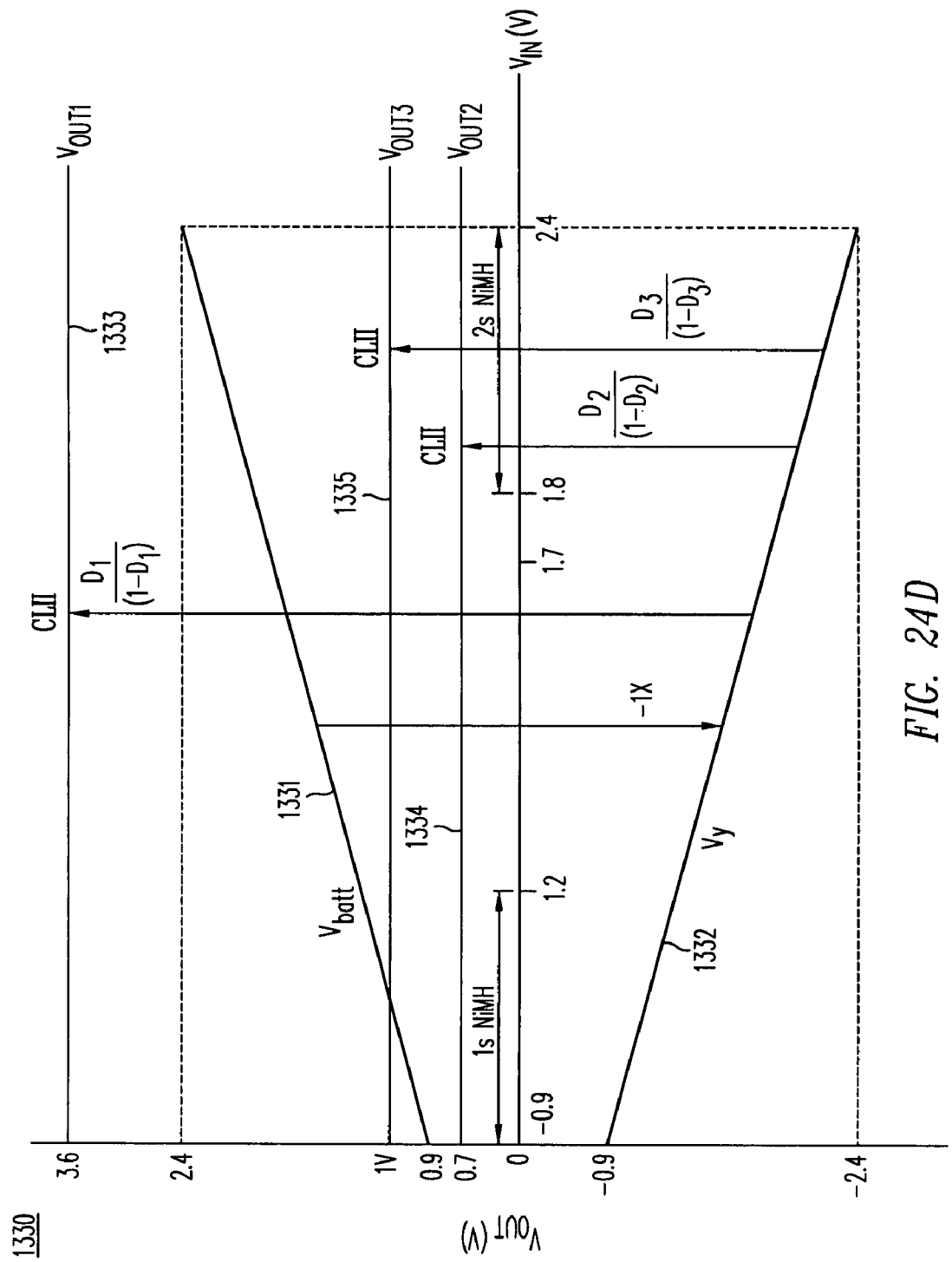
FIG. 24D is a graph showing the low voltage transfer characteristic of a −1× type CLII converter.
Figure 24E:
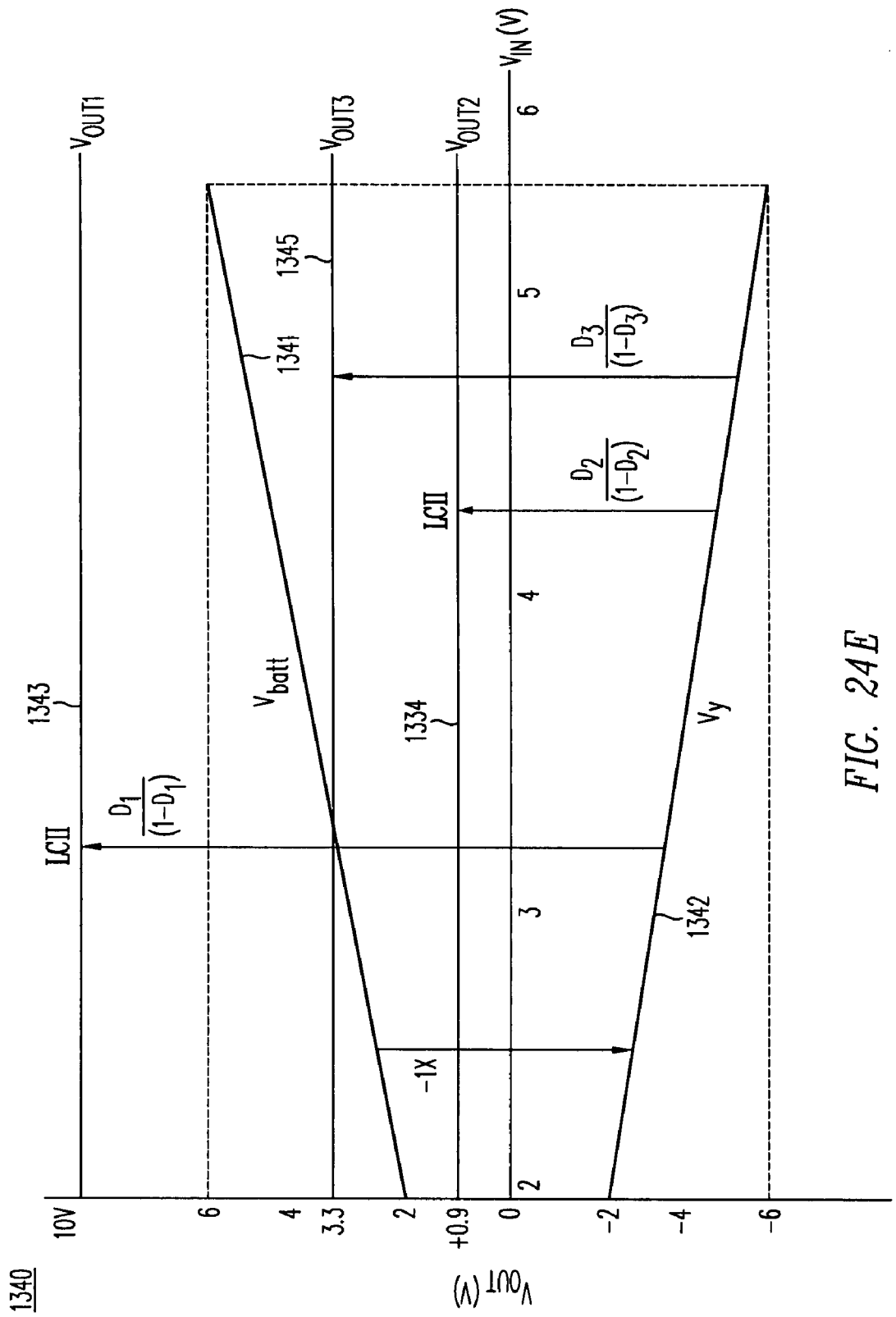
FIG. 24E is a graph showing the higher voltage transfer characteristic of a −1× type CLII converter.

The operating range of $-1\times$-type CLII converter 830 is also illustrated in FIGS. 24D and 24E. In graph 1330 of FIG. 24D, a range of input voltages from 0.9 to 2.4V, illustrated as curve 1331, is inverted by the charge pump pre-converter 830A to a voltage range shown by curve 1332. The range shown as curve 1332 is then used to power the boost post-regulator 830B to produce various output voltages. At a duty factor D₁, a $V_{out1}$, of 3.6V (curve 1333), a voltage above the battery input, is produced. At a duty factor D₂, a $V_{out2}$ of 0.7V (curve 01334), a voltage below the battery input, is produced. At a duty factor D₃, a $V_{out3}$ of 1.0V (curve 1335), a voltage within the battery input range, is produced.

Similarly, $-1\times$ LCII regulation for 2V to 5.5V inputs is illustrated in graph 1340 of FIG. 24E, where the battery input (curve 1341) is inverted by charge pump pre-converter 830A to a varying negative voltage rail $V_y$, shown by curve 1342. At a duty factor D₁, an output voltage $V_{out1}$ of 310V (curve 1343), a voltage above the input range, is produced. At a duty factor D₂, an output voltage $V_{out2}$ of 0.9V (curve 1344), a voltage well below the battery input, is produced. At a duty factor D₃, an output voltage $V_{out3}$ of 3.3V (curve 1344), a voltage within the specified battery input range is produced.

Figure 24F:
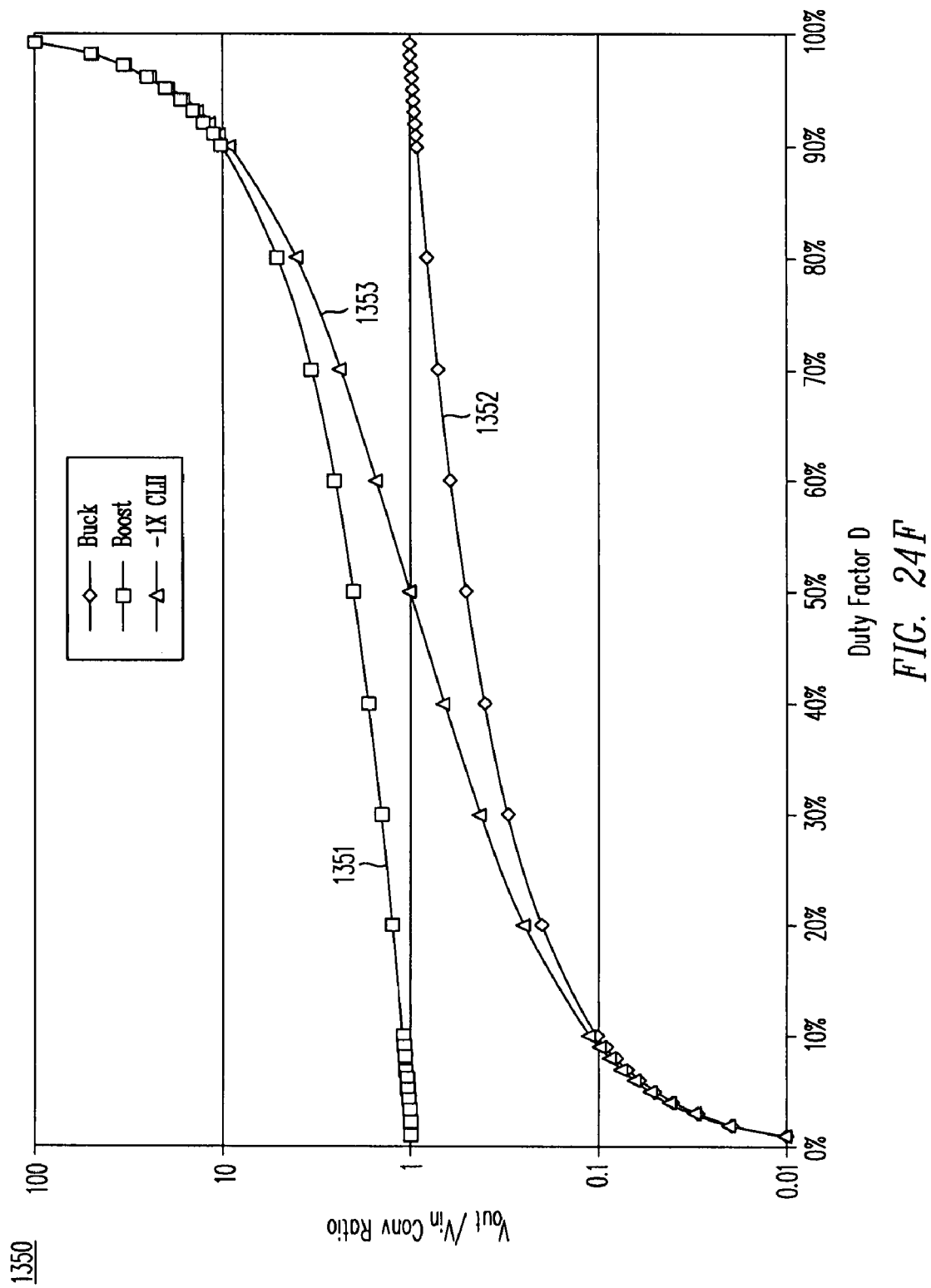
FIG. 24F is a graph showing the voltage conversion ratio $V_{out}/V_{in}$ as a function of duty factor for a −1× CLII converter.

Since the negative voltage produced by the charge pump is the voltage powering the boost post-regulator, and since a boost converter can only output a voltage greater than its input voltage, the minimum output voltage of the LCII converter is zero volts. But its maximum output voltage is limited only by its duty factor. Capable of output-to-input voltage conversion ratios less than and greater than unity, the LCII converter can be considered a special implementation of a down-up converter. This feature of the CLII converter is illustrated in graph 1350 of FIG. 24F by curve 1353, showing its ability to regulate at unity conversion ratios, a feature not available in boost converters (curve 1351) and Buck converters (curve 1352).

Figure 20A:
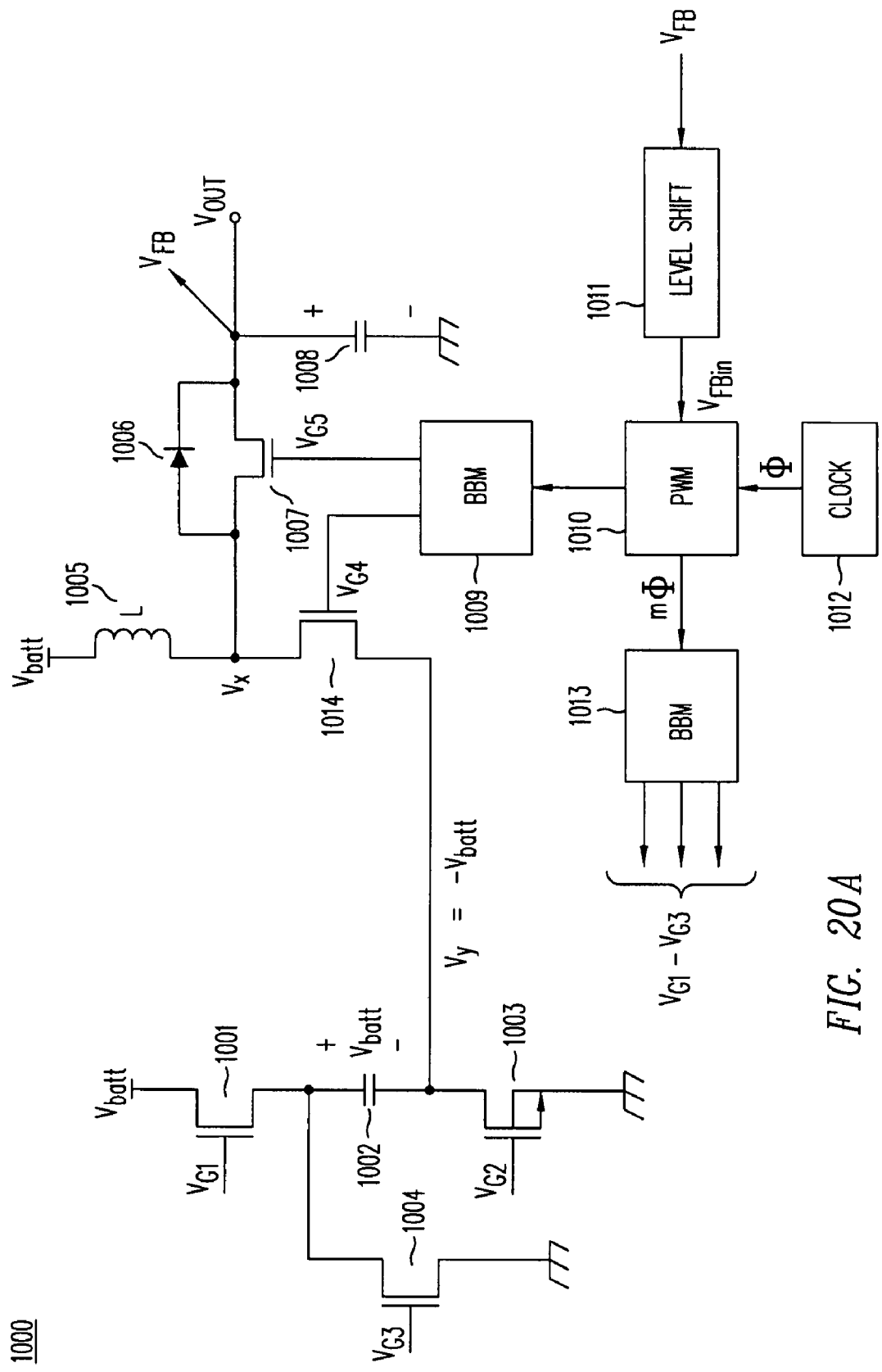
FIG. 20A is a circuit diagram of a −1× CLII converter.

A circuit diagram of a CLII converter 1000 using a $-1\times$-type pre-converter 1000A is shown in FIG. 20A. As shown, charge pump inverting pre-converter 1000A includes MOSFETs 1001, 1003, and 1004 and a flying capacitor 1002 and provides an intermediate negative output voltage $V_y=-V_{batt}$. Intermediate voltage $V_y$ is connected to a MOSFET 1014 in an inverting boost-type post-regulator 1000B with a ground-connected inductor 1005, a floating synchronous rectifier MOSFET 1007 with an intrinsic P-N diode 1006 and an output capacitor 1008 driving the load.

Post-regulator 1000B is controlled by a PWM controller 1010 driving MOSFET 1014 in response to the feedback signal $V_{FB}$ from the output terminal of converter 1000, level shifted to the appropriate value $V_{FBin}$ by a level shift circuit 1011. The level shift circuit 1011 is needed to convert the output voltage $V_{out}$ to a voltage within the range of PWM controller 1010. One convenient method to implement level shift circuit 1010 involves a current mirror. The implementation of various feedback circuits is described in the above-referenced application Ser. No. 11/890,818.

As shown in FIG. 20A, a clock and ramp generator 1012 is used to switch PWM controller 1010 at a frequency Φ and is used to drive the charge pump MOSFETs 1001, 1003, and 1004 at a frequency m·Φ, which may be higher or lower than the switching frequency used to drive post-regulator 1000B. In a preferred embodiment m=1 and charge pump pre-converter 1000A and switched inductor post-regulator 1000B are clocked at the same frequency and synchronized to the same clock. A BBM circuit 1013 provides the gate drive and necessary level shifting to generate the gate voltages $V_{G1}$ to $V_{G3}$ of the charge pump MOSFETs 1001, 1003, and 1004, respectively. A BBM circuit 1009 drives MOSFET 1014 and synchronous rectifier MOSFET 1007 in accordance with PWM controller 1010, preventing significant shoot-through conduction, i.e. simultaneous conduction in both MOSFET 1007 and MOSFET 1014, to prevent damage to and improve the efficiency of converter 1000.

Figure 20B:
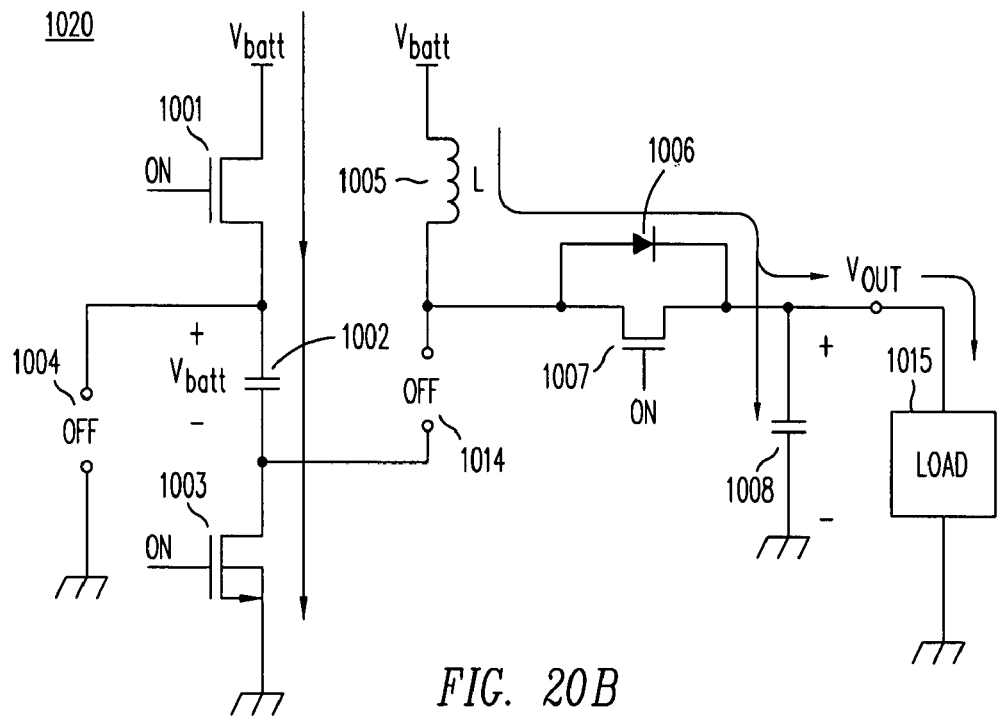
FIG. 20B is an equivalent circuit diagram of the −1× CLII converter during the charging stage.
Figure 20C:
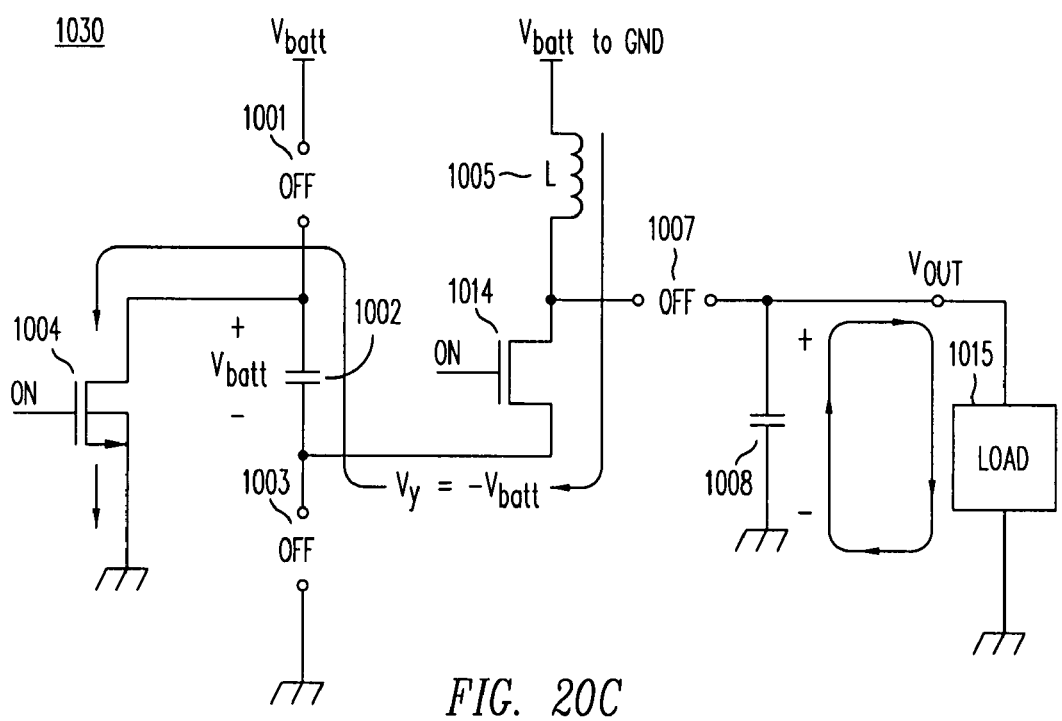
FIG. 20C is an equivalent circuit diagram of the −1× CLII converter during the magnetizing and discharging stage.

FIGS. 20B and 20C show that the operation of converter 1000 occurs in two alternating phases. In the charging and recirculating phase, shown in FIG. 20B, flying capacitor 1002 is charged to substantially the full battery voltage Vbatt through MOSFETs 1001 and 1003, while the current $I_L$ in inductor 1005 re-circulates through diode 1006, the on-state synchronous rectifier MOSFET 1007, output capacitor 1008, and load 1015. The recirculation path is completed by capacitor 1008. MOSFET remains off in this phase of operation. The on-time of synchronous rectifier MOSFET 1007 may be shorter than the entire period when diode 1006 is conducting and control signals other than simply the gate drive of ground connected MOSFET 929 may determine when it begins and ends.

In the second phase, shown in FIG. 20C, MOSFETs 1001, 1003 and 1007 are turned off and MOSFETs 1004 and 1014 are turned on to connect flying capacitor 1002 to inductor 1005, thereby magnetizing inductor 1005. During this phase, output capacitor 1008 must supply load 1015. After a prescribed time determined by the PWM controller 1010, converter 1000 reverts to the first phase.

Alternatively the synchronous rectifier MOSFET 1007 and $V_y$-connected MOSFET 1014 may be switched in a phase opposite to that of the charge pump MOSFETs 1001, 1003, and 1003, but this alternative may require that a capacitor be connected between the node $V_y$ and ground. In another embodiment the synchronous rectifier MOSFET 1007 is never turned off fully but only reduced to low current operation, in the range of a few microamperes to reduce noise, as described in the above-referenced application Ser. No. 11/890,947.

Another LCII converter 890 is illustrated in functional blocks in FIG. 18D. Converter 890 includes a pre-converter 890A containing a −0.5× fractional type charge pump 891 with flying capacitors 892 and 893 and a filter capacitor 894. The output of charge pump 891 supplies a negative, i.e. below ground, intermediate voltage $V_y$, which in turn forms a negative supply rail and powers a step-up switched-inductor post-regulator 890B, which includes a MOSFET 896 connected between an inductor 898 and $-V_y$, a synchronous rectifier MOSFET 900 with an intrinsic diode 899, and an output capacitor 901. MOSFET 896 includes a P-N diode 897 which remains reverse biased since $V_y<0$ and $V_x>0$. In some cases, depending on the magnitude of capacitance $C_1$ of capacitor 894, a diode 895 is included to clamp the positive voltage range of $V_y$. While any input voltage may be used to power the boost converter, FIG. 18D illustrates a case where the input voltage is equal to the positive polarity of the $V_y$ supply rail. The transfer characteristic for such a converter is $$\frac{V_{out}}{V_{batt}} = \frac{0.5 \cdot D}{1-D}$$

a ratio that that of the −1× CLII converter described previously.

The operation of −0.5× type CLII converter 890 is illustrated by graph 1310 in FIG. 24B, where a LiIon battery voltage ranging from 4.2V to 2.7V (curve 1311) is inverted by a −0.5× type fractional charge pump to produce a varying $V_y$ negative supply rail (curve 1312). At a duty factor $D_1$, a $V_{out1}$ of +0.9V (curve 1313), a voltage below the battery, is produced. At a duty factor $D_2$, a $V_{out2}$ of 5V (curve 1314), a voltage well above the battery input, is produced. At a duty factor $D_3$, a $V_{out3}$ of 3.3V (curve 1315), a voltage within the LiIon battery input range, is produced.

Figure 24G:
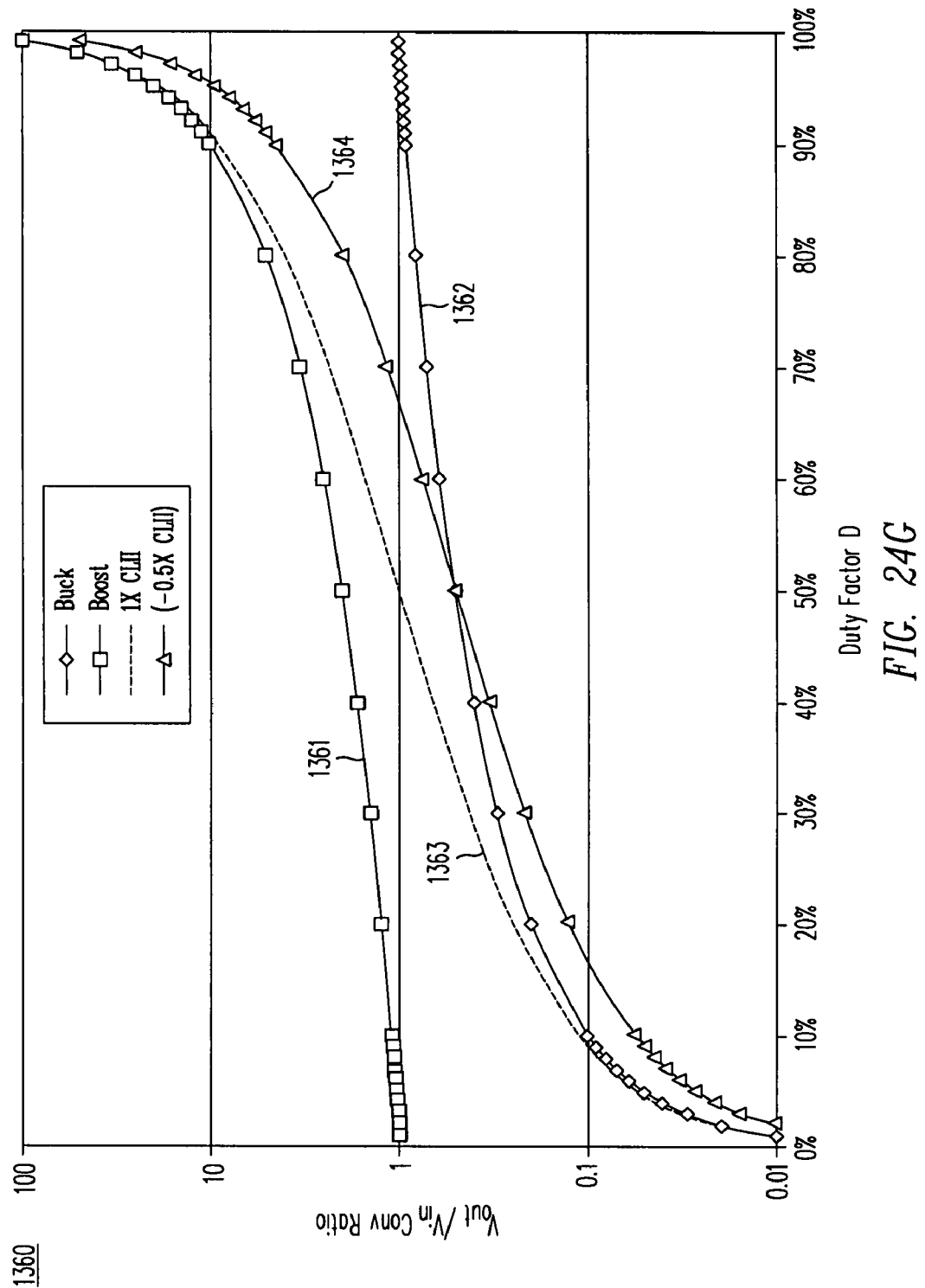
FIG. 24G is a graph showing the voltage conversion ratio $V_{out}/V_{in}$ as a function of duty factor for a −0.5× CLII converter.

The −0.5× CLII converter 890 is also capable of output to input voltage conversion ratios less than and greater than unity, and can therefore be considered a special implementation of a down-up converter. This feature of the CLII converter is illustrated in graph 1360 of FIG. 24G by curve 1364 showing its ability to regulate at unity conversion ratios, a feature not available a in boost converter (curve 1361) or a Buck converter (curve 1362). The conversion ratios for a −1×-type CLII converter (curve 1363) is included as a reference.

Figure 22A:
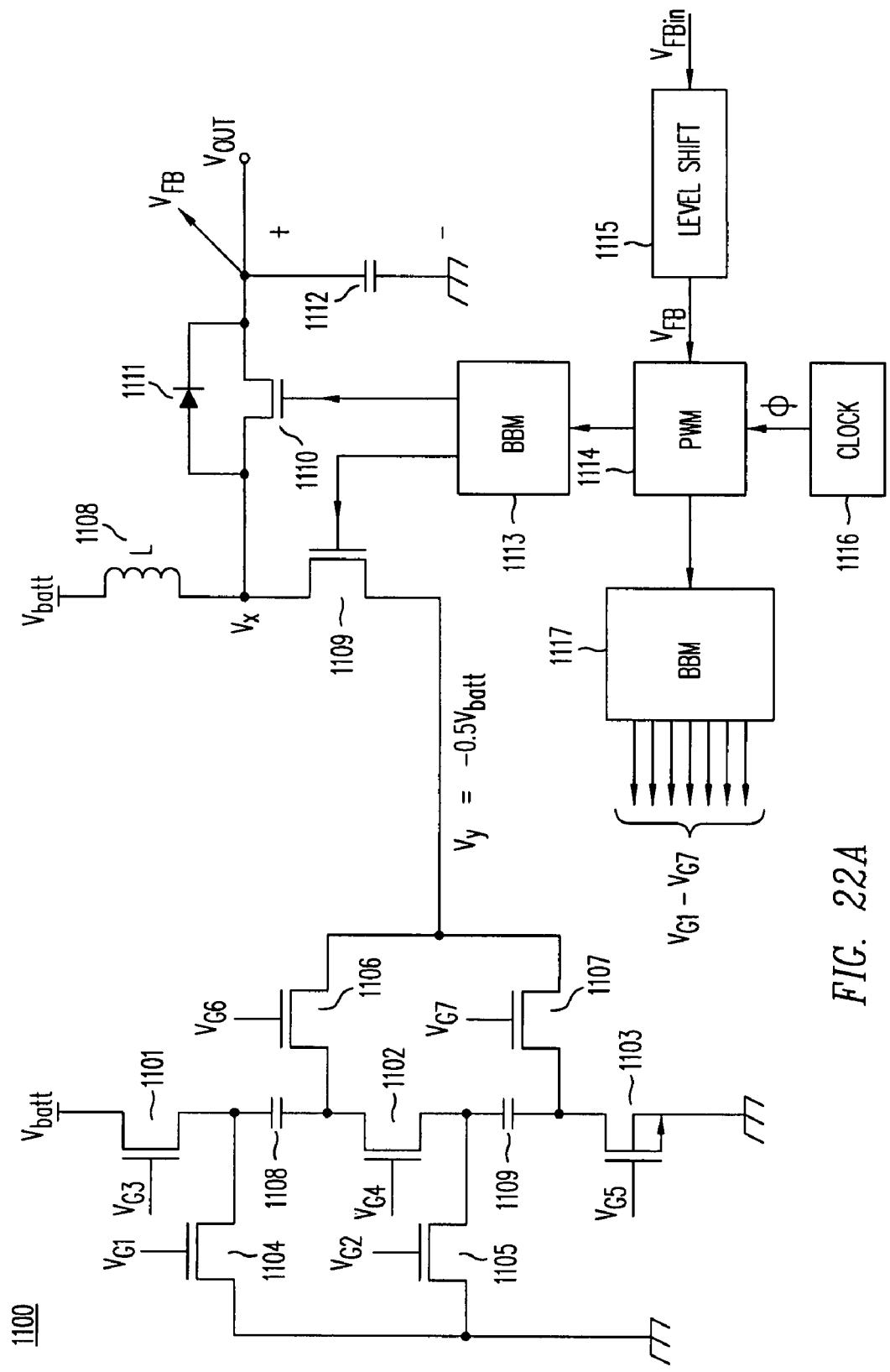
FIG. 22A is a circuit diagram of a −0.5× CLII converter.

A circuit diagram of a CLIU converter 1100 using a −0.5×-type pre-converter 1100A is shown in FIG. 22A. As shown, charge pump inverting pre-converter 1100A includes MOSFETs 1101, 1102, 1103, 1104, 1105, 1106, and 1107 and flying capacitors 1108 and 1109 and provides an intermediate negative output voltage $V_y=-0.5V_{batt}$. Intermediate voltage $V_y$ is connected to a MOSFET 1119 of an inverting boost-type post-regulator 1100B with a $V_{batt}$-connected inductor 1118, a floating synchronous rectifier MOSFET 1110 with an intrinsic P-N diode 1111 and an output capacitor 1112 driving the load.

Post-regulator 1100B is controlled by a PWM controller 1114 driving MOSFET 1119 in response to the feedback signal $V_{FB}$ from the output terminal of converter 1100, level shifted to the appropriate value $V_{FBin}$ by a level shift circuit 1115. The level shift circuit 1115 is needed to convert the output voltage $V_{out}$ to a voltage within the range of PWM controller 1114. One convenient method to implement level shift circuit 1114 involves a current mirror. The implementation of various feedback circuits is described in the above-referenced application Ser. No. 11/890,818.

As shown in FIG. 22A, a clock and ramp generator 1116 is used to switch PWM controller 1114 at a frequency Φ and is used to drive the charge pump MOSFETs 1101, 1102, 1103, 1104, 1105, 1106, and 1107 at a frequency m·Φ, which may be higher or lower than the switching frequency used to drive post-regulator 1100B. In a preferred embodiment m=1 and charge pump pre-converter 1100A and switched inductor post-regulator 1100B are clocked at the same frequency and synchronized to the same clock. A BBM circuit 1117 provides the gate drive and necessary level shifting to generate the gate voltages $V_{G1}$ to $V_{G7}$ of the charge pump MOSFETs 1101, 1102, 1103, 1104, 1105, 1106, and 1107, respectively. A BBM circuit 1113 drives MOSFET 1119 and synchronous rectifier MOSFET 1110 in accordance with PWM controller 1114, preventing significant shoot-through conduction, i.e. simultaneous conduction in both MOSFET 1119 and MOSFET 1110, to prevent damage to and improve the efficiency of converter 1100.

Figure 22B:
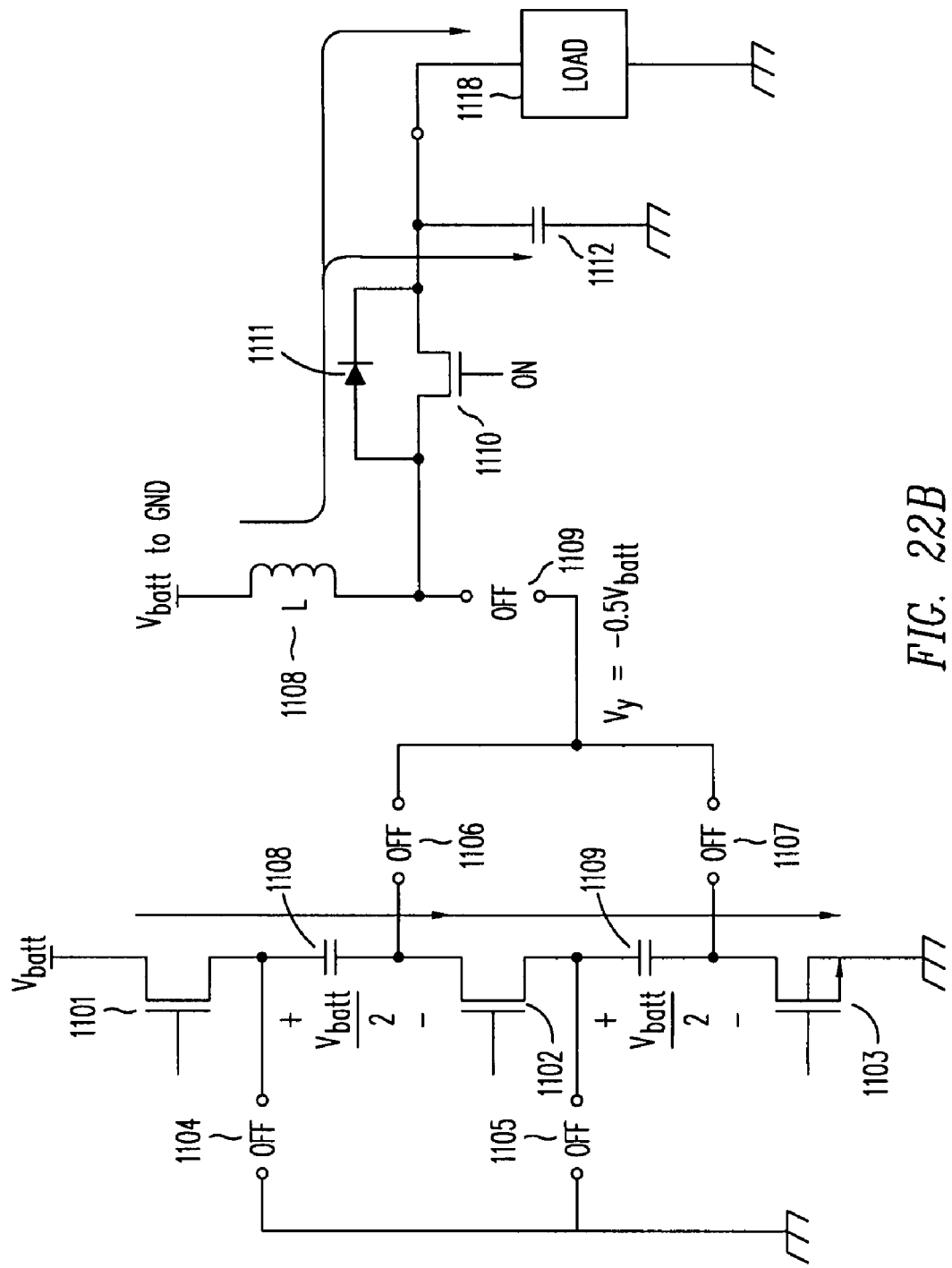
FIG. 22B is an equivalent circuit diagram of the −0.5× CLII converter during the charging stage.
Figure 22C:
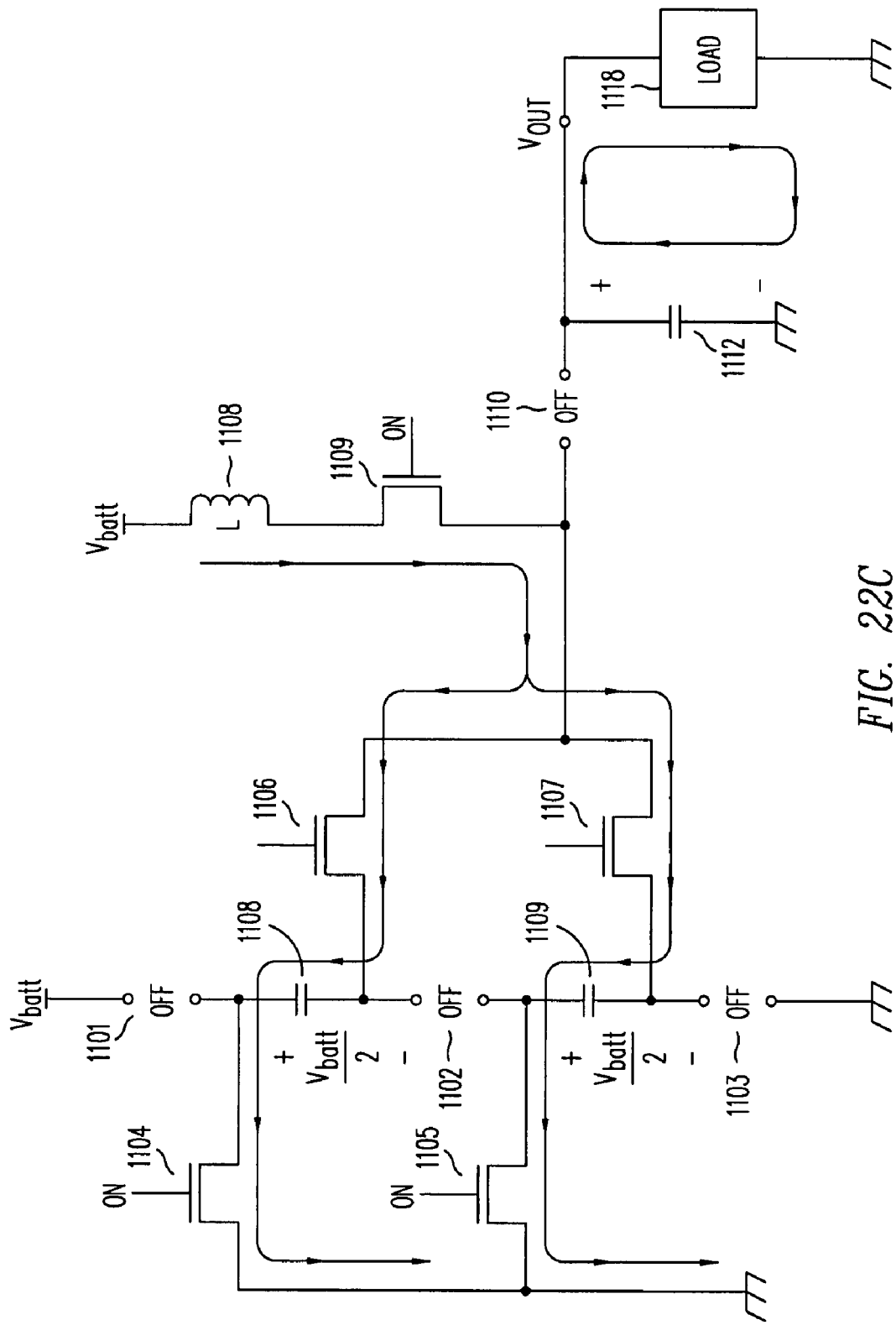
FIG. 22C is an equivalent circuit diagram of the −0.5× CLII converter during the magnetizing and discharging stage.

FIGS. 22B and 22C show that the operation of converter 1100 occurs in two alternating phases. In the charging and recirculating phase, shown in FIG. 22B, each of flying capacitors 1108 and 1109 is charged to substantially one-half the battery voltage Vbatt through MOSFETs 1101, 1102 and 1103, while the current $I_L$ in inductor 1118 re-circulates through diode 1111, the on-state synchronous rectifier MOSFET 1110, output capacitor 1112, and load 1120. MOSFETs 1104, 1105, 1106, 1107 and 1119 remain off in this phase of operation. The on-time of synchronous rectifier MOSFET 1110 may be shorter than the entire period when diode 1111 is conducting and control signals other than simply the gate drive of MOSFET 1110 may determine when it begins and ends.

In the second phase, shown in FIG. 22C, MOSFETs 921, 923 and 932 are turned off and MOSFETs 1104, 1105, 1106, 1107 and 1119 are turned on to connect flying capacitors 1108 and 1109 to inductor 1118, thereby magnetizing inductor 1118. During this phase, output capacitor 1112 must supply load 1120. After a prescribed time determined by the PWM controller 1114, converter 1100 reverts to the first phase.

Alternatively the synchronous rectifier MOSFET 1110 and MOSFET 1119 may be switched in a phase opposite to that of the charge pump MOSFETs 1101, 1102, 1103, 1104, 1105, 1106, and 1107, but this alternative may require a capacitor to be connected to node $V_y$. In another embodiment the synchronous rectifier MOSFET 1110 is never turned off fully but only reduced to low current operation, in the range of a few microamperes to reduce noise, as described in the above-referenced application Ser. No. 11/890,947.

CONCLUSION

The family of CLXX converters is capable of producing a well regulated output for a wide range of output to input voltage conversion ratios. These various CLXX topologies are illustrated during their discharge phase in FIGS. 25A-25G.

Figure 25A:
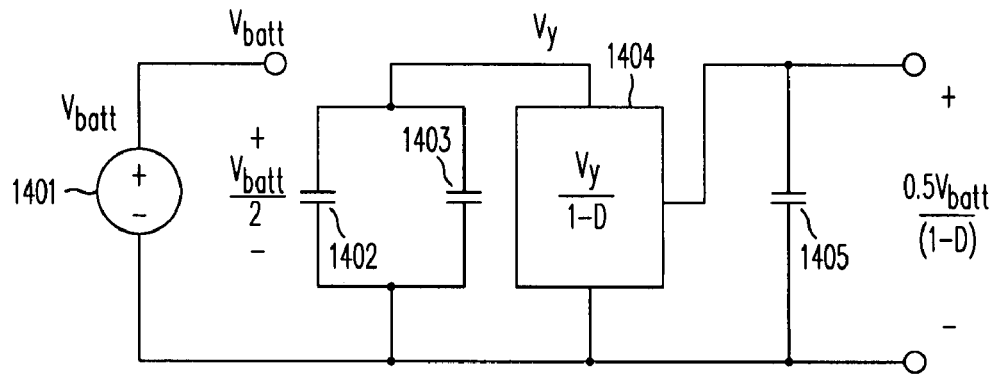
FIG. 25A shows an equivalent circuit diagram of a 0.5× CLDU converter during discharge.

In the 0.5×-type fractional CLDU converter 1400 of FIG. 25A, the input voltage from a battery 1401 is used to repeatedly charge two flying capacitors 1402 and 1403 to a voltage $+V_{batt}/2$ to produce an intermediate voltage $V_y$ equal to $V_{batt}/2$. The intermediate voltage $V_y$ is then used to magnetize a switched inductor in a boost converter 1404 to step up $V_y$ by a factor of $1/(1-D)$. The resulting output voltage is given by $+0.5 \cdot V_{batt}/(1-D)$, and converter 1400 is capable of down-up operation and voltage regulation at unity voltage conversion ratios.

Figure 25B:
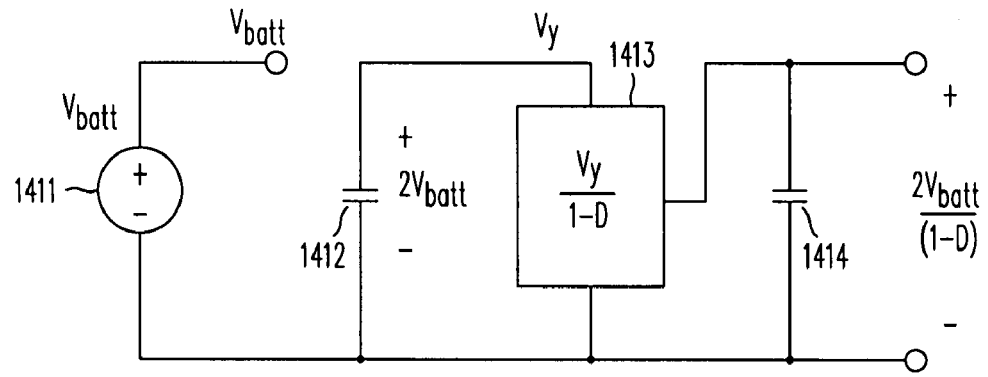
FIG. 25B shows an equivalent circuit diagram of a 2× CLUU converter during discharge.

In the 2×-type CLUU converter 1410 of FIG. 25B, the input voltage from a battery 1411 is used to repeatedly charge one flying capacitor 1412 to a voltage $+V_{batt}$ to produce an intermediate voltage $V_y$ equal to $2 \cdot V_{batt}$. The intermediate voltage $V_y$ is then used to magnetize a switched inductor in a boost converter 1413 to step up $V_y$ by a factor of $1/(1-D)$. The resulting output voltage is given by $+2 \cdot V_{batt}/(1-D)$, and converter 1410 is capable of up-up voltage regulation with extreme voltage conversion ratios at moderate duty factors.

Figure 25C:
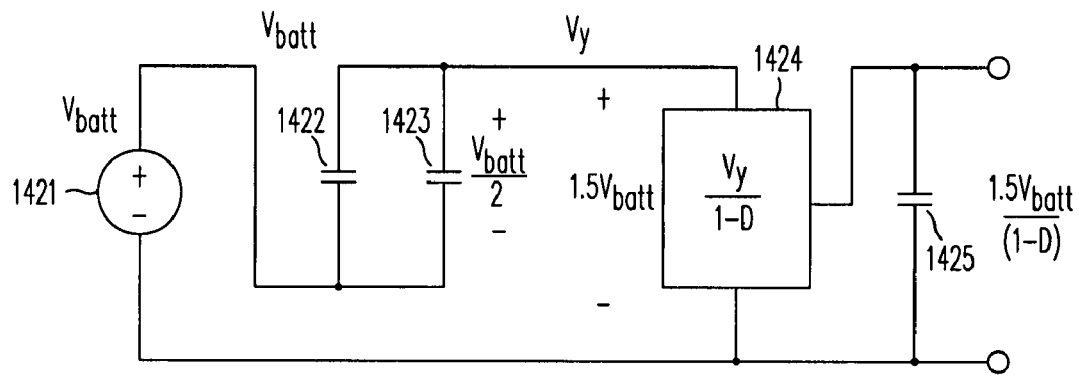
FIG. 25C shows an equivalent circuit diagram of a 1.5× CLUU converter during discharge.

In the 1.5×-type fractional CLUU converter 1420 of FIG. 25C, the input voltage from a battery 1421 is used to repeatedly charge two flying capacitors 1422 and 1423 to a voltage $+V_{batt}/2$ to produce an intermediate voltage $V_y$ equal to $1.5 \cdot V_{batt}$. The intermediate voltage $V_y$ is then used to magnetize a switched inductor in a boost converter 1424 to step up $V_y$ by a factor of $1/(1-D)$. The resulting output voltage is given by $+1.5 \cdot V_{batt}/(1-D)$, and converter 1420 is capable of up-up voltage regulation with extreme voltage conversion ratios at moderate duty factors.

Figure 25D:
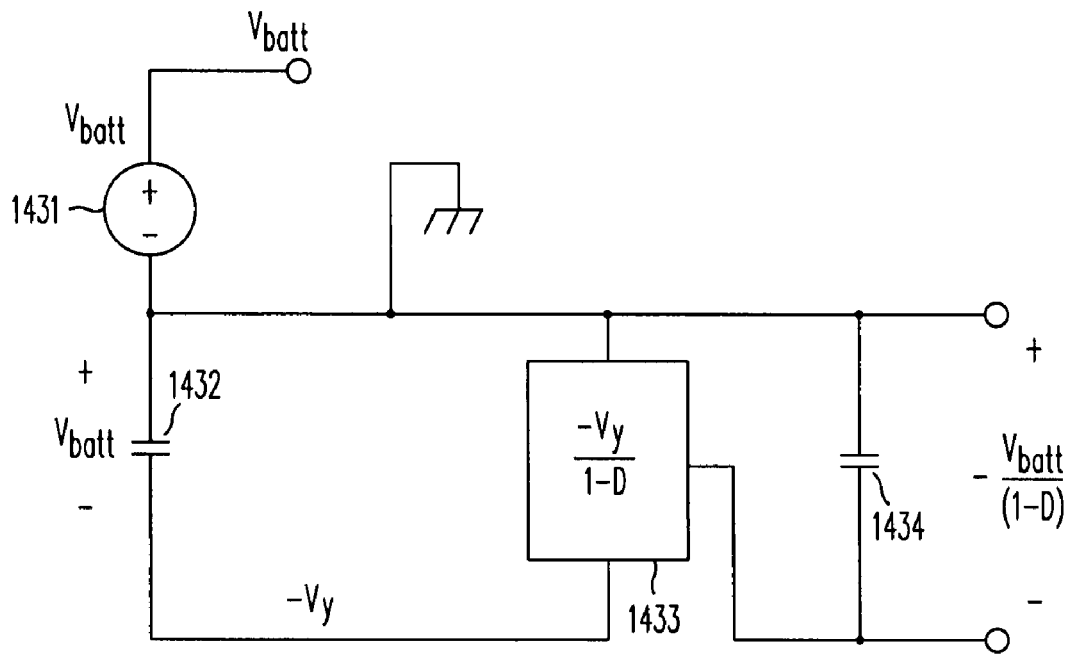
FIG. 25D shows an equivalent circuit diagram of a −1× CLIU converter during discharge.

In the −1×-type CLID converter 1430 of FIG. 25D, the input voltage from a battery 1431 is used to repeatedly charge one flying capacitor 1432 to a voltage $+V_{batt}$ to produce an inverted intermediate voltage $V_y$ equal to $-V_{batt}$. The intermediate voltage $V_y$ is then used to magnetize a switched inductor in a non-inverting boost converter 1433 to increase the magnitude of $V_y$ by a factor of $1/(1-D)$ without changing its polarity, i.e. to make a larger negative voltage. The resulting output voltage is given by $-V_{batt}/(1-D)$, and converter 1430 is capable of inverted step-up voltage regulation with extreme negative voltage conversion ratios at moderate duty factors.

Figure 25E:
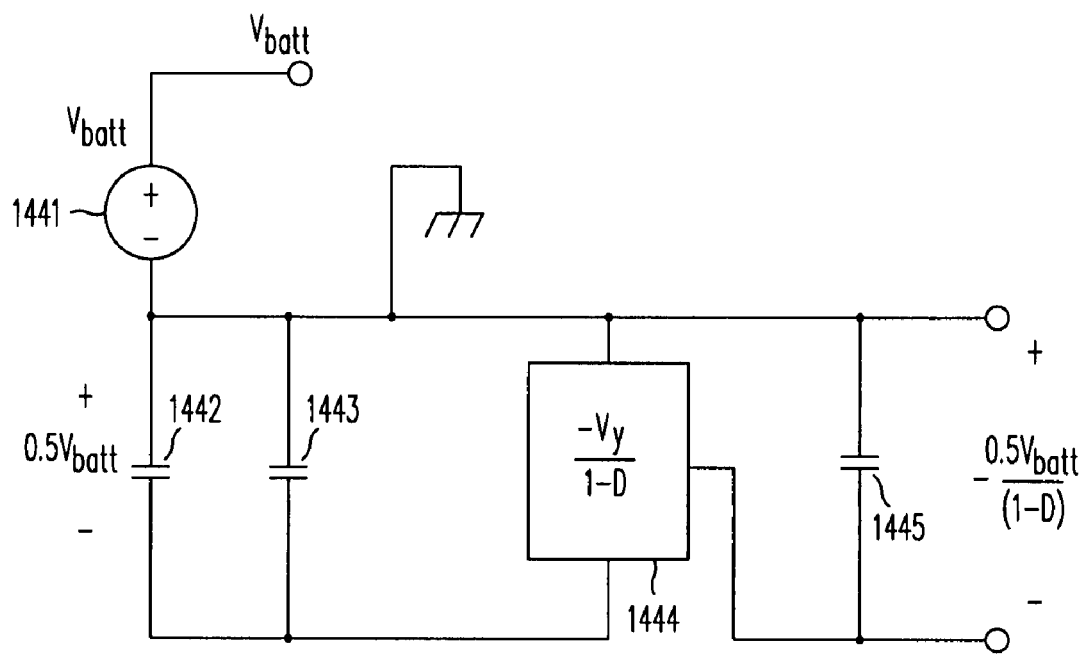
FIG. 25E shows an equivalent circuit diagram of a −0.5× CLIU converter during discharge.

In the −0.5×-type inverting fractional CLDU converter 1440 of FIG. 25E, the input voltage from a battery 1441 is used to repeatedly charge two flying capacitors 1442 and 1443 to a voltage $+V_{batt}/2$ to produce an intermediate voltage $V_y$ equal to $-V_{batt}/2$. The intermediate voltage $V_y$ is then used to magnetize a switched inductor in a boost converter 1444 to increase the magnitude of $V_y$ by a factor of $1/(1-D)$ without changing its polarity, i.e. to make a larger negative voltage. The resulting output voltage is given by $-0.5 \cdot V_{batt}/(1-D)$, and converter 1440 is capable of inverted step-up voltage regulation with extreme negative voltage conversion ratios at moderate duty factors.

Figure 25F:
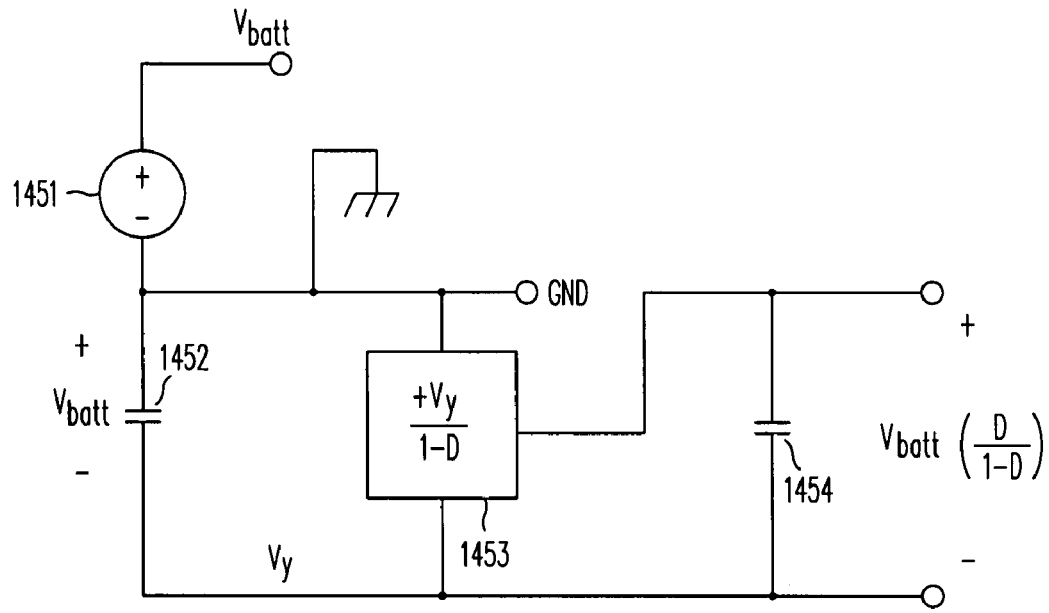
FIG. 25F shows an equivalent circuit diagram of a −1× CLII converter during discharge.

In the −1×-type double inverting CLII converter 1450 of FIG. 25F, the input voltage from a battery 1431 is used to repeatedly charge one flying capacitor 1452 to a voltage $+V_{batt}$ to produce an inverted intermediate voltage $V_y$ equal to $-V_{batt}$. The intermediate voltage $V_y$ is then used as a negative supply rail and to magnetize a switched inductor in a non-inverting boost converter 1453 to increase the magnitude of $V_y$ by a factor of $1/(1-D)$ without changing its polarity, i.e. to make a larger positive voltage. The resulting output voltage is given by $V_{batt}[D/(1-D)]$, and converter 1450 is capable of above ground up-down voltage conversion and voltage regulation at unity voltage ratios.

Figure 25G:
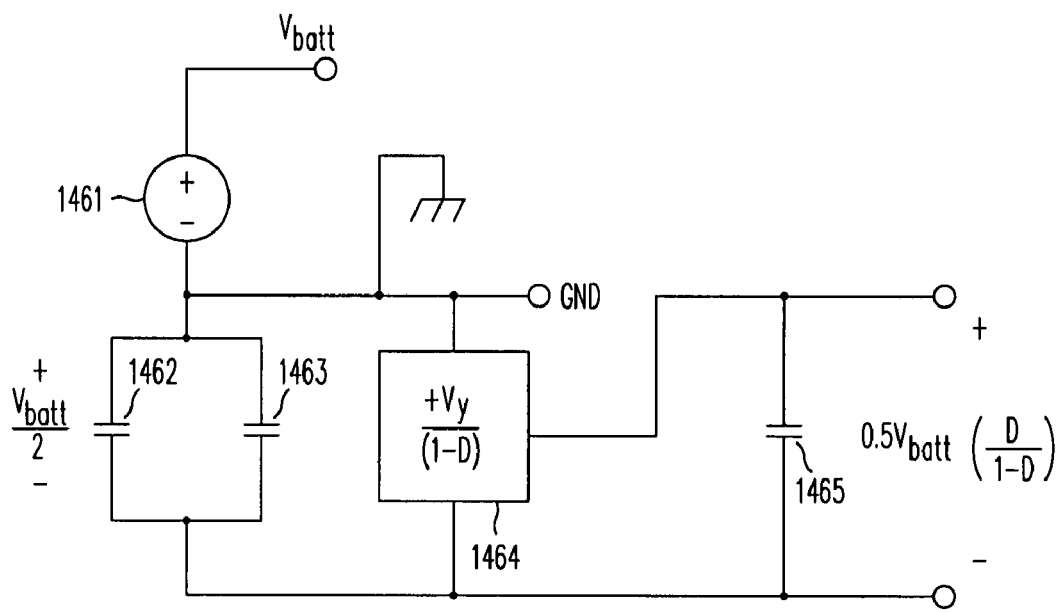
FIG. 25G shows an equivalent circuit diagram of a −0.5× CLII converter during discharge.

In the −0.5×-type fractional double inverting CLII converter 1460 of FIG. 25G, the input voltage from a battery 1461 is used to repeatedly charge two flying capacitors 1462 and 1463 to a voltage $+V_{batt}/2$ to produce an inverted intermediate voltage $V_y$ equal to $-V_{batt}/2$. The intermediate voltage $V_y$ is then used as a negative supply rail and to magnetize a switched inductor in a non-inverting boost converter 1464 to increase the magnitude of $V_y$ by a factor of $1/(1-D)$ without changing its polarity, i.e. to make a larger positive voltage. The resulting output voltage is given by $0.5 \cdot V_{batt}[D/(1-D)]$, and converter 1460 is capable of above ground up-down voltage conversion and voltage regulation at unity voltage ratios.

While a number of embodiments according to this invention have been described above, these embodiments are intended to be illustrative and not limiting. Persons of skill in the art will be able to devise numerous alternative embodiments within the broad principles of this invention from the descriptions herein.

I claim:

1. A DC/DC voltage converter comprising:
a pre-converter comprising a switched capacitive circuit; and
a post-regulator comprising a switched inductive circuit,
wherein an output terminal of the pre-converter is coupled to an input terminal of the post-regulator, an input terminal of the DC/DC voltage converter comprising an input terminal of the pre-converter, an output terminal of the DC/DC voltage converter comprising an output terminal of the post-regulator, and wherein the post-regulator is structured to produce a voltage at the output terminal of the post-regulator that is higher in absolute value than the voltage at the input terminal of the post-regulator.

2. The DC/DC voltage converter of claim 1 wherein the post-regulator comprises a synchronous rectifier switch connected in a series path with a low-side switch and an inductor connected to a point in the series path between the synchronous rectifier switch and the low-side switch.

3. The DC/DC voltage converter of claim 2 wherein the synchronous rectifier switch comprises a synchronous rectifier MOSFET and the low-side switch comprises a low-side MOSFET.

4. The DC/DC voltage converter of claim 3 wherein the post-regulator comprises a break-before-make unit coupled to a gate of the synchronous rectifier MOSFET and a gate of the low-side MOSFET and a pulse width modulation unit coupled to the break-before-make unit.

5. The DC/DC voltage converter of claim 4 comprising a clock generator coupled to the pulse width modulation unit and to the pre-converter.

6. The DC/DC voltage converter of claim 4 wherein the post-regulator comprises a level shift unit coupled to the pulse width modulation unit.

7. The DC/DC voltage converter of claim 6 comprising a feedback path, a first terminal of the feedback path being coupled to the level shift unit.

8. The DC/DC voltage converter of claim 7 wherein a second terminal of the feedback path is coupled to the output terminal of the post-regulator.

9. The DC/DC voltage converter of claim 1 wherein the pre-converter comprises a charge pump, the charge pump being structured to produce an output voltage equal to a predetermined multiple of an input voltage.

10. The DC/DC voltage converter of claim 9 wherein the charge pump is structured to produce an output voltage equal to 1.5 times the input voltage.

11. The DC/DC voltage converter of claim 10 wherein the post-regulator comprises a boost converter.

12. The DC/DC voltage converter of claim 11 wherein the post-regulator comprises:
an inductor and a low-side MOSFET connected in a series conduction path between an output terminal of the pre-converter and ground; and
a synchronous rectifier MOSFET connected between a common node in the series conduction path between the inductor and the low-side MOSFET and the output terminal of the DC/DC converter.

13. The DC/DC voltage converter of claim 9 wherein the charge pump is structured to produce a voltage at the output terminal of the pre-converter that is lower in absolute value than a voltage at the input terminal of the pre-converter.

14. The DC/DC voltage converter of claim 13 wherein the charge pump is structured to produce an output voltage equal to 0.5 times the input voltage.

15. The DC/DC voltage converter of claim 14 wherein the post-regulator comprises a boost converter.

16. The DC/DC voltage converter of claim 15 wherein the post-regulator comprises:
an inductor and a low-side MOSFET connected in a series conduction path between an output terminal of the pre-converter and ground; and
a synchronous rectifier MOSFET connected between a common node in the series conduction path between the inductor and the low-side MOSFET and the output terminal of the DC/DC converter.

17. The DC/DC voltage converter of claim 9 wherein the charge pump is structured to produce an output voltage equal to 2 times the input voltage.

18. The DC/DC voltage converter of claim 17 wherein the post-regulator comprises a boost converter.

19. The DC/DC voltage converter of claim 18 wherein the post-regulator comprises:
an inductor and a low-side MOSFET connected in a series conduction path between an output terminal of the pre-converter and ground; and
a synchronous rectifier MOSFET connected between a common node in the series conduction path between the inductor and the low-side MOSFET and the output terminal of the DC/DC converter.

20. The DC/DC voltage converter of claim 1 further comprising a feedback path, a first terminal of the feedback path being coupled to control circuitry of the post-regulator, a second terminal of the feedback path being coupled to the output terminal of the post-regulator.

21. A DC/DC voltage converter comprising:
a pre-converter comprising a switched capacitive circuit; and
a post-regulator comprising a switched inductive circuit,
wherein an output terminal of the pre-converter is coupled to an input terminal of the post-regulator, an input terminal of the DC/DC voltage converter comprising an input terminal of the pre-converter, an output terminal of the DC/DC voltage converter comprising an output terminal of the post-regulator; and
wherein the pre-converter comprises a charge pump inverter.

22. The DC/DC voltage converter of claim 21 wherein the post-regulator comprises an inverting boost converter.

23. The DC/DC voltage converter of claim 21 wherein the charge pump inverter is structured to produce an inverted output voltage equal to −1 times the input voltage.

24. The DC/DC voltage converter of claim 23 wherein the post-regulator comprises a non-inverting boost converter.

25. The DC/DC voltage converter of claim 23 wherein the post-regulator comprises an inverting boost converter.

26. The DC/DC voltage converter of claim 21 wherein the charge pump inverter is structured to produce an inverted output voltage equal to −0.5 times the input voltage.

27. The DC/DC voltage converter of claim 21 wherein the post-regulator comprises a non-inverting boost converter.

* * * * *